US008948596B2

(12) United States Patent
Nielsen et al.

(10) Patent No.: US 8,948,596 B2
(45) Date of Patent: Feb. 3, 2015

(54) NEIGHBORHOOD NODE MAPPING METHODS AND APPARATUS FOR INGRESS MITIGATION IN CABLE COMMUNICATION SYSTEMS

(75) Inventors: Steven Nielsen, North Palm Beach, FL (US); Ronald Totten, Strafford, NH (US); Travis Halky, Jupiter, FL (US)

(73) Assignee: CetusView Technologies, LLC, Palm Beach Gardens, FL (US)

( * ) Notice: Subject to any disclaimer, the term of this patent is extended or adjusted under 35 U.S.C. 154(b) by 148 days.

(21) Appl. No.: 13/539,383

(22) Filed: Jun. 30, 2012

(65) Prior Publication Data

US 2013/0004179 A1 Jan. 3, 2013

Related U.S. Application Data

(60) Provisional application No. 61/503,906, filed on Jul. 1, 2011, provisional application No. 61/538,646, filed on Sep. 23, 2011, provisional application No. 61/544,895, filed on Oct. 7, 2011.

(51) Int. Cl.
*H04B 10/00* (2013.01)
*H04J 14/00* (2006.01)
(Continued)

(52) U.S. Cl.
CPC .. *H04B 3/02* (2013.01); *H04B 3/50* (2013.01); *H04B 3/46* (2013.01); *H04J 3/00* (2013.01);
(Continued)

(58) Field of Classification Search
CPC ............ H04B 10/2575; H04B 10/25751; H04B 10/25752; H04B 10/25753; H04B 10/25759
USPC ........... 398/16, 17, 20, 21, 25, 58, 66, 67, 69, 398/70–72, 128, 135, 118, 115
See application file for complete search history.

(56) References Cited

U.S. PATENT DOCUMENTS

| 4,520,508 A | 5/1985 | Reichert, Jr. |
|---|---|---|
| 4,989,151 A | 1/1991 | Nuimura |

(Continued)

FOREIGN PATENT DOCUMENTS

| WO | WO01/89197 | 11/2001 |
|---|---|---|
| WO | WO02/49285 | 6/2002 |
| WO | WO2010/091340 | 8/2010 |

OTHER PUBLICATIONS

"Motorola Mobility and Cox Break World Record in Data Transmission Rates," Press Release, Mar. 1, 2011, http://mediacenter.motorola.com/Press-Releases/Motorola-Mobility-and-Cox-Break-World-Record-in-Data-Transmission-Rates-35e6.aspx, 2 pp.

(Continued)

*Primary Examiner* — Dalzid Singh

(57) ABSTRACT

A mobile transmitter traverses a drive path in a neighborhood node of a cable communication system and broadcasts a test signal at frequencies falling within an upstream path bandwidth. A navigational device generates a first record of positions of the transmitter along the drive path, and an analyzer monitors the upstream path bandwidth and generates a second record of received signal amplitudes of the transmitted test signal as a function of time. An ingress map is generated showing the drive path and potential points of ingress in the node, and employed to remediate faults particularly in the hardline coaxial cable plant. Iterative generation of maps and corresponding remediation in the node enable improved cable communication systems with reduced noise profiles between 5 MHz and 20 MHz and employing higher modulation order QAM communication channels (e.g., 256-QAM and higher) throughout the upstream path bandwidth to increase upstream capacity.

54 Claims, 63 Drawing Sheets
(18 of 63 Drawing Sheet(s) Filed in Color)

(51) Int. Cl.
*H04B 3/02* (2006.01)
*H04B 3/50* (2006.01)
*H04B 3/46* (2006.01)
*H04J 3/00* (2006.01)
*H04J 3/16* (2006.01)
*H04W 52/22* (2009.01)
*H04L 12/26* (2006.01)
*H04B 10/2575* (2013.01)
*H04Q 11/00* (2006.01)
*H04B 10/114* (2013.01)
*H04N 17/00* (2006.01)
*H04N 21/61* (2011.01)

(52) U.S. Cl.
CPC ........... *H04J 3/1694* (2013.01); *H04W 52/225* (2013.01); *H04L 43/0823* (2013.01); *H04B 10/2575* (2013.01); *H04N 21/6118* (2013.01); *H04N 21/6168* (2013.01); *H04Q 11/0067* (2013.01); *H04B 10/25751* (2013.01); *H04B 10/1143* (2013.01); *H04N 17/00* (2013.01); *H04L 43/08* (2013.01); *H04N 17/004* (2013.01); *H04N 21/6175* (2013.01)
USPC ............................................. 398/72; 398/115

(56) References Cited

U.S. PATENT DOCUMENTS

| | | | |
|---|---|---|---|
| 5,294,937 | A | 3/1994 | Ostteen et al. |
| 5,299,300 | A | 3/1994 | Femal et al. |
| 5,777,662 | A | 7/1998 | Zimmerman |
| 5,793,759 | A | 8/1998 | Rakib et al. |
| 5,943,604 | A | 8/1999 | Chen et al. |
| 5,990,687 | A | 11/1999 | Williams |
| 6,091,932 | A | 7/2000 | Langlais |
| 6,192,070 | B1 | 2/2001 | Poon |
| 6,425,132 | B1 | 7/2002 | Chappell |
| 6,530,087 | B1 | 3/2003 | Kobayashi et al. |
| 6,772,437 | B1 | 8/2004 | Cooper et al. |
| 6,804,826 | B1 | 10/2004 | Bush et al. |
| 6,833,859 | B1 | 12/2004 | Schneider et al. |
| 6,880,170 | B1 | 4/2005 | Kauffman et al. |
| 6,904,160 | B2 | 6/2005 | Burgess |
| 6,915,530 | B1 | 7/2005 | Kauffman et al. |
| 6,978,476 | B2 | 12/2005 | Zimmerman |
| 7,111,318 | B2 | 9/2006 | Vitale et al. |
| 7,139,283 | B2 | 11/2006 | Quigley et al. |
| 7,162,731 | B2 | 1/2007 | Reidhead et al. |
| 7,360,124 | B2 | 4/2008 | Bouchard |
| 7,395,548 | B2 | 7/2008 | Runzo |
| 7,489,137 | B2 | 2/2009 | Williams |
| 7,748,023 | B2 | 6/2010 | Weinstein et al. |
| 7,821,954 | B2 | 10/2010 | Quigley et al. |
| 8,000,254 | B2 | 8/2011 | Thompson et al. |
| 8,143,900 | B2 | 3/2012 | Shimp et al. |
| 8,270,833 | B2 * | 9/2012 | Lin et al. ............................ 398/72 |
| 8,311,412 | B2 | 11/2012 | Rakib |
| 8,625,987 | B2 * | 1/2014 | Pfeiffer et al. ................... 398/33 |
| 2001/0033583 | A1 | 10/2001 | Rabenko et al. |
| 2002/0067802 | A1 | 6/2002 | Smith et al. |
| 2002/0141347 | A1 | 10/2002 | Harp et al. |
| 2003/0061159 | A1 | 3/2003 | Adams et al. |
| 2003/0179821 | A1 | 9/2003 | Lusky et al. |
| 2004/0031059 | A1 | 2/2004 | Bialk |
| 2005/0058082 | A1 | 3/2005 | Moran |
| 2005/0076381 | A1 | 4/2005 | Gross |
| 2005/0120196 | A1 | 6/2005 | Zito |
| 2005/0183130 | A1 | 8/2005 | Sadja et al. |
| 2005/0251331 | A1 | 11/2005 | Kreft |
| 2005/0265730 | A1 | 12/2005 | Yasue et al. |
| 2006/0192672 | A1 | 8/2006 | Gidge et al. |
| 2006/0248565 | A1 | 11/2006 | Shimp et al. |
| 2007/0019577 | A1 | 1/2007 | Jang |
| 2007/0022457 | A1 | 1/2007 | Eckenroth |
| 2007/0106784 | A1 | 5/2007 | Dickman |
| 2007/0189770 | A1 | 8/2007 | Sucharczuk et al. |
| 2007/0249318 | A1 | 10/2007 | Williams et al. |
| 2008/0089399 | A1 | 4/2008 | Azenko et al. |
| 2008/0124083 | A1 | 5/2008 | Esser et al. |
| 2008/0310842 | A1 | 12/2008 | Skrobko |
| 2008/0320541 | A1 | 12/2008 | Zinevich |
| 2009/0013210 | A1 | 1/2009 | McIntosh |
| 2009/0096665 | A1 | 4/2009 | Maxson |
| 2009/0205007 | A1 | 8/2009 | Woodward |
| 2009/0300534 | A1 | 12/2009 | Bush et al. |
| 2010/0031305 | A1 | 2/2010 | Liva et al. |
| 2010/0100919 | A1 | 4/2010 | Hsue et al. |
| 2010/0157824 | A1 | 6/2010 | Thompson et al. |
| 2010/0309805 | A1 | 12/2010 | Jones, Jr. et al. |
| 2011/0043640 | A1 | 2/2011 | Zinevich |
| 2011/0170871 | A1 * | 7/2011 | Kazawa et al. ................... 398/66 |
| 2011/0185263 | A1 | 7/2011 | Chapman et al. |
| 2011/0274148 | A1 | 11/2011 | Urban et al. |
| 2012/0047544 | A1 | 2/2012 | Bouchard |
| 2012/0163201 | A1 | 6/2012 | Williams et al. |
| 2013/0064279 | A1 | 3/2013 | Nielsen et al. |
| 2013/0064549 | A1 | 3/2013 | Nielsen et al. |
| 2013/0070826 | A1 | 3/2013 | Nielsen et al. |
| 2013/0088993 | A1 | 4/2013 | Nielsen et al. |
| 2013/0094369 | A1 | 4/2013 | Nielsen et al. |
| 2013/0094859 | A1 | 4/2013 | Nielsen et al. |
| 2013/0182752 | A1 | 7/2013 | Fox |
| 2014/0143818 | A1 | 5/2014 | Nielsen et al. |

OTHER PUBLICATIONS

Data Sheet RX48 BSR 64000 Decoupled Upstream Module, © Motorola, Inc. 2010, http://moto.arrisi.com/Video-Solutions/US-EN/Products-and-Services/Broadband-Access/CMTS/ci.RX48_US-EN.resources, 2 pp.

West, L. "Reverse Path Design for DOCSIS 3.0 and Beyond—Part 1: The long loop ALC," CED Magazine, Dec. 1, 2008, 4 pp.

West, L. "Reverse Path Design for DOCSIS 3.0 and Beyond—Part 2: Optical Link Dynamic Range," CED Magazine, Dec. 1, 2008, 8 pp.

West, L. "Reverse Path Design for DOCSIS 3.0 and Beyond—Part 3: Link Budget and System Set-Up," CED Magazine, Dec. 1, 2008, 8 pp.

West, L. "Composite Power and Its Effect on Reverse Path Laser Clipping," from SCT 1997 Conference on Emerging Technologies, Jan. 8-10, 1987, 6 pp.

West, L. "The Effect of Preamplifier Compression on Measured Noise Power Ratios," *IEEE Photonics Technology Letters*, vol. 1, No. 7, Jul. 2000, pp. 924-926.

West, L. "On Determining the Optimum Modulation Index for Reverse Path Lasers in Hybrid Fiber/Coax Networks," IEEE Photonics Technology Letters, vol. 8, No. 11, Nov. 1996, pp. 1555-1557.

Labiche, M. "Basics of Semiconductor Laser Diodes for Modern Communication Systems," The Hybrid/Coax Reverse Path: A Proven Gateway to New Services, 1997 Scientific Atlanta, Inc., pp. 26-38.

Loveless, R.C. "Interactive HFC-Optimizing the Reverse System Design: A Balance of the Reverse to the Forward," The Hybrid/Coax Reverse Path: A Proven Gateway to New Services, 1997 Scientific Atlanta, Inc., pp. 89-111.

Lucas, M. "Testing Techniques for Upstream Communications over Hybrid Fiber/Coax Networks," The Hybrid/Coax Reverse Path: A Proven Gateway to New Services, 1997 Scientific Atlanta, Inc., pp. 121-131.

McBride, A.L. et al., "HFC Reliability/Availability: On Predicting Subscriber-Weighted Availability in the Fiber Serving Area," The Hybrid Fiber/Coax Reverse Path: A Proven Gateway to New Services, 1997 Scientific Atlanta, Inc., pp. 10-38.

Mobley, J.G. "Simulating the Reverse-Path Performance of an HFC Plant," The Hybrid/Coax Reverse Path: A Proven Gateway to New Services, 1997 Scientific Atlanta, Inc., pp. 113-119.

Murphy, K. et al., "Balancing the Reverse Path: From the Subscriber to the Headend and Back," The Hybrid/Coax Reverse Path: A Proven Gateway to New Services, 1997 Scientific Atlanta, Inc., pp. 64-79.

Office Action dated Mar. 14, 2013 from U.S. Appl. No. 13/669,154.
Office Action dated Mar. 26, 2013 from U.S. Appl. No. 13/690,814.

(56) References Cited

OTHER PUBLICATIONS

Office Action dated Apr. 9, 2013 from U.S. Appl. No. 13/669,172.
Office Action dated Apr. 30, 2013 from U.S. Appl. No. 13/669,092.
Stine, A. "Performance Characterization of Reverse Path Fabry-Perot and Distributed Feedback Lasers," The Hybrid/Coax Reverse Path: A Proven Gateway to New Services, 1997 Scientific Atlanta, Inc., pp. 40-47.
Wall, B. "The Basics of Digital Transmission (and Reception) for the Reverse Path," The Hybrid/Coax Reverse Path: A Proven Gateway to New Services, 1997 Scientific Atlanta, Inc., pp. 55-62.
West, L. "A Reverse Path System Design Approach," The Hybrid/Coax Reverse Path: A Proven Gateway to New Services, 1997 Scientific Atlanta, Inc., pp. 81-87.
West, L. "Laser Loading Theory for Reverse Path Design in HFC Networks," The Hybrid/Coax Reverse Path: A Proven Gateway to New Services, 1997 Scientific Atlanta, Inc., pp. 49-53.
Wilk, T., "Reverse Traffic Considerations on HFC Node Size Migration," The Hybrid Fiber/Coax Reverse Path: A Proven Gateway to New Services, 1997 Scientific Atlanta, Inc., pp. 2-8.
Nielsen et al., co-pending U.S. Publication No. 2013-0064279, published Mar. 14, 2013.
Nielsen et al., co-pending U.S. Publication No. 2013-0064549, published Mar. 14, 2013.
Nielsen et al., co-pending U.S. Publication No. 2013-0070826, published Mar. 21, 2013.
Ciciora, W. et al., "Upstream Issues," Modern Cable Television Technology, Video, Voice, and Data Communications, 2nd Edition, Morgan Kauffman Publishers, Inc., 2004, Chapter 16, pp. 649-697.
Raskin, D. et al., "Digital Applications on Cable Systems," Return Systems for Hybrid Fiber/Coax Cable TV Networks, Prentice Hall PTR, 1998, Chapter 3, pp. 22-45.
Raskin, D. et al., "Sources of Noise and Interference," Return Systems for Hybrid Fiber/Coax Cable TV Networks, Prentiss Hall PTR, 1998, Chapter 4, pp. 46-68.
Raskin, D. et al., Plant Design considerations, Return Systems for Hybrid Fiber/Coax Cable TV Networks, Prentiss Hall PTR, 1998, Chapter 5, pp. 69-87.
Notice of Allowance dated Jan. 21, 2014 from U.S. Appl. No. 13/669,092.
Notice of Allowance dated Jun. 13, 2013 from U.S. Appl. No. 13/690,814.
Notice of Allowance dated Nov. 20, 2013 from U.S. Appl. No. 13/669,172.
Office Action dated Feb. 11, 2014 from U.S. Appl. No. 14/034,261.
Office Action dated Aug. 9, 2013 from U.S. Appl. No.. 13/669,172.
Raskin, D. et al., "RF Power Allocation," Return Systems for Hybrid Fiber/Coax Cable TV Networks, Prentice Hall PTR, 1998, Chapter 10, pp. 165-186.
Supplemental Notice of Allowability dated Jul. 1, 2013 from U.S. Appl. No. 13/669,154.
Supplemental Notice of Allowability dated Jul. 11, 2013 from U.S. Appl. No. 13/669,154.
Supplemental Notice of Allowabilty dated Mar. 14, 2014 for U.S. Appl. No. 14/054,771.
Nielsen et al., co-pending U.S. Publication No. 2014-0047489, published Feb. 13, 2014.
Nielsen et al., co-pending U.S. Publication No. 2014-0010542, published Jan. 9, 2014.
Notice of Allowance dated May 23, 2013 from U.S. Appl. No. 13/669,064.
Notice of Allowance dated May 23, 2013 from U.S. Appl. No. 13/669,154.
Office Action dated Jun. 4, 2014 from U.S. Appl. No. 14/216,584.
Corrected Notice of Allowability dated Jun. 3, 2014 from U.S. Appl. No. 14/054,771.
Corrected Notice of Allowability dated Jun. 2, 2014 from U.S. Appl. No. 13/669,092.
Office Action dated May 8, 2014 from Canadian Application No. 2,843,530.
U.S. Appl. No. 13/669,064, filed Nov. 5, 2012, Nielsen et al.
U.S. Appl. No. 13/669,092, filed Nov. 5, 2012, Nielsen et al.
U.S. Appl. No. 13/669,154, filed Nov. 5, 2012, Nielsen et al.
U.S. Appl. No. 13/669,172, filed Nov. 5, 2012, Nielsen et al.
U.S. Appl. No. 13/690,739, filed Nov. 30, 2012, Nielsen et al.
U.S. Appl. No. 13/690,814, filed Nov. 30, 2012, Nielsen et al.
Al-Banna, A. "Architecting the DOCSIS Network to Offer Symmetric 1Gbps Service Over the Next Two Decades," The NCTA 2012 Spring Technical Forum Proceedings, May 21, 2012.
"Detecting Leakage of Digital Channels in an HFC Network," White Paper by Acrom Digital; http://www.arcomlabs.com/images/documents/qamsnarewhitepaperformattedv4.pdf, Mar. 1, 2009.
"Leakage in an All-Digital World: Heavy Hitters Weigh in," Mar. 2009 *Communications Technology*; http://www.cable360.net/ct/deployment/techtrends/34303.html.
"256-QAM for Upstream HFC," Thompson et al., NCTA 2010 Spring Technical Forum Proceedings, Los Angeles, California, May 2010.
"Advanced Physical Layer Technologies for High-Speed Data Over Cable," Cisco Whitepaper, Aug. 2005, http://www.cisco.com/en/US/prod/collateral/video/ps8806/ps5684/ps2209/prod_white_paper0900aecd8066c6cc_ps4969_Products_White_Paper.html.
"Better Returns from the Return Path: Implementing an Economical Migration Plan for Increasing Upstream Capacity," Brian O'Neill and Rob Howald, Motorola whitepaper, Sep. 2008, http://www.motorola.com/staticfiles/Video-Solutions/Solutions/Industry%20Solutions/ Service%20Providers/Cable%20Operators/Broadband%20Access%20Networks%20(BAN)/ Fiber%20Deep/_Documents/Static%20files/Better%20Returns%20from%20the%20Return%20PathWhitepaper92008.pdf.
"Broadband: Another Look at Upstream 64-QAM," Ron Hranac, Communications Technology, Apr. 1, 2009, http://www.cablefax.com/ct/operations/bestpractices/Broadband-Another-Look-at-Upstream-64-QAM_34894.html.
"Broadband: Equalized or Unequalized? That is the Question," Ron Hranac, Communication Technology, Feb. 1, 2007, http://www.cable360.net/print/ct/operations/ bestpractices/21885.html.
"Carrier-to-Noise Versus Signal-to-Noise," R. Hranac, Cisco Presentation, SCTE Cascade Range Chapter, printed Dec. 2, 2012, http://www.cascaderange.org/presentations/CNR_vs_SNR.pdf.
"CATV Application: Using WWG Equipment to Test and Troubleshoot CPD, Impulse Noise and Ingress in the Return Path," Return Path Troubleshooting, Application Note 3, Wavetek Wendel Goltermann, 1999, http://www.protelturkey.com/teknik/catv/Return%20path%20troubleshooting.pdf.
"CCAP 101: Guide to Understanding the Converged Cable Access Platform," Motorola whitepaper, Feb. 2012, http://www.motorola.com/ staticfiles/Video-Solutions/Products/Video-Infrastructure/Distribution/EDGE-QAM/APEX-3000/_Documents/_StaticFiles/12.02.17-Motorola-CCAP%20101_white%20paper-US-EN.pdf.
"Cisco Hints at What Comes After Docsis 3.0," Jeff Baumgartner, Light Reading Cable, May 14, 2012, http://www.lightreading.com/document.asp?doc_id= 220896&site=lr_cable&.
"Digital Transmission: Carrier-to-Noise Ratio, Signal-to-Noise Ratio, and Modulation Error Ratio," Ron Hranac and Bruce Currivan, Cisco whitepaper, Nov. 2006, http://www.cisco.com/en/US/prod/collateral/video/ps8806/ps5684/ps2209/prod_white_paper0900aecd805738f5.html.
"Effectively Migrating to DOCSIS 2.0," Motorola whitepaper, Sep. 29, 2003, http://freedownloadb.com/pdf/efficiently-migrating-to-bdocsis-b-2-10401369.html.
"Expanding Bandwidth Using Advanced Spectrum Management," Motorola whitepaper, Sep. 25, 2003, http://www.motorola.com/web/Business/Solutions/Industry%20Solutions/Service%20Providers/Cable %20Operators/CablePON/Greenfield/_documents/_StaticFiles/CMTS_spectrum_mgmt_New.pdf.
"HFC Network Capacity Expansion Options," J.D. Salinger, The NCTA 2012 Spring Technical Forum Proceedings, May 21, 2012.
"How to Increase Return Path Availability and Throughput," Cisco whitepaper, http://www.cisco.com/en/US/products/hw/cable/ps2209/products_white_paper09186a00801be4ad.shtml, printed Dec. 1, 2012.

(56) References Cited

OTHER PUBLICATIONS

"Moto: S-CDMA Starting to Spread," Jeff Baumgartner, Light Reading Cable, Feb. 16, 2010, http://www.lightreading.com/document.asp?doc_id=187997&site=lr_cable.
"Pushing IP Closer to the Edge," Rei Brockett et al., The NCTA 2012 Spring Technical Forum Proceedings, May 21, 2012.
"QAM Overview and Troubleshooting Basics for Recently digital Cable Operators," JDSU whitepaper, Oct. 2009, http://www.jdsu.com/ProductLiterature/ Digital_QAM_Signals_Overview_and_Basics_of _Testing.pdf.
"Qualifier X-Ray User Guide," ComSonics, Inc., CSI Doc. 101399-001, 2008, http://www.comsonics.com/products/manuals/Qualifier%20X-Ray%20UG_101399-001%20Rev_D%20web.pdf.
"Return Path Maintenance Plan: A Five Step Approach to Ensuring a Reliable Communications Path," Robert Flask, Acterna LLC whitepaper, 2005, p. 7, http://sup.xenya.si/sup/info/jdsu/white_papers/ ReturnPathMaintenancePlan_Whitepaper.pdf.
"Return Path Noise Troubleshooting—Piedmont Chapter/SCTE Technical Session," Trilithic Presentation, printed Dec. 2, 2012, http://www.piedmontscte.org/resources/SCTE+Piedmont$2C+NC+Return+Path+Noise.pdf.
"Return Path Testing Seminar," Sunrise Telecom Broadband, Feb. 14, 2002, http://docsis.beckitrue.com/seminars/PowerPointFiles/Returnseminar.ppt.
"Return Path," Leslie Ellis, translationplease.com, undated, http://www.translation-please.com/dictionarymeaning.cfm?dictionary id=304, Oct. 20, 2011.
"The Grown-up Potential of a Teenage PHY," Dr. Robert Howald et al., The NCTA 2012 Spring Technical Forum Proceedings, May 21, 2012.
"Theory Behind Optimizing Your Return Path Using the 9581 SST R4," Trilithic Application Note, Jan. 2008, http://vault.trilithic.com/instruments/documents/applications/theory_behind_optimizing_your_return_path_using_the_9581_sst_r4_appnote.pdf.
"Understanding Data Throughput in a DOCSIS World," Cisco Whitepaper, Document ID 19220, Aug. 25, 2008, http://www.cisco.com/en/US/tech/tk86/tk168/technologies_tech_note09186a0080094545.shtml.
"Understanding the FCC Regulations for Low-Power, Non-Licensed Transmitters," OET Bulletin 63, Oct. 1993, FCC Office of Engineering and Technology, Washington, DC.
"Upstream FEC Errors and SNR as Ways to Ensure Data Quality and Throughput," Cisco Whitepaper, Document ID: 49780, Oct. 4, 2005.
"Using JDSU Equipment to Test and Troubleshoot CPD, Impulse Noise, and Ingress in the Return Path," JDSU Application Note, 2006, http://www.jdsu.com/ProductLiterature/SDA_App_Note3_RetPath.pdf.
Chapman, J. et al., "Mission is Possible: An Evolutionary Approach to Gigabit-Class DOCSIS," The NCTA 2012 Spring Technical Forum Proceedings, May 21, 2012.
Eckenroth, K. "21st Century Technology—now: Global Satellite System for Signal Leakage," Cable Leakage Technologies, 2009, http://www.wavetracker.com/21stcenturytech.html.
Eckenroth, K. "A CLI Dialogue on Digital RF Tracking/Mapping," Cable Leakage Technologies, 2009, http://www.wavetracker.com/CLIdialogue.html.
Eckenroth, K. "Easy-to-Implement Signal Leakage Strategies," Cable Leakage Technologies, 2009, http://www.wavetracker.com/Strategies.html.
Eckenroth, K. "Wavetracking the Leakage Basics," Cable Leakage Technologies, 2009, http://www.wavetracker.com/leakagebasics.html.
Eckenroth, K. et al. "Signal Leakage: The Next Logical Step," Cable Leakage Technologies, 2009, http://www.wavetracker.com/signal-leakagenextstep.html.
Howald, Robert, Dr. "Access Networks Solutions—DOCSIS 3.0 Upstream: Technology, RF Variables & Case Studies,", Motorola Home and Networks Mobility, 2009, http://chapter.scte.org/southflorida/files/2010/04/SCTE_D3-Upstream-A-TDMARon Howald.pdf.
Hranac, R. "Broadband: Interference Report Card," Communications Technology, Apr. 1, 2003, http://www.cable360.net/ct/operations/bestpractices/14955.html.
Hranac, R. "Just How Strong is That Ingress," Communications Technology, Jun. 1, 2011, http://www.cable360.net/ct/sections/columns/broadband/46498.html.
Hranac, R. "Return Path Troubleshooting," Cisco Presentation, undated http://www.ciscoknowledgenetwork.com/cable/documents/10_Return_path_troubleshooting.pdf, Dec. 10, 2013.
Hranac, R. "Tackling Serious Ingress," Communications Technology, May 1, 2004, http://www.cable360.net/ct/operations/bestpractices/15016.html.
Hranac, R. "Understanding Real-World MER Measurements (Part 1)," Communications Technology, Feb. 1, 2012, http://www.cable360.net/ct/sections/columns/broadband/50866.html.
Hranac, R. "Understanding Real-World MER Measurements (Part 2)," Communications Technology, May 1, 2012, http://www.cable360.net/ct/sections/columns/broadband/Understanding-Real-World-MER-Measurements-Part-2_52032.html.
Hranac, R. et al., "Another Look at Signal Leakage—The Need to Monitor at Low and High Frequencies," Society of Cable Telecommunications Engineers, Expo '12, Oct. 2012, http://expo.scte.org/content/sessions/workshopsdescriptions.cfm.
Hranac, R., "A Leak is a Leak—or is it?," Aug. 2012, *Communications Technology Mid-Day Report*; http://www.cable360.net/ct/news/ctreports/commentary/A-Leak-is-A-Leak&hellipOr-Is-It_52272.html.
Hranac, R., "LTE Interference (Part 2)," Nov. 2011 *Communications Technology*; http://www.cable360.net/ct/operations/testing/48917.html.
Hranac, R., "Signal Leakage in an All-Digital Network," Feb. 2009 *Communications Technology*; http://www.cable360.net/ct/operations/bestpractices/33882.html.
Hranac, R., "Signal Leakage in an All-Digital Network: The Continuing Story," May 2009 *Communications Technology*; http://www.cable360.net/ct/operations/bestpractices/35443.html.
Hranac, R., "Some Thoughts on LTE Interference," Oct. 2011 *Communications Technology*; http://www.cable360.net/ct/sections/columns/broadband/48482.html.
Hranac, R., "Untangling Some of the Confusion," Mar. 2012 *Communications Technology Mid-Day Report*; http://www.cable360.net/ct/news/ctreports/commentary/Untangling-Some-Of-theConfusion_51219.html.
Hranac, R., Even More on LTE Interference, Aug. 2012 *Communications Technology Mid-Day Report*; http://www.cable360.net/ct/news/ctreports/commentary/Even-More-On-LTE-Interference_53627.html.
Marketos, J. "Return Path Performance Requirements in Contemporary CATV Systems," Philips Broadband Networks, printed Dec. 2, 2012, http://www.scatmag.com/technical/return.pdf.
Morgan, B. "Insights Into Proper Return Path Alignment," Communication Engineering and Design, Oct. 1996.
Morgan, B. "Noise and Ingress Performance in the Return Path," Communication Engineering and Design, Mar. 1997.
Morgan, B. "Proactive Return Path Maintenance," Communication Engineering and Design, Nov. 1996.
Murphy, R. A simulation Study of DOCSIS Upstream Channel Bandwidth Allocation Strategies for Minimal User Response Time, Thesis, The University of Texas at San Antonio, College of Sciences, Department of Computer Science, Dec. 2004.
Ovadia, S. "Cable TV Return-Path Transmission Characteristics," Inform IT, Jun. 1, 2001, http://www.informit.com/articles/article.aspx?p=21622.
Robuck, M. "Engineering Practices Key to Midcontinent's Successes," Communication Technology, Aug. 1, 2007, http://www.cable360.net/print/ct/operations/bestpractices/24884.html.
Webb, J. "Identifying Common Impairments in DOCSIS Networks," Sunrise Telecom, Broadband Gear Report, printed Nov. 8, 2011, http://www.sunrisetelecom.com.cn/support/article_docsis_impairments.php.

(56) References Cited

OTHER PUBLICATIONS

International Search Report and Written Opinion, Application No. PCT/2012/45278, dated Nov. 20, 2012.

Combined Search and Examination Report for Application No. GB1211715.6, dated Dec. 12, 2012.

Guan, K. et al., "Cost-Efficient Fiber Connection Topology Design for Metropolian Area WDM Networks," J. Opt. Commun. Netw., vol. 1, No. 1, Jun. 2009.

Corrected Notice of Allowability dated Jul. 17, 2014 from U.S. Appl. No. 13/669,092.

Corrected Notice of Allowabilty dated Sep. 15, 2014 from U.S. Appl. No. 14/034,261.

Corrected Notice of Allowability dated Sep. 2, 2014 from U.S. Appl. No. 14/034,261.

Miguelez, P., "The Right Stuff—Breaking the Upstream Bandwidth Speed Barrier," Motorola, Inc., ©Motorola, Inc., May 2011.

Office Action dated Sep. 23, 2014 from Canadian Application No. 2,843,530.

Notice of Allowance dated Sep. 24, 2014 from U.S. Appl. No. 14/216,584.

Corrected Notice of Allowability dated Sep. 30, 2014 from U.S. Appl. No. 14/034,261.

International Search Report and Written Opinion, Application PCT/US2014/030579, dated Oct. 29, 2014.

Office Action dated Nov. 3, 2014 form U.S. Appl. No. 14/022,096.

* cited by examiner

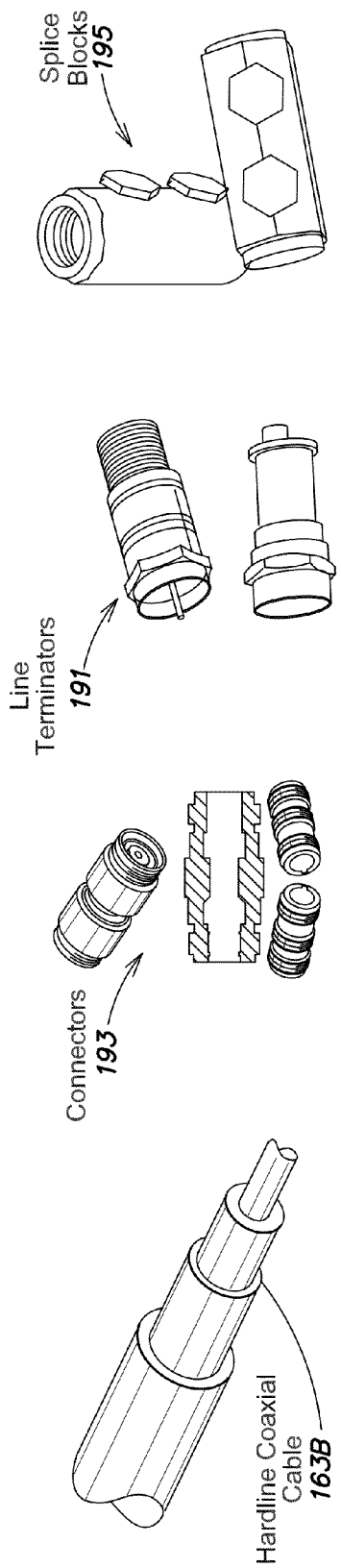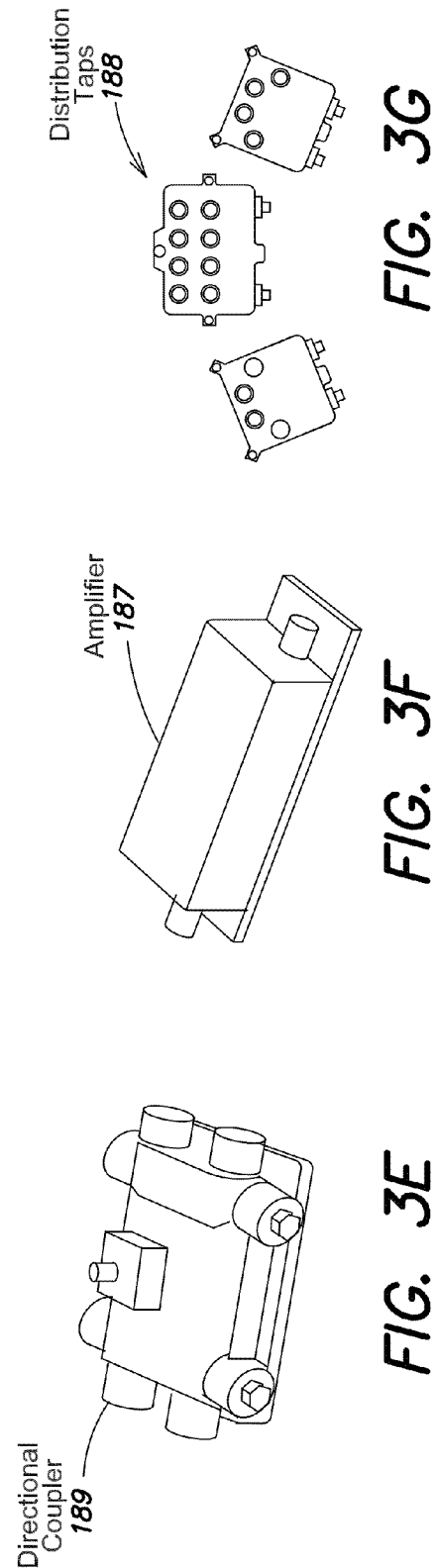

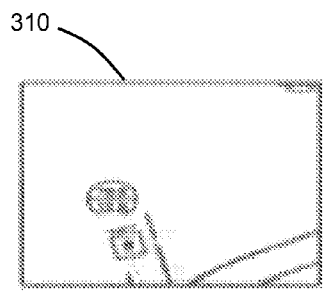
FIG. 49A
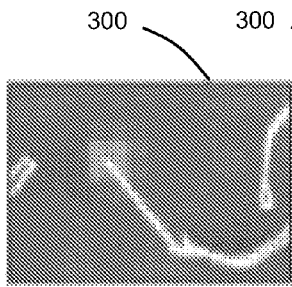
FIG. 49B
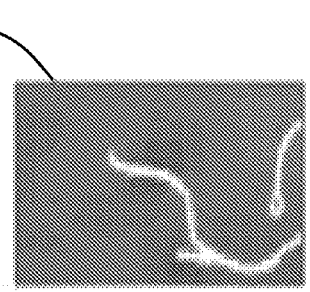
FIG. 49C
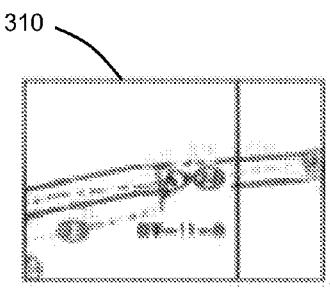
FIG. 49D
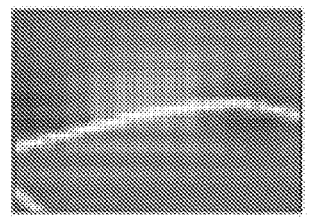
FIG. 49E
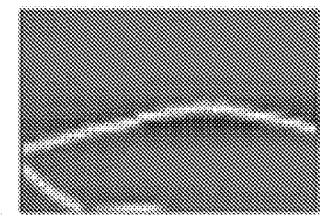
FIG. 49F
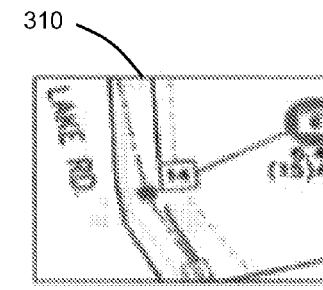
FIG. 49G
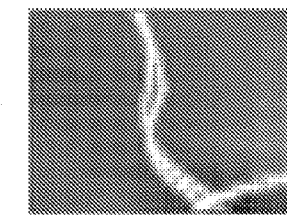
FIG. 49H
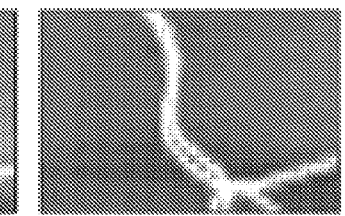
FIG. 49I
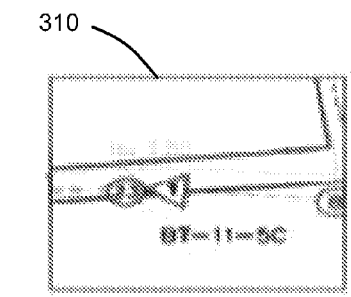
FIG. 49J
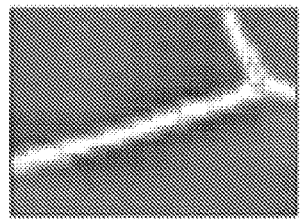
FIG. 49K
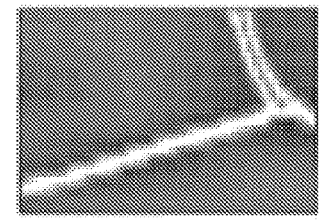
FIG. 49L
*FIG. 49*

NEIGHBORHOOD NODE MAPPING METHODS AND APPARATUS FOR INGRESS MITIGATION IN CABLE COMMUNICATION SYSTEMS

CROSS-REFERENCES TO RELATED APPLICATIONS

The present application claims a priority benefit, under 35 U.S.C. §119(e), to the following U.S. provisional applications:

Ser. No. 61/503,906, filed Jul. 1, 2011, entitled "METHODS, APPARATUS AND SYSTEMS FOR INGRESS DETECTION AND REMEDIATION;"

Ser. No. 61/538,646, filed Sep. 23, 2011, entitled "METHODS, APPARATUS AND SYSTEMS FOR INGRESS DETECTION AND REMEDIATION;" and Ser. No. 61/544,895, filed Oct. 7, 2011, entitled "METHODS, APPARATUS AND SYSTEMS FOR INGRESS DETECTION AND REMEDIATION."

Each of the above-identified applications is hereby incorporated herein by reference in its entirety.

BACKGROUND

Cable communication systems provide one or more of commercial TV services, Internet data services, and voice services (e.g., "Voice-over-Internet Protocol," or VoIP) to one or more subscriber premises (or "end users") in a given geographic area. Generally speaking, a cable communication system refers to the operational (e.g., geographical) footprint of an entertainment and/or information services franchise that provides entertainment and/or information services to a subscriber base spanning one or more towns, a metropolitan area, or a portion thereof. Particular entertainment and/or information services offered by the franchise (e.g., entertainment channel lineup, data packages, etc.) may differ from system to system. Some large cable companies operate several cable communication systems (e.g., in some cases up to hundreds of systems), and are known generally as Multiple System Operators (MSOs).

Cable Communication System Overview

FIG. 1 generally illustrates various elements of a conventional hybrid fiber-coaxial (HFC) cable communication system 160. The cable communication system 160 includes a headend 162 coupled to one or more nodes 164A, 164B and 164C via one or more physical communication media. The physical communication media typically include fiber optic cable and coaxial cable to convey information (e.g., television programming, Internet data, voice services) between the headend 162 and subscriber premises served by the nodes 164A, 164B and 164C of the cable communication system 160.

In FIG. 1, a first node 164A is illustrated with some detail to show multiple subscriber premises 190 as well as additional elements that similarly may be found in the other nodes 164B and 164C. In general, the headend 162 transmits information to and receives information from a given node via physical communication media (i.e., fiber optic cable and coaxial cable) dedicated to serving the geographic area covered by the node. Although the physical communication media of a given node may pass proximate to several premises, not all premises passed are necessarily subscriber premises 190 (i.e., actual subscribers to the services provided by the cable communication system 160); in some conventional cable communication systems, subscriber premises 190 of a given node may constitute on the order of 50% of the total number of premises passed by the physical communication media serving the node.

Although FIG. 1 illustrates only three subscriber premises 190 in the first node 164A, it should be appreciated that the geographic area covered by a representative node of a conventional cable communication system typically includes anywhere from approximately 100 premises to as many as 1000 premises (not all of which may be subscriber premises 190). Also, while FIG. 1 shows only three nodes 164A, 164B and 164C coupled to the headend 162, it should be appreciated that cable communication systems similar to the system 160 shown in FIG. 1 may include different numbers of nodes (e.g., for some larger cable communication systems, the headend may serve several hundreds of nodes).

Nodes

The first node 164A shown in FIG. 1 is depicted generally as either a "Fiber to the Neighborhood" (FTTN) node (also sometimes referred to as a "Fiber to the Feeder" or FTTF node), or a "Fiber to the Curb" (FTTC) node. In an FTTN/FTTF or FTTC node, fiber optic cable is employed as the physical communication medium to communicate information between the headend 162 and the general geographic area of subscriber premises. Within the area occupied by the subscriber premises, coaxial cable is employed as the physical communication medium between the fiber optic cable and respective subscriber premises 190. A general difference between FTTN/FTTF and FTTC nodes relates to how close the fiber optic cable comes to the premises in the node, and how many premises are passed by the coaxial cable portion of the node; for example, in an FTTC node, the fiber optic cable generally comes closer to the premises in the node than in an FTTN/FTTF node, and the coaxial cable portion of the FTTC node typically passes fewer than 150 premises (whereas the coaxial cable portion of an FTTN/FTTF node passes as many as from 200 to 1000 premises, as discussed further below). Unlike cable communication systems employing FTTN/FTTF and FTTC nodes, "Fiber to the Home" (FTTH) systems (also knows as "Fiber to the Premises" or FTTP systems) have a primarily fiber optic cable infrastructure (a "passive optical network" or PON) that runs directly and respectively to some smaller number of subscriber premises (e.g., approximately 30 or fewer premises passed).

As shown in FIG. 1, the first node 164A has an infrastructure (also referred to generally herein as a "cable plant") that includes a first fiber optic cable 163A, a first optical/radio frequency (RF) converter 167, a first RF hardline coaxial cable plant 180, a plurality of first subscriber service drops 163C, and a plurality of first subscriber premises 190.

More specifically, the first node 164A includes a first fiber optic cable 163A, coupled to the headend 162 of the cable communication system 160 and to a first optical/radio frequency (RF) converter 167 (also sometimes referred to as a "bridge converter") within the first node 164A. As noted above, depending on the configuration of the node as an FTTN/FTTF node or an FTTC node, the first optical/RF bridge converter 167 may be physically disposed at various geographic locations covered by the first node 164A. The bridge converter 167 generally serves to convert optical signals transmitted by the headend 162 to radio frequency (RF) signals that are received by subscriber premises 190 in the first node; the bridge converter 167 also converts RF signals transmitted by the subscriber premises 190 to optical signals that are received at the headend 162.

The first node 164A also includes a first RF hardline coaxial cable plant 180 (also referred to herein simply as a "hardline cable plant") coupled to the bridge converter 167.

The first hardline cable plant 180 constitutes another portion of the physical communication media over which information is carried, in the form of RF signals (e.g., modulated RF carrier waves), between the optical/RF bridge converter 167 and the subscriber premises 190 of the first node. Additional details of the first hardline cable plant 180 are discussed below in connection with FIG. 2.

As shown in FIG. 1, the first node 164A further includes multiple first subscriber service drops 163C, coupled to the first hardline cable plant 180 and respectively associated with subscriber premises 190. Each of the subscriber premises 190 includes one or more end-user modems 165 (also referred to herein as "subscriber modems" or "media terminal adapters") to demodulate RF signals carrying data and/or voice information and received from the first hardline plant 180 via the premises' corresponding subscriber service drop 163C (a different device, commonly known as a "set-top box," is typically employed at a subscriber premises to demodulate RF signals carrying video information). The subscriber modem(s) 165 also modulate an RF carrier with information (e.g., data and/or voice information) to be transmitted from the subscriber premises 190 to the first hardline cable plant 180. Thus, the first subscriber service drops 163C communicatively couple the subscriber modem(s) 165 of the respective subscriber premises 190 to the first hardline cable plant 180.

In the cable communication system 160 of FIG. 1, the first cable hardline plant 180 (as well as the first subscriber service drops 163C) carries RF signals that convey downstream information 183 from the headend 162 (as received via the fiber optic cable 163A and the bridge converter 167) to the subscriber premises 190 of the first node 164A. The first hardline cable plant also carries RF signals that convey upstream information 184 from at least some of the subscriber premises 190 of the first node 164A to the bridge converter 167 (which upstream information ultimately is transmitted to the headend 162 via the fiber optic cable 163A). To this end, the RF communication bandwidth supported by the first hardline cable plant 180 typically is divided into a downstream path bandwidth 181 in which the downstream information 183 is conveyed, and an upstream path bandwidth 182 in which the upstream information 184 is conveyed. In most conventional cable communication systems in the United States, the upstream path bandwidth 182 includes a first frequency range of from 5 MHz to 42 MHz (in other geographies, the upstream path bandwidth may extend to a higher frequency; for example, in Europe the upstream path bandwidth includes frequencies from 5 MHz to 65 MHz). The downstream path bandwidth 181 includes a second frequency range of from 50 MHz to 750 MHz (and in some instances as high as approximately 1 GHz). The downstream information 183 is conveyed by one or more downstream RF signals having a carrier frequency falling within the downstream path bandwidth 181, and the upstream information 184 is conveyed by one or more upstream RF signals having a carrier frequency falling within the upstream path bandwidth 182.

As noted above, the nodes 164B and 164C typically cover different geographic areas within the overall operating footprint of the cable communication system 160, but may be configured similarly to the first node 164A with respect to the various infrastructure constituting the node (e.g., each of the nodes 164B and 164C may include a dedicated fiber optic cable, optical/RF bridge converter, hardline plant, subscriber premises, and subscriber service drops to subscriber premises).

As also noted above, the overall infrastructure of a given node is referred to generally herein as a "cable plant," with respective constituent elements of the cable plant including the first fiber optic cable 163A, the first optical/radio frequency (RF) converter 167, the first RF hardline coaxial cable plant 180, the plurality of first subscriber service drops 163C, and the plurality of first subscriber premises 190, as illustrated in FIG. 1. These respective elements have corresponding roles and functions within the cable plant (and the cable communication system as a whole); accordingly, it should be appreciated that while "cable plant" may refer to any one or more node infrastructure elements in combination, specific elements of the cable plant are referred to with particularity when describing their corresponding roles and functions in the context of the inventive concepts discussed in subsequent sections of this disclosure. For example, "RF hardline coaxial cable plant" (or "hardline cable plant") refers specifically to the element 180 as introduced above in connection with FIG. 1, described further below in connection with FIG. 2, and similarly implemented according to various embodiments of inventive concepts discussed in subsequent sections of this disclosure.

In particular, FIG. 2 illustrates additional details of the first hardline cable plant 180 of the first node 164A. FIG. 2 also shows the first optical/RF converter 167 of the first node (to which the first hardline cable plant 180 is coupled), as well as one subscriber premises 190 of the first node (coupled to the first hardline cable plant 180 via a subscriber service drop 163C). Although only one subscriber premises 190 is shown in FIG. 2 for purposes of illustration, it should be appreciated that multiple subscriber premises may be coupled to the hardline cable plant 180 (e.g., as shown in FIG. 1). In FIG. 2, the first hardline cable plant 180 is indicated generally with dashed lines so as to distinguish various elements of the hardline cable plant 180 from the optical/RF converter 167 and other elements of the cable communication system generally associated with one or more subscriber premises 190. As noted above, hardline cable plants employed in other nodes of the communication system 160 shown in FIG. 1 generally may include one or more of the various elements shown in FIG. 2 as constituting the first hardline cable plant 180, and may be similarly configured to the first hardline cable plant 180.

As conventional cable communication systems have evolved over the years, so has some nomenclature for various elements of the system and, particularly, the hardline cable plant. Turning again to FIG. 2, a first segment of the hardline coaxial cable 163B in the hardline cable plant 180, between the optical/RF bridge converter 167 and a first amplifier 187 (e.g., in which power supply 186 is connected via connector 193), is sometimes referred to as an "express feeder" (historically, an express feeder was sometimes considered/referred to as part of the "trunk"). An express feeder may run for various distances and generally does not include any distribution taps 188. Conversely, a section of the hardline cable plant including one or more segments of hardline coaxial cable 163B and one or more distribution taps 188 sometimes is referred to merely as a "feeder" (as opposed to an "express feeder"). It should be appreciated that the terminology "trunk," "express feeder," and "feeder" are merely referred to above as examples of nomenclature used in the industry for various portions of the cable communication system and hardline cable plant. In exemplary implementations, various elements of the hardline cable plant 180 often are disposed above the ground, e.g., mounted on and/or hung between utility poles, and in some cases elements of the hardline cable plant also or alternatively may be buried underground.

As shown in FIG. 2, the first hardline cable plant 180 includes one or more segments of hardline coaxial cable 163B (one of which segments is coupled to the optical/RF converter 167). The hardline cable plant 180 also may include one or more components generally categorized as an "active" component, a "passive" component, a power supply, a connector, or various hardware (e.g., clamps, hangers, anchors, lashing wire, etc.) employed to secure various components to each other or other supporting infrastructure (e.g., utility poles, underground conduit, etc.). More specifically, with reference to FIG. 2, the hardline cable plant may include: one or more amplifiers 187 (also sometimes referred to as "line extenders") constituting an active component and requiring power from one or more power supplies 186; one or more passive components, examples of which include distribution taps 188 (also referred to simply as "taps"), directional couplers 189 (also referred to as "splitters" or "combiners"), line terminators 191, and filters/attenuators (not shown explicitly in FIG. 2, although a filter/attenuator may be a constituent component of a tap, splitter/combiner, or a line terminator); one or more connectors or "fittings" 193 for coupling segments of the hardline coaxial cable 163B to various other elements of the hardline cable plant 180 (e.g., pin-type connectors, such as housing terminators, extension fittings, 90-degree fittings, splice connectors, etc., or one or more "splice blocks" 195 that may be employed to interconnect two segments of hardline coaxial cable 163B). FIGS. 3A through 3G illustrates examples of these various elements, which are discussed in greater detail in turn below.

With respect to the hardline coaxial cable 163B used in the hardline cable plant 180, as shown in FIG. 3A the coaxial cable commonly employed in the hardline plant often includes a center solid conductor surrounded by an electrically insulating material and a solid conductor shield to provide for improved electrical characteristics (e.g., lower RF signal loss/leakage) and/or some degree of environmental robustness. Some types of coaxial cables used for the hardline plant 180 include low density foam (LDF) insulation, which has insulating qualities similar to dry air, making it particularly well-suited for outdoor use. The solid conductor shield generally makes the cable somewhat more difficult to bend (hence the terminology "hardline" coaxial cable). In various implementations, 0.75 inch hardline coaxial cable may be employed for "express feeders," whereas 0.625 inch hardline coaxial cable may be employed for "feeders." One example of hardline coaxial cable 163B conventionally employed in the hardline plant 180 is given Commscope PIII 0.625 cable (e.g., see http://www.commscope.com/broadband/eng/product/cable/coaxial/1175378_7804.html). However, it should be appreciated that a variety of hardline coaxial cables may be employed in different hardline plants and/or different portions of the same hardline plant. Additionally, hardline tri-axial cable also is available that includes an additional shield layer to discourage electromagnetic interference, and may in some instances be employed in a hardline plant (for purposes of the present disclosure, any reference to "hardline coaxial cable" should be understood to include hardline tri-axial cable as well).

With reference again to FIG. 2, as noted above the hardline cable plant 180 also may include one or more power supplies 186 and one or more amplifiers 187 or "line extenders" (also shown in FIG. 3F). An exemplary power supply 186 converts commercially-available power (e.g., 120 Volts A.C. rms, 60 Hz) to voltage amplitudes (e.g., 60 VAC, 90 VAC) that may be distributed (e.g., in some cases along with RF signals via the hardline coaxial cable 163B) for providing power to one or more amplifiers 187 or other active components of the hardline cable plant. One or more amplifiers 187 may be employed to boost attenuated RF signals for further propagation or distribution along the hardline cable plant 180 (in one or both of the upstream path bandwidth or the downstream path bandwidth). Some types of amplifiers 187 may be bi-directional and provide separate amplification pathways for downstream and upstream RF signals, respectively. It should be appreciated that for purposes of the present discussion, the term "amplifier" is used generally to refer to a device that may amplify a signal; in some examples, an amplifier also may implement a filtering function as well (e.g., selective attenuation/amplification at one or more particular frequencies or over one or more frequency bands) for one or more RF signals propagating along the hardline cable plant 180. In particular, hardline cable plant amplifiers 187 typically include "diplex filters" that allow passage of signals through the amplifier only in the frequency ranges prescribed for the upstream path bandwidth and the downstream path bandwidth, respectively.

In conventional implementations of hardline coaxial cable plants, amplifiers may be distributed along the hardline coaxial cable plant of a given node at distances of approximately 1200 feet between amplifiers. One typical characterization of a node is referred to as "cascade," which refers to the number of amplifiers in the longest branch of the hardline coaxial cable plant in the node. More specifically, the cascade for a given node often is denoted as "NODE+N," in which N denotes the number of amplifiers between the RF/optical bridge converter of the node and an endpoint of the longest branch of the hardline coaxial cable plant in the node. With reference to FIG. 2, the illustrated example of the hardline cable plant 180 includes two amplifiers 167; if this illustration represented the entire hardline cable plant in the first node 164A, the cascade for this node would be referred to as "NODE+2." In many conventional implementations of cable communication systems, typical cascades for hardline coaxial cable plants in respective nodes of the system are five or six (i.e., NODE+5 and NODE+6) (see section 3.1, pages 3-4 of "Architecting the DOCSIS Network to Offer Symmetric 1 Gbps Service Over the Next Two Decades," Ayham Al-Banna, The NCTA 2012 Spring Technical Forum Proceedings, May 21, 2012, hereafter "Al-Banna," which publication is hereby incorporated herein by reference in its entirety).

The hardline cable plant of FIG. 2 also may include one or more directional couplers 189 (also shown in FIG. 3E) to divide an input RF signal into two or more RF output signals or combine multiple input RF signals into one RF output signal (directional couplers also are referred to as "splitters" or "combiners"). For example, a splitter may divide an RF signal on one feeder section of the hardline cable plant to provide respective RF signals on two different feeder sections of the hardline cable plant; conversely, a directional coupler acting as a combiner combines RF signals from respective different feeders onto a same feeder of the hardline plant. In some examples, a directional coupler may include a transformer to split or combine power while maintaining a certain impedance. In other examples, a directional coupler 189 may include various features and materials to reduce interference. In common implementations, directional couplers are bi-directional devices in which both upstream RF signals and downstream RF signals may be present, wherein the directional coupler acts as a splitter with respect to downstream RF signals and a combiner with respect to upstream RF signals as these signals propagate along different feeder sections of the hardline cable plant.

A distribution tap (or simply "tap") 188 of the hardline cable plant (see FIG. 3G) provides a connection point between the hardline cable plant and a subscriber service drop 163C. In one aspect, a tap functions similarly to a directional coupler in that a small portion of one or more downstream RF signals on the hardline coaxial cable 163B (e.g., in a "feeder" of the hardline plant) is extracted for providing to a subscriber premises 190. In the upstream direction, taps may be configured with different predetermined attenuation values (e.g., 4 dB, 11 dB, 17 dB, 20 dB) for attenuating RF signals originating from a subscriber premises 190 (e.g., signals transmitted by the subscriber modem 165) and intended for propagation along the hardline cable plant 180 toward the headend 162 of the cable communication system 160. Taps 188 may come in various forms, including multi-port taps. Taps typically include threaded connector ports to facilitate coupling to one or more hardline coaxial cable(s) and one or more subscriber service drops. In common examples, a port on a tap to which a subscriber service drop 163C is coupled may be constituted by a female F-type connector or jack, and the subscriber service drop 163C includes a coaxial cable terminated with a male F-type connector for coupling to the port of the tap 188 (e.g., see FIG. 11 and the discussion below in connection with same relating to male connector 197A and female connector 197B). Thus, in one aspect, the female F-type connector(s) of one or more taps 188 of the hardline cable plant 180 serve as a "boundary" between the hardline cable plant and other elements of the cable communication system generally associated with one or more subscriber premises 190.

Line terminators 191 of the hardline cable plant 180 (see FIG. 3C) electrically terminate RF signals at the end of a feeder to prevent signal interference. Line terminators 191 may include various materials and provide differing levels of shielding from environmental elements.

Various connectors 193 (see FIG. 3B) employed in the hardline cable plant 180, also referred to herein as "fittings," may join two coaxial cables from separate sheaths, or may join a coaxial cable to one of the elements discussed above (e.g., amplifiers, power supplies, taps, directional couplers, line terminators, etc.). Connectors may be male, female, or sexless; some connectors have female structures with slotted fingers that introduce a small inductance; other connectors involve pin-based structures (e.g., pin-type connectors, such as housing terminators, extension fittings, 90-degree fittings, splice connectors, etc.). One common example of a connector is given by "F" series connectors, which may have ⅜-32 coupling thread or may be push-on. Other types of connectors employed in hardline cable plants include UHF connectors, BNC connectors, and TNC connectors. Various connectors differ in the methods they use for connecting and tightening. A splice block 195 (see FIG. 3D) is a particular type of connector used to join two respective segments of hardline coaxial cable.

As also shown in FIG. 2, the subscriber service drop 163C generally refers to the coaxial cable and associated hardware between a distribution tap 188 and a subscriber premises 190. In one aspect, as discussed above, a subscriber service drop 163C may be deemed to "begin" at a male F-connector (coupled to a female F-connector of a distribution tap 188) with which a coaxial cable used for the subscriber service drop 163C is terminated (e.g., see FIG. 11, male connector 197A). A subscriber service drop 163C often is constituted by a coaxial cable segment of a different type than the hardline coaxial cable 163B employed in the hardline plant 180 (as generally shorter cable lengths, greater physical flexibility, and less environmental robustness are required for subscriber service drops 163C than for the hardline cable plant 180; also whereas hardline coaxial cable is intended to be an essentially permanent component over the life of a cable communication system, subscriber service drops are considered as less permanent and may be installed and removed based on service changes relating to new subscribers or cancellation of services by existing subscribers). Some examples of coaxial cable conventionally employed for subscriber service drops 163C are given by RG-6 and RG-59 cables (e.g., see http://www.tonercable.com/assets/images/ProductFiles/1830/PD-FFile/TFC %20T10%2059%20Series %20Drop%20Cable.pdf). In other examples, a subscriber service drop 163C may be constituted by a "flooded" cable or a "messenger" (aerial) cable; "flooded" cables may be infused with heavy waterproofing for use in an underground conduit or directly buried in the ground, whereas "messenger" cables may contain some waterproofing as well as a steel messenger wire along the length of the cable (to carry tension involved in an aerial drop from a utility pole). At the subscriber premises 190, the service drop 163C typically is fastened in some manner to the subscriber premises 190 and coupled to a ground block 198, and in turn connects to various components inside the subscriber premises, such as interior cables 192 (each of which typically terminates with connectors 196), one or more splitters/combiners 194, and one or more end user modems 165 (sometimes collectively referred to as "subscriber premises equipment" or "customer premises equipment").

Finally, FIG. 2 also illustrates that an analyzer 110 (e.g., a spectrum analyzer and/or a tuned receiver) may be coupled to a junction between the bridge converter 167 and the hardline cable plant 180 so as to monitor RF signals that are transmitted to and/or received from the first node 164A. The coupling of the analyzer 110 to the junction between the bridge converter 167 and the hardline cable plant 180 is shown in FIG. 2 using dashed lines, so as to indicate that the analyzer 110 is not necessarily included as a constituent element of the first node, but may be optionally employed from time to time as a test instrument to provide information relating to signals propagating to and/or from the first node. As discussed further below in connection with FIGS. 1 and 4, an analyzer similarly may be employed in the headend to monitor various RF signals of interest in the cable communication system.

Table 1 below provides some typical parameters generally representative of node architecture found in several conventional communication systems (e.g., see "Mission is Possible: An Evolutionary Approach to Gigabit-Class DOCSIS," John Chapman et al., The NCTA 2012 Spring Technical Forum Proceedings, May 21, 2012, hereafter referred to as "Chapman," which publication is hereby incorporated herein by reference in its entirety; pages 35-47 and 57-62 of Chapman discuss particulars of node architecture):

TABLE 1

| | |
|---|---|
| Households Passed (HHP) | 500 |
| Subscriber Premises (e.g., high speed data) | 50% |
| HHP Density | 75 HHP/mile |
| Node Mileage | 6.67 miles |
| Cascade | NODE + 5 or +6 |
| Amplifiers/Mile | 4.5/mile |
| Taps/Mile | 30/mile |
| Amplifiers | 30 |
| Taps | 200 |
| Highest Tap Value | 23 dB |
| Lowest Tap Value | 8 dB |
| Express Feeder Cable Type | 0.750 inch PIII |
| Largest Express Feeder Span | 2000 feet |
| Feeder (distribution) Cable Type | 0.625 inch PIII |
| Feeder Cable Distance to First Tap | 100 feet |
| Largest Feeder Span | 1000 feet |
| Subscriber Drop Cable Type | Series 6 |
| Largest Drop Cable Span | 150 feet |
| Maximum Subscriber Modem Transmit Power | 65 dBmV |

Headend

With reference again to FIG. 1, the headend 162 of the cable communication system 160 generally serves as a receiving and processing station at which various entertainment program signals (e.g., television and video programming from satellite or land-based sources) are collected for retransmission to the subscriber premises of respective nodes 164A, 164B, and 164C over the downstream path bandwidth of each node. The headend 162 also may serve as a connection point to various voice-based services and/or Internet-based services (e.g., data services) that may be provided to the subscriber premises of respective nodes 164A, 164B, and 164C; such voice-based services and/or Internet-based services may employ both the upstream path bandwidth and downstream path bandwidth of each node. Accordingly, the headend 162 may include various electronic equipment for receiving entertainment programming signals (e.g., via one or more antennas and/or satellite dishes, tuners/receivers, amplifiers, filters, etc.), processing and/or routing voice-related information, and/or enabling Internet connectivity, as well as various electronic equipment for facilitating transmission of downstream information to, and receiving upstream information from, the respective nodes. Some conventional cable communication systems also include one or more "hubs" (not shown in FIG. 1), which are similar to a headend, but generally smaller in size; in some cable communication systems, a hub may communicate with a larger headend, and in turn provide television/video/voice/Internet-related services only to some subset of nodes (e.g., as few as a dozen nodes) in the cable communication system.

Since each node of the cable communication system 160 functions similarly, some of the salient structural elements and functionality of the headend 162 may be readily understood in the context of a single node (e.g., represented in FIG. 1 by the first node 164A). Accordingly, it should be appreciated that the discussion below regarding certain elements of the headend 162 particularly associated with the first node 164A applies similarly to other elements of the headend that may be associated with and/or coupled to other nodes of the cable communication system 160.

As shown in FIG. 1, the fiber optic cable 163A of the first node 164A is coupled to an optical/RF bridge converter 175 within the headend 162 (also referred to herein as a "headend optical/RF bridge converter"). As also shown in FIG. 1, each of the other nodes 164B and 164C similarly is coupled to a corresponding optical/RF bridge converter of the headend 162. The headend bridge converter 175 functions similarly to the bridge converter 167 of the first node; i.e., the headend bridge converter 175 converts upstream optical signals carried by the fiber optic cable 163A to RF signals 177 within the headend 162. In some implementations, the headend bridge converter 175 is constituted by two distinct devices, e.g., a downstream transmitter to convert RF signals originating in the headend to downstream optical signals, and an upstream receiver to convert upstream optical signals to RF signals in the headend. The headend 162 also may include an RF splitter 173, coupled to the headend bridge converter 175, to provide multiple paths (e.g., via multiple ports of the RF splitter) for the RF signals 177 in the headend that are transmitted to or received from the headend bridge converter 175. As discussed in greater detail below in connection with FIG. 4, the RF splitter 173 provides for various equipment (e.g., demodulators, modulators, controllers, test and monitoring equipment) to be coupled to the RF signals 177 within the headend carrying information to or from the first node 164A; for example, FIG. 1 illustrates an analyzer 110 (e.g., a spectrum analyzer), coupled to the RF splitter 173, that may be employed to monitor RF signals 177 in the headend 162 that are transmitted to and/or received from the first node 164A (as also discussed above in connection with FIG. 2).

The headend 162 shown in FIG. 1 also includes a cable modem termination system (CMTS) 170 that serves as the central controller for the subscriber modems in respective nodes of the cable communication system 160. In general, the CMTS 170 provides a bridge between the cable communication system 160 and an Internet Protocol (IP) network and serves as an arbiter of subscriber time sharing (e.g., of upstream path bandwidth in each node) for data services. In particular, for upstream information transmitted from subscriber modems in a given node to the headend 162 (e.g., the upstream information 184 from the first node 164A), in example implementations the CMTS 170 instructs a given subscriber modem in a given node when to transmit RF signals (e.g., onto a corresponding subscriber service drop and the hardline plant of the given node) and what RF carrier frequency to use in the upstream path bandwidth of the node (e.g., the upstream path bandwidth 182 of the first node 164A). The CMTS 170 then demodulates received upstream RF signals (e.g., the RF signals 177 from the first node 164A) to recover the upstream information carried by the signals, converts at least some of the recovered upstream information to "outgoing" IP data packets 159, and directs the outgoing IP data packets to switching and/or routing equipment (not shown in FIG. 1) for transmission on the Internet, for example. Conversely, the CMTS 170 also receives "incoming" IP data packets 159 from the Internet via the switching and/or routing equipment, modulates RF carrier waves with data contained in the received incoming IP data packets, and transmits these modulated RF carrier waves (e.g. as RF signals 177) to provide at least some of the downstream information (e.g., the downstream information 183 of the first node 164A) to one or more subscriber modems in one or more nodes of the cable communication system.

As also indicated in FIG. 1, in some implementations in which the recovered upstream information includes voice information (e.g., from subscriber premises receiving VoIP services), the CMTS 170 may also direct "outgoing" voice information 157 to a voice switch coupled to a Public Switched Telephone Network (PSTN). The CMTS 170 also may receive "incoming" voice information 157 from the PSTN, and modulate the received incoming voice information onto RF carrier waves to provide a portion of the downstream information.

As illustrated in FIG. 1, the CMTS 170 may include multiple RF ports 169 and 171, in which typically one pair of RF ports 169 and 171 of the CMTS facilitates coupling of a corresponding node of the cable communication system 160 (in some instances via one or more RF splitters 173) to the CMTS 170; in particular, for the first node 164A shown in FIG. 1, downstream RF port 169 provides downstream information from the CMTS to the first node, and upstream RF port 171 provides upstream information to the CMTS from the first node. For each downstream RF port 169, the CMTS further includes one or more modulation tuners 172 coupled to the downstream RF port; similarly, for each upstream RF port 171, the CMTS includes one or more demodulation tuners 174 coupled to the upstream RF port 171. As noted above, the modulation tuner(s) 172 is/are configured to generate one or more modulated RF carrier waves to provide downstream information to subscriber modems of the node coupled to the corresponding RF port 169; conversely, the demodulation tuner(s) 174 is/are configured to demodulate one or more received upstream RF signals carrying upstream information from the subscriber modems of the node coupled to the corresponding RF port 171.

FIG. 4 illustrates further details of a portion of the headend 162 shown in FIG. 1, relating particularly to upstream information received from subscriber modems of the first node 164A via the fiber optic cable 163A, and exemplary arrangements of the CMTS 170. For example, FIG. 4 shows that the RF splitter 173 associated with the first node 164A may include multiple ports to couple upstream RF signals 177 received from the first node to each of the analyzer 110, one RF port 171 of the CMTS 170, a digital account controller 254 (DAC), and other test and/or monitoring equipment 256. The DAC 254 relates primarily to video programming (e.g., managing on-demand video services by receiving programming requests from subscriber premises "set-top boxes" and coordinating delivery of requested programming). As discussed elsewhere herein, the analyzer 110 may be configured to monitor a spectrum of the upstream path bandwidth to measure an overall condition of the upstream path bandwidth (e.g., a presence of noise in the node) and/or provide performance metrics relating to the conveyance of upstream information in the node (e.g., for diagnostic purposes). Other test and/or monitoring equipment 256 may be configured to receive signals from field-deployed monitoring devices (most typically in power supplies in the node) to alert system operators of critical events (e.g., a power outage) or other alarm conditions.

The CMTS 170 itself may be constructed and arranged as a modular apparatus that may be flexibly expanded (or reduced in size) depending in part on the number of nodes/subscribers to be served by the cable communication system 160. For example, the CMTS 170 may have a housing configured as a chassis with multiple slots to accommodate "rack-mountable" modular components, and various RF modulation/demodulation components of the CMTS may be configured as one or more such modular components, commonly referred to as "blades," which fit into respective slots of the CMTS's chassis. FIG. 4 shows a portion of the CMTS 170 including two such "blades" 252.

As illustrated in FIG. 4, each blade 252 of the CMTS 170 may include multiple upstream RF ports 171 (e.g., four to six ports per blade), as well as one or more downstream ports (not explicitly shown in FIG. 4). Historically, each upstream RF port 171 of a blade 252 was coupled to only one demodulation tuner 174 serving a particular node coupled to the upstream RF port 171; in more recent CMTS configurations, a blade 252 may be configured such that one or more upstream RF ports 171 of the blade may be coupled to multiple demodulation tuners 174 (e.g., FIG. 4 shows two demodulation tuners 174 coupled to one upstream port 171 of the top-most blade 252). In this manner, the upstream information from a given node may be received by the CMTS via multiple RF signals 177 (i.e., one RF signal per demodulation tuner 174 coupled to the blade's upstream RF port 171 corresponding to the given node). The CMTS 170 may include virtually any number of blades 252, based at least in part on the number of nodes included in the cable communication system 160 (and the number of RF ports per blade).

Various implementations of the CMTS 170 constitute examples of a "cable modem system," which generally refers to one or more modulation tuners and/or demodulation tuners, and associated controllers and other equipment as may be required, to facilitate communication of downstream information to, and/or upstream information from, one or more subscriber premises. As noted above, one or both of the downstream information and upstream information handled by a cable modem system may include a variety of data content, including Internet-related data, voice-related data, and/or audio/video-related data. Other implementations of a cable modem system may include a "Converged Cable Access Platform" (CCAP), which combines some of the functionality of a CMTS discussed above and video content delivery in contemplation of conventional MPEG-based video delivery migrating to Internet Protocol (IP) video transport (e.g., see "CCAP 101: Guide to Understanding the Converged Cable Access Platform," Motorola whitepaper, February 2012, http://www.motorola.com/staticfiles/Video-Solutions/Products/Video-Infrastructure/Distribution/EDGE-QAM/APEX-3000/_Documents/_StaticFiles/12.02.17-Motorola-CCAP %20101_white %20paper-US-EN.pdf, which whitepaper is hereby incorporated by reference herein in its entirety). For purposes of the discussion below, the CMTS 170 is referred to as a representative example of a "cable modem system;" however, it should be appreciated that the various concepts discussed below generally are applicable to other examples of cable modem systems, such as a CCAP.

Communication Concepts

With reference again to FIG. 1, the transmission of downstream information 183 between the headend 162 and subscriber premises 190 in the first node 164A, and the transmission of upstream information 184 from one or more subscriber premises 190 in the first node 164A to the headend 162, may be understood as follows.

With respect to downstream information 183 in the first node 164A, digital information (e.g., voice information or other data in the form of IP data packets 159 from an external IP network) constituting the downstream information is modulated onto an RF carrier wave (having a particular carrier frequency in the downstream path bandwidth 181) by a modulation tuner 172 in the CMTS 170 at the headend 162, to provide a downstream RF signal 177 via a port 171 of the CMTS 170. This downstream RF signal 177 is converted to a downstream optical signal by headend optical/RF converter 175 and transported via first fiber optic cable 163A to the first optical/RF converter 167 in the first node 164A, which converts the downstream optical signal back to an RF signal. This converted RF signal (carrying the downstream information 183) is then transported via the hardline cable plant 180 and subscriber service drops 163C to the respective subscriber modems 165 of the subscriber premises 190, each of which modems includes appropriate demodulator circuitry that is tuned to the carrier frequency of the downstream RF signal so as to appropriately demodulate the RF signal and thereby recover the downstream information 183 (e.g., in the form of the IP data packets 159).

With respect to upstream information 184, the foregoing process is essentially reversed; i.e., digital information originating from a given subscriber premises 190 (e.g., voice information or other data in the form of IP data packets) constituting at least a portion of the upstream information 184 is modulated onto an RF carrier wave (having a particular frequency in the upstream path bandwidth 182) by modulation circuitry in the subscriber modem 165 to provide an upstream RF signal. This upstream RF signal is transported via subscriber service drop 163C and the hardline cable plant 180 to the first optical/RF converter 167 in the first node 164A, which converts the upstream RF signal to an upstream optical signal that is transported to the headend 162 via the first fiber optic cable 163A. At the headend, the headend optical/RF converter 175 converts the upstream optical signal back to an upstream RF signal 177. This RF signal 177 is coupled via a port 171 of the CMTS 170 to a demodulation tuner 174 tuned to the carrier frequency of the upstream RF signal so as to appropriately demodulate the upstream RF signal and thereby recover the upstream information 184 (e.g., which may be in the form of IP data packets 159 to be conveyed to an external IP network).

Regarding common modulation schemes that may be employed generally by subscriber modems 165, or the modulation tuners 172 and demodulation tuners 174 of the CMTS 170 at the headend 162, to encode digital information (e.g., the downstream information 183 and the upstream information 184) on an RF carrier wave to provide an RF signal, such modulation schemes often employ modulation of the phase and/or the amplitude of a carrier wave having a given carrier frequency $f$ based on the particular digital information to be encoded. To illustrate some common digital modulation schemes, it is helpful to first represent a sinusoidal carrier wave having an amplitude A, a frequency f, and a phase $\phi$ (in radians), denoted mathematically as A sin ($2\pi ft+\phi$), as the composition of two sinusoidal waves that are out of phase by 90 degrees with respect to each other. Using well-known trigonometric relationships, it may be shown that:

$$A \sin(2\pi ft+\phi) = I \sin(2\pi ft) + Q \cos(2\pi ft), \quad \text{Eq. 1}$$

where:

$$A = \sqrt{I^2 + Q^2} \quad \text{Eq. 2}$$

and $$\varphi = \arctan\left(\frac{Q}{I}\right). \quad \text{Eq. 3}$$

The foregoing decomposition of a carrier wave is sometime referred to as "orthogonal decomposition," in which the sine term of the decomposition is referred to as the "in-phase" component having an amplitude I, and the cosine term of the decomposition is referred to as the "quadrature" component having an amplitude Q. The representation of a sinusoidal carrier wave in terms of in-phase and quadrature components may be facilitated by a coordinate plane defined by a horizontal axis representing values of I (the "in-phase component" axis) and a vertical axis representing values of Q (the "quadrature component" axis). FIG. 5 shows a generic example of the carrier wave of Eq. 1 represented as a vector on such a coordinate plane, in which the length of the vector is given by the amplitude A (according to Eq. 2) and the phase of the vector is given by the angle ca between the vector and the in-phase component axis (according to Eq. 3).

In some digital modulation schemes commonly employed in conventional cable communication systems, the amplitudes I and Q of the in-phase and quadrature components, respectively, may only have one of some number of finite values at any given time. Once the in-phase and quadrature components are combined according to Eq. 1, each of the possible combinations of finite values that the amplitudes I and Q may have according to a given digital modulation scheme correspond to a particular unique state of the resulting modulated carrier wave, which state is defined by a particular amplitude A and a particular phase $\phi$ of the resulting modulated carrier wave (pursuant to Eq. 2 and Eq. 3 above). With the foregoing in mind, each of the possible combinations of finite values that the amplitudes I and Q may have in a given modulation scheme are assigned to some number m bits of digital information to be encoded on the carrier wave; each m bits of digital information that is assigned to a particular combination of I and Q values is commonly referred to as a "symbol." In this manner, each unique combination of m digital bits (each "symbol"), representing a particular combination of possible values for each of I and Q, "maps" to a particular amplitude A and a particular phase $\phi$ of the resulting modulated carrier wave.

More specifically, a given modulator (e.g., modulator circuitry in a subscriber modem 165, or a modulation tuner 172 of the CMTS 170) separates a carrier wave to be encoded into respective in-phase and quadrature components and, based on the respective values (i.e., logic 1 or logic 0) of m digital bits in a given symbol to be encoded, selects corresponding assigned values for the amplitudes I and Q respectively. The in-phase and quadrature components are then recombined and, as noted above, the resulting modulated carrier wave has a particular amplitude A and a particular phase $\phi$ corresponding to the particular symbol encoded on the wave. A given demodulator employing the same modulation scheme and receiving such a modulated carrier wave (a "signal") is thus able to recover the particular symbol by determining the amplitude and phase of the received signal.

Two common digital modulation schemes employed in conventional cable communication systems and based on the foregoing concepts include quadrature phase shift keying (QPSK) and different orders of quadrature amplitude modulation (QAM). With reference again to Eq. 1 above, in QPSK each of the amplitudes I and Q for the respective in-phase and quadrature components has the same magnitude |X| and one of two possible non-zero values at any given time, namely I=+X or −X, and Q=+X or −X. A convenient way to visualize a QPSK modulation scheme (as well as other digital modulation schemes) is via a "constellation diagram," in which different possible states of the recombined (modulated) carrier wave are illustrated in the coordinate plane employed for FIG. 5 (i.e., having a horizontal "in-phase" axis and a vertical "quadrature" axis). FIG. 6 illustrates such a constellation diagram 5000A for a QPSK modulation scheme; again, in QPSK, only values of +X and −X are possible for each of I and Q. As such, there are four different possible states for the resulting recombined carrier wave, which states commonly are referred to as "constellation points." An interesting artifact of QPSK is that, since the magnitudes of I and Q are identical at any given time (i.e., |X|), the amplitude A of the resulting modulated carrier wave remains fixed according to Eq. 2 (i.e., A=√2|X|); however, the respective constellation points have different phases $\phi$, namely 45 degrees, 135 degrees, 225 degrees and 315 degrees (hence the name quadrature "phase shift" keying). Given the four constellation points representing different phases, each point may be represented by a unique combination of two bits of digital information constituting a "symbol" corresponding to the constellation point (e.g., "11"=45 degrees; "01"=135 degrees; "00"=225 degrees, and "10"=315 degrees).

Like QPSK, Quadrature Amplitude Modulation (QAM) similarly is based on amplitude modulation of respective in-phase and quadrature components of a carrier wave, which components are recombined to form an information-bearing signal (i.e., a modulated carrier wave). Unlike QPSK, however, in QAM each of the amplitudes I and Q of the respective in-phase and quadrature components may have one of multiple different magnitudes, resulting in a modulated carrier wave with both changing amplitude A and phase ca. Different QAM schemes may be visualized via a constellation diagram similar to that shown in FIG. 6 for QPSK. In QAM, the constellation points typically are arranged in a grid with equal vertical and horizontal spacing. The number of constellation points in a given square-grid QAM implementation is often referred to as the QAM "modulation order" and is related to the number n of unique magnitudes each of the I and Q amplitudes may have. If the value of n for the I amplitudes is different than the number n for Q amplitudes, a rectangular-shaped constellation diagram results; if on the other hand the number n of unique magnitudes is the same for both I and Q), a square constellation diagram results. Rectangular QAM constellations generally are sub-optimal in that constellation points are not maximally spaced for a given constellation energy, and they are somewhat more challenging to modulate and demodulate. Accordingly, square QAM constellations are more commonly (but not exclusively) employed in conventional cable communication systems, wherein the QAM modulation order is given by:

$$\text{QAM modulation order} = 4n^2. \quad \text{Eq. 4}$$

From Eq. 4, it may be appreciated that the QPSK constellation diagram shown in FIG. 6 is actually a special case of QAM with modulation order 4 (i.e., n=1 results in 4-QAM).

The number of constellation points in a given QAM implementation also dictates the number of unique symbols that may be mapped to the constellation diagram, which in turn depends on the number of bits per symbol m; i.e., the number of unique symbols=$2^m$ (m=1, 2, 3 . . . ). Again, since QAM often is implemented as a square-grid constellation diagram (e.g., see Eq. 4), certain QAM modulation orders are more commonly implemented in conventional cable communication systems, for values of m>2 and integer values of n that satisfy:

$$\text{QAM modulation order} = 4n^2 = 2^m. \quad \text{Eq. 5}$$

Table 2 below lists some common QAM modulation orders and associated values of n (number of unique magnitudes of I and Q) and m (number of bits per symbol) for square QAM constellations based on Eq. 5. Table 2 also includes entries for 32-QAM and 128-QAM and their associated bits per symbol m; these are rectangular constellations (for which there is no integer value for n in Eq. 5) that nonetheless may be employed in some cable communication system implementations. To illustrate the higher QAM modulation orders for square constellations listed in Table 2, FIG. 7 provides an example constellation diagram 5000B for 16-QAM, FIG. 8 provides an example constellation diagram 5000C for 64-QAM, and FIG. 9 provides an example constellation diagram 5000D for 256-QAM.

TABLE 2

| QAM modulation order (symbols per constellation) | n | m |
|---|---|---|
| 4 | 1 | 2 |
| 16 | 2 | 4 |
| 32 | | 5 |
| 64 | 4 | 6 |
| 128 | | 7 |
| 256 | 8 | 8 |
| 512 | | 9 |
| 1024 | 16 | 10 |
| 2048 | | 11 |
| 4096 | 32 | 12 |

Although Table 2 and FIGS. 7 through 9 illustrate four exemplary modulation orders for QAM, it should be appreciated that pursuant to the general principles outlined above, a number of different QAM modulation orders are possible in addition to those noted in Table 2 and FIGS. 7 through 9. In general, by moving to a higher QAM modulation order it is possible to transmit more bits per symbol. However, for purposes of comparing two different QAM modulation orders, if the mean energy of the constellation is to remain the same, the respective constellation points must be closer together within the constellation. Recall that each constellation point represents a particular amplitude A and phase φ of a modulated carrier signal that ultimately needs to be demodulated by a demodulator (that can effectively discern amongst different points of the constellation). As discussed further below in connection with FIG. 16, noise that may be present on a physical communication medium carrying a QAM signal may alter one or both of the amplitude A and phase φ of the signal such that the signal, upon demodulation, may be confused with another neighboring point on the constellation, resulting in the wrong symbol being recovered by a demodulator. As respective constellation points are more "tightly-packed" in higher modulation order constellations, they are thus more susceptible to noise and other corruption upon demodulation; accordingly, higher modulation-order QAM can deliver more data less reliably than lower modulation-order QAM, for constant mean constellation energy.

Turning again to FIG. 1, and with respect to communication of upstream and downstream RF signals associated with the first node 164A within the headend 162, on the hardline plant 180, or on the subscriber service drops 163C, each of the downstream path bandwidth 181 and the upstream path bandwidth 182 is divided up into multiple communication "channels" to convey the downstream information 183 and the upstream information 184. For purposes of the present disclosure, a "physical communication channel" may be described by at least three parameters, namely: 1) a carrier frequency of an RF carrier wave onto which information (e.g., upstream information 184 or downstream information 183) is modulated; 2) a modulation type (e.g., QPSK, QAM), used by a modulation tuner 172 at the headend or modulation circuitry of a subscriber modem 165, to modulate the carrier wave; and 3) a channel bandwidth, wherein the carrier frequency typically is located at a center of the channel bandwidth. As discussed in detail further below, another parameter of an upstream physical communication channel may include the access protocol (e.g., Time Division Multiple Access, Advanced Time Division Multiple Access, Synchronous Code Division Multiple Access) employed to transport upstream information from multiple subscriber premises via the physical communication channel.

Regarding physical communication channel parameters, as noted above the upstream path bandwidth 182 in the United States typically includes upstream channels having carrier frequencies within a first frequency range of from 5 MHz to 42 MHz (5 MHz to 65 MHz in Europe), and the downstream path bandwidth 181 includes downstream channels having carrier frequencies within a second frequency range of from 50 MHz to 750 MHz (and in some instances as high as approximately 1 GHz). As discussed in greater detail below, practical considerations relating to noise have limited the information carrying capacity of the upstream path bandwidth in the portion of the spectrum between approximately 20 MHz and 42 MHz, and have rendered the portion of the upstream path bandwidth between 5 MHz and approximately 20 MHz effectively unusable. Accordingly, upstream channels having carrier frequencies in the range of 5 to approximately 20 MHz (and particularly below 18 MHz, and more particularly below 16.4 MHz, and more particularly below 10 MHz) are rarely if ever employed in conventional cable communication systems; if used at all, such channels are typically limited to rudimentary binary modulation schemes (e.g., binary phase-shift keyed or "PSK" modulation, or binary frequency-shift keyed or "FSK" modulation) rather than quadrature modulation schemes, and have significantly limited information-carrying capacity and functionality (e.g., conveying subscriber orders for pay-per-view television from subscriber premises to the headend of the cable communication system).

With respect to the bandwidth of physical communication channels, typical upstream and downstream channel bandwidths employed for cable communication system channels are 3.2 MHz and 6.4 MHz, although other channel bandwidths are possible (e.g., 1.6 MHz). Conceptually, the bandwidth of a physical communication channel for which QPSK or QAM modulation schemes are employed effectively represents the number of symbols per second that may be conveyed over the channel, which in turn relates to the maximum data rate of the channel. According to various channel filtering and tuning techniques which define the passband (i.e., shape or profile) of a channel as a function of frequency, only a portion of the stated bandwidth of a channel is available for data transmission (e.g., the lowest and highest frequency portions of the channel serve as transition bands and the centermost frequencies of the channel serve as a passband); thus, it is conventionally presumed that approximately 80% of the stated bandwidth of a given channel is deemed available for data transmission. Accordingly, the "symbol rate" of a given channel (i.e., the maximum number of symbols per second that can be effectively conveyed over the channel) is taken to be 80% of the channel's specified bandwidth. With the foregoing in mind, a maximum "deployed data rate" (also sometimes referred to as "raw data rate") with which the upstream information 184 or the downstream information 183 may be conveyed on a given physical communication channel ("data rate" is also sometimes referred to as "channel capacity") is typically specified in units of bits per second and is based on the symbol rate of the channel (0.8 BW) and the number m of bits per symbol (as dictated by the modulation order), given by:

$$\text{Data rate(bits/sec)} = 0.8 \, BW(\text{symbols/sec}) * m(\text{bits/symbol}). \quad \text{Eq. 6}$$

Using values of m from Table 2 above corresponding to different QAM modulation orders (wherein 4-QAM=QPSK), FIG. 10 illustrates a bar graph showing different modulation orders and channel bandwidths along the horizontal axis, and corresponding maximum deployed (or "raw") data rates along the vertical axis, according to Eq. 6. From FIG. 10, it may be seen that a conventional 6.4 MHz channel in which a 64-QAM modulation scheme is used may convey data at a maximum deployed data rate of approximately 30 Mbits/s.

As an alternative to the graph of FIG. 10, the maximum deployed data rates for respective QAM modulation orders may be normalized for different possible channel bandwidths, in units of bits/sec-Hz (by removing the BW term from Eq. 6). Table 3 below provides the normalized maximum "raw" data rates for different QAM modulation orders, and the corresponding maximum raw data rates (maximum deployed channel capacities) for channel bandwidths of 1.6 MHz, 3.2 MHz and 6.4 MHz, respectively, corresponding to each QAM modulation order:

With reference again to FIG. 1, it should be appreciated that in the conventional cable communication system 160, downstream information 183 in the first node 164A generally is broadcast from the headend 162, using multiple downstream channels having different carrier frequencies in the downstream path bandwidth 181, to all subscriber premises 190 in the node; however, the demodulator circuitry of a given subscriber modem 165 generally is tuned to only one or more particular carrier frequencies in the downstream path bandwidth 181 at a given time so as to recover only a particular portion of the downstream information 183 (i.e., particular downstream information encoded on an RF signal having a carrier frequency to which the modem's demodulator is tuned).

Conversely, multiple subscriber premises 190 in the node 164A typically share a single upstream channel defined by an RF signal having a carrier frequency in the upstream path bandwidth 182, so as to convey respective portions of upstream information 184 originating from different subscriber modems 165 that share the upstream channel. A collection of multiple subscriber premises/subscriber modems of a given node that share a single upstream channel commonly is referred to as a "service group" (in FIG. 1, such a service group is denoted by reference number 195; in some conventional cable communication systems, a service group may include between approximately 100 and 300 subscriber premises). To ensure that upstream information from multiple subscriber modems in a service group is effectively received at the headend, various upstream "access protocols" may be implemented by the CMTS 170 and the subscriber modems 165 to regulate the manner in which portions of upstream information from different subscriber modems are carried over the shared upstream channel. Examples of such access protocols include Time Division Multiple Access (TDMA), Asynchronous Transfer Mode (ATM), Carrier Sense Multiple Access/Collision Detection (CSMA/CD). Generally speaking, such access protocols are responsible for implementing timing schemes with which different subscriber modems may transmit portions ("transmission bursts") of upstream information, and in some cases assigning a carrier frequency to be modulated (with upstream information) by the modulation circuitry of a subscriber modem.

One widely adopted specification for transport of upstream and downstream information via a cable communication system and associated access protocols is referred to as the "Data Over Cable Service Interface Specification" (DOCSIS). DOCSIS is an international open protocol developed by the industry consortium CableLabs for deploying high-speed data and voice services over cable communication systems similar to the system 160 shown in FIG. 1. The DOCSIS specification relates to aspects of the "physical layer" of the

TABLE 3

| QAM modulation order (symbols per constellation) | m | Raw Data Rate/Hz (bps/Hz) | 1.6 MHz BW Raw Data Rate (Mbits/s) | 3.2 MHz BW Raw Data Rate (Mbits/s) | 6.4 MHz BW Raw Data Rate (Mbits/s) |
|---|---|---|---|---|---|
| QPSK (4-QAM) | 2 | 1.6 | 2.56 | 5.12 | 10.24 |
| 16-QAM | 4 | 3.2 | 5.12 | 10.24 | 20.48 |
| 32-QAM | 5 | 4.0 | 6.40 | 12.80 | 25.60 |
| 64-QAM | 6 | 4.8 | 7.68 | 15.36 | 30.72 |
| 128-QAM | 7 | 5.6 | 8.96 | 17.92 | 35.84 |
| 256-QAM | 8 | 6.4 | 10.24 | 20.48 | 40.96 |
| 512-QAM | 9 | 7.2 | 11.52 | 23.04 | 46.08 |
| 1024-QAM | 10 | 8.0 | 12.80 | 25.60 | 51.20 |
| 2048-QAM | 11 | 8.8 | 14.08 | 28.16 | 56.32 |
| 4096-QAM | 12 | 9.6 | 15.36 | 30.72 | 61.44 | communication system (e.g., specifying channel bandwidths and modulation types supported), the "data link layer" of the communication system (e.g., specifying access protocols for transmission of upstream information, quality of service features to support Voice-over-Internet Protocol, or "VoIP," and channel bonding), and the "network layer" of the communication system (e.g., management of subscriber modems and the CMTS via IP addresses).

More specifically, with respect to "physical layer" specifications, the North American version of DOCSIS utilizes 6 MHz channels for transmission of downstream information, and specifies upstream channel bandwidths of between 200 kHz and 3.2 MHz (DOCSIS version 1.0) and more recently 6.4 MHz (DOCSIS versions 2.0 and 3.0). All versions of DOCSIS specify that 64-QAM or 256-QAM may be used for modulation of downstream information; DOCSIS version 1.0 specified QPSK or 16-QAM for modulation of upstream information, and DOCSIS versions 2.0 and 3.0 specify QPSK, 8-QAM, 16-QAM, 32-QAM, and 64-QAM for modulation of upstream information (where noise conditions permit such higher modulation orders, as discussed further below). DOCSIS versions 2.0 and 3.0 also supports a limited special version of 128-QAM for modulation of upstream information, requiring trellis coded modulation in Synchronous Code Division Multiple Access (S-CDMA) mode (discussed further below). With respect to "data link layer" or media access control layer (MAC) specifications, DOCSIS employs a mixture of deterministic access methods for transmission of upstream transmission, specifically TDMA for DOCSIS version 1.0/1.1 and both ATDMA (Advanced Time Division Multiple Access) and S-CDMA for DOCSIS versions 2.0 and 3.0. For DOCSIS 1.1 and above the data link layer also includes quality-of-service (QoS) features to support applications that have specific traffic requirements such as low latency (e.g., VoIP, some gaming applications). DOCSIS version 3.0 also features channel bonding, which enables multiple downstream and upstream channels to be used together at the same time by a single subscriber modem.

DOCSIS also defines a "channel utilization index" which generally represents a percentage of time over some predetermined time period that the respective subscriber premises of a service group are transmitting upstream information and hence "using" the physical communication channel over which upstream information from the service group is conveyed. More specifically, the upstream channel utilization index is expressed as a percentage of minislots utilized on the physical communication channel, regardless of burst type. In one example, minislots are considered utilized if the CMTS receives an upstream burst from any subscriber modem transmitting on the physical channel. In another example ("contention REQ and REQ/DATA"), minislots for a transmission opportunity are considered utilized if the CMTS receives an upstream burst within the opportunity from any subscriber modem transmitting on the physical channel.

Egress and Ingress

A cable communication system is considered theoretically as a "closed" information transmission system, in that transmission of information between the headend 162 and subscriber modems 165 occurs via the physical communication media of optical fiber cable, a hardline cable plant, and subscriber service drops (and not over air or "wirelessly") via prescribed portions of frequency spectrum (i.e., in the U.S., upstream path bandwidth from 5 MHz-42 MHz; downstream path bandwidth from 50 MHz to 750 MHz or higher). In practice, however, cable communication systems generally are not perfectly closed systems, and may be subject to signal leakage both out of and into the system (e.g., through faulty/damaged coaxial cable and/or other network components). The term "egress" refers to signal leakage out of a cable communication system, and the term "ingress" refers to signal leakage into a cable communication system. A significant operating and maintenance expense for owners/operators of cable communication systems relates to addressing the problems of signal egress and ingress.

More specifically, egress occurs when RF signals travelling in the downstream path bandwidth of a cable communication system leak out into the environment. Egress may cause RF interference with devices in the vicinity of the point of egress, and in some cases can result in weaker signals reaching the subscriber modems 165. The Federal Communications Commission (FCC) enforces laws established to regulate egress, noting that egress may cause interference with "safety-of-life" radio services (communications of police, fire, airplane pilots) and endanger the lives of the public by possibly hampering safety personnel's efforts. Accordingly, the FCC has set maximum individual signal leakage levels for cable communication systems. As a further prevention, the FCC requires cable communication system operators to have a periodic on-going program to inspect, locate and repair egress on their systems.

In light of the potential for catastrophic harm which may be caused by cable communication system egress interfering particularly with aeronautical navigational and communications radio systems, the FCC requires more stringent regulations for cable communication system egress in the aeronautical radio frequency bands (sometimes referred to as the "aviation band," from approximately 110 MHz to 140 MHz). For example, any egress in the aviation band which produces a field strength of 20 uV/m or greater at a distance of three meters must be repaired in a reasonable period of time. Due to these regulations and government oversight by the FCC, cable communication system operators historically have focused primarily on egress monitoring and mitigation.

With respect to examples of conventional techniques for detecting egress, the company Comsonics, Inc. (http://www-.comsonics.com/) provides various equipment (e.g., a GPS navigation system, an RF receiver, and an RF antenna), referred to as Genacis™, for a vehicle-based approach to monitor egress over a geographic region. In particular, the Genacis™ RF antenna monitors one or more particular frequencies in the downstream path bandwidth of the cable communication system generally corresponding to the aviation band (e.g., approximately 120 MHz) and records signal amplitude of any egress emanating from the cable communication system at the monitored frequency and vehicle position. This information is used to identify locations of egress in the network.

Ingress is noise or interference that may occur from an outside signal leaking into the cable communication system infrastructure. The source of the outside signal is commonly referred to as an "ingress source." Some common ingress sources include broadband noise generated by various man-made sources, such as automobile ignitions, electric motors, neon signs, power-line switching transients, arc welders, power-switching devices such as electronic switches and thermostats, and home electrical appliances (e.g., mixers, can openers, vacuum cleaners, etc.) typically found at subscriber premises. Although some of these ingress sources produce noise events in the 60 Hz to 2 MHz range, their harmonics may show up in the cable communication system upstream path bandwidth from 5 MHz to 42 MHz. "Impulse" noise is generally characterized by a relatively short burst of broadband noise (e.g., 1 to 10 microseconds), and "burst" noise is generally characterized by bursts of broadband noise with durations up to about 100 microseconds. In addition to man-made sources of broadband noise which may contribute to burst or impulse noise, natural sources of burst noise include lightning and electrostatic discharge, which may give rise to noise events from 2 kHz up to 100 MHz.

Other ingress sources include relatively narrowband signals arising from transmission sources that may be proximate to the cable communication system (e.g., transmitting devices such as HAM or CB radios in the vicinity, subscriber premises garage door openers, fire and emergency communication devices, and pagers). In particular, ham radio operators use carrier frequencies at 7 MHz, 10 MHz, 14 MHz, 18 MHz, 21 MHz, 24 MHz and 28 MHz, and citizen band radios use frequencies at approximately 27 MHz, all of which fall within the upstream path bandwidth of the cable communication system.

The foregoing ingress sources often create intermittent and/or seemingly random signals that may leak into the infrastructure of the cable communication system, causing disturbances that may be difficult to locate and/or track over time. Such disturbances may impede normal operation of the cable communication system, and/or render some communication bandwidth significantly compromised or effectively unusable for conveying information. In particular, ingress from these random and/or intermittent sources may undesirably and unpredictably interfere with transmission of upstream information by operative RF signals in the upstream path bandwidth. Yet another ingress source includes "terrestrial" signals present in free space, primarily from short wave radio and radar stations (e.g., short wave radio signals are present from approximately 4.75 MHz to 10 MHz).

It is commonly presumed in the cable communication industry that egress may serve as a proxy for ingress; i.e., where there is an opening/fault in the cable communication system that allows for signal leakage from the system to the outside (egress), such an opening/fault likewise allows for outside signals to enter the cable communication system (ingress). It is also commonly presumed in the cable communication industry that a significant majority of cable communication system faults allowing for signal leakage into and out of the system occur almost entirely in connection with system elements associated with one or more subscriber premises; more specifically, subscriber service drops, and particularly subscriber premises equipment, are conventionally deemed to be the greatest source of signal leakage problems.

FIG. 11 shows the example subscriber premises 190 from FIG. 2, together with a portion of the hardline cable plant 180 including two segments of hardline coaxial cable 163B and a tap 188, to which the segments of hardline coaxial cable 163B are coupled via connectors 193. A subscriber service drop 163C also is coupled to the tap 188, for example, via a male connector 197A on one end of the subscriber service drop 163C and a female connector 197B of the tap 188. As illustrated in FIG. 11, it is commonly presumed in the cable communication industry that approximately 75% or more of ingress in a cable communication system originates inside respective subscriber premises 190 (all subscriber premises taken in aggregate), and that approximately 20% is attributable to the respective subscriber service drops 163C (taken in aggregate) (e.g., see "Return Path Maintenance Plan: A Five Step Approach to Ensuring a Reliable Communications Path," Robert Flask, Acterna LLC whitepaper, 2005, page 7, http://sup.xenya.si/sup/info/jdsu/white_papers/ReturnPath-MaintenancePlan_Whitepaper.pdf).

More specifically, poorly shielded subscriber premises equipment (e.g., defective or inferior quality cables 192; loose, corroded, or improperly-installed connectors 196; improperly terminated splitters 194), together with faults associated with the subscriber service drop 163C (e.g., pinched, kinked, and/or inferior quality/poorly shielded cable 163C; loose, corroded, or improperly-installed drop connectors 197A to the tap 188; improper/poor ground block splices 198), are conventionally deemed to account for 95% or more of ingress in the cable communication system (i.e., 75% inside subscriber premises plus 20% subscriber service drop, as noted above). While the hardline cable plant 180 generally is considered to be significantly better shielded and maintained (e.g., by the cable communication system owner/operator), in contrast the respective subscriber premises 190 typically are the least accessible and least controllable (i.e., they are generally private residences or businesses) and, as such, the least regularly-maintained portion of the cable communication system 160 (i.e., there is no regular access by the system owner/operator); hence, subscriber premises and their associated service drops are generally considered in the industry to be the most susceptible to signal leakage problems. Faults in subscriber service drops 163C and/or within subscriber premises 190 are considered to readily permit ingress from common ingress sources often found in household devices (e.g., appliances, personal computers, other consumer electronics, etc.) of cable communication system subscribers, as well as other ingress sources (e.g., garage door openers, various transmitting devices such as HAM or CB radios in the vicinity, fire and emergency communication devices, and terrestrial signals).

With respect to conventional ingress mitigation techniques, some approaches involve installing passive filters (e.g., in the taps 188 or within subscriber premises 190) to attenuate ingress originating from subscriber premises, while other approaches involve active systems that monitor communication traffic on the upstream path bandwidth and attenuate all or a portion of this bandwidth during periods of idle traffic. These approaches do not attempt to identify or eliminate ingress sources, but merely attempt to reduce their impact, and are accordingly not completely effective. Some other approaches, discussed in detail below, do attempt to identify subscriber-related faults that allow for ingress, but are generally labor and/or time intensive and largely ineffective. Furthermore, given the conventional presumption that 75% or more of ingress problems are deemed to relate to faults inside subscriber premises, even if ingress sources of this ilk are identified they may not be easily addressed, if at all (e.g., it may be difficult or impossible to gain access to one or more subscriber premises in which faults giving rise to ingress are suspected).

One conventional method for detecting ingress is to sequentially disconnect respective sections of hardline coaxial cable 163B ("feeders") within the hardline cable plant 180 in which suspected ingress has been reported (e.g., by disconnecting a given feeder branch from the port of a directional coupler 189), and concurrently monitor resulting variations in the noise profile of the upstream path bandwidth as seen from the headend of the network (e.g., using the analyzer 110 shown in FIGS. 1, 2 and 4). This technique is sometimes referred to as a "divide and conquer" process (e.g., akin to an "Ariadne's thread" problem-solving process), and entails a significantly time consuming trial-and-error approach, as there are often multiple hardline coaxial cable feeder branches ultimately serving several subscriber premises, any one or more of which could allow for ingress to enter the network; accordingly, this technique has proven to be inaccurate and inefficient at effectively detecting points of ingress. Additionally, disruptive conventional methods involving disconnecting different feeder cables in the hardline cable plant cause undesirable subscriber interruption of ordinary services, including one or more of entertainment-related services, data and/or voice services, and potentially critical services (i.e. lifeline or 911 services).

Other conventional approaches to ingress mitigation employ low attenuation value switches (termed "wink" switches), installed in different feeder branches of the hardline cable plant, to selectively attenuate noise in the upstream path bandwidth and thereby facilitate localizing potential sources of ingress. Each wink switch has a unique address, and the various switches are sequentially controlled to introduce some amount of attenuation in the corresponding branch. The upstream path bandwidth is monitored at the headend (e.g., via the analyzer 110) while the wink switches are controlled, allowing observation at the headend for any changes in noise level in the upstream path bandwidth that may be attributed to respective corresponding branches. In one aspect, the use of wink switches in this approach constitutes an essentially automated methodology of the approach described immediately above (i.e., "divide and conquer"), but suffers from the same challenges; namely, the feeder branches being selectively attenuated ultimately serve several subscriber premises, any one or more of which could allow for ingress to enter the network. Accordingly, pinpointing potential points of ingress remains elusive.

In yet other conventional approaches, mobile transceivers may be employed in an attempt to detect both egress and ingress. For example, U.S. Pat. No. 5,777,662 ("Zimmerman"), assigned to Comsonics, Inc., discloses an ingress/egress management system for purportedly detecting both ingress and egress in a cable communication system. The system described in Zimmerman includes a mobile transceiver that receives RF egress and records GPS coordinates. The mobile transceiver also transmits a signal that is modulated with GPS coordinates. If there is a significant fault in the cable communication system allowing for ingress in the vicinity of signal transmission, the transmitted signal may be received at the headend of the network by a headend monitoring receiver. Based on transmitted signals that are received at the headend, a computer assigns coordinates to potential flaws within the cable system to generate a simple point map of same so that they may be repaired by a technician. One disadvantage of this system is that the transmitted signal modulated with GPS coordinates must be received at the headend with sufficient strength and quality to permit identification of the location of a potential flaw; in other words, if a potential flaw is not significant enough so as to admit the transmitted signal with sufficient strength, but is nonetheless significant enough to allow some amount of ingress to enter into the system, no information about the location of the potential flaw is received at the headend. Thus, obtaining an accurate and complete profile of potential ingress across a range of signal levels (and across a significant geographic area covered by a cable communication system), arguably is significantly difficult to achieve (if not impossible) using the techniques disclosed in Zimmerman.

It is generally understood that noise levels due to ingress in the upstream path bandwidth may vary as a function of one or more of time, frequency, and geographic location. Conventional ingress detection and mitigation techniques generally have been marginally effective in reducing ingress to some extent in the upper portion of the upstream path bandwidth (e.g., above 20 MHz); however, notable ingress noise levels continue to persist below approximately 20 MHz, with ingress noise at the lower end of this range (e.g., 5 MHz to approximately 18 MHz, and particularly below 16.4 MHz, and more particularly below 10 MHz) being especially significant.

As a result, it is widely accepted in the cable communication industry that only a portion of the upstream path bandwidth of a cable communication system, generally from about 20 MHz to 42 MHz, may be used in some circumstances (e.g., depending in part on the presence of broadband noise and/or narrowband interference, carrier frequency placement of one or more communication channels, carrier wave modulation type used for the channel(s), and channel bandwidth) for transmission of upstream information from subscriber modems to the headend, and that the lower portion of the upstream path bandwidth (e.g., generally from about 5 MHz to about 20 MHz, and particularly below 18 MHz, and more particularly below 16.4 MHz, and more particularly 10 MHz) is effectively unusable due to persistent ingress.

FIG. 12 shows an example of a power spectral density (PSD) (or "spectrum") 2100A associated with the upstream path bandwidth 182 (i.e., 5 MHz to 42 MHz for the U.S.) of a conventional cable communication system, so as to illustrate the presence of ingress. The spectrum 2100A shown in FIG. 12 is provided as a screen shot from a display of a spectrum analyzer at the headend or coupled to the hardline cable plant 180 (e.g., serving as the analyzer 110 discussed above in connection with FIGS. 1, 2 and 4). In the spectrum analyzer screen shot of FIG. 12, the horizontal axis represents frequency in MHz, and the vertical axis represents signal level in dBmV.

As illustrated in FIG. 12, the presence of significant ingress disturbances 3500 from 5 MHz to just above approximately 20 MHz may be readily observed in the spectrum 2100A, including what appear to be a number of narrowband interference signals (also referred to as discrete "ingress carriers") at approximately 6-7 MHz, 9 MHz, 10 MHz, 11.5 MHz, 13 MHz, 15 MHz, 18 MHz and 21 MHz, respectively (viewed from left to right in the screen shot). As noted above, constituent elements of such ingress disturbances 3500 possibly may be due to ham radio, short wave terrestrial signals, or other sources of narrowband interference that has entered via one or more faults. The spectrum 2100A in FIG. 12 also illustrates the presence of two channels 2103A and 2103B in the upstream path bandwidth 182, placed in a relatively "cleaner" portion of the spectrum 2100A at carrier frequencies of approximately 25 MHz and 30 MHz, respectively, wherein each upstream channel has a bandwidth 2109 of 3.2 MHz. From the relative signal levels of the channels 2103A and 2103B as compared to the ingress disturbances 3500, it may be readily appreciated from FIG. 12 that the ingress disturbances 3500 in the region of the spectrum 2100A below approximately 20 MHz essentially preclude the existence of any channels in this portion of the upstream path bandwidth.

FIG. 13 shows another example of a spectrum 2100B associated with the upstream path bandwidth 182 of a conventional cable communication system, so as to illustrate the presence of ingress in the form of broadband impulse noise (see Chapman, pages 90-91). As illustrated in FIG. 13, the presence of broadband impulse noise 3502 (indicated by a dashed oval in FIG. 13) covers a significant portion of the upstream path bandwidth 182 and is likely adversely impacting the transmission of upstream information via the channel 2103C (having a carrier frequency of approximately 27 MHz). As noted above, ingress sources giving rise to such broadband impulse noise 3502 include electric motors and power-switching devices (often found in household devices at subscriber premises).

FIG. 14 shows yet another example of a spectrum 2100C associated with the upstream path bandwidth 182 of a conventional cable communication system, so as to illustrate the presence of ingress. The screen shot of the spectrum 2100C shows a frequency marker at 50 MHz, around which frequency point (e.g., from about 40 MHz to 54 MHz) a significant "roll-off" may be readily observed in the spectrum 2100C (e.g., due to diplex filters included in amplifiers of the hardline cable plant), indicating the transition between the upstream path bandwidth 182 and the downstream path bandwidth (i.e., above 50 MHz). By conventional standards, the spectrum 2100C represents an example of a relatively "clean" upstream path bandwidth (see pages 31-33, FIG. 19 of "Digital Transmission: Carrier-to-Noise Ratio, Signal-to-Noise Ratio, and Modulation Error Ratio," Ron Hranac and Bruce Currivan, Cisco whitepaper, November 2006, http://www.cisco.com/en/US/prod/collateral/video/ps8806/ps5684/ps2209/prod_white_paper0900aecd805738f5.html, hereafter "Hranac," which whitepaper is hereby incorporated herein by reference in its entirety). In particular, the "noise floor" 2107 of the spectrum 2100C is relatively flat from about 25 MHz to 42 MHz. For purposes of the present disclosure, the noise floor of a spectrum refers to a measure of additive white Gaussian noise (AWGN) power (sometimes also referred to as "thermal noise" or "white noise") within a measurement bandwidth of an instrument providing the spectrum. A noise floor may be substantially flat across a significant range of frequencies covered by the spectrum, or may vary within different frequency ranges of a given spectrum. In the example of FIG. 14, the noise floor 2107 is relatively flat from about 25 MHz to 40 MHz (there appears to be a very slight decrease in the noise floor over this range, but overall the noise floor is relatively flat in this range). Notwithstanding, below 25 MHz and particularly below 20 MHz, the noise floor rises significantly, and additionally the presence of significant ingress disturbances 3500 may be observed in the spectrum 2100C, including what appear to be a number of discrete "ingress carriers" at frequencies similar to those shown and discussed above in connection with FIG. 12.

While the particular regions of the spectrums 2100A and 2100C associated with ingress disturbances 3500 including discrete ingress carriers are particularly noteworthy in FIGS. 12 and 14, it should be appreciated that ingress may more generally impact the overall spectrum of the upstream path bandwidth; in particular, as illustrated in FIG. 13, various sources of ingress beyond the more discrete carriers shown amongst the ingress disturbances 3500 in FIGS. 12 and 14 may serve as wider-band noise sources that contribute to the overall noise profile of a spectrum, throughout significant portions (if not substantially all of) the spectrum.

The spectrum 2100C of FIG. 14 also illustrates the presence of an upstream channel 2103D in the upstream path bandwidth 182, wherein the upstream channel has a bandwidth 2109 of 3.2 MHz and is placed at a carrier frequency of 32.75 MHz (i.e., within a "cleaner" portion of the spectrum 2100B). A "carrier-to-noise ratio" (CNR) 2105 of the upstream channel 2103D also is indicated in FIG. 14; generally speaking, as discussed in greater detail below, a larger CNR for a channel (i.e., a greater distance between the average channel power, as represented by the top of the "haystack" profile for the channel, and the noise floor of the spectrum proximate to the channel) typically correlates with a reasonably functioning channel that effectively conveys upstream information, whereas relatively smaller values for CNR may be associated with channels that are not capable of conveying upstream information with sufficient reliability or accuracy. Accordingly, at least from a qualitative perspective, it may be appreciated from FIG. 14 that even in a so-called "clean" upstream spectrum by conventional standards, the presence of significant ingress disturbances 3500 in the region of the spectrum 2100C below approximately 20 MHz (notwithstanding the relatively lower magnitude of these disturbances as compared to FIG. 12) nonetheless poses significant challenges for the placement of appropriately functioning upstream channels in this region of the spectrum (e.g., see Table 4 and Table 5 discussed below).

Noise-Based Limitations on Cable System Communications

As noted above, noise that may be present on one or more physical communication media of a cable communication system may corrupt the integrity of information-bearing signals propagating on the media/medium. More specifically, as discussed above in connection with FIGS. 12 through 15, ingress in the upstream path bandwidth of a cable communication system can significantly (and adversely) impact the amount of usable spectrum within the upstream path bandwidth that can be employed to effectively convey upstream information from subscriber premises to the headend.

In the cable communication industry, various figures of merit are used to characterize the communication of information via modulated RF carrier waves (i.e., RF signals) in the presence of noise on the communication medium/media over which the RF signals propagate. A detailed treatment of such figures of merit is found in Hranac, referenced above.

One such figure of merit discussed in Hranac is referred to as "Carrier-to-Noise Ratio" (CNR), which is defined as the ratio of carrier or signal power to white-noise power in a specified bandwidth, as measured on a spectrum analyzer (or similar equipment). CNR often is expressed in units of decibels (dB), according to the relationship:

$$CNR \text{ (dB)} = 10\log\left(\frac{P_{carrier/signal}}{P_{noise}}\right), \qquad \text{Eq. 7}$$

where $P_{carrier/signal}$ is the carrier or signal power in Watts, and $P_{noise}$ is the additive white Gaussian noise (AWGN) power in Watts over a specified bandwidth. For digitally modulated RF signals (e.g., QPSK and QAM signals), the signal power $P_{signal}$ is the average power level of the signal (also sometimes called average "digital channel power") and is measured in the full occupied bandwidth of the signal (i.e., the symbol rate bandwidth, as discussed above in connection with Eq. 6).

With reference again to the upstream channel 2103D shown in FIG. 14, the spectrum of a typical QPSK or QAM channel resembles a "haystack" with an essentially flat top across the channel bandwidth. In the spectrum 2100C of FIG. 14, the height of the channel 2103 gives the signal density in units of dBmV as measured in the spectrum analyzer resolution bandwidth (RBW) (which in the example of FIG. 14 is 300 kHz). Given the specified channel bandwidth 2109 of 3.2 MHz, this RBW value can be scaled to the symbol rate bandwidth (i.e., 0.8×3.2 MHz=2.56 MHz) to arrive at the signal density in the channel (i.e., across the symbol rate bandwidth). Similarly, the height of the noise floor 2107 gives the noise density in units of dBmV as measured in the spectrum analyzer resolution bandwidth (RBW), and this also can be scaled to the symbol rate bandwidth to provide the total noise density in the channel. Given decibel units for the signal power and the noise power as expressed by the spectrum analyzer, the CNR is calculated by subtracting the total noise density in the channel from the signal density in the channel—however, since these respective values are both scaled similarly by the symbol rate bandwidth, this difference can be read directly from the spectrum analyzer screen shot as the vertical height between the average value at the top of the "haystack" channel spectrum to the noise floor, as shown by the reference numeral 2105 in FIG. 14 (In FIG. 14, the CNR 2105 is approximately 36 dB). This type of measurement of CNR from a spectrum analyzer screen shot is sufficiently accurate for CNR values greater than about 15 dB; if, however, the height between the top of the channel spectrum to the noise floor is between about 10 dB and 15 dB, an offset of about 0.5 dB should be subtracted from the observed height to provide a more accurate CNR measurement (for even smaller heights, larger offsets are required, e.g., subtracting as much as 1.5 dB from heights of about 5 dB).

Regarding channel power for upstream channels, and with reference again for the moment to FIG. 1, as discussed above a number of subscriber modems 165 that share a same physical communication channel in the upstream path bandwidth are referred to a "service group," and the respective modulator circuits of these modems in the service group transmit upstream RF signals at different times (according to TDMA/ATDMA access protocols dictated by the CMTS 170 and the modems 165). Although transmitting at different times, subscriber modem upstream transmit levels are managed by the CMTS 170 so as to provide generally the same receive level for all subscriber modems (typically with less than 1 dB signal level difference among the modems) at a given demodulation tuner 174 of the CMTS tuned to demodulate the channel. Ingress (as well as AWGN) travels back to this same demodulation tuner, so the noise amplitude at the CMTS port coupled to the demodulation tuner is the same for all modems of the service group. Accordingly, the CNR for each modem in a service group (as observed at the CMTS port corresponding to the service group) typically is substantially similar if not virtually identical to other modems in the service group (unless there is a problem with a particular subscriber modem and/or an associated subscriber-related fault in a subscriber service drop or subscriber premises equipment within the service group).

Another related figure of merit discussed in Hranac is "Carrier-to-Noise-Plus-Interference Ratio" (CNIR), which makes a distinction between an essentially flat noise floor and more narrowband noise that could be present within the bandwidth of a physical communication channel. Rather than taking the ratio of the average channel power to only the white noise power in the symbol rate bandwidth, for CNIR the power of any narrowband interference present in the symbol rate bandwidth is added to the white noise power in the symbol rate bandwidth, and then the ratio of the channel power to this "noise-plus-interference power" is taken. The noise-plus-interference power may be measured during periods in which there is no RF signal being transmitted in the channel ("quiet times"); of course, it may be appreciated that for intermittent, random and/or bursty ingress sources, the noise-plus-interference power measurements may differ significantly as a function of time. In any event, the presence of significant interference power within the symbol rate bandwidth of a channel, in addition to white noise power, results in a CNIR significantly lower than a comparable CNR in the absence of such interference.

To illustrate the concept of CNIR relative to CNR, FIG. 15 shows the spectrum 2100C of FIG. 14 in which, for purposes of illustration, two additional hypothetical channels similar to the 3.2 MHz-wide channel 2103D are shown in "phantom" (with dashed lines to outline the channel) on the spectrum 2100C; in particular, a first hypothetical channel 2111 is placed at a center frequency of approximately 14 MHz, and a second hypothetical channel 2113 is placed at a center frequency of approximately 11 MHz. These two hypothetical channels occupy a portion of the spectrum 2100C in which the ingress disturbances 3500 are present, which disturbances would constitute a significant source of noise power in each of the hypothetical channels. In particular, it may be readily observed in FIG. 15 that the noise floor in the region of the spectrum corresponding to the two hypothetical channels 2111 and 2113 is notably higher than the noise floor 2107 in the vicinity of the channel 2103D (e.g., approximately 3 to 5 dB higher), and the respective peaks of the ingress carriers within the channels (constituting part of the ingress disturbances 3500) range from approximately 15 to 20 dB higher than the noise floor 2107; accordingly, the CNIR for each of the two hypothetical channels 2111 and 2113 would be significantly less than the CNR 2105 of the channel 2103D (e.g., CNIR on the order of 20-23 dB, as opposed to a CNR of 36 dB).

With reference again to the spectrum 2100A shown in FIG. 12, or the spectrum 2100B shown in FIG. 13, the situation for placing hypothetical channels in the region of the spectrum 2100A occupied by the ingress disturbances 3500, or the spectrum 2100B occupied by broadband impulse noise 3502, would be dramatically worse in terms of CNIR as compared to the situation discussed immediately above in connection with the relatively "cleaner" spectrum 2100C of FIG. 14. In FIG. 12, the respective CNRs of the channels 2103A and 2103B appear to be somewhat larger than the CNR 2105 for the channel 2103D shown in FIG. 14 (although the spectrums for the channels 2103A and 2103B in FIG. 12 may be obscuring some underlying narrowband interference noise, which indeed seems to be present to some extent in the region between the channels 2103A and 2103B, and just to the left of the channel 2103A). However, if the hypothetical channels of FIG. 15 where to be placed in the region of the spectrum 2100A in FIG. 12 that is occupied by the ingress disturbances 3500, or placed virtually anywhere within the spectrum 2100B of FIG. 13 below 27 MHz, the CNIR for these hypothetical channels would be severely lower than the CNR for the channels 2103A and 2103B (at one point around 10 MHz in the spectrum 2100A, there is an ingress carrier that is only about 3 dB below the channel power of the channels 2103A and 2103B).

On this qualitative basis alone, it would be readily appreciated from FIGS. 12 through 15 that the presence of significant broadband noise and narrowband interference signals in the region of the spectrum occupied by the ingress disturbances 3500 or the broadband impulse noise 3502, even for a relatively "clean" upstream spectrum as shown in FIG. 14, effectively precludes the placement of appropriately functioning channels in this region of the spectrum. As noted in Hranac, on page 6, DOCSIS specifies a minimum CNR for upstream channels, i.e., digitally modulated carriers, of 25 dB; this level of CNR, however, does not appear to be available for channels that would be placed below 20 MHz in the spectrums shown in FIGS. 12 through 15.

Table 4 below provides conventionally-accepted minimum carrier-to-in-channel noise values (CNR or CNIR, denoted generally as C/N) for a given physical communication channel that are required to support effective transport and demodulation of information carried over the channel using a particular modulation order of QAM; stated differently, different modulation orders of QAM require different minimum C/N values (e.g., see Chapman, page 38, Table 4 and page 133, Table 36; also see page 7, Table 3 of "The Grown-up Potential of a Teenage PHY," Dr. Robert Howald et al., The NCTA 2012 Spring Technical Forum Proceedings, May 21, 2012, hereafter "Howald," which publication is hereby incorporated herein by reference in its entirety; also see FIG. 1, page 150 of "256-QAM For Upstream HFC," Thompson et al., NCTA 2010 Spring Technical Forum Proceedings, Los Angeles, Calif., May 2010, hereafter "Thompson," which publication is hereby incorporated herein by reference in its entirety):

TABLE 4

| QAM Modulation Order | Uncoded Theoretical C/N (dB) | Operator Desired C/N Target (db) |
| --- | --- | --- |
| QPSK (4-QAM) | 16 | 22 |
| 16-QAM | 22 | 28 |
| 32-QAM | 25 | 31 |
| 64-QAM | 28 | 34 |
| 128-QAM | 31 | 37 |
| 256-QAM | 34 | 40 |

In Table 4, the "uncoded theoretical" values for C/N presume a bit error rate (BER) for demodulated symbols on the order of $10^{-8}$ (BER is the ratio of corrupt bits to total bits of information recovered from demodulation over some sampling period). Also, the uncoded theoretical values for C/N in Table 4 presume that no forward error correction or "FEC" (discussed in greater detail below) is employed in the transmission of information via a given physical communication channel (some MSOs tolerate a pre-FEC BER on the order of $10^{-7}$, although as noted above a pre-FEC BER on the order of $10^{-8}$ is more commonly adopted as a minimum BER threshold; modems typically start to have difficulty when BER is as high as on the order of $10^{-6}$ and modems typically fail to lock consistently when BER is as high as on the order of $10^{-5}$; for post-FEC BER, $10^{-9}$ is more commonly adopted as a minimum acceptable BER threshold for MSOs providing voice and/or data services, and more specifically "triple play" premium services).

The "operator desired" C/N targets listed in Table 4 are chosen to provide 6 dB of headroom above the uncoded theoretical values (to account for a wide variety of possible noise profiles that may occur in actual implementations with upstream information traffic from subscriber premises). From the C/N values provided in Table 4, it may be further appreciated in connection with FIGS. 12 through 15 that the presence of significant broadband noise and narrowband interference signals in the region of the spectrum occupied by the ingress disturbances 3500 or the broadband impulse noise 3502, even for a relatively "clean" upstream spectrum as shown in FIG. 14, effectively precludes the placement of appropriately functioning channels in this region of the spectrum having a QAM modulation order greater than 4 (i.e., only QPSK channels might function, if at all, in the lower portion of the upstream path bandwidth).

While CNR and CNIR (collectively C/N) provide illustrative figures of merit relating to RF signals as received by a demodulation tuner in the presence of noise (in terms of respective signal and noise powers), other instructive figures of merit relate to how effectively received signals are demodulated by a demodulation tuner of the CMTS. For example, other figures of merit quantify how effectively received RF signals are demodulated so as to recover the digital information transported by such signals, based on the symbol constellations associated with the modulation type and order used to generate the RF signals.

More specifically, as discussed above in connection with FIGS. 5 through 9 relating to QAM constellations and a QAM RF signal carrying upstream information (in which an amplitude A and phase $\phi$ of the signal is mapped to a particular point on the constellation corresponding to a symbol representing the upstream information), the presence of noise on a medium carrying such a signal may alter one or both of the signal's amplitude A and phase $\phi$. Such alteration to the signal's amplitude A and/or phase $\phi$ may distort the signal such that, upon demodulation, the demodulated signal may be mapped not to the "target" constellation point corresponding to the original symbol carried by the signal, but instead to another neighboring point in the constellation, resulting in the wrong symbol being recovered by the demodulator.

FIG. 16 illustrates the effect of noise on the demodulation of QAM signals (e.g., as may be observed at a demodulation tuner 174 of the CMTS 170 at the headend 162—see FIG. 4) using an example of a QPSK or 4-QAM constellation diagram 5000A. As used in connection with FIG. 16, the term "decision boundary" refers to a bounded area on the constellation diagram 5000A, defined by certain ranges of values for I and Q, that are used to evaluate the constellation point/symbol of the constellation diagram to which a received and demodulated RF signal most appropriately maps. To this end, vertical and horizontal lines representing particular values of I and Q, respectively, are added to the constellation diagram 5000A so as to separate respective equidistant constellation points, thereby creating four squares in the constellation diagram, wherein a corresponding constellation point is at the center of each square. Each of the four squares constitutes a decision boundary for the corresponding constellation point/symbol, one of which decision boundaries is labeled in FIG. 16 with the reference numeral 5102 (i.e., the decision boundary in the top right hand corner of the constellation diagram 5000A).

Ideally, all received RF signals corresponding to a particular constellation point/symbol would, upon demodulation, map to the center of a decision boundary for the constellation point/symbol on the constellation diagram. However, various imperfections in the communication system, giving rise to the presence of noise within the signal's bandwidth and/or adversely affecting the propagation of the RF signal along the physical communication media in the system (i.e., the "channel response"), may cause the mapping of the signal upon demodulation to deviate from the center of the decision boundary. Based on the constellation's decision boundaries, a received RF signal having an amplitude A and a phase $\phi$ which upon demodulation provides I and Q values that fall within a particular decision boundary is deemed to represent the symbol corresponding to the constellation point within that decision boundary. Accordingly, such decision boundaries allow for a certain amount of fluctuation in the amplitude A and the phase $\phi$ of a received RF signal due to noise, without resulting in a demodulation error (or "symbol decoding error").

In FIG. 16, this behavior may be observed by noting that within each decision boundary of the QPSK constellation diagram 5000A, there are multiple mapped points that fall outside of a shaded circle forming a small area around the center of each decision boundary. As more points are mapped to the constellation diagram over time, the mapped points form a "cloud" or "cluster" around the center of each decision boundary. Generally speaking, the amount of noise present within the channel and/or the channel response affects the overall spread of mapped points (spread of the "cloud" or "cluster") within each decision boundary; in some cases, significant fluctuations in the amplitude A and/or the phase $\phi$ of a received RF signal due to noise in the channel and/or other adverse affect of the channel response may, upon demodulation, cause one or more points to be mapped close to or across a boundary edge, the latter resulting in a symbol decoding error. From FIG. 16, and with reference again to the various constellation diagrams shown in FIGS. 7 through 9 for different modulation orders of QAM, it may be appreciated that more dense constellations have smaller areas for the decision boundary associated with each constellation point/symbol; hence, as discussed above, RF signals based on higher order QAM modulation generally are more susceptible to noise-induced demodulation or symbol decoding errors.

To quantify the spread of mapped points in the example of FIG. 16, the first decision boundary 5102 shows a "target symbol vector" 5104, a "received symbol vector" 5106, and an "error vector" 5108 for one of several points mapped to this region of the constellation diagram 5000A. The target symbol vector 5104 represents an "ideal RF signal" that, upon demodulation, would be mapped to the center of the decision boundary 5102. The received symbol vector 5106 represents an actual signal that is received, demodulated, and mapped to the constellation diagram, and the error vector 5108 represents the difference between the received symbol vector 5106 and the closest target symbol vector 5104. As may be appreciated from FIG. 16, for each received demodulated signal mapped to the constellation diagram, a corresponding error vector may be determined based on the difference between the received symbol vector corresponding to the mapped point and the closest target symbol vector for the constellation point to which the signal is mapped. Thus, it may also be appreciated from FIG. 16 that smaller error vectors correspond to a more accurate mapping of received signals to the constellation diagram.

The term "modulation error ratio" (MER) refers to a figure of merit, based at least in part on error vectors similar to the error vector 5108 shown in FIG. 16, for quantifying the effectiveness of demodulating a received QAM RF signal. The MER takes into account any noise present within the channel bandwidth as well as the channel response, and provides a numerical metric to describe the spread (or "fuzziness") of the "cloud" or "cluster" of points mapped to the constellation diagram around respective constellation points/symbols of the diagram.

Mathematically, MER is defined in terms of the average symbol power of some number N of symbols decoded from samples of demodulated received RF signals, divided by the average error power associated with the decoded symbols, according to the relationship:

$$MER(\text{dB}) = 10\log\left[\frac{\sum_{j=1}^{N}(I_j^2 + Q_j^2)}{\sum_{j=1}^{N}(\delta I_j^2 + \delta Q_j^2)}\right]. \quad \text{Eq. 8}$$

Again, in Eq. 8 N denotes the total number of symbols determined from demodulation of successive samples of a received RF signal over a given time period, $I_j$ and $Q_j$ respectively represent the in-phase and quadrature parts of the target symbol vector in the decision boundary to which the $j^{th}$ sample of the RF signal maps, and $\delta I_j$ and $\delta Q_j$ respectively represent the in-phase and quadrature parts of the error vector corresponding to the actual point to which the $j^{th}$ sample of the RF signal maps. In practical application of Eq. 8, it is presumed that the measurement of MER is taken over a sufficiently large number N of samples (e.g., N>100) such that all of the constellation symbols are equally likely to occur; if this is the case, the numerator of Eq. 8 divided by N essentially represents the average symbol power of the constellation as a whole (which is a known constant for a given QAM modulation order). With this in mind, MER alternatively may be more generally defined as the ratio of average constellation symbol power to average constellation error power. In general, a higher value for MER represents a smaller cloud or tighter cluster of points for each symbol (less "fuzziness"), and corresponds to a lower level of impairments to the channel (e.g., noise and/or channel response anomalies) that may adversely impact propagation and hence demodulation of RF signals.

Another figure of merit that is closely related to MER is referred to as "error vector magnitude" (EVM). By convention, EVM is based on the root-mean-square (RMS) values of error vectors similar to the error vector 5108 shown in FIG. 16, as a percentage of the maximum symbol magnitude (e.g., corresponding to the constellation corner states). Accordingly, in contrast to MER, a lower EVM percentage value represents a smaller cloud or tighter cluster of points for each symbol (less "fuzziness"), and corresponds to a lower degree of impairment to the channel that may adversely impact demodulation of received RF signals. EVM is a linear figure of merit whereas MER is a logarithmic figure of merit, but both figures convey similar information regarding the effectiveness and accuracy of demodulation of QAM RF signals. For purposes of the discussion herein, MER is used primarily as the figure of merit regarding demodulation of QAM RF signals; however, it should be readily appreciated that MER may be converted to EVM, and vice versa, via well-known mathematical relationships (e.g., see Hranac, pages 28-29).

With reference again to FIGS. 1 and 4, whereas CNR or CNIR measurements for a given upstream channel often are made with the assistance of the analyzer 110 (e.g., a spectrum analyzer) at the headend 162 (or coupled to the hardline cable plant 180 as shown in FIG. 2), MER measurements typically are provided by the demodulation tuners 174 of a conventional CMTS 170 (or in some instances a specialized QAM analysis device/tool may be employed, e.g., the PathTrack™ HCU200 Integrated Return Path Monitoring Module offered by JDSU, see http://www.jdsu.com/ProductLiterature/hcu200_ds_cab_tm_ae.pdf). A detailed discussion of demodulation tuner functionality and the manner in which MER measurements may be made is discussed in Hranac (e.g., see Hranac, pages 19-21).

Recall from the discussion above in connection with FIGS. 1 and 4 that multiple subscriber premises typically share a single upstream channel as a "service group." In exemplary implementations of conventional demodulation tuners 174 and subscriber modems 165 according to the DOCSIS standard utilizing TDMA or ATDMA, different subscriber premises of a given service group transmit their corresponding portions of upstream information to the headend as transmission "bursts" with some preordained timing (in this context, a demodulation tuner 174 also is sometimes referred to as a "burst receiver"). Typical demodulation tuners of a CMTS are configured to report various operating parameters, including MER (some instruments refer to MER as "signal-to-noise ratio" (SNR) as well as "receive modulation error ratio" (RxMER)). Some CMTSs are configured to report MER on both a per-channel basis and a per-subscriber-modem basis, in which per-channel MER measurements provide an average MER value over some number of valid bursts from the service group (DOCSIS specifies upstream MER measurements as an estimate provided by a CMTS demodulation tuner of the ratio of average constellation energy with equally likely symbols to average squared magnitude of error vectors, over some number of valid bursts from different subscriber modems of the service group sharing the physical communication channel assigned to the demodulation tuner). Accordingly, unless otherwise indicated herein, any reference to numerical MER values represents an MER value for a physical communication channel, rather than for a particular subscriber modem (that may be sharing the channel with other modems of the service group).

Various other features that may be implemented in demodulation tuners 174 of the CMTS 170 and subscriber modems 165 adopting DOCSIS version 1.1 and higher also may need to be considered in connection with MER measurements provided by a given demodulation tuner (or QAM analysis device), as they may provide "processing gains" to improve channel performance in the presence of noise or other channel impediments (e.g., see "Advanced Physical Layer Technologies for High-Speed Data Over Cable," Cisco Whitepaper, August 2005, http://www.cisco.com/en/US/prod/collateral/video/ps8806/ps5684/ps2209/prod_white_paper0900aecd8066c6cc_ps4969_Products_White_Paper.html, hereafter "Cisco Advanced PHY," which whitepaper is incorporated by reference herein in its entirety; also see "QAM Overview and Troubleshooting Basics for Recently digital Cable Operators," JDSU whitepaper, October 2009, http://www.jdsu.com/ProductLiterature/Digital_QAM_Signals_Overview_and_Basics_of_Testing.pdf, hereafter "JDSU QAM Overview," which whitepaper is hereby incorporated by reference herein in its entirety; also see Hranac, pages 18-21). For example, subscriber modems 165 may implement an adaptive equalizer (sometimes referred to as a "pre-equalizer") to intentionally distort the waveform of a transmitted upstream RF signal so as to compensate for the upstream channel frequency response; similarly, demodulation tuners may implement a complimentary adaptive equalizer to compensate for channel response effects (e.g., group delay variation, amplitude slope or ripple, and/or microreflections). While the adaptive equalizers in one or both of the subscriber modem and the demodulation tuner may significantly improve the channel response for a given channel over which upstream information is being communicated, there are practical limitations on the extent to which channel impairments can be compensated. Notwithstanding, some demodulation tuners of conventional CMTSs (as well as various QAM analysis devices) provide "equalized" MER measurements (i.e., for which a given demodulation tuner adapts its equalizer on each data traffic burst received from a subscriber modem of the service group), as well as "unequalized" MER measurements (e.g., for which adaptive equalization is bypassed or not enabled). For purposes of the present disclosure, unless otherwise indicated specifically, any reference to numerical MER values herein presumes an "unequalized" MER measurement (which is typically a lower numerical value than a corresponding equalized MER measurement for the same channel, absent the processing gain provided by adaptive equalization).

Additionally, some conventional demodulation tuners of CMTSs are equipped with "ingress cancellation" circuitry, which is designed to attenuate to some degree in-channel narrowband interference arising from ingress (as discussed above in the previous section). Such circuitry is similar to the adaptive equalizers discussed immediately above, in that it dynamically detects and measures in-channel narrowband interference and adapts filter coefficients so as to try to attenuate the detected/measured interference. Ingress cancellation circuitry may add some broadband white noise (AWGN) to the channel; additionally, ingress cancellation circuitry generally is only effective at mitigating some degree of demodulation error due to narrowband interference in a channel that is already "minimally functioning" (e.g., channels having a CNIR above a certain minimum threshold, in which there may be a single narrowband ingress carrier having relatively modest peak power within the channel bandwidth, which may be further attenuated by the ingress cancellation circuitry).

As noted above, however, the presence of appreciable interference (e.g., in the form of multiple ingress carriers of significant strength—see FIGS. 12 and 14; and/or broadband impulse noise—see FIG. 13) in some portion(s) of the spectrum of the upstream path bandwidth (e.g., below 20 MHz, and particularly below 18 MHz, and more particularly below 16.4 MHz, and more particularly below 10 MHz) may significantly impair, or preclude the existence of, a channel within that/those portion(s) of the spectrum, even with demodulation tuners that employ ingress cancellation circuitry. Indeed it has been noted that while ingress cancellation circuitry is effective at facilitating reliable transmissions in the middle to high end of the upstream path bandwidth, in contrast ingress cancellation circuitry generally is not effective below 20 MHz, where channels are most vulnerable to broadband impulse noise (and multiple significant ingress carriers) (e.g., see Chapman, page 69; also see Cisco Advanced PHY, pages 23-28, in which tests of ingress cancellation circuitry for a 16-QAM 3.2 MHz bandwidth channel below 20 MHz result in significant bit error rates (BER)—ping losses of 0.01% and higher, suggest BERs on the order of $10^{-4}$ to $10^{-6}$, i.e., notably worse BERs than conventionally acceptable post-FEC BER on the order of $10^{-9}$; also see Thompson, pages 148-149—"Laboratory Measurements").

With respect to the effect of ingress cancellation circuitry on MER, assuming a minimally functioning channel (e.g., pre-FEC BER on the order of no higher than $10^{-7}$ and preferably on the order of $10^{-8}$), MER measurements for a given channel in which ingress cancellation circuitry is employed generally are higher than CNIR measurements for the channel, due to some degree of attenuation of limited narrowband interference. In any event, for purposes of the present disclosure, the function of ingress cancellation circuitry, if present in a demodulation tuner of the CMTS, is treated similarly to adaptive equalization; accordingly, unless otherwise indicated specifically, again any reference to numerical MER values herein presumes an "unequalized" MER measurement (in which neither ingress cancellation circuitry nor other adaptive equalization is employed in connection with demodulation of a received upstream RF signal). Again, as noted above, an unequalized MER measurement for a channel typically provides a lower numerical value than a corresponding equalized MER measurement in which ingress cancellation and/or adaptive equalization is employed.

With the foregoing in mind, there are conventionally-accepted approximate minimum unequalized MER values ("MER failure threshold values") for a given physical communication channel that are required to support effective transport and demodulation of information carried over the channel using a particular modulation order of QAM; stated differently, different modulation orders of QAM require different MER failure threshold values (e.g., see "Broadband: Equalized or Unequalized? That is the Question," Ron Hranac, Communication Technology, Feb. 1, 2007, http://www.cable360.net/print/ct/operations/bestpractices/21885.html, hereafter "Hranac 2007," which article is hereby incorporated by reference herein in its entirety; also see Hranac, page 23, Table 4; also see JDSU QAM Overview, pages 7-8). Table 5 below provides representative unequalized MER failure threshold values to support different modulation orders of QAM, and corresponding C/N target values (from Table 4 above).

TABLE 5

| QAM modulation order (symbols per constellation) | Minimum Unequalized MER (dB) | C/N Target (db) |
| --- | --- | --- |
| QPSK (4-QAM) | 10-13 | 22 |
| 16-QAM | 17-20 | 28 |
| 64-QAM | 22-24 | 34 |
| 256-QAM | 28-30 | 40 |

Hranac and Hranac 2007 suggest that unequalized MER values in an operational system should be kept at least 3 dB to 6 dB above the failure threshold for the modulation type in use (also see Hranac, page 23, footnote 11, which notes that many cable operators use the following unequalized MER values as minimum operational values: QPSK ~18 dB; 16-QAM ~24 dB; 64-QAM ~27 dB; and 256 QAM ~31 dB; also see Chapman, page 77, Table 18, which notes an equalized MER of 37 dB to support a pre-FEC error-free 256-QAM channel in the presence of AWGN, and without ingress carriers; also see "Pushing IP Closer to the Edge," Rei Brockett et al., The NCTA 2012 Spring Technical Forum Proceedings, May 21, 2012, which publication is hereby incorporated herein by reference in its entirety—page 5 notes an MER of 37 dB sufficient to support a modulation order of 256-QAM).

According to Hranac, CNR, CNIR and MER for a given channel should be virtually identical in an "ideal" system with no impairment to the channel other than additive white Gaussian noise (AWGN) and with full traffic loading (e.g., see Hranac, page 39); in many practical implementations, however, Hranac suggests that for CNR values of between 15-25 dB, again where AWGN is the primary channel impairment (i.e., CNR=CNIR), MER should agree with CNR to within about 2 dB or less. Hranac also points out that the MER of a channel is less than, or at best equal to, CNR, but never greater than CNR, and that MER may be appreciably less than CNR if significant impairments to the channel beyond AWGN exist (e.g., ingress disturbances and/or channel response effects such as group delay variation, amplitude slope or ripple, and/or microreflections). Accordingly, it should be appreciated that the CNR for a given channel may appear to be relatively high while at the same time the MER for the channel can be unusually low—however, the converse can not be true; stated differently, a channel may have a relatively high CNR and low MER, but a channel with a low CNR (or low CNIR) will always have a correspondingly low MER.

With the foregoing also in mind, and with reference again to FIGS. 12 and 14, the presence of significant ingress disturbances 3500 in the spectrums 2100A and 2100C are indicative of notably low prospective CNIRs for hypothetical channels placed in this portion of the upstream path bandwidth, as discussed above in connection with FIG. 15. Accordingly, in view of the relationship between MER and CNR/CNIR discussed immediately above, and the MER fault thresholds given in Table 5 above, such low prospective CNIRs due to significant ingress disturbances essentially serve as a "non-starter" for implementation of functioning channels in this portion of the upstream path bandwidth.

As discussed briefly above, one technique specified in DOCSIS to improve the robustness of information transmission over a physical communication channel in the presence of broadband impulse or burst noise is referred to as "Forward Error Correction" (FEC). FEC typically involves the transmission of additional data (sometimes referred to as "parity bytes" or "overhead"), together with data packets constituting upstream information from subscriber premises that is encoded on a channel's modulated carrier, to allow for the correction of bit errors post demodulation. FEC conventionally is accomplished by adding redundancy to the transmitted information using a predetermined algorithm. Unlike adaptive equalization and ingress cancellation circuitry, FEC does not affect MER measurements; rather, if bit errors do occur as a result of demodulation, FEC provides a technique by which such bit errors may be corrected based on the "overhead" or redundancy built into the information transported over the channel. In this manner, using FEC as part of the modulation and demodulation processing of information transported over a physical communication channel in which a given modulation order of QAM is employed may permit somewhat less stringent C/N or MER threshold values for ensuring reliable channel operation (e.g., the C/N and MER threshold values shown in Table 4 and Table 5 may be somewhat lower if FEC is employed).

To illustrate the foregoing premise, Table 6 below provides additional C/N performance targets for different modulation orders of QAM using two different types of FEC, namely, "Reed-Solomon" FEC (commonly employed in conventional subscriber modems and CMTSs, and "Low Density Parity Check" (LDPC) codes, currently proposed for future "next generation" implementations of DOCSIS-compliant modulators and demodulators; see Chapman, pages 119 through 126). For comparison, Table 6 also includes uncoded theoretical C/N values from Table 4 above. From Table 6, it may be appreciated that employing these forms of FEC provides additional robustness against channel impairments, thereby permitting lower C/N performance targets for sustaining functional channels (e.g., see Chapman, FIG. 57, page 132, and Table 36, page 133).

TABLE 6

| QAM Modulation Order | Uncoded Theoretical C/N (dB) | Reed-Solomon FEC C/N Target (dB) | LDPC Coded C/N Target (dB) |
| --- | --- | --- | --- |
| QPSK (4-QAM) | 16 | 10 | 4 |
| 16-QAM | 22 | 16 | 10 |
| 32-QAM | 25 | 19 | 13 |
| 64-QAM | 28 | 22 | 16 |
| 128-QAM | 31 | 25 | 19 |
| 256-QAM | 34 | 28 | 22 |
| 512-QAM | 37 | 31 | 25 |
| 1024-QAM | 40 | 34 | 28 |
| 2048-QAM | 43 | 37 | 31 |
| 4096-QAM | 46 | 40 | 34 |

While providing some degree of enhanced protection against noise-induced errors, FEC does not work well however if significant impulse noise creates many demodulation errors in succession (e.g., see "Upstream FEC Errors and SNR as Ways to Ensure Data Quality and Throughput," Cisco Whitepaper, Document ID: 49780, Oct. 4, 2005, which whitepaper is incorporated by reference herein in its entirety). In particular, ingress types that could introduce errors that are uncorrectable via FEC include excessive impulse noise and/or narrowband interference (e.g., ingress carriers). As discussed earlier in connection with the C/N metrics presented in Table 4, some MSOs tolerate a pre-FEC BER on the order of $10^{-7}$, although a pre-FEC BER on the order of $10^{-8}$ is more commonly adopted as a minimum BER threshold; for channels in which FEC is employed, a BER on the order of $10^{-9}$ is more commonly adopted as a minimum acceptable BER threshold. In particularly noisy environments, however, even with FEC, this level of BER may be challenging if not impossible to attain.

In addition to RS-FEC, DOCSIS versions 2.0 and higher support an alternative to the TDMA and ATDMA time-division protocols (employed by multiple subscriber modems to share a channel as a service group) that purportedly is more robust than its TDMA/ATDMA counterparts against channel impairments such as broadband impulse noise; as briefly noted above, this alternative protocol is commonly known as Synchronous Code Division Multiple Access (S-CDMA) (see Chapman, pages 88 through 95). In S-CDMA, each symbol of data is multiplied at the modulation tuner (i.e., transmitter) of a subscriber modem by a spreading code including some number of codes, which spreads out each symbol in the time domain by as much as 128 times. Accordingly a noise burst that may wipe out many QAM symbols being transported over an ATDMA channel must have a significantly longer duration to have the same effect on an S-CDMA channel. At the same time, there is no reduction in data throughput in an S-CDMA channel, as multiple subscriber modems of a service group may transmit at the same time (the orthogonal spreading code is used to differentiate respective transmissions from different modems, which may transmit simultaneously). While S-CDMA is widely touted as a possible solution for deployment of channels in the troublesome portion of the upstream path bandwidth below 20 MHz, it has nonetheless remained largely unused in practice by MSOs despite its availability in DOCSIS 2.0 and DOCSIS 3.0 certified equipment (e.g., see Chapman, page 89).

Regarding the figures of merit discussed above, the power of an S-CDMA burst depends on the number of codes used in the spreading code; accordingly, S-CDMA presents some challenges for accurate CNR and MER measurements at the headend. For purposes of the present disclosure, unless otherwise specifically stated, it is presumed that any numerical CNR, CNIR, or MER values provided herein are associated with channels implemented according to TDMA or ATDMA protocols, and not S-CDMA (i.e., it is presumed that subscriber modems and demodulation tuners of the CMTS are not employing S-CDMA unless specifically noted otherwise).

Given the accepted limitations on the upstream path bandwidth arising from ingress, conventional cable communication systems implement "channel plans" for the upstream path bandwidth that attempt to avoid the various challenges posed by the presence of ingress (as well as other potential channel impairments). For purposes of the present disclosure, a "channel plan" for the upstream path bandwidth of a cable communication system refers to the designation of one or more of: 1) a number of channels occupying the upstream path bandwidth; 2) the carrier frequency/frequencies at which the channel(s) is/are placed in the upstream path bandwidth; 3) the bandwidth(s) of the channel(s); 4) the QAM modulation order(s) of the channel(s); 5) an operational average power level for each channel with respect to the overall power budget of the upstream path; and 6) an aggregate deployed or "raw" data rate (deployed capacity) for the channel plan. For example, with reference again to FIG. 12, the channel plan for the upstream path bandwidth 182 represented by the spectrum 2100A includes the two channels 2103A and 2103B, wherein the channel 2103A has a carrier frequency of about 25 MHz and the channel 2103B has a carrier frequency of about 30 MHz, both channels have a bandwidth of 3.2 MHz, and both channels use QPSK (4-QAM) for modulation of upstream information conveyed by the channel. For a given upstream channel plan, an aggregate upstream raw data rate (i.e., "deployed capacity") may be calculated based on Table 2 and the bar graph shown in FIG. 10. In particular, for the channel plan shown in FIG. 12, FIG. 10 indicates that a 3.2 MHz wide QPSK channel has a raw data rate of approximately 5 Mbits/s (and from Table 2, for a QPSK channel, 1.6 bps/Hz×3.2 MHz=5.12 Mbits/s); therefore, given two channels having a raw data rate of approximately 5 Mbits/s each, the deployed upstream capacity of the channel plan shown in FIG. 12 is approximately 10 Mbits/s.

Generally speaking, only a portion of the deployed capacity for a given physical communication channel, or for a given channel plan, is available for transporting upstream information from one or more subscriber premises. In particular, if forward error correction (FEC) is employed (which is effectively a given in conventional communication systems), some of the available deployed capacity is used for the overhead involved in FEC; similarly, the transmission of upstream information in bursts of data, and formulation of data into IP data packets, also involves some administrative overhead that consumes some of the deployed capacity of a given channel/channel plan.

More specifically, the "overhead" or "parity bytes" that are employed in FEC understandably take up a portion of the deployed or "raw" data rate of a physical communication channel that would otherwise be used for upstream information from one or more subscriber premises. For example, in conventional Reed-Solomon FEC implementations, k represents the number of data symbols being encoded in a given block of data, n represents the total number of coded symbols in the encoded block, and t represents the symbol-error correcting capability of the code, where n−k=2t provides the number of parity symbols constituting the "overhead" (i.e., to ensure correction of 8 erroneous symbols, 16 parity symbols of "overhead" is required). Thus, a "code rate" of the FEC, i.e., the portion of the encoded data block effectively constituted by the original k symbols of upstream information being encoded, is given by k/n. Example code rates for FEC commonly employed in conventional cable communication systems are on the order of approximately 0.7 to 0.9; for example, consider an RS-FEC in which k=100, n=116, and t=8, providing for an FEC code rate of 0.862 (e.g., see Chapman, pages 122-123). Accordingly, the "raw" data rate of a physical communication channel employing FEC is "discounted" or "de-rated" by an amount corresponding to the FEC code rate (in the foregoing example, approximately an 86% de-rating factor).

There are additional aspects of "DOCSIS overhead," beyond FEC, that further limit an effective data rate of a physical communication channel. For example, DOCSIS "physical layer overhead" ("PHY overhead") relates to some number of symbols in a transmission burst received at the CMTS that are dedicated to a preamble and a guard band, thereby diminishing the number of symbols in a burst relating to the actual information payload. In exemplary implementations, 40 symbols of a 2048 symbol burst may be used for PHY overhead, thereby further reducing an effective data rate for the channel by a factor of 0.9805. In addition, DOCSIS "media access and control layer overhead" ("MAC overhead") relates to the number of bytes of information typically included in IP data packets, packet header sizes, number of headers in a given transmission burst, and other factors that further reduce an effective data rate for the channel, typically by a factor of approximately 0.91 (e.g., see Chapman, pages 122-123).

Accordingly, when one considers the cumulative effect of FEC, PHY overhead, and MAC overhead on the data rate of a physical communication channel, the deployed or "raw" data rate of the channel needs to be discounted or de-rated to provide an effective data rate for upstream information from one or more subscriber premises that is conveyed over the channel. Given the examples provided above for FEC, PHY Overhead, and MAC Overhead, a representative de-rating factor is on the order of (0.862)×(0.985)×(0.91)≈0.77, or approximately 77% of the deployed or raw data rate for the channel. In view of the foregoing, for purposes of the present disclosure, an "effective data rate" for a physical communication channel (or similarly an "effective upstream capacity" for a channel plan) takes into consideration a cumulative de-rating factor that is applied to the "raw" data rate of the channel (or the deployed capacity of the channel plan), wherein the de-rating factor may relate at least in part to FEC overhead and/or DOCSIS overhead. For purposes of the present disclosure, unless otherwise indicated in illustrative examples, a representative FEC/DOCSIS overhead de-rating factor of approximately 0.8 (80%) of the raw data rate of a channel (or the deployed capacity of a channel plan) is presumed to determine an effective data rate of the channel (or the effective upstream capacity of the channel plan).

FIG. 17 illustrates a chart showing a typical DOCSIS upstream channel plan 2000A for a conventional cable communication system (e.g., see page 6 of "Better Returns from the Return Path Implementing an Economical Migration Plan for Increasing Upstream Capacity," Brian O'Neill and Rob Howald, Motorola whitepaper, September 2008, http://www.motorola.com/staticfiles/Video-Solutions/Solutions/Industry %20Solutions/Service %20Providers/Cable %20Operators/Broadband %20Access %20Networks %20 (BAN)/Fiber %20Deep/_Documents/Static %20files/Better %20Returns %20from %20the %20Return %20PathWhitepaper92008.pdf, hereafter referred to as "Motorola," which whitepaper is hereby incorporated by reference herein in its entirety). In the chart of FIG. 17, the horizontal axis represents frequency within the upstream path bandwidth from 5 MHz to 42 MHz, and the vertical axis indicates the QAM modulation order of a given channel and the associated data rate in Mbits/s/MHz (from Table 2 above). As shown in FIG. 17, Motorola indicates that a typical upstream channel plan 2000A includes two channels 2002A and 2002B having respective carrier frequencies generally in a range around 30 MHz to 35 MHz (e.g., well above 20 MHz, below which ingress becomes a salient issue, and well below the diplex filter roll-off of the upstream path bandwidth at 42 MHz). Each of the channels 2002A and 2002B has a bandwidth of 3.2 MHz, and uses a QAM modulation order of 16 (16-QAM). In one aspect, the selection of the QAM modulation order of 16 for the channels 2002A and 2002B, as well as the appropriate channel carrier frequencies, is based at least in part on prevailing noise and/or channel response conditions typically expected in a conventional cable system that give rise to a particular MER failure threshold value according to Table 5 above (i.e., in the case of 16-QAM, an MER of at least 17 to 20 dB, and preferably 24 dB). The deployed upstream capacity for the channel plan 2000A may be estimated from FIG. 17 by considering the two channels, each having a bandwidth of 3.2 MHz and respective data rates of 3.2 Mbits/s/Hz; i.e., 2×3.2×3.2≈20.5 Mbits/s. Using a de-rating factor of approximately 80%, this deployed upstream capacity corresponds to an effective upstream capacity of approximately 16.4 Mbits/s for the channel plan 2000A.

FIG. 18 illustrates a chart showing another DOCSIS upstream channel plan 2000B proposed by Hranac and including a 64-QAM upstream channel (e.g., see "Broadband: Another Look at Upstream 64-QAM," Ron Hranac, Communications Technology, Apr. 1, 2009, http://www.cablefax.com/ct/operations/bestpractices/Broadband-Another-Look-at-Upstream-64-QAM_34894.html, hereafter referred to as "Hranac Broadband"). In particular, in the proposed channel plan 2000B, a first channel 2002C has a carrier frequency of 21.6 MHz, a bandwidth of 6.4 MHz, and uses 64-QAM, and a second channel 2002D has a carrier frequency between 30-35 MHz (e.g., approximately 32.5 MHz), a bandwidth of 3.2 MHz, and uses 16-QAM. For the proposed upstream channel plan 2000B, Hranac Broadband also suggests multiple narrower bandwidth QPSK channels (e.g., three 1.6 MHz-wide QPSK channels 2002E) placed between 35 MHz and approximately 40 MHz. From FIG. 18 and Table 2, and with the aid of Table 7 below, it can be seen that the proposed channel plan 2000B has a deployed upstream capacity of just under approximately 50 Mbits/s (corresponding to an effective upstream capacity of approximately 39 Mbits/s using an 80% de-rating factor):

TABLE 7

| Channel QAM | Channel BW (MHz) | Raw Data Rate (Mbits/s) |
|---|---|---|
| 64 | 6.4 | 30.72 |
| 16 | 3.2 | 10.24 |
| 4 (QPSK) | 1.6 | 2.56 |
| 4 (QPSK) | 1.6 | 2.56 |
| 4 (QPSK) | 1.6 | 2.56 |
| TOTAL DEPLOYED CAPACITY | | 48.64 |

In proposing the channel plan 2000B of FIG. 18, Hranac Broadband notes that the wider bandwidth 64-QAM channel should be placed below 30 MHz to avoid potential channel impairments in the form of group delay arising from diplex filters associated with one or more amplifiers of the hardline cable plant. In particular, as upstream RF signals travel from subscriber modems toward the headend, these upstream signals often pass through multiple amplifiers of the hardline cable plant, each of which amplifiers contains diplex filters to only permit passage of RF signals within the upstream path bandwidth. Hranac Broadband notes that, although the roll-off of such filters in the area of 42 MHz (as discussed above in connection with the spectrum 2100C shown in FIG. 14) is generally considered to only affect signal transmission above 35 MHz, this roll-off nonetheless may adversely affect reliable transmission of signals modulated with more dense constellations (e.g., 64-QAM), due to diplex filter-related group delay (which is a cumulative effect that is exacerbated with passage of the signal through a greater number of amplifiers/filters). Accordingly, Hranac Broadband suggests placement of the 64-QAM channel 2002C below 30 MHz, and using lower modulation order and lower bandwidth channels above 30 MHz (e.g., the channels 2002D and 2002E shown in FIG. 18).

FIG. 19 illustrates a chart showing yet another DOCSIS upstream channel plan 2000C proposed by Motorola (see Motorola, page 6) that suggests three upstream 64-QAM channels above 20 MHz, and two 16-QAM channels below 20 MHz. The channel plan 2000C proposed by Motorola, however, requires the use of the S-CDMA protocol (as opposed to TDMA or ATDMA) for at least two and possibly three of the upstream channels. In particular, in the channel plan 2000C, two channels collectively labeled as 2002F are proposed below 20 MHz, each having a bandwidth of 3.2 MHz and using 16-QAM with S-CDMA (the requirement of S-CDMA is indicated in FIG. 19 using cross-hatching for the channels 2002F). Motorola acknowledges that, in the upstream path bandwidth, frequencies below about 20 MHz, and especially below 15 MHz, tend to be cluttered with interference and impulse noise (e.g., see the ingress disturbances 3500 and broadband impulse noise 3502 shown in FIG. 12-16 as discussed above), thus making this band unsuitable for DOCSIS performance and unused for DOCSIS services. Motorola nonetheless proposes that lower modulation order QAM (e.g., 16-QAM), coupled with S-CDMA technology, could be used for channels below 20 MHz.

The proposed channel plan 2000C shown in FIG. 19 also indicates the placement of a 6.4 MHz-wide 64-QAM channel 2002G above 20 MHz. Motorola indicates that this channel may be implemented successfully using an ATDMA protocol, but also indicates, however, that this channel may require the use of S-CDMA technology for successful implementation (accordingly, the possible requirement of S-CDMA for the channel 2002G is indicated with "confetti-type" fill in FIG. 19). Motorola further suggests that the proposed channel plan 2000C also may include two 6.4 MHz-wide 64-QAM channels 2002H employing ATDMA (i.e., without requiring the use of S-CDMA). It is noteworthy that the placement of these channels 2002H as recommended by Motorola would occupy a portion of the upstream path bandwidth well above 30 MHz, in stark contrast to the teachings of Hranac Broadband (which advise against placement of 64-QAM channels above 30 MHz, at least in part due to undesirable diplex filter-related group delay effects). In any event, from FIG. 19 and Table 2, and with the aid of Table 8 below, it can be seen that the channel plan 2000C, which would require the use of S-CDMA for at least two if not three of the specified channels, has a deployed upstream capacity of just over approximately 110 Mbits/s (corresponding to an effective upstream capacity of approximately 90 Mbits/s using an 80% de-rating factor):

TABLE 8

| Channel QAM | Channel BW (MHz) | Raw Data Rate (Mbits/s) |
|---|---|---|
| 16 (S-CDMA) | 3.2 | 10.24 |
| 16 (S-CDMA) | 3.2 | 10.24 |
| 64 (S-CDMA?) | 6.4 | 30.72 |
| 64 | 6.4 | 30.72 |
| 64 | 6.4 | 30.72 |
| TOTAL DEPLOYED CAPACITY | | 112.64 |

FIG. 20 illustrates a chart showing yet another DOCSIS upstream channel plan 2000D proposed by Chapman (see Chapman, page 89, FIG. 37) that suggests a total of seven channels, i.e., four ATDMA channels above 22.8 MHz and three S-CDMA channels below 22.8 MHz; accordingly, like the channel plan 2000C shown in FIG. 19 proposed by Motorola, Chapman's proposed channel plan also requires S-CDMA channels below 20 MHz. Specifically, below 22.8 MHz, Chapman's channel plan 2000D calls for a 32-QAM S-CDMA channel 2002I having a bandwidth of 3.2 MHz, another 32-QAM S-CDMA channel 2002J having a bandwidth of 6.4 MHz, and a 64-QAM S-CDMA channel 2002K having a bandwidth of 6.4 MHz. Above 22.8 MHz, Chapman's proposed channel plan 2000D calls for two 64-QAM ATDMA channels 2002L each having a bandwidth of 6.4 MHz, a 64-QAM ATDMA channel 2002M having a bandwidth of 3.2 MHz, and a 16-QAM ATDMA channel 2002N having a bandwidth of 3.2 MHz (notably, Chapman's proposed channel plan 2000D adopts in part the recommendation of Hranac Broadband against placement of 64-QAM channels above 30 MHz, by using the smaller bandwidth 16-QAM channel 2002N closest to the diplex filter roll-off at the highest end of the spectrum).

From FIG. 20 and Table 2, and with the aid of Table 9 below, it can be seen that the channel plan 2000D, which would require the use of S-CDMA for all channels below 22.8 MHz, has a deployed upstream capacity of just over approximately 155 Mbits/s (corresponding to an effective upstream capacity of approximately 125 Mbits/s using an 80% de-rating factor):

TABLE 9

| Channel QAM | Channel BW (MHz) | Raw Data Rate (Mbits/s) |
|---|---|---|
| 32 (S-CDMA) | 3.2 | 12.8 |
| 32 (S-CDMA) | 6.4 | 25.6 |
| 64 (S-CDMA) | 6.4 | 30.72 |
| 64 | 6.4 | 30.72 |
| 64 | 6.4 | 30.72 |
| 64 | 3.2 | 15.36 |
| 16 | 3.2 | 10.24 |
| TOTAL DEPLOYED CAPACITY | | 156.16 |

Although the proposed channel plan 2000C of FIG. 19 and proposed channel plan 2000D of FIG. 20, both employing multiple S-CDMA channels, promise deployed upstream capacities on the order of 110 Mbits/sec and 155 Mbits/sec, respectively, industry commentators have noted that such plans have not been effectively adopted by operators of conventional cable communication systems to achieve this degree of upstream capacity. In particular, while S-CDMA has been available since the advent of DOCSIS version 2.0 in 2002, there has not been significant adoption of S-CDMA technology by MSOs, in part due to some required improvements in software and algorithms employed by demodulation tuners of the CMTS to decode S-CDMA, and appropriate selection of spreading codes given the variety of possible noise profiles that may be encountered in the upstream path bandwidth (e.g., see "Moto: S-CDMA Starting to Spread," Jeff Baumgartner, Light Reading Cable, Feb. 16, 2010, http://www.lightreading.com/document.asp?doc_id=187997& site=lr_cable; also see Chapman, page 89).

Industry commentators also have noted that, even with S-CDMA and the additional upstream channel bonding capabilities available with the advent of DOCSIS version 3.0, at present the maximum effective upstream capacity arising from current implementations by some MSOs of upstream channel plans under DOCSIS version 3.0 is on the order just under 100 Mbits/sec at best (e.g., see "Cisco Hints at What Comes After Docsis 3.0," Jeff Baumgartner, Light Reading Cable, May 14, 2012, http://www.lightreading.com/document.asp?doc_id=220896&site=lr_cable&). This arises from the channel plan 2000E shown in FIG. 21, which includes four 64-QAM ATDMA channels 2002P each having a bandwidth of 6.4 MHz and having carrier frequencies of approximately 19.6 MHz, 26.0 MHz, 32.4 MHz, and 38.8 MHz, respectively. In spite of the admonishments of Hranac Broadband (i.e., placement of 64-QAM channels only below 30 MHz, and using lower modulation order and lower bandwidth channels above 30 MHz to avoid undesirable diplex filter-related group delay effects), the channel plan 2000E shown in FIG. 21 represents the present maximum-capacity state of the art for actual implementations of upstream channel plans by some MSOs. From FIG. 21 and Table 2, and with the aid of Table 10 below, it can be seen that the channel plan 2000E has a deployed upstream capacity of just over approximately 120 Mbits/s (corresponding to an effective upstream capacity of approximately 100 Mbits/s using an 80% de-rating factor; see Chapman, page 8 and page 9, Table 1):

TABLE 10

| Channel QAM | Channel BW (MHz) | Raw Data Rate (Mbits/s) |
|---|---|---|
| 64 | 6.4 | 30.72 |
| 64 | 6.4 | 30.72 |
| 64 | 6.4 | 30.72 |
| 64 | 6.4 | 30.72 |
| TOTAL DEPLOYED CAPACITY | | 122.88 |

Some industry commentators have indicated that an effective upstream capacity of approximately 100 Mbits/s provided by the channel plan 2000E of FIG. 21 is not so much a present reality as it is a near term target (e.g., see Chapman, pages 23 (Table 3), 63, and 138 regarding present-day maximum upstream capacity), at least in part due to ingress and other channel impairment issues discussed above (which arguably would impact the full functionality of at least the lowest frequency "leftmost" channel and the highest frequency "rightmost" channel of the set of four channels 2002P).

Recent trends toward improving upstream capacity in a cable communication system relate to using more effective DOCSIS Physical (PHY) layer technologies (e.g., S-CDMA, see Chapman, pages 88 through 95; Orthogonal Frequency Division Multiplexing or OFDM, see Chapman, pages 96 through 110), advanced error correction techniques (e.g., Low Density Parity Check or LDPC codes, see Chapman, pages 119 through 121), decreasing node and/or service group size (e.g., decreasing the number of subscriber premises per node and/or service group via node splitting or segmentation, see Chapman, pages 57 through 62), and expanding the range of frequencies allotted to the upstream path bandwidth (e.g., a "mid split" plan to expand the upstream path bandwidth to 85 MHz, a "high split" plan to expand the upstream path bandwidth to 200 MHz, and a "top-split" plan which would place additional upstream path bandwidth above 1 GHz) (e.g., see Chapman, pages 10 through 21; also see Al-Banna, throughout). One proposed channel plan relating to a "mid split" upstream path bandwidth expansion suggests the use of seven 256-QAM ATDMA 6.4 MHz bandwidth channels above 42 MHz (and no 256-QAM channels in the "original" upstream path bandwidth from 5 MHz to 42 MHz) (e.g., see Chapman, page 74, Table 17); this plan nonetheless requires S-CDMA channels below 20 MHz (e.g., as seen in the channel plans 2000C and 2000D of FIGS. 19 and 20, respectively).

Regarding proposals for expanding the range of frequencies allotted to the upstream path bandwidth, some commentators have noted various challenges with such an expansion; for example, from a system components perspective, diplexers would need to be changed throughout the hardline cable plant (such that the division between the upstream path bandwidth and the downstream path bandwidth would be moved to a higher portion of the spectrum), and active components as well as passive component may need to be retrofitted to accommodate higher frequency operation (see "HFC Network Capacity Expansion Options," J. D. Salinger, The NCTA 2012 Spring Technical Forum Proceedings, May 21, 2012, hereafter "Salinger," which publication is hereby incorporated herein by reference in its entirety). From an operational perspective, existing downstream analog channels would need to be removed, which may not be possible for many MSOs that are either required to maintain support for analog TVs directly, and/or are unable to remove analog channels for contractual reasons (Salinger, page 7). Even if removing analog channels is possible, this option appears to require the installation of filters in most or perhaps all subscriber premises equipment to both protect the new portion of the spectrum from emissions by existing subscriber equipment, and to protect existing equipment from transmissions by new subscriber premises equipment that would use the new portion of spectrum.

SUMMARY

As discussed above, it is widely accepted in the cable communication industry that only a portion of the upstream path bandwidth generally from about 20 MHz to 42 MHz may be used in some circumstances for transmission of upstream information from subscriber premises to the headend of the cable communication system via conventional access protocols such as time division multiple access (TDMA) or advanced time division multiple access (ATDMA). In tandem, it is also widely accepted that the lower portion of the upstream path bandwidth (e.g., generally from about 5 MHz to about 20 MHz, and particularly below 18 MHz, and more particularly below 16.4 MHz, and more particularly below 10 MHz) is effectively unusable for conveying upstream information via TDMA or ATDMA (e.g., see Chapman, pages 11, 69, 77, 88-89 and 128 (FIG. 53), and 178 regarding usable/unusable spectrum).

It is also commonly presumed in the cable communication industry that egress serves as a proxy for ingress; i.e., where there is an opening/fault in the cable communication system that allows for signal leakage from the system to the outside (egress), such an opening/fault likewise allows for unwanted outside signals to enter the cable communication system (ingress). Thus, prior conventional techniques for assessing ingress in a cable communication system have adopted testing equipment and protocols for detecting egress, and have presumed that locations in the system at which egress is detected correspond to faults that similarly allow for ingress into the system (and that repair of such faults addresses ingress problems to the extent possible).

It is also commonly presumed in the cable communication industry that a significant majority of cable communication system faults allowing for egress and ingress occur almost entirely in connection with system elements associated with one or more subscriber premises. More specifically, subscriber service drops, and particularly subscriber premises equipment (e.g., internal wiring, connectors, splitters, subscriber modem, etc.) are conventionally deemed to be the greatest source (95% or greater) of egress and ingress problems in conventional cable communication systems. Subscriber-related egress and ingress problems generally are deemed to be especially difficult and in some cases impossible to adequately address, in that subscriber premises typically are the least accessible, least controllable, and least regularly-maintained elements of the cable communication system (i.e., they are generally private residences or businesses that may be difficult or impossible to access); furthermore, some significant subscriber-related problems may be related to former subscribers, who no longer receive services from the cable communication system operator, but may nonetheless still be physically connected to the system via a subscriber service drop and various system elements remaining in the premises, any of which may have one or more faults. Moreover, with respect to regular system maintenance, certain technicians typically responsible for routine maintenance and repair of conventional cable communication systems arguably are the farthest removed from potentially addressing such subscriber-related signal leakage problems.

More specifically, cable communication system operators (e.g., "MSOs") typically maintain a staff of "maintenance technicians" (sometimes also referred to as "line technicians"), and a separate staff of "fulfillment technicians" (also sometimes referred to as "service technicians" or a "drop crew"). With reference again to FIGS. 1 and 2, maintenance technicians generally are responsible for maintaining and repairing constituent elements of the RF hardline coaxial cable plant 180 of respective nodes 164A, 164B, 164C, etc., of the cable communication system 160. One typical task performed by maintenance technicians includes a procedure referred to as a "sweep," i.e., periodic testing of a frequency response of the hardline cable plant 180, which may entail adjustment of amplifiers 167 and laser power levels in RF/optical bridge converters 167 (in a node) and 175 (in the headend 162), or replacement of same and/or passive components in the node. Other examples of tasks that may be performed by maintenance technicians from time to time include egress testing (e.g., using commercially available egress testing equipment) and occasionally ingress detection if a particular problem is suspected with, or reported by, a given subscriber premises; as noted above, typical ingress detection involves the time consuming "divide and conquer" trial and error process of sequentially disconnecting respective sections of hardline coaxial cable 163B or "feeders" and concurrently monitoring resulting variations in the noise profile of the upstream path bandwidth. Maintenance technicians typically do not attend to subscriber-related equipment or problems; generally speaking, the responsibility of maintenance technicians ends at the female connectors of the taps 188 to which subscriber service drops 163C are coupled (e.g., see FIG. 11, female connector 197B). As such, subscriber service drops and subscriber premises equipment typically are the least regularly-maintained portion of a conventional cable communication system (i.e., there is typically no handling of the subscriber service drops or access to subscriber premises equipment by the cable communication system owner/operator's maintenance technicians).

Unlike maintenance technicians, fulfillment technicians ("service technicians" or a "drop crew") instead are generally responsible only for attending to new subscriber services or subscriber service upgrades/downgrades (e.g., installation of a new subscriber service drop from a tap in the hardline cable plant, installation or removal of various equipment and components inside a subscriber premises corresponding to new service, upgraded service, or downgraded service, etc.). As such, fulfillment technicians are not involved with issues relating to the hardline cable plant or the headend, and very rarely, if ever, perform regular diagnostic, testing, maintenance or repair-related functions in connection with the overall cable communication system (fulfillment technicians typically are not qualified to, and in some instances expressly forbidden from, working on the hardline coaxial cable plant or the headend).

For at least the foregoing reasons, the cable communication industry has essentially resigned itself to the notions that: 1) most ingress is "subscriber-related" due to faults in subscriber service drops and/or subscriber premises equipment, as well as ingress sources that are often random, intermittent, and/or impulse (broadband) in nature, originate from or local to subscriber premises, and generally challenging to pinpoint; 2) as such, ingress is a virtually uncorrectable problem and can be mitigated only to a limited extent (e.g., generally in the higher frequency portion of the upstream path bandwidth above 20 MHz, using egress testing as a proxy for detection of faults that may allow for ingress); 3) as such, the portion of the upstream path bandwidth of a cable communication system between 5 MHz and 20 MHz (and particularly below 18 MHz, and more particularly below 16.4 MHz, and more particularly below 10 MHz) is effectively unusable for conveying upstream information from subscriber premises to the headend via conventional TDMA and ATDMA protocols; and 4) to expand the upstream information carrying capacity of cable communication systems, it will be necessary to: rely on advanced modulation techniques and/or signaling protocols and error correction techniques that may be able to convey greater amounts of information in the existing upstream path bandwidth; reduce node size and/or service group size; and/or establish new regions of the electromagnetic spectrum in which upstream information may be conveyed (e.g., a "mid split" plan to expand the upstream path bandwidth to 85 MHz, a "high split" plan to expand the upstream path bandwidth to 200 MHz, and a "top-split" plan which would place additional upstream path bandwidth above 1 GHz).

In connection with the recommendations for expanding upstream information carrying capacity noted in 4) immediately above, it is particularly noteworthy that recent considerations in the industry have largely ignored the infrastructure of the hardline cable plant itself as a possible source of improvement towards increased upstream capacity; instead, recent considerations have effectively deemed any conditioning of the outside plant unnecessary, and past attempts at ingress mitigation largely ineffective (see Chapman, pages 118-119 and FIG. 51).

In view of the conventional presumptions outlined above, the Inventors have recognized and appreciated: 1) various shortcomings in the manner in which the cable communication industry conventionally has approached ingress mitigation and has characterized limitations on the upstream path bandwidth of a cable communication system due to ingress; and 2) various shortcomings in corresponding conventional approaches and proposals for future designs and implementations of cable communication systems.

For example, the Inventors have posited and verified that, contrary to conventional presumptions, egress is not a proxy for ingress. Accordingly, detecting and repairing system faults that allow for egress from a cable communication system does not necessarily identify or adequately address faults that may allow for ingress.

First, as noted above, egress is tested at aviation frequencies around 120 MHz—i.e., at frequencies well above the presently-used upstream path bandwidth from approximately 5 MHz to approximately 42 MHz (and accordingly well beyond the frequency range in which ingress problematic to the upstream path bandwidth typically is encountered). Second, the Inventors have appreciated that the presumption that egress is a proxy for ingress fails to recognize that different types of faults in the cable communication system may form a wide variety of resonance structures (and in some instances time-varying resonance structures) that may have a corresponding wide variety of frequency dependencies (and in some instances time-varying frequency dependencies). Stated differently, a particular fault forming a resonance structure that may readily allow signals having frequencies around 120 MHz to escape from the cable communication system as egress at a given point in time may not necessarily allow for signals having significantly lower frequencies to enter into the cable communication system as ingress (at the same time or some later time). This situation may be particularly exacerbated when comparing potential egress at around 120 MHz to potential ingress below 20 MHz (i.e., at frequencies typically corresponding to terrestrial signals including short wave radio signals).

The foregoing premise may be more readily appreciated by recognizing a given fault in the cable communication system as an impairment (either static or dynamic) to a current path provided by conducting entities of the physical communication media carrying RF signals in the cable communication system. Such an impairment may arise, for example, from a loose, water-logged, oxidized or otherwise corroded connector and/or a damaged coaxial cable, and may be characterized as a resistor-capacitor (RC) or resistor-inductor-capacitor (RLC) circuit forming a resonance structure whose frequency dependence may vary significantly (e.g., based on representative values of resistance, capacitance and inductance created by the current path impairment). Furthermore, the nature of a given impairment to the current path may in some instances change as a function of time; for example, consider a loose connector, coupling a section of coaxial cable hanging on a utility pole to another system component, in the presence of significant wind and/or significant temperature changes over some time period (the wind and/or temperature changes may dramatically change the nature of the impairment and corresponding frequency response). Thus, a virtually unlimited variety of such resonance structures may be created by respective faults in a cable communication system, some of which may have a frequency dependence that allows for egress, and others of which may have a significantly different frequency dependence that allows for ingress in frequency ranges particularly germane to the upstream path bandwidth. Accordingly, relying on egress as a proxy for ingress ignores a wide variety (and significant number) of frequency-dependent and/or frequency-specific faults that may allow for ingress in the upstream path bandwidth.

Furthermore, to the Inventors' knowledge, there has been no systematic approach to date for verifying the presumption that a substantial portion of ingress in cable communication systems (i.e., approximately 95% or greater) is "subscriber-related" (i.e., arising from subscriber-related signal leakage problems and/or ingress sources proximate to or within subscriber premises) and that, as a result, ingress is a virtually uncorrectable problem that can be mitigated only to a limited extent. More specifically, the Inventors have recognized a historical bias in the industry that placed significant attention on random, intermittent and/or bursty (impulse/broadband) ingress sources proximate to or within subscriber premises, and faults in subscriber service drops or subscriber premises equipment that would readily admit ingress from such sources.

In contrast, the Inventors have instead realized that greater attention should be given to more persistent narrowband ingress sources ("ingress carriers"), such as terrestrial signals including short wave radio signals, that are ubiquitously present in free space (i.e. not necessarily subscriber-dependent sources), remain present in free space over generally longer periods of time (i.e., not necessarily bursty, random or intermittent), and can enter into the cable communication system virtually anywhere within the RF footprint of the system (subscriber premises, subscriber service drops, and/or the hardline cable plant).

With the foregoing in mind, the Inventors also have posited and verified, contrary to conventional presumptions, that the degree to which the hardline cable plant itself may be responsible for ingress (presumed to be 5% or less) has been significantly underestimated by the cable communication industry, particularly with respect to narrowband interference signals as potential ingress sources. The conventional presumption that the hardline cable plant is responsible for only approximately 5% of ingress corresponds to an approximately 0.2 dB of presumed potential impact on the noise profile of the upstream path bandwidth; understandably, this is hardly an incentive for the industry to target the hardline cable plant, and as such there has been virtually no substantial focus in the industry on elements of the hardline coaxial cable plant (as opposed to subscriber service drops and/or subscriber premises equipment) that may give rise to faults allowing for ingress. In particular, in spite of the various tasks typically performed by maintenance or "line" technicians primarily responsible for the headend and hardline coaxial cable plant of a cable communication system, to date there has been no effective diagnostic testing in practice specifically of the hardline cable plant to particularly identify problems in the plant itself that may be associated with ingress.

Moreover, as noted above, the limited conventional ingress detection procedures historically performed by maintenance technicians (e.g., a "divide and conquer" or "Ariadne's thread" approach involving sequentially disconnecting respective sections of hardline coaxial cable in an attempt to identify a problem subscriber premises) are marginally effective at identifying some particular points of potential ingress (presumed to be subscriber-related), but essentially ignore the possibility that persistent and ubiquitous terrestrial signals (as well as other signals within the geographic area of the system and not necessarily localized to a particular subscriber premises) could conceivably enter into the system anywhere in the RF footprint.

With the foregoing in mind, the Inventors have approached the challenge of effective ingress mitigation in a cable communication system by recognizing and underscoring the construct of a "neighborhood node," i.e., the collection of the hardline coaxial cable plant, multiple subscriber service drops, and corresponding multiple subscriber premises that are electrically connected to a common fiber optic cable and ultimately coupled to a particular demodulation tuner port of a cable modem termination system (CMTS). The construct and importance of a neighborhood node in connection with ingress mitigation methods, apparatus and systems according to various embodiments of the present invention is related at least in part to a phenomenon referred to as the "noise funneling affect," and the Inventors appreciation of the role of the noise funneling effect particularly with respect to ingress.

FIG. 22 shows a portion of a neighborhood node 1640A so as to conceptually illustrate the "noise-funneling effect" associated with ingress and other sources of noise (e.g., various system components) in the node. In particular, FIG. 22 shows various elements of at least a portion of the hardline coaxial cable plant 180 in the neighborhood node 1640A (e.g., hardline coaxial cable 163B, directional couplers 189, amplifiers 187, taps 188) distributed amongst multiple feeder branches of the hardline coaxial cable plant that ultimately converge to an express feeder coupled to the optical/RF bridge converter 167. Ingress entering into various faults in the neighborhood node 1640A (conventionally presumed to be largely subscriber-related) is summed together as the ingress traverses different feeder branches of the hardline cable plant toward the headend 162; these different feeder branches are progressively joined together to reach the express feeder and ultimately the neighborhood node's optical/RF bridge converter. The noise-summing process not only applies to ingress entering via one or more faults in the neighborhood node, but also to sources of Additive White Gaussian Noise (AWGN) generated by various components of the node (e.g., subscriber premises equipment, amplifiers of the hardline coaxial cable plant) which collectively contribute to a "noise floor" of the neighborhood node pursuant to the noise-funneling effect.

The noise funneling effect illustrated in FIG. 22 dictates that: 1) one or a small number of faults can cause the introduction of significant ingress in the neighborhood node 1640A as observed at the headend 162 (i.e., one "bad subscriber" may adversely affect the transmission of upstream information from several/all subscriber premises on the neighborhood node); and 2) a noise power level due to ingress in the node, as well as AWGN contributing to the noise floor of the node, generally increases as the number of subscriber premises in the neighborhood node increases. Stated differently, larger nodes (e.g., in terms of one or more households passed, number of subscribers, miles traversed, length of feeders, number of amplifiers, number of taps, etc.; see Table 1) generally are subject to higher levels of ingress and a higher noise floor. In terms of a node's cascade value N (NODE+N), nodes with higher values of N generally have higher levels of ingress and higher noise floors than nodes with lower values of N (the node depicted in FIG. 22 is illustrated as a relatively smaller node with a cascade value of 2, i.e. NODE+2; however, as note above, typical cascade values of many conventional cable communication systems are NODE+5 or NODE+6) (see section 3.1, pages 3-4 of Al-Banna).

While the contribution of the hardline cable plant to noise in a given neighborhood node is conventionally presumed to arise primarily from various active components such as amplifiers (that produce Additive White Gaussian Noise), ingress on the other hand essentially has been attributed exclusively to faults associated with subscriber service drops and subscriber premises. However, in contrast to this presumption, the Inventors have recognized and appreciated that a significant source of ingress arises from faults in the hardline cable plant itself Ingress resulting from such faults in the hardline cable plant itself travels along the hardline cable plant in a given neighborhood node toward the headend and is additively funneled to a corresponding demodulation tuner port to which the neighborhood node is coupled. More specifically, the accumulation of ingress from multiple faults particularly in the hardline coaxial cable plant (as well as subscriber-related faults) due to the "noise-funneling" effect results in an appreciable presence of broadband noise and/or narrowband interference signals ("ingress carriers") in the lower portion of a spectrum of the upstream path bandwidth in the neighborhood node, as observed at the headend (e.g., via the analyzer 110 coupled to the RF splitter 173 shown in FIG. 4) or on the hardline cable plant (e.g., via the analyzer 110 coupled to the hardline cable plant 180 as shown in FIG. 2).

Thus, the Inventors have recognized and appreciated that the cable communication system as a whole, in terms of the conveyance of upstream information from various subscriber premises in the system and noise that could possibly interrupt or impede such conveyance of upstream information, should be considered as a number of essentially independent neighborhood nodes, each of which is intended to function as its own "closed" sub-system. More specifically, each neighborhood node should be viewed as a closed communication sub-system, essentially isolated from other neighborhood nodes of the overall system, in which the same frequency spectrum assigned to the upstream path bandwidth and downstream path bandwidth, respectively, may be re-used from neighborhood node to neighborhood node. Accordingly, when one or more such neighborhood nodes are "breached" (e.g., particularly via faults in the hardline coaxial cable plant of the neighborhood node), each neighborhood node needs to be treated as its own sub-system in which ingress detection and remediation is warranted. To this end, the Inventors have appreciated that all of the infrastructure within a given neighborhood node (i.e., the hardline coaxial cable plant, in addition to the subscriber service drops and the subscriber premises) needs to be considered completely and holistically for any and all faults throughout the neighborhood node that could contribute in some manner to allowing for ingress.

In view of the foregoing, various inventive embodiments disclosed herein relate to methods and apparatus for ingress mitigation in cable communication systems, and cable communication systems and methods having increased upstream capacity for supporting voice and/or data services based at least in part on such ingress mitigation. Various aspects of such methods, apparatus and systems, in a manner contrary to the conventional presumptions outlined above, involve some degree of focus on detecting and remediating faults particularly in the hardline coaxial cable plant of one or more neighborhood nodes of a cable communication system so as to significantly reduce ingress, and particularly narrowband interference in the portion of the upstream path bandwidth between approximately 5 MHz and approximately 20 MHz (in many instances arising from relatively persistent and non-localized terrestrial signals such as short wave radio signals).

FIG. 23 is an illustration showing the concept of terrestrial signals 3700 constituting a source of ingress and entering into one or more faults 1800 in the hardline coaxial cable plant 180 of a cable communication system. As shown in FIG. 23, the propagation of some terrestrial signals depends in part on atmospheric conditions and the solar cycle (increased solar activity causes ionization in the upper layers of the atmosphere 4000, i.e., the "ionosphere", which in turn affects propagation of short wave signals). In any event, terrestrial signals 3700 such as short wave radio signals are essentially ubiquitous, in that their origin is not necessarily proximate to the cable communication system. Also, rather than manifest themselves as intermittent and/or random signals in the upstream path bandwidth, these terrestrial signals 3700 may constitute ingress sources over prolonged periods of time whose presence in the upstream path bandwidth is relatively persistent. As noted above, the Inventors have recognized and appreciated that the terrestrial signals 3700 can enter into the cable communication system virtually anywhere within the RF footprint of the system, particularly through one or more faults 1800 in the hardline coaxial cable plant 180 of one or more neighborhood nodes, and indeed commonly constitute a significant manifestation of ingress in the portion of the upstream path bandwidth from approximately 5 MHz to approximately 20 MHz (particularly below 18 MHz, more particularly below 16.4 MHz, and more particularly below 10 MHz).

As discussed in greater detail below, pursuant to the Inventors' emphasis on the construct of neighborhood nodes, approaching the ingress mitigation challenge from the perspective of the hardline cable plant traversing a neighborhood node leads to significant, surprising, and unexpected results in terms of noise reduction in the upstream path bandwidth, particularly below 20 MHz, via effective remediation of faults allowing for ingress (and particularly ingress due to relatively persistent and non-localized terrestrial signals). In exemplary implementations according to various inventive embodiments disclosed herein, significant ingress mitigation in the portion of the upstream path bandwidth of a given neighborhood node below approximately 20 MHz, particularly between 5 MHz and approximately 18 MHz, more particularly between 5 MHz and approximately 16.4 MHz, and more particularly between 5 MHz and 10 MHz, has recovered bandwidth widely recognized as effectively unusable to instead be more productively and reliably employed to facilitate increased upstream capacity for supporting voice and/or data services.

In some exemplary embodiments of inventive ingress mitigation methods according to the present invention, ingress mitigation may be approached in two "phases" of activity. In a first phase ("phase 1"), various information is collected from the field (e.g., proximate to the hardline cable plant infrastructure and subscriber premises) to facilitate identification of potential points of ingress in a given neighborhood node, with particular focus on one or more possible faults in the hardline coaxial cable plant that may allow for ingress. As part of phase 1, information collected for this purpose may in some implementations be visually rendered as a "neighborhood node ingress map" to provide an intuitive illustration of ingress in the neighborhood node. In a second phase ("phase 2"), the information collected during phase 1 (e.g., a neighborhood node ingress map) is used to facilitate more particularly identifying specific faults in the field, remediating such faults so as to significantly reduce ingress into the neighborhood node, and verifying the efficacy of fault remediation efforts toward a reduction in ingress. In various implementations discussed in detail below, these respective phases of activity may be conducted by various personnel assigned to multiple tasks involved in both phases of activity, or different personnel assigned to one or more tasks in respective phases of activity at different times; in yet other implementations, various elements of phase 1 and phase 2 activity may be combined or merged into a unified process performed by one or more personnel. Thus, a wide variety of specific implementation options are contemplated by the inventive concepts disclosed herein relating to ingress mitigation.

In some exemplary embodiments of inventive ingress mitigation methods according to the present invention, multiple different nodes of the cable communication system are treated separately and as their own sub-system, and the complete infrastructure within a given neighborhood node (i.e., the hardline coaxial cable plant, in addition to the subscriber service drops and the subscriber premises) is considered holistically for possible faults throughout the node that may contribute in some manner to allowing for ingress. To facilitate illustration of such a holistic approach, FIG. 24 shows an example of a "cable facilities map" 310 for a neighborhood node of a cable communication system (the node shown in FIG. 24 is labeled as "BT-11"), and FIG. 25 illustrates a zoomed-in portion of the cable facilities map shown in FIG. 24 (corresponding to the boxed-in area 310A in the center portion of the map shown in FIG. 24). As used herein, the term "cable facilities map" (also sometimes referred to as a cable "plant map") refers to a visual representation of cable communication system infrastructure that provides a geographical framework for the respective locations of cable communication system components. In various examples of cable facilities maps, subscriber service drops and subscriber premises may or may not be indicated; in particular, the illustrations shown in FIGS. 24 and 25 only include infrastructure relating specifically to the hardline coaxial cable plant, and do not show any subscriber service drops or subscriber premises.

As can be observed from FIGS. 24 and 25, cable communication system infrastructure within a given neighborhood node, and particularly elements of the hardline coaxial cable plant deployed in a given neighborhood node, often generally follow existing roadways in the geographic area covered by the neighborhood node; in particular, the hardline coaxial cable plant may be deployed substantially or at least partially above ground on utility poles flanking and proximate to roadways (e.g., that provide access to subscriber premises), and/or in part underground in trenches generally following a path proximate to roadways. Within a given neighborhood node, these roadways, and portions of the hardline coaxial cable plant deployed proximate to such roadways, may sometimes pass through regions of the neighborhood node having a relatively lower density of premises (at least some of which may be subscriber premises), and at other points may pass through regions of the neighborhood node with a relatively higher density of premises (at least some of which may be subscriber premises). In either case, as the hardline coaxial cable plant as well as the subscriber premises and associated subscriber service drops may include one or more faults that may contribute in some manner to allowing for ingress, a "neighborhood node drive path" for a given neighborhood node is considered that affords substantially full coverage of the neighborhood node.

With the foregoing in mind, in one embodiment of an ingress mitigation method according to the present invention, during a first phase of activity ("phase 1") a mobile broadcast apparatus (e.g., which may be situated in a motorized or non-motorized vehicle, or carried/transported by a technician on foot) equipped with a transmitter is driven or otherwise directed along a neighborhood node drive path proximate to the RF hardline coaxial cable plant of a neighborhood node, so as to effectively traverse and ensure substantially full coverage of the neighborhood node. As the mobile broadcast apparatus is driven (or otherwise directed) along the neighborhood node drive path, one or more test signals having one or more frequencies within the upstream path bandwidth is/are broadcast from the transmitter at a plurality of locations distributed along the drive path. Also as the mobile broadcast apparatus is driven (or otherwise directed) along the drive path, geographic information corresponding to respective positions of the mobile broadcast apparatus along the drive path is electronically recorded (e.g., via a navigational device such as a GPS apparatus, or a "smart" phone configured with navigational functionality) so as to generate a first record of the geographic information (e.g., as a function of time). At the same time, via an analyzer (e.g., a spectrum analyzer or a tuned receiver) at the headend of the cable communication system (or otherwise coupled to the hardline coaxial cable plant of the neighborhood node), a plurality of signal amplitudes at the test signal frequency/frequencies are recorded so as to generate a second record; the plurality of signal amplitudes represent a strength of one or more received upstream test signals as a function of time, based on the test signal(s) broadcast from the mobile broadcast apparatus as the mobile broadcast apparatus traverses the drive path and test signal ingress of the test signal(s) into one or more faults in the hardline coaxial cable plant. In exemplary implementations, the generation of the first record of geographic information is accomplished independently of the broadcasting of the test signal(s) and the generation of the second record of the plurality of signal amplitudes; i.e., the generation of the first record of geographic information corresponding to respective positions of the mobile broadcast apparatus along the drive path does not rely on the integrity of the transmitted test signal(s), nor does it rely on reliable reception of the test signal(s) at the headend of the cable communication system.

In one aspect of this embodiment, based on the first record of geographic information relating to the mobile broadcast apparatus positions and the second record of signal amplitudes representing the strength of received upstream test signals as a function of time, a "neighborhood node ingress map" may be generated. In one exemplary implementation, such a neighborhood node ingress map may include a first graphical representation of the neighborhood node drive path, and a second graphical representation, overlaid on the first graphical representation, of the plurality of signal amplitudes so as to illustrate the test signal ingress of the test signal(s) into the hardline coaxial cable plant of the neighborhood node. In some implementations discussed in greater detail below, the second graphical representation of the plurality of signal amplitudes may be in the form of a "heat map" (e.g., in which different signal amplitudes are represented by different colors) to provide an intuitive visualization of the test signal ingress over the entire RF footprint of (and the overall geographic area covered by) the neighborhood node.

More specifically, in another aspect, by traversing an entirety of the neighborhood node drive path, broadcasting the test signal(s) at a plurality of locations distributed along the entirety of the drive path, recording the geographic information corresponding to the respective positions of the mobile broadcast apparatus along the entirety of the neighborhood node drive path so as to generate the first record of the geographic information, and recording the plurality of signal amplitudes at the test signal frequency/frequencies throughout traversing the entirety of the drive path so as to generate the second record, an effectively complete picture of possible faults in the hardline coaxial cable plant and corresponding test signal ingress may be visually conveyed by the neighborhood node ingress map. To this end, in exemplary implementations, frequent, regular and/or periodic measurements are taken (e.g., every second) of mobile broadcast apparatus position along the drive path; similarly, amplitude measurements corresponding to one or more received upstream test signals are frequently, regularly and/or periodically recorded by the analyzer (e.g., a spectrum analyzer operating in a "free run" mode, or a tuned receiver having a relatively high sampling rate). In one significant aspect, such amplitude measurements are recorded whether or not there is an appreciable presence of one or more received upstream test signals at a given time, so as to obtain a comprehensive mobile broadcast apparatus position/test signal ingress profile for the neighborhood node. Furthermore, since the test signal(s) is/are broadcast at known times (e.g., either continuously over a given time period, or periodically at known times as the mobile broadcast apparatus traverses the drive path), the identification of potential ingress points does not depend on potentially intermittent, random and unpredictable signals generated by an actual ingress source. Thus, the approach adopted for phase 1 activity significantly reduces the time and effort needed to identify potential points of ingress in a cable communication system.

In yet another aspect, based at least in part on the presumption that in some instances a drive path for a given neighborhood node may involve one or more curvilinear portions (i.e., such that the drive path viewed as a whole may be referred to as a "curvilinear neighborhood node drive path"), the first record of geographic information and the second record of signal amplitudes representative of test signal ingress into the hardline coaxial cable plant (e.g., proximate to the drive path) may be processed so as to render an augmented data set representative of test signal ingress across a two-dimensional geographic footprint of the neighborhood node. For example, in one implementation, the plurality of signal amplitudes in the second record, representing the strength of the received upstream test signal(s) as a function of time and along the drive path, may be interpolated so as to provide estimated signal amplitudes for respective geographic positions within the neighborhood node beyond the drive path. In particular, the first record of geographic information representing mobile broadcast apparatus positions along the drive path may be expanded to include multiple additional geographic points distributed with some resolution across a substantial portion of the two-dimensional geographic footprint of the neighborhood node (e.g., in some cases at substantial distances from the drive path), and for each such additional geographic point a corresponding estimated signal amplitude may be generated based on interpolation of signal amplitudes contained in the second record.

Accordingly, in some embodiments a neighborhood node ingress map may be generated based at least in part on such expanded/interpolated data. Such a neighborhood node ingress map provides an enhanced intuitive visual aid for identifying potential points of ingress in the neighborhood node based on respective and cumulative contributions to ingress from multiple possible faults in the hardline coaxial cable plant (as well as subscriber-related faults in subscriber service drops and/or subscriber premises equipment). As discussed in greater detail below, other types of information processing and/or visual representations of "raw" or processed information relating to mobile broadcast apparatus position and signal amplitudes of one or more received upstream test signals, and/or selection of one or more test signal frequencies for the one or more test signals broadcast from the mobile broadcast apparatus, may further facilitate: 1) determination of specific types and/or locations of faults in the hardline coaxial cable plant; 2) differentiation of faults in the hardline coaxial cable plant from subscriber-related faults; and/or 3) prioritization of multiple hardline plant-related and/or subscriber-related faults (e.g., determination of a relative "severity" of multiple faults) so as to in turn facilitate appropriate and efficient fault remediation and ingress mitigation efforts.

As noted above, the information collected during phase 1 (e.g., a neighborhood node ingress map) may be used in methods according to other embodiments of the invention relating to a second phase of activity ("phase 2"), directed at least in part to particularly identifying specific faults in the field, remediating such faults so as to significantly reduce ingress in the neighborhood node, and/or verifying the efficacy of fault remediation efforts toward a reduction in ingress. In particular, in some exemplary implementations, one or more faults in the hardline coaxial cable plant of a given neighborhood node are specifically identified and remediated so as to significantly reduce a noise power (e.g., as measured at the headend of the cable communication system) associated with the neighborhood node ingress in at least a portion of the upstream path bandwidth below approximately 20 MHz (e.g., particularly below approximately 18 MHz, and more particularly below approximately 16.4 MHz, and more particularly below approximately 10 MHz). Examples of faults in the hardline coaxial cable plant that may be remediated (e.g., via repair or replacement of a defective component) so as to significantly reduce a noise power associated with neighborhood node ingress include, but are not limited to, one or more loose and/or defective connectors (loose/defective "fittings"), one or more flaws in the hardline coaxial cable, and a compromised ground (e.g., compromised RF shielding) or other defect in one or more electronics components (e.g., amplifiers, directional couplers, taps, line terminators) of the hardline coaxial cable plant.

More specifically, in some implementations, one or more faults in the hardline coaxial cable plant of a given neighborhood node may be repaired or replaced such that a highest value for an average noise power in at least a portion of the upstream path bandwidth below approximately 20 MHz (e.g., as measured over at least a 24 hour period at the headend) is less than approximately 20 decibels (dB) (and more particularly less than 15 dB, and more particularly less than 10 dB, and more particularly less than 8 dB) above a noise floor associated with the upstream path bandwidth below 20 MHz (e.g., as measured at the headend over the same time period).

In other implementations, one or more faults in the hardline coaxial cable plant may be repaired or replaced such that a highest value for the average noise power in at least a portion of the upstream path bandwidth below approximately 20 MHz (e.g., as measured over at least a 24 hour period at the headend) is at least 22 decibels (dB) (and more particularly at least 24 dB, and more particularly at least 27 dB, and more particularly at least 30 dB, and more particularly at least 33 dB, and more particularly at least 36 dB, and more particularly at least 38 dB) below an average channel power of one or more physical communication channels having a carrier frequency in the portion of the upstream path bandwidth below approximately 20 MHz and carrying upstream information from one or more subscriber premises in the neighborhood node.

In yet other implementations, one or more faults in the hardline coaxial cable plant may be repaired or replaced so as to achieve a carrier-to-noise-plus-interference ratio (CNIR) of at least 25 decibels (dB) (and more particularly at least 28 dB, and more particularly at least 31 dB, and more particularly at least 34 dB, and more particularly at least 37 dB) associated with one or more physical communication channels deployed in the upstream path bandwidth of the neighborhood node (and, more specifically, channels deployed in a portion of the upstream path bandwidth below approximately 19.6 MHz, and more particularly below approximately 18 MHz, and more particularly below approximately 16.4 MHz, and more particularly below approximately 10 MHz). In yet other implementations, one or more faults in the hardline coaxial cable plant may be repaired or replaced so as to achieve an unequalized modulation error ratio (MER) of at least 17 decibels (dB) (and more particularly at least 20 dB, and more particularly at least 22 dB, and more particularly at least 24 dB, and more particularly at least 28 dB, and more particularly at least 30 dB) associated with one or more physical communication channels deployed in the upstream path bandwidth of the neighborhood node (and, more specifically, channels deployed in a portion of the upstream path bandwidth below approximately 19.6 MHz, and more particularly below approximately 18 MHz, and more particularly below approximately 16.4 MHz, and more particularly below approximately 10 MHz). In yet other implementations, one or more faults in the hardline coaxial cable plant may be repaired or replaced so as to significantly reduce a noise power (e.g., as measured at the headend) associated with one or more narrowband substantially persistent ingress signals (e.g., short wave radio signals) constituting at least part of the neighborhood node ingress. Again, these results are significant, unexpected, and surprising, particularly given the cable communication industry's previously undisputed presumption that the portion of the upstream path bandwidth below approximately 20 MHz purportedly suffers from an irreparable presence of ingress.

In other embodiments of ingress mitigation methods, an iterative approach is adopted in which identification of potential points of ingress in a given neighborhood node and corresponding remediation of hardline plant-related and/or subscriber-related faults are conducted successively and multiple times to document a progression of ingress mitigation efforts in a given neighborhood node (e.g., in some implementations, the various noise metrics and communication channel metrics discussed above may be achieved via multiple iterations of "phase 1" and "phase 2" activity). More specifically, the Inventors have recognized and appreciated that: 1) as faults allowing for more significant ingress are remediated, "lesser" faults that allow for relatively lower (but nonetheless potentially problematic) levels of ingress may become more evident during iterative phase 1 and phase 2 activity; and 2) some faults may be intermittent (e.g., time-dependent and/or weather-dependent), and may be identifiable only via iterative phase 1 and phase 2 activity (e.g., over different time periods and/or weather conditions, and/or using different test signal frequencies) to identify potential points of ingress.

In view of the foregoing, in one embodiment, after collection of information during a first iteration of phase 1 activity in a given neighborhood node (i.e. via broadcasting of one or more test signals from a mobile broadcast apparatus traversing a neighborhood node drive path and recording geographical information representing positions of the mobile broadcast apparatus along the drive path and signal amplitudes representing a strength of one or more received upstream test signals based on the broadcasted test signal(s) and test signal ingress), and after a first iteration of phase 2 activity in the neighborhood node (i.e., a first remediation of one or more hardline plant-related and/or subscriber-related faults based on the first iteration of phase 1 activity), an ingress mitigation method comprises conducting at least a second iteration of phase 1 activity in the neighborhood node.

In one example implementation of this embodiment, a neighborhood node ingress map is generated as part of the first iteration of phase 1 activity, and a second iteration of the neighborhood node ingress map is generated as part of the second iteration of the phase 1 activity, so as to ascertain an effectiveness of the first remediation. In another aspect, the neighborhood node ingress map and the second iteration of the neighborhood node ingress map may be generated as an electronic visual rendering having a plurality of independently selectable and independently viewable layers comprising a first layer corresponding to the neighborhood node ingress map and a second layer corresponding to the second iteration of the neighborhood node ingress map, so as to facilitate comparative viewing of the respective layers. In yet another aspect, a second iteration of phase 2 activity is conducted in the neighborhood node (a second remediation of one or more additional hardline plant-related and/or subscriber-related faults based on the second iteration of phase 1 activity) and, after the second remediation, the ingress mitigation method comprises conducting at least a third iteration of phase 1 activity in the neighborhood node. In yet another aspect, a third iteration of the neighborhood node ingress map is generated pursuant to the third iteration of phase 1 activity so as to provide a time series of at least three neighborhood node ingress maps.

The cumulative effect of the iterative approach as outlined above, in which various components of the hardline coaxial cable plant and/or subscriber service drops or subscriber premises equipment are successively repaired or replaced, leads to a dramatic reduction of ingress in a given neighborhood node across the upstream path bandwidth, with a particularly noteworthy reduction in narrowband interference in the portion of the upstream path bandwidth between approximately 5 MHz and approximately 20 MHz (and particularly between 5 MHz to approximately 18 MHz, and more particularly between 5 MHz and approximately 16.4 MHz, and more particularly between 5 MHz and approximately 10 MHz). In some implementations, even a single iteration of phase 1 activity and phase 2 activity (in various possible modes of execution) results in a significant reduction of ingress in a given neighborhood node. Thus, ingress mitigation methods according to various embodiments of the present invention effectively recover valuable bandwidth, widely recognized as being otherwise effectively unusable, to instead be more productively and reliably employed to facilitate increased upstream capacity for supporting voice and/or data services.

More generally, pursuant to various inventive ingress mitigation methods and apparatus disclosed herein, improved cable communication systems and methods according to other embodiments of the present invention may be realized that previously were not possible. In particular, existing cable communication systems may be modified (e.g., repaired and/or updated with new components) pursuant to the ingress mitigation methods and apparatus disclosed herein to yield significantly improved cable communication systems according to various embodiments of the present invention. Similarly, new cable communication systems according to various embodiments of the present invention may be deployed in which, as part of a quality assessment of the newly installed system for example, the ingress mitigation methods and apparatus disclosed herein may be applied to ascertain that various noise metrics are met to accommodate significant increases in aggregate deployed upstream capacity as compared to conventional cable communication systems, and to generally ensure reliable operation of the newly installed system. For both pre-existing and newly installed cable communication systems, ingress mitigation methods and apparatus according to various embodiments of the present invention may be employed as part of a periodic (e.g., routine or occasional) cable communication system maintenance program to ensure ongoing reliability of such increased upstream capacity systems.

Furthermore, the Inventors have recognized and appreciated that a dramatic reduction of ingress in a given neighborhood node, particularly below approximately 20 MHz, also may provide for greater effectiveness of ingress cancellation circuitry employed in some cable modem termination system (CMTS) demodulation tuners, and/or obviate the need in some instances for advanced access protocols such as Synchronous Code Division Multiple Access (S-CDMA), thereby permitting expanded use of TDMA/ATDMA channels in a previously unusable portion of the upstream path bandwidth.

In particular, as noted above, ingress cancellation circuitry generally is not effective below 20 MHz, where channels are most vulnerable to broadband impulse noise and multiple significant ingress carriers (e.g., see Chapman, page 69; also see Thompson, pages 148-149, "Laboratory Measurements"). Instead, for this lower portion of the upstream path bandwidth, the industry has proposed the use of S-CDMA, which has a purported increased resistance to broadband impulse noise. However, while the spreading code employed in S-CDMA to significantly expand symbol duration purportedly renders this protocol somewhat more resistant to demodulation/decoding errors due to the presence of broadband noise in the upstream path bandwidth, S-CDMA is arguably significantly less effective in the presence of narrowband and/or persistent interference signals or "ingress carriers" (e.g., due to ham radio and/or short wave terrestrial signals), which may be present for durations in excess of the expanded time per symbol. Accordingly, the purported benefits of S-CDMA may be most realized in portions of the upstream path bandwidth susceptible to broadband burst/impulse noise but in which there is only a modest presence at most of narrowband interference (where ingress cancellation circuitry similarly may be effective, i.e., above 20 MHz). In view of the foregoing, with reference again to the proposed channel plans 2000C and 2000D illustrated in FIGS. 19 and 20, respectively, the S-CDMA channels below approximately 20 MHz arguably would not function effectively due to the presence of ingress disturbances typically encountered in this region of the upstream path bandwidth (e.g., as discussed above in connection with FIGS. 12, 14 and 15). In fact, as discussed above, industry adoption of S-CDMA as a solution for implementing channels below 20 MHz has been notably limited, and S-CDMA remains largely unused in practice by cable system operators (e.g., see Chapman, page 89).

Thus, given the limited efficacy of conventional ingress cancellation circuitry, and arguably limited efficacy (and limited adoption) of S-CDMA, cable communication systems according to various embodiments of the present invention having significantly reduced noise in the upstream path bandwidth of respective neighborhood nodes enable improved performance of ingress cancellation circuitry below 20 MHz (e.g., by significantly reducing troublesome ingress carriers that impede satisfactory functioning of ingress cancellation circuitry), and also enable an expanded use below 20 MHz of TDMA/ATDMA channels (conventionally used above 20 MHz) to increase upstream capacity for supporting voice and/or data services. Furthermore, such reduced noise cable communication systems enable the implementation of upstream QAM channels with higher modulation orders (and hence increased deployed channel data rates) throughout the upstream path bandwidth from approximately 5 MHz to at least approximately 42 MHz as compared to conventional cable communication systems (even in the absence of forward error correction, adaptive equalization and/or ingress cancellation), thus providing significantly increased aggregate deployed upstream capacity in a given neighborhood node. When reduced noise cable communication systems according to various embodiments of the present invention are coupled with one or more of adaptive equalization and ingress cancellation for physical communication channels, forward error correction (e.g., Reed-Solomon FEC or LDPC—see Table 6 above), and optionally advanced protocols such as S-CDMA or Orthogonal Frequency Division Multiplexing (OFDM), even further enhancements in aggregate deployed upstream capacity may be realized in the upstream path bandwidth of respective neighborhood nodes of the system (e.g., using QAM channels having modulation orders in excess of 256).

To provide an illustration of exemplary aggregate deployed upstream capacity gains facilitated by various embodiments of the present invention, FIG. 26 is a chart similar to that shown in FIGS. 17 through 21, in which incremental aggregate deployed upstream capacity gains may be observed via the use of higher modulation order QAM channels in different portions of the upstream path bandwidth in a given neighborhood node. In FIG. 26, the channel plan 2002P shown in FIG. 21 (i.e., including four 64-QAM 6.4 MHz-wide channels occupying a portion of the upstream path bandwidth between 16.4 MHz and 42 MHz and representing the current "state-of-the-art" in some conventional cable communication systems in active use) is represented as providing approximately 123 Mbits/s of maximum aggregate deployed upstream capacity between 16.4 MHz and 42 MHz (see Table 10). In one embodiment of a cable communication system according to the present invention, the four 64-QAM channels of the channel plan 2002P shown in FIG. 21 may be replaced by four 256-QAM channels, providing an aggregate deployed upstream capacity gain of approximately 41 Mbits/s (for a total of 123+41=164 Mbits/s). While not shown explicitly in FIG. 26, it may be appreciated that in other embodiments, the four 64-QAM channels of the channel plan 2002P alternatively may be replaced by four 128-QAM channels, or a combination of 128-QAM and 256-QAM channels, to provide some incremental gain in aggregate deployed upstream capacity beyond 123 Mbits/s.

In another embodiment, whether or not 64-QAM or higher modulation order QAM channels are employed above 16.4

MHz, as illustrated in FIG. 26 three or more 16-QAM channels (e.g., TDMA or ATDMA channels) may be added in the portion of the upstream path bandwidth from approximately 5.2 MHz to approximately 16.4 MHz based on channel bandwidths having multiples of 1.6 MHz (e.g., one 1.6 MHz-wide channel, one 3.2 MHz-wide channel, and one 6.4 MHz-wide channel, or other combinations of 1.6 MHz-wide and/or 3.2 MHz-wide channels) to provide an aggregate deployed upstream capacity gain of approximately 36 Mbits/s. In yet another embodiment, these 16-QAM channels may be replaced by 64-QAM channels to provide approximately another 18 Mbits/s gain in aggregate deployed upstream capacity and, in yet another embodiment, these 64-QAM channels may be replaced by 256-QAM channels to provide approximately another 18 Mbits/s gain in aggregate deployed upstream capacity (i.e., total gain in aggregate deployed upstream capacity by using 256-QAM channels between approximately 5.2 MHz and approximately 16.4 MHz is approximately 72 Mbits/s).

While not shown explicitly in FIG. 26, different incremental gains in aggregate deployed upstream capacity may be obtained in other embodiments by using 32-QAM or 128-QAM channels between approximately 5.0 MHz and approximately 16.4 MHz, and various combinations of QAM channels having different modulation orders and/or bandwidths (including channel bandwidths smaller than 1.6 MHz, so as to further fill the portion of the upstream path bandwidth between 5.0 MHz and 5.2 MHz). In any event, by using QAM channels having a modulation order as high as 256 throughout the upstream path bandwidth from approximately 5.2 MHz to approximately 42 MHz in a given neighborhood node of a cable communication system according to one embodiment of the present invention, a total aggregate deployed upstream capacity of approximately 240 Mbits/s may be realized—almost doubling the aggregate deployed upstream capacity of "state-of-the-art" conventional cable communication systems.

Furthermore, while FIG. 26 illustrates an example of aggregate deployed upstream capacity in a cable communication system according to one embodiment of the present invention, enabled at least in part by ingress mitigation methods, apparatus and systems according to other embodiments of the present invention, it should be appreciated that the invention is not limited to the upstream capacity improvements shown in FIG. 26. In particular, in other embodiments, cable communication systems may be realized in which the noise profile of a given neighborhood node (e.g., the noise floor arising from AWGN, and other disturbances/interference combined therewith) over a substantial portion of the upstream path bandwidth from approximately 5 MHz to at least approximately 42 MHz allows for C/N values that, when combined with advanced error correction techniques such as LDPC, support functioning QAM channels having modulation orders in excess of 256 (e.g., see Table 6, in which a C/N value of 34 dB supports 4096-QAM using LDPC ⅚ error correction). In this manner, aggregate deployed upstream capacities of up to approximately 350 Mbits/s may be achieved in cable communication systems according to various embodiments of the present invention (e.g., using 4096-QAM channels having a deployed data rate of 9.6 Mbits/s/MHz across the upstream path bandwidth from approximately 5 MHz to at least approximately 42 MHz; see Table 3).

In sum, one embodiment of the present invention is directed to a method for facilitating detection of potential points of signal ingress in a cable communication system. The method comprises: A) broadcasting a test signal in an upstream path bandwidth of the cable communication system from a plurality of locations proximate to at least one node of the cable communication system; B) recording corresponding geographic information for the plurality of locations, at respective ones of the plurality of locations, together with a first plurality of corresponding time stamps, so as to generate a first record of the geographic information for the plurality of locations at which the test signal is broadcast in A) as a function of time; C) recording, at a headend of the cable communication system, a plurality of signal amplitudes together with a second plurality of corresponding time stamps so as to generate a second record, the plurality of signal amplitudes representing a strength of a received upstream test signal at the headend as a function of time, based on A); and D) based on the first record and the second record, generating an ingress map including a graphical representation of the potential points of signal ingress in the at least one node of the cable communication system.

Another embodiment is directed to a system for detecting potential points of signal ingress in a cable communication system. The system comprises: A) a mobile broadcast apparatus to broadcast a test signal in an upstream path bandwidth of the cable communication system from a plurality of locations proximate to at least one node of the cable communication system; B) a navigational device, coupled to the mobile broadcast apparatus, to record corresponding geographic information for the plurality of locations, at respective ones of the plurality of locations, together with a first plurality of corresponding time stamps, so as to generate a first record of the geographic information for the plurality of locations at which the test signal is broadcast by the mobile broadcast apparatus as a function of time; C) a signal receiver to record, at a headend of the cable communication system, a plurality of signal amplitudes together with a second plurality of corresponding time stamps so as to generate a second record, the plurality of signal amplitudes representing a strength of a received upstream test signal at the headend as a function of time, based on the test signal transmitted by the mobile broadcast apparatus; and D) at least one processor to process the first record and the second record so as to generate an ingress map including a graphical representation of the potential points of signal ingress in the at least one node of the cable communication system based on the first record and the second record.

Another embodiment is directed to a method for facilitating detection of potential points of signal ingress in a cable communication system. The method comprises: A) broadcasting, from a signal generator coupled to or situated in a vehicle, a test signal in an upstream path bandwidth of at least one node of the cable communication system; B) during A), operating the vehicle so as to traverse a plurality of locations proximate to the at least one node of the cable communication system; and C) recording, using a navigational device coupled to or situated in the vehicle, corresponding geographic information for the plurality of locations, at respective ones of the plurality of locations, together with a first plurality of corresponding time stamps, so as to generate a first record of the geographic information for the plurality of locations at which the test signal is broadcast in A) as a function of time, wherein in A): the test signal does not significantly interfere with operative signaling in the upstream path bandwidth from one or more end users on the at least one node of the cable communication system; and the test signal does not include the geographic information for the plurality of locations recorded in C).

Another embodiment is directed to a computer-implemented method for facilitating detection of potential points of signal ingress in a cable communication system. The method comprises: A) receiving or accessing a first electronic record including: geographic information for a plurality of locations at which a test signal is broadcast in an upstream path bandwidth of at least one node of the cable communication system, the plurality of locations being proximate to the at least one node of the cable communication system; and a first plurality of corresponding time stamps, such that the first record includes the geographic information for the plurality of locations at which the test signal is broadcast as a function of time; B) receiving or accessing a second electronic record including: a plurality of signal amplitudes recorded at a headend of the cable communication system, the plurality of signal amplitudes representing a strength of a received upstream test signal at the headend based on the broadcasted test signal; and a second plurality of corresponding time stamps, such that the second record includes the plurality of signal amplitudes as a function of time; C) merging the first electronic record and the second electronic record, based at least in part on the first plurality of corresponding time stamps and the second plurality of corresponding time stamps, so as to generate a third electronic record including at least the geographic information for the plurality of locations at which the test signal is broadcast and the plurality of signal amplitudes representing the strength of the received upstream test signal; and D) processing the third electronic record so as to generate an ingress map including a graphical representation of the potential points of signal ingress in the at least one node of the cable communication system.

Another embodiment is directed to a method for reducing or remediating signal ingress in at least one node of a cable communication system. The method comprises: A) transmitting a local test signal, at or proximate to at least one potential point of the signal ingress, in an upstream path bandwidth of the at least one node of the cable communication system; B) receiving, at or proximate to the at least one potential point of the signal ingress, at least one signal amplitude representing a strength of a received upstream test signal at a headend of the cable communication system, based on A); C) based at least in part on the at least one signal amplitude received in B), identifying, at or proximate to the at least one potential point of the signal ingress, at least one faulty or defective infrastructure element of the at least one node of the cable communication system; and D) repairing or replacing the at least one faulty or defective infrastructure element so as to reduce or remediate the signal ingress.

Another embodiment is directed to an apparatus for facilitating detection of signal ingress in at least one node of a cable communication system. The apparatus comprises: at least one antenna; a transmitter, coupled to the at least one antenna, to transmit a local test signal via the at least one antenna in an upstream path bandwidth of the at least one node of the cable communication system; at least one communication interface to receive signal information relating to at least one signal amplitude representing a strength of a received upstream test signal at a headend of the cable communication system, based on the local test signal transmitted by the transmitter; and at least one display device, coupled to the at least one communication interface, to display at least one indication, based at least in part on the received signal information, corresponding to the at least one signal amplitude representing the strength of the received upstream test signal at the headend of the cable communication system.

Another embodiment is directed to an apparatus for facilitating detection of signal ingress in at least one node of a cable communication system. The apparatus comprises: at least one antenna; a transmitter, coupled to the at least one antenna, to transmit a local test signal via the at least one antenna in an upstream path bandwidth of the at least one node of the cable communication system without significantly interfering with operative signaling in the upstream path bandwidth from one or more end users on the at least one node of the cable communication system; at least one communication interface to receive at least signal information relating to at least one signal amplitude representing a strength of a received upstream test signal at a headend of the cable communication system, based on the local test signal transmitted by the transmitter; at least one display device; at least one memory to store: processor-executable instructions; first map information relating to an ingress map illustrating a plurality of potential points of the signal ingress and corresponding signal amplitudes indicating relative degrees of the signal ingress, at respective ones of the plurality of potential points, in a geographic area proximate to the at least one node of the cable communication system; and second map information relating to at least a portion of a cable communication system facilities map illustrating at least a portion of an infrastructure of the at least one node of the cable communication system; at least one processor, communicatively coupled to at least the at least one memory, the at least one display device, and the at least one communication interface; and a portable or handheld housing for at least the transmitter, the at least one communication interface, the at least one display device, the at least one memory, and the at least one processor, wherein upon execution of the processor-executable instructions, the at least one processor: controls the at least one display device to display an ingress overlay map comprising the ingress map and at least the portion of the cable communication system facilities map overlaid on the ingress map; and further controls the at least one display device to display at least one indication, based at least in part on the signal information received by the at least one communication interface, corresponding to the at least one signal amplitude representing the strength of the received upstream test signal at the headend of the cable communication system.

Further combinations and sub-combinations of various concepts are provided below in the Detailed Description and Claims. It should be appreciated that all combinations of the foregoing concepts and additional concepts discussed in greater detail below (provided such concepts are not mutually inconsistent) are contemplated as being part of the inventive subject matter disclosed herein. In particular, all combinations of subject matter appearing as numbered claims at the end of this disclosure are contemplated as being part of the inventive subject matter disclosed herein. In addition, all combinations of subject matter supported by this disclosure, including the drawings, the description and the claims, are contemplated as being part of the inventive subject matter even if not expressly recited as one of the numbered claims. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 3A through 3G illustrate various components of the hardline coaxial cable plant shown in FIG. 2.

FIGS. 49A through 49L illustrate expanded close-up views of facilities maps showing cable communication system infrastructure, corresponding heat maps before ingress remediation, and corresponding heat maps after ingress remediation, according to embodiments of the present invention.

DETAILED DESCRIPTION

Figure 1:
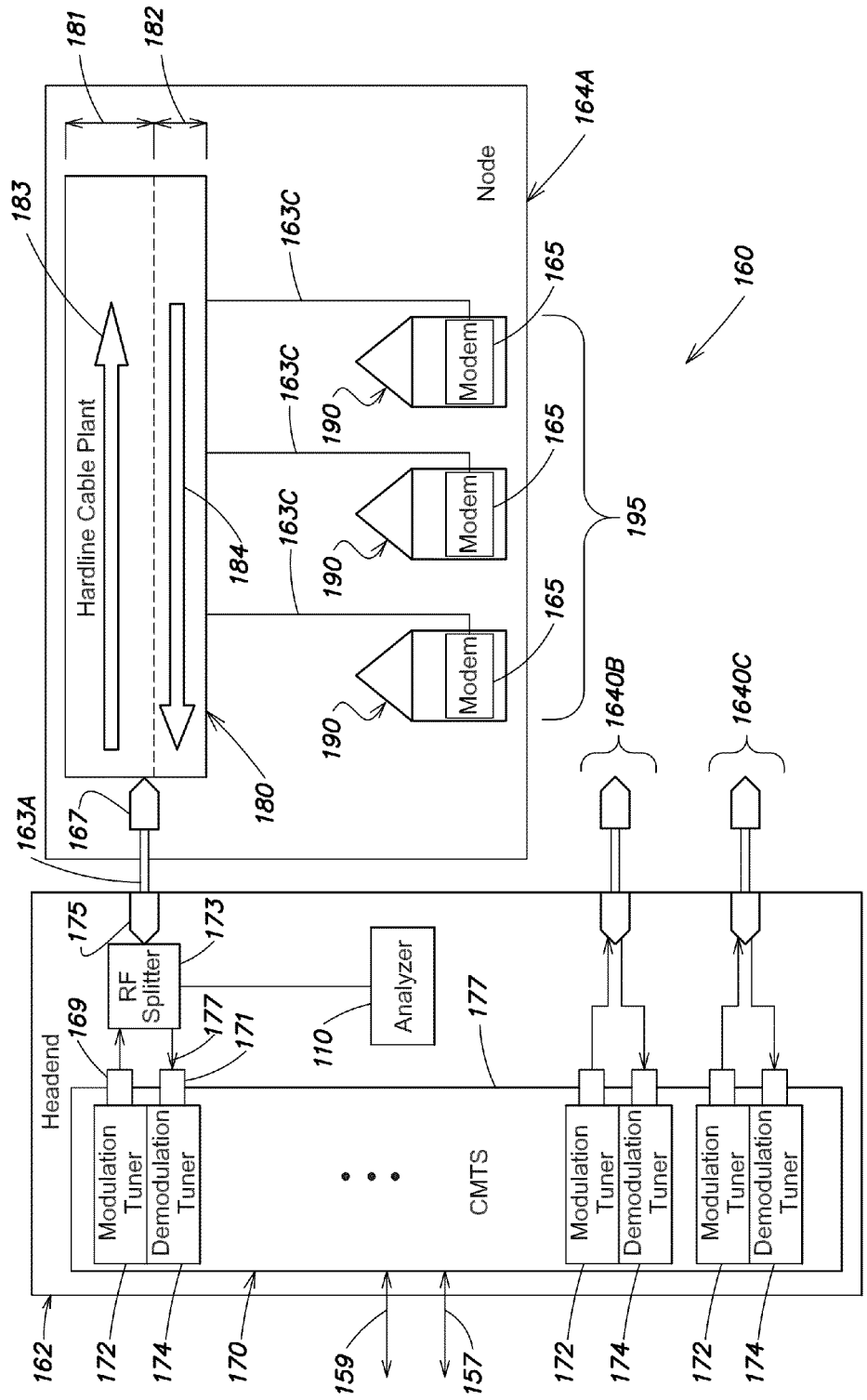
FIG. 1 illustrates various aspects of a conventional cable communication system.

Following below are more detailed descriptions of various concepts related to, and embodiments of, inventive methods and apparatus for ingress mitigation in cable communication systems, and cable communication systems and methods having increased upstream capacity for supporting voice and/or data services. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. System Overview to Demonstrate Efficacy

To demonstrate the various concepts disclosed herein, ingress mitigation methods and apparatus according to embodiments of the present invention were employed in a functioning cable communication system similar to that shown in FIGS. 1 through 4, having multiple neighborhood nodes respectively serving numerous subscriber premises. Noise profiles of the upstream path bandwidth in multiple different neighborhood nodes of this cable communication system first were studied so as to collect general baseline information (e.g., 24 hour average spectrums for the upstream path bandwidth were acquired for each of the neighborhood nodes to obtain representative noise power spectrums), and one neighborhood node with a noteworthy noise profile showing a significant presence of ingress particularly between 5 MHz and 20 MHz was chosen in which to implement ingress mitigation methods as outlined in greater detail below (this neighborhood node is referred to herein as the "ingress mitigated node"). Four other nodes of the cable communication system, all demonstrating appreciable ingress, served as "control nodes" in which no ingress mitigation was performed, so as to provide a system-wide comparative basis for illustrating the efficacy of the ingress mitigation methodology.

As noted above, in some exemplary embodiments of inventive ingress mitigation methods according to the present invention, ingress mitigation may be approached in two "phases" of activity. In a first phase ("phase 1"), various information is collected from the field (e.g., proximate to the hardline cable plant infrastructure and subscriber premises) to facilitate identification of potential points of ingress into a given neighborhood node under evaluation, with particular focus on one or more possible faults in the hardline coaxial cable plant that may allow for ingress. As part of phase 1, information collected for this purpose may in some implementations be visually rendered as a "neighborhood node ingress map" to provide an intuitive illustration of ingress in the neighborhood node. In a second phase ("phase 2"), the information collected during phase 1 (e.g., a neighborhood node ingress map) is used to facilitate particularly identifying specific faults in the field, remediating such faults so as to significantly reduce ingress into the neighborhood node, and verifying the efficacy of fault remediation efforts toward a reduction in ingress.

Accordingly, as part of the ingress mitigation methodology employed in the ingress mitigated node, multiple potential points of ingress in the ingress mitigated node initially were identified during phase 1 activity, and based on such identification multiple and iterative remediation efforts in the ingress mitigated node were performed (e.g., repair and/or replacement of various components), particularly in connection with the RF hardline coaxial cable plant of the node, during phase 2 activity. With each iteration of remediation, measurements were made including a noise power spectrum of the upstream path bandwidth in the ingress mitigated node so as to illustrate incremental reductions in ingress; additionally, measurements were made of a carrier-to-noise ratio (CNR) and a modulation error ratio (MER) (unequalized and equalized) of a quadrature amplitude modulation (QAM) radio frequency (RF) signal defining a physical communication test channel in the lower-frequency portion of the upstream path bandwidth of the ingress mitigated node (e.g., carrier frequency of 16.4 MHz) and carrying simulated upstream information, so as to illustrate corresponding improvements in the upstream information carrying capacity of the upstream test channel.

After a series of remediation efforts, a 24 hour average noise power spectrum of the ingress mitigated node was measured, so as to provide a "before and after" illustration of the dramatic reduction of noise power in the ingress mitigated node throughout the upstream path bandwidth from approximately 5 MHz to at least approximately 42 MHz (e.g., on the order of at least a 6 dB reduction throughout the spectrum, and in some instances as much as a 14 dB reduction particularly below 20 MHz, and more particularly below 18 MHz, and more particularly below 16.4 MHz, and more particularly below 10 MHz). Post-mitigation free run spectra for the ingress mitigated node revealed an essentially Additive White Gaussian Noise (AWGN) noise floor profile from approximately 5 MHz to at least approximately 42 MHz, with essentially no presence of discrete ingress carriers.

Similarly, CNR and MER values for the upstream test channel after each iteration of remediation, and particularly after a series of remediation efforts, illustrated a dramatic improvement in channel metrics and performance (e.g., CNR as high as approximately 40 to 44dB—see Table 4; unequalized MER as high as approximately 30 dB and equalized MER as high as approximately 40 dB—see Table 5). Observed CNR and MER values were stable and sufficient to support significantly higher QAM modulation orders (e.g., up to at least 256-QAM) and corresponding increased upstream capacity throughout the upstream path bandwidth (e.g., at least up to approximately 240 Mbits/s of aggregate deployed upstream capacity between approximately 5 MHz to approximately 42 MHz), using a conventional Advanced Time Division Multiple Access (ATDMA) protocol, and without necessarily requiring advanced error correction techniques (e.g., Low Density Parity Check or LDPC codes), a Synchronous Code Division Multiple Access (S-CDMA) protocol, or Orthogonal Frequency Division Multiplexing (OFDM) (although one or more of LDPC, S-CDMA, and OFDM may be employed in cable communication systems according to various embodiments of the present invention, as discussed further below).

Figure 24:
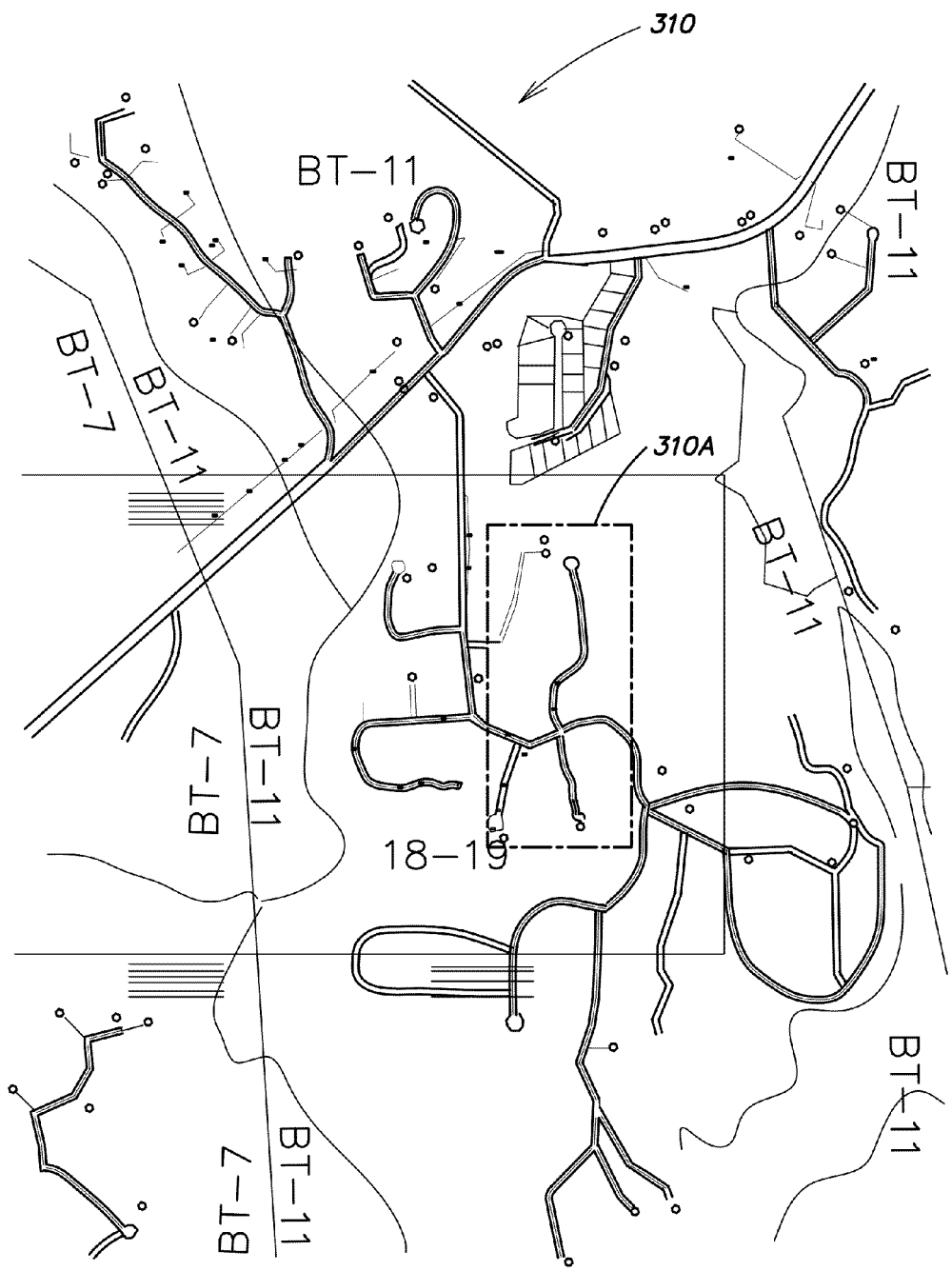
FIG. 24 illustrates a cable facilities map for a neighborhood node of a cable communication system according to one embodiment of the present invention.
Figure 25:
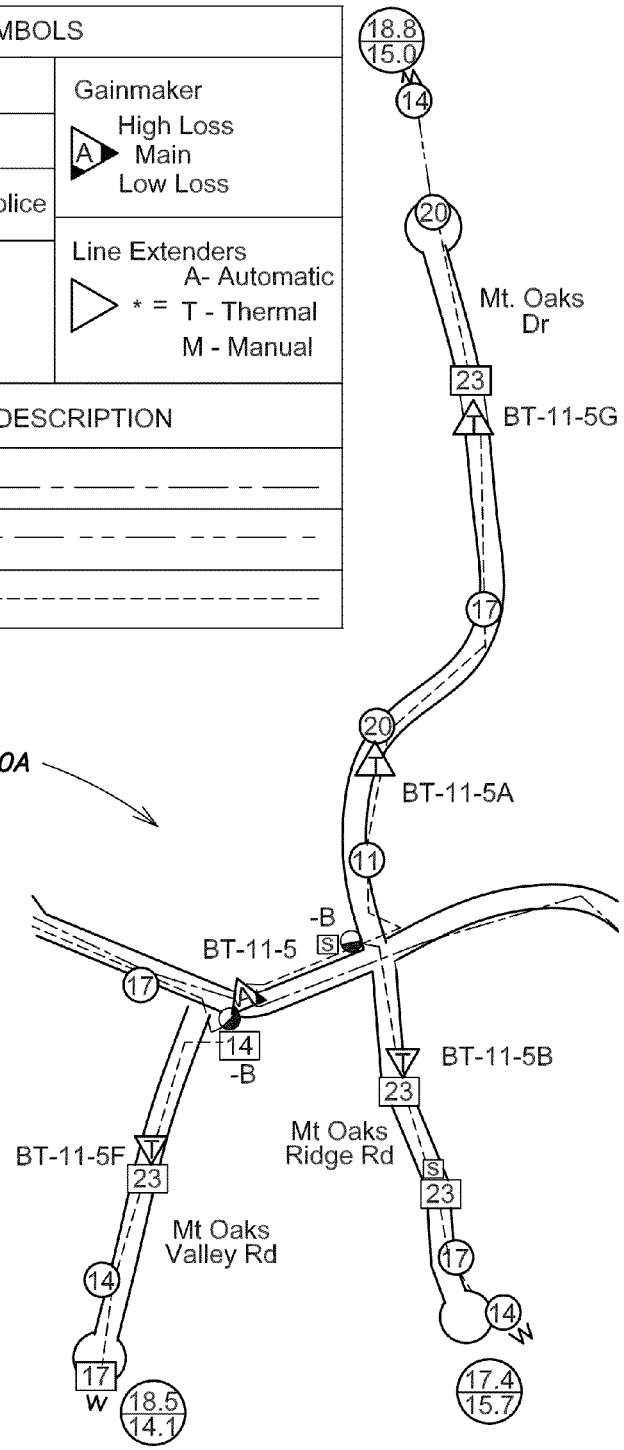
FIG. 25 illustrates a portion of the cable facilities map of FIG. 24 to show additional details of cable communication system infrastructure in a portion of the neighborhood node.

FIG. 24 illustrates part of a cable facilities map 310 that includes the ingress mitigated node, labeled in the map as node "BT-11". FIG. 25 illustrates a portion 310A of the cable facilities map 310 to show additional details of cable communication system infrastructure in part of the ingress mitigated node corresponding to the portion 310A of the cable facilities map 310 (in which portion some exemplary remediation was performed, as discussed in greater detail below). In particular, with reference again to FIG. 2, as can be seen in FIG. 25 the portion 310A of the cable facilities map 310 indicates multiple segments of hardline coaxial cable 163B (in which different segments may employ different diameters of hardline coaxial cable), a number of amplifiers 187 (indicated by a triangular-shaped symbol, and including one or more examples of a "gainmaker" multi-port amplifier), a number of taps 188 (e.g., including two-port taps indicated by a circle enclosing a tap attenuation value in dB, and four-port taps indicated by a square enclosing a tap attenuation value in dB), a number of directional couplers 189 (indicated by a half-filled circle), a number of line terminators 191, and a number of splice blocks 195, in the corresponding portion of the ingress mitigated node.

Figure 12:
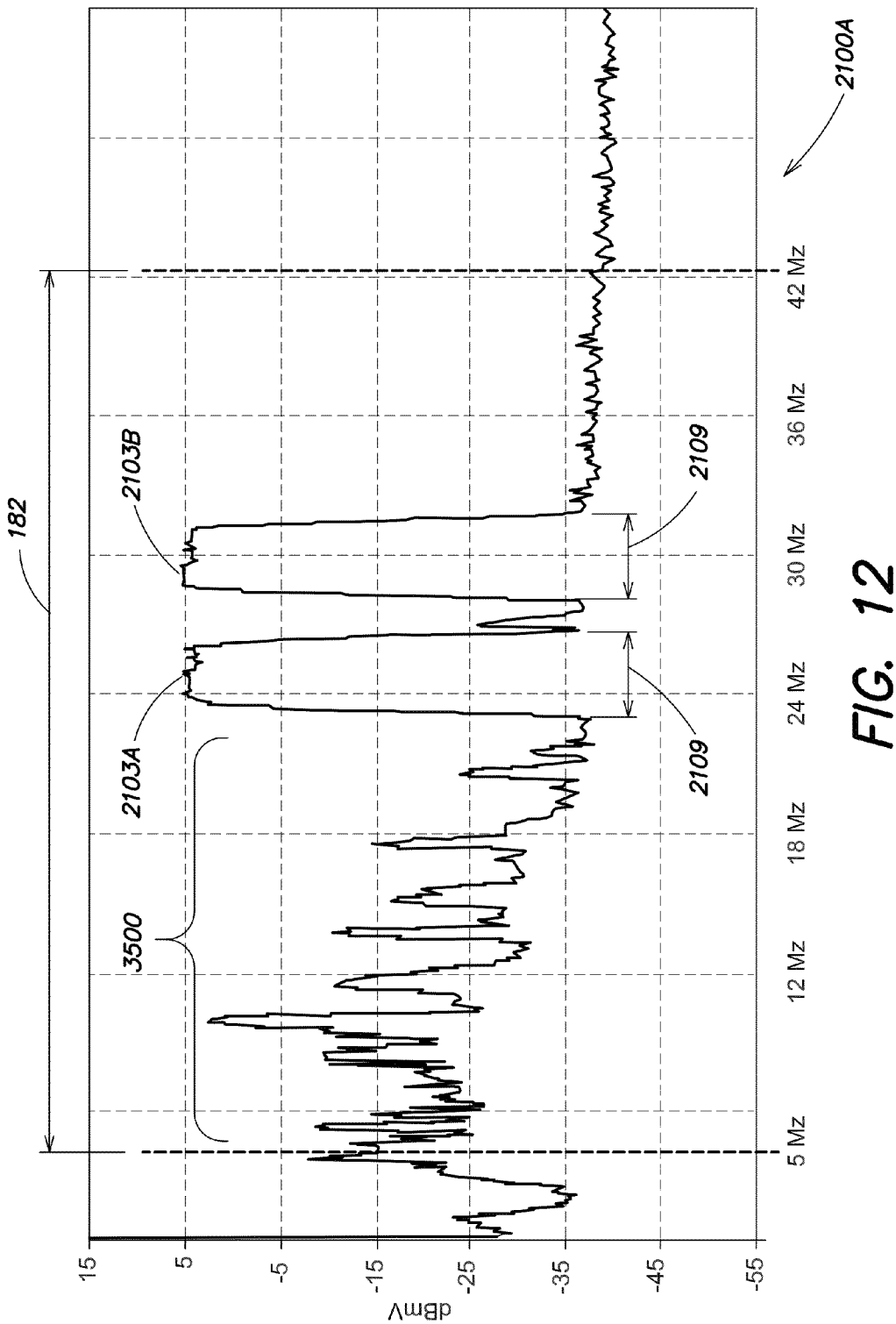
FIG. 12 shows an example of a power spectral density (PSD) (or "spectrum") associated with an upstream path bandwidth in a conventional cable communication system similar to that shown in FIG. 1, so as to illustrate the presence of ingress.
Figure 13:
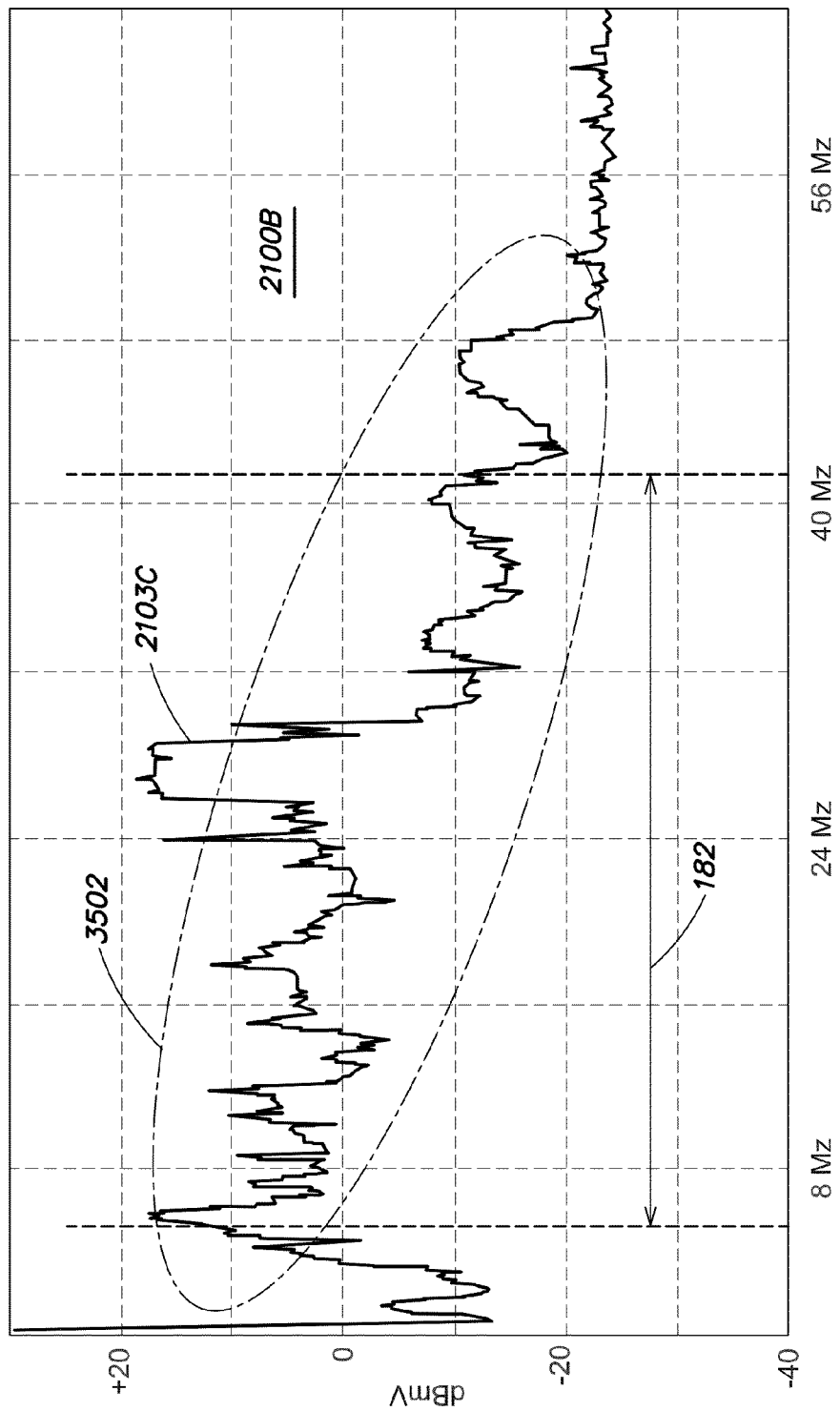
FIG. 13 shows another example of a spectrum associated with the upstream path bandwidth of a conventional cable communication system similar to that shown in FIG. 1, so as to illustrate the presence of ingress in the form of broadband impulse noise.
Figure 14:
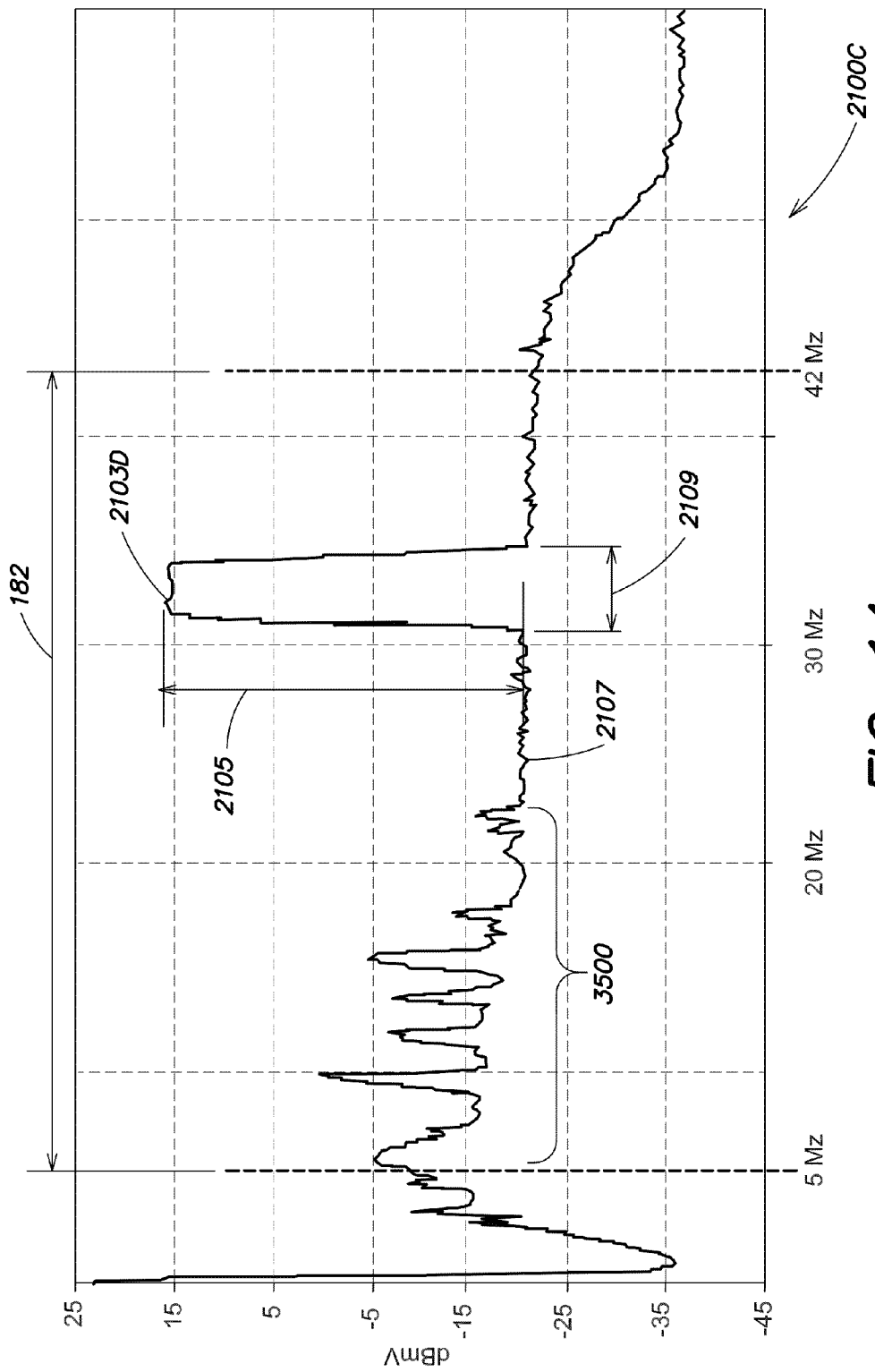
FIG. 14 shows yet another example of a spectrum associated with the upstream path bandwidth of a conventional cable communication system similar to that shown in FIG. 1, so as to illustrate the presence of ingress.
Figure 15:
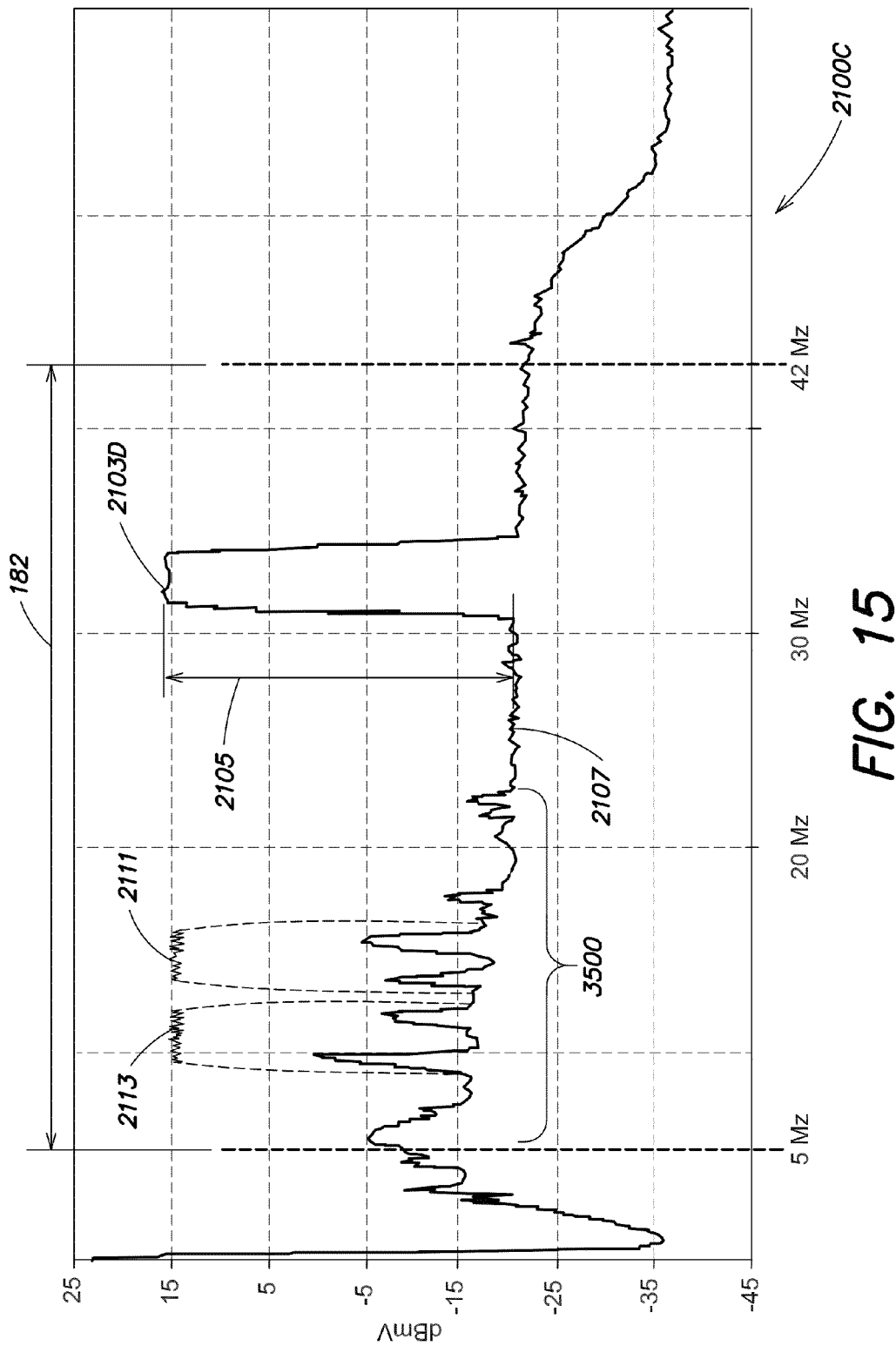
FIG. 15 shows the spectrum of FIG. 14 and two hypothetical channels positioned over a significantly noisy portion of the spectrum to illustrate the concept of carrier-to-interference noise.
Figure 16:
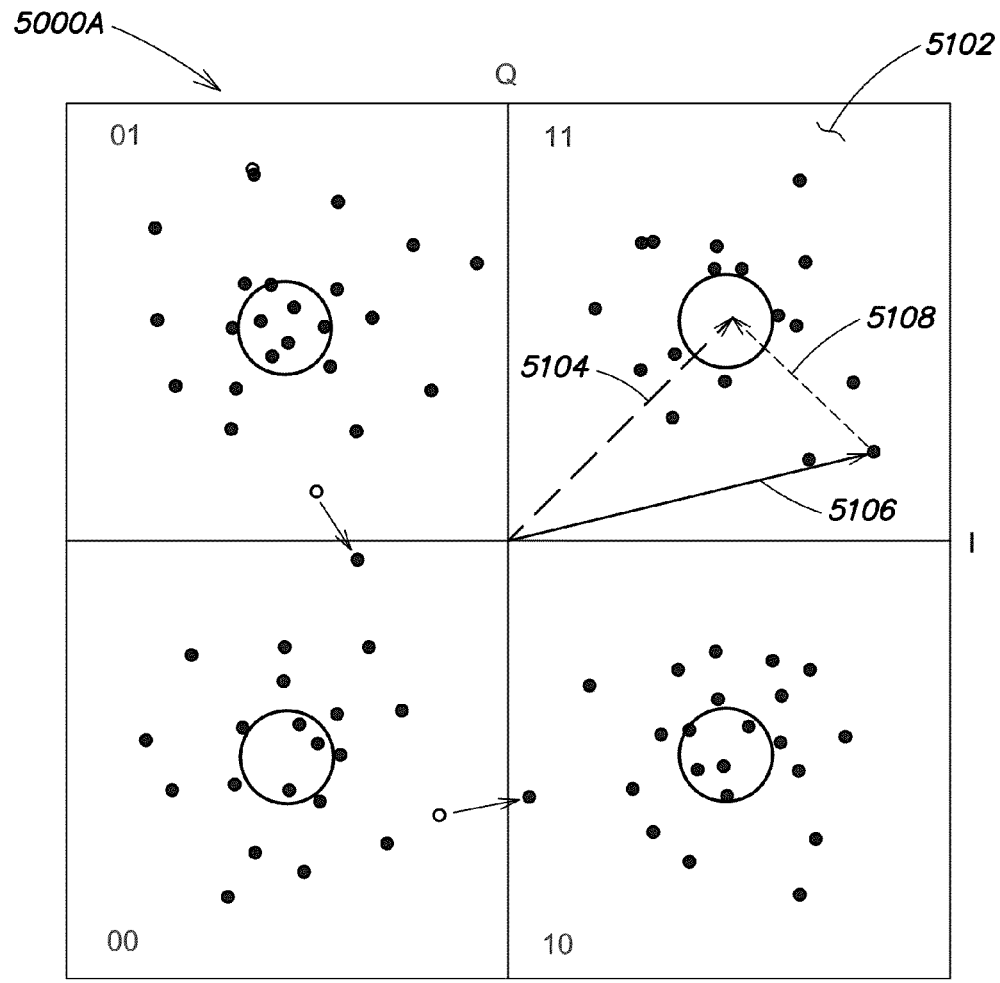
FIG. 16 illustrates the effect of noise on the demodulation of QAM signals using an example of a QPSK or 4-QAM constellation diagram.
Figure 17:
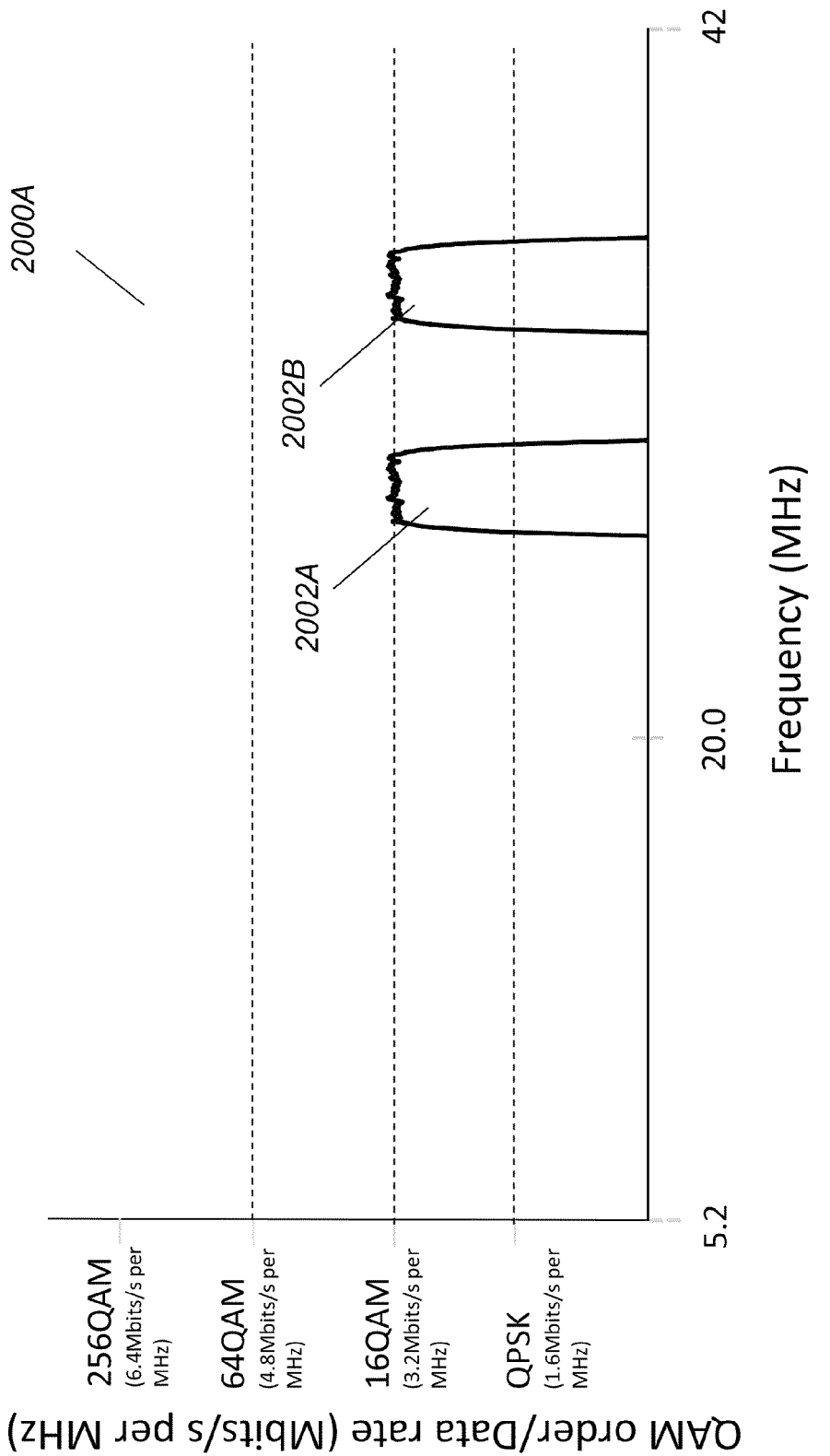
FIG. 17 illustrates a chart showing a typical DOCSIS upstream channel plan for a conventional cable communication system, with two channels placed between 20 MHz and 42 MHz.
Figure 18:
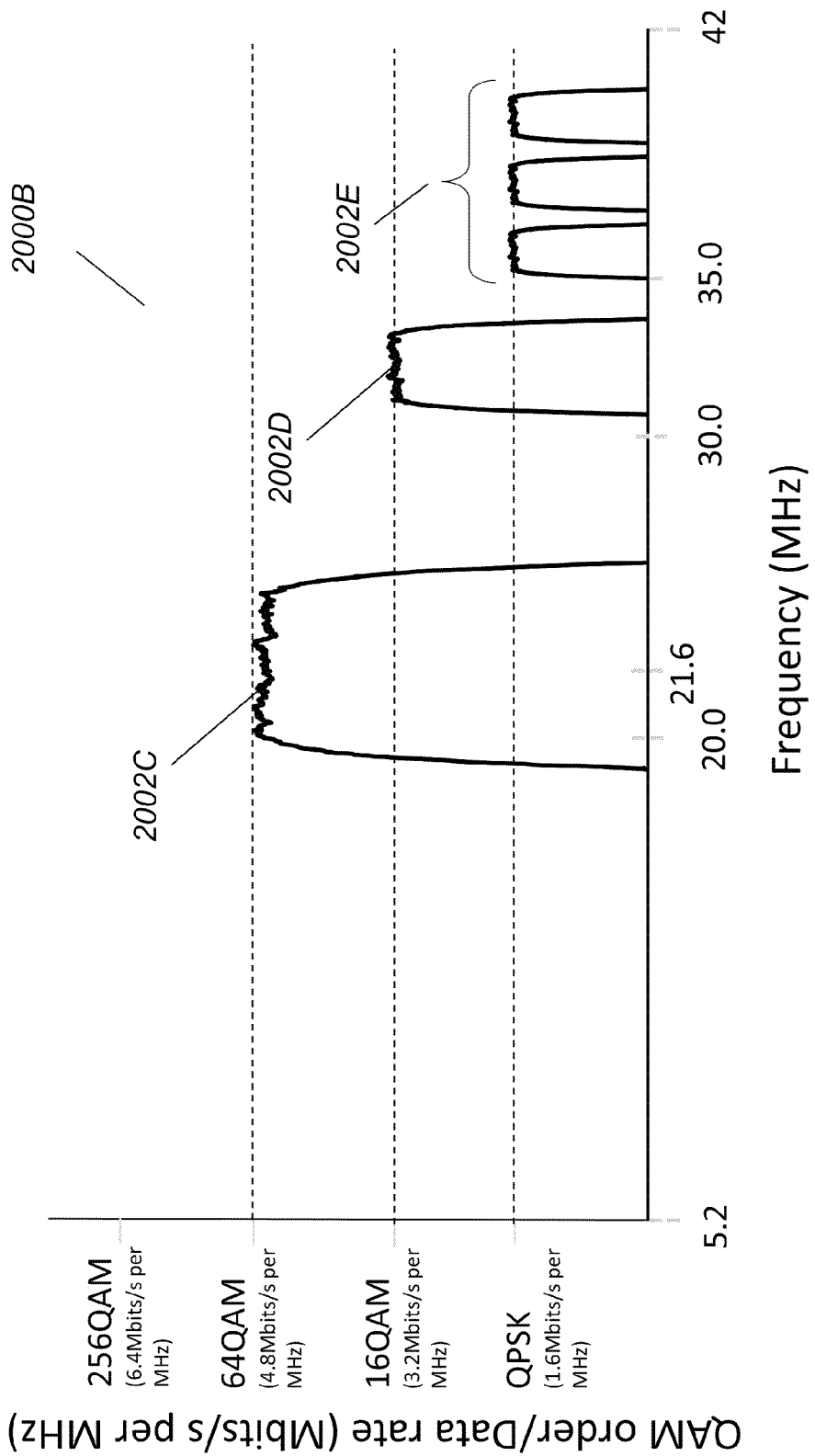
FIG. 18 illustrates a chart showing a proposed DOCSIS upstream channel plan for a conventional cable communication system, with five channels placed between 20 MHz and 42 MHz.
Figure 19:
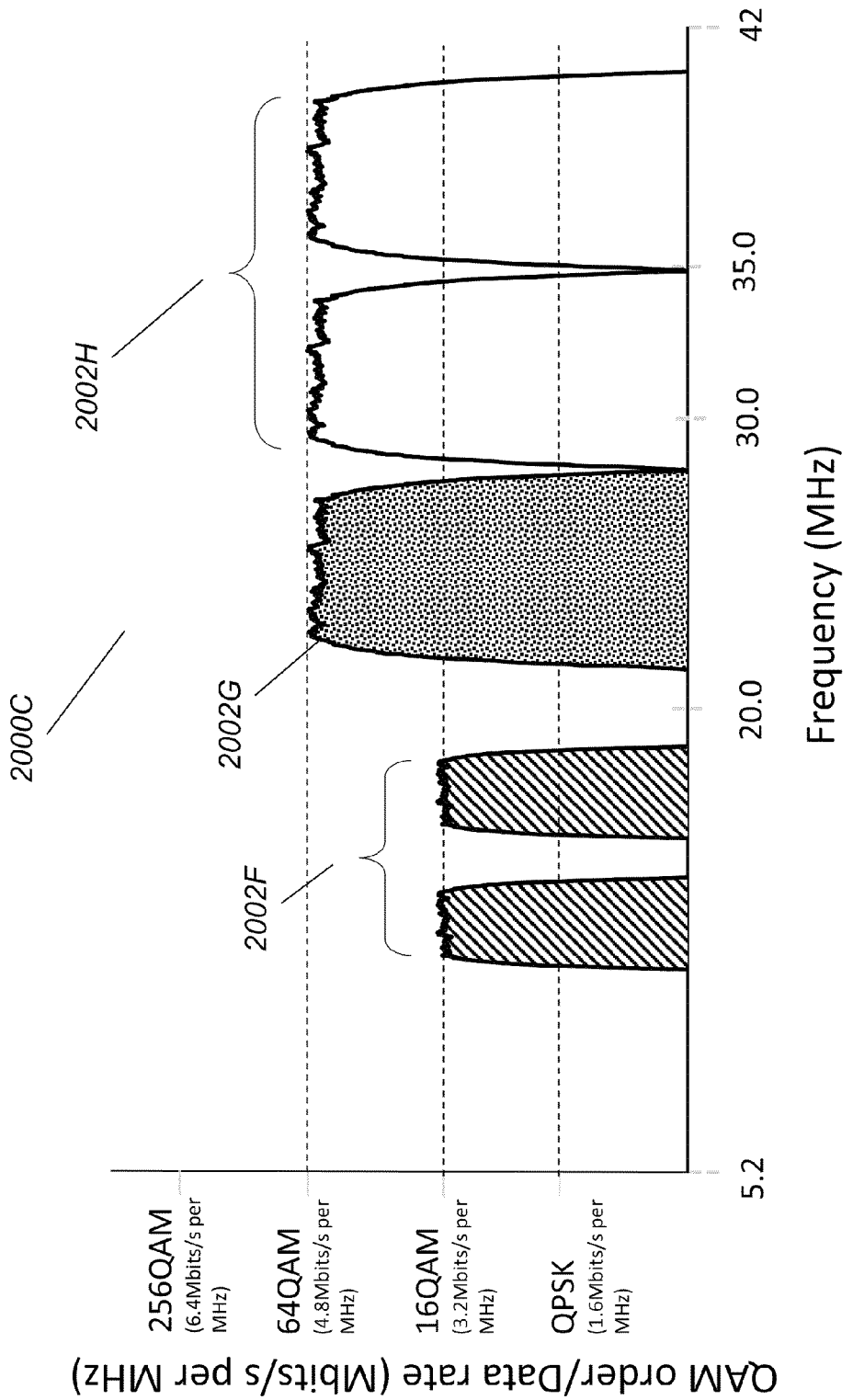
FIG. 19 illustrates a chart showing another proposed DOCSIS upstream channel plan for a conventional cable communication system, including two proposed channels placed below 20 MHz and requiring Synchronous Code Division Multiple Access (S-CDMA).
Figure 20:
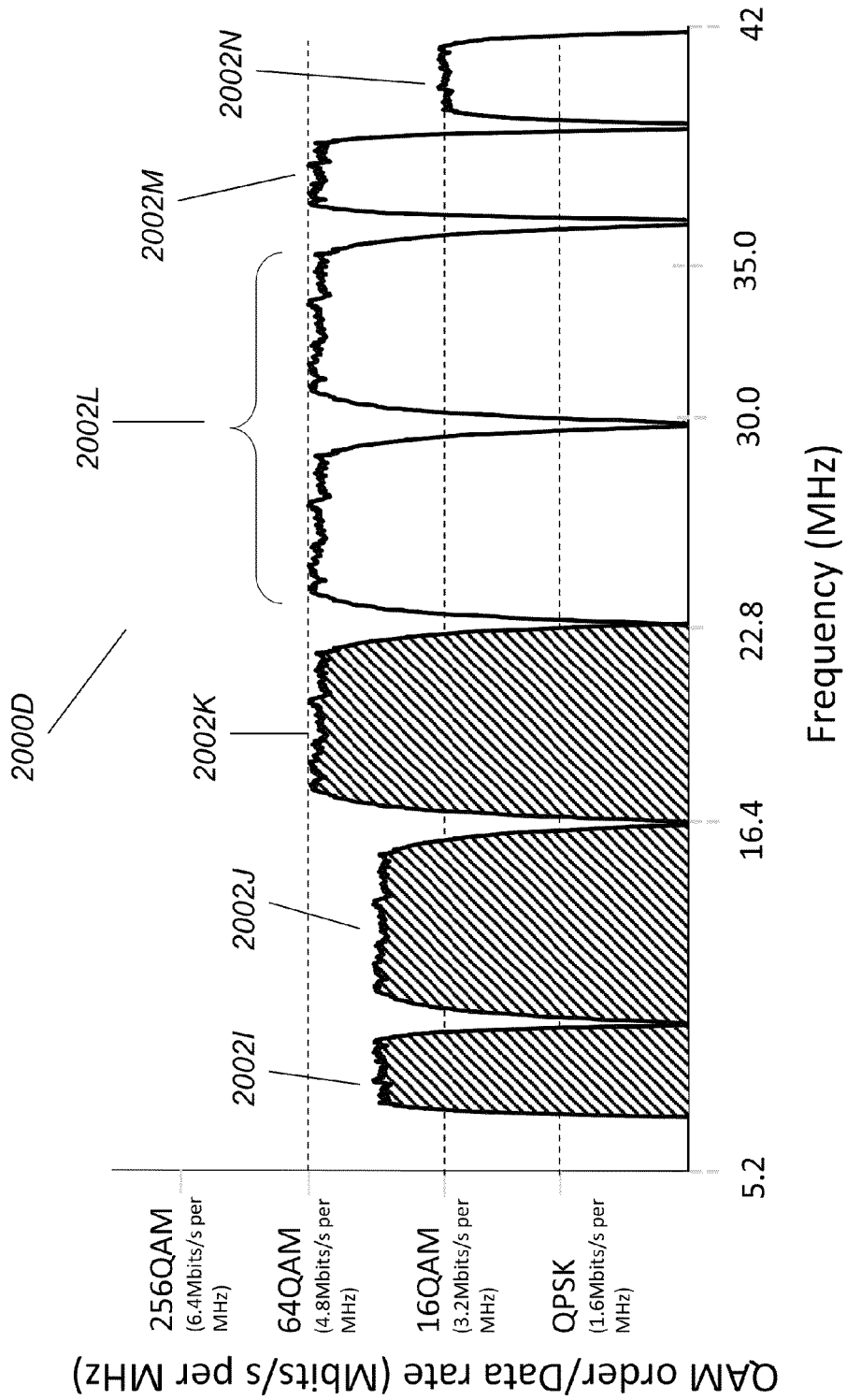
FIG. 20 illustrates a chart showing yet another proposed DOCSIS upstream channel plan for a conventional cable communication system, including three proposed channels placed below 20 MHz and requiring Synchronous Code Division Multiple Access (S-CDMA).
Figure 21:
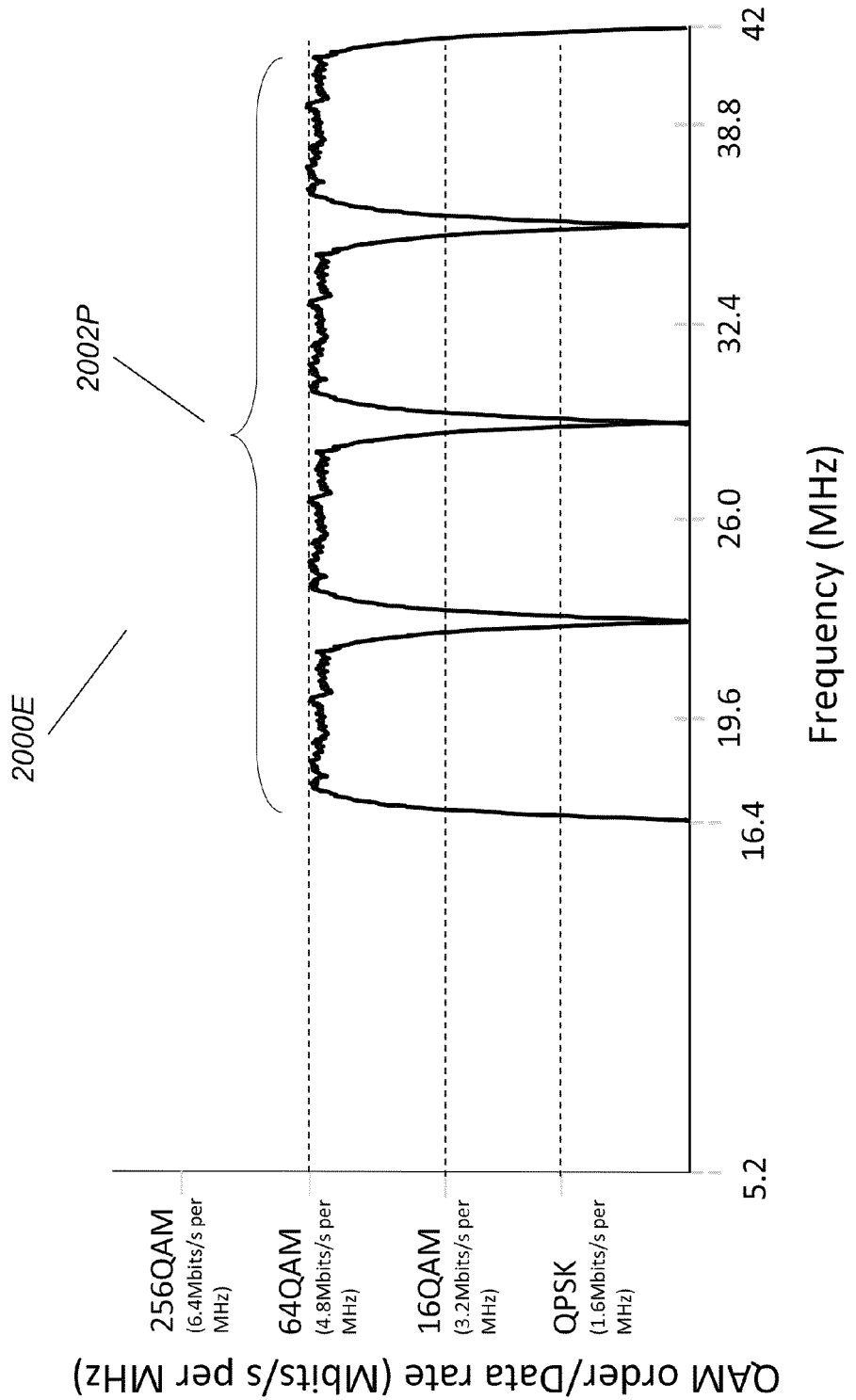
FIG. 21 illustrates a chart showing a DOCSIS upstream channel plan for a conventional cable communication system, including four 64-QAM Advanced Time Division Multiple Access (ATDMA) channels occupying the upper portion of the upstream path bandwidth of a neighborhood node.
Figure 22:
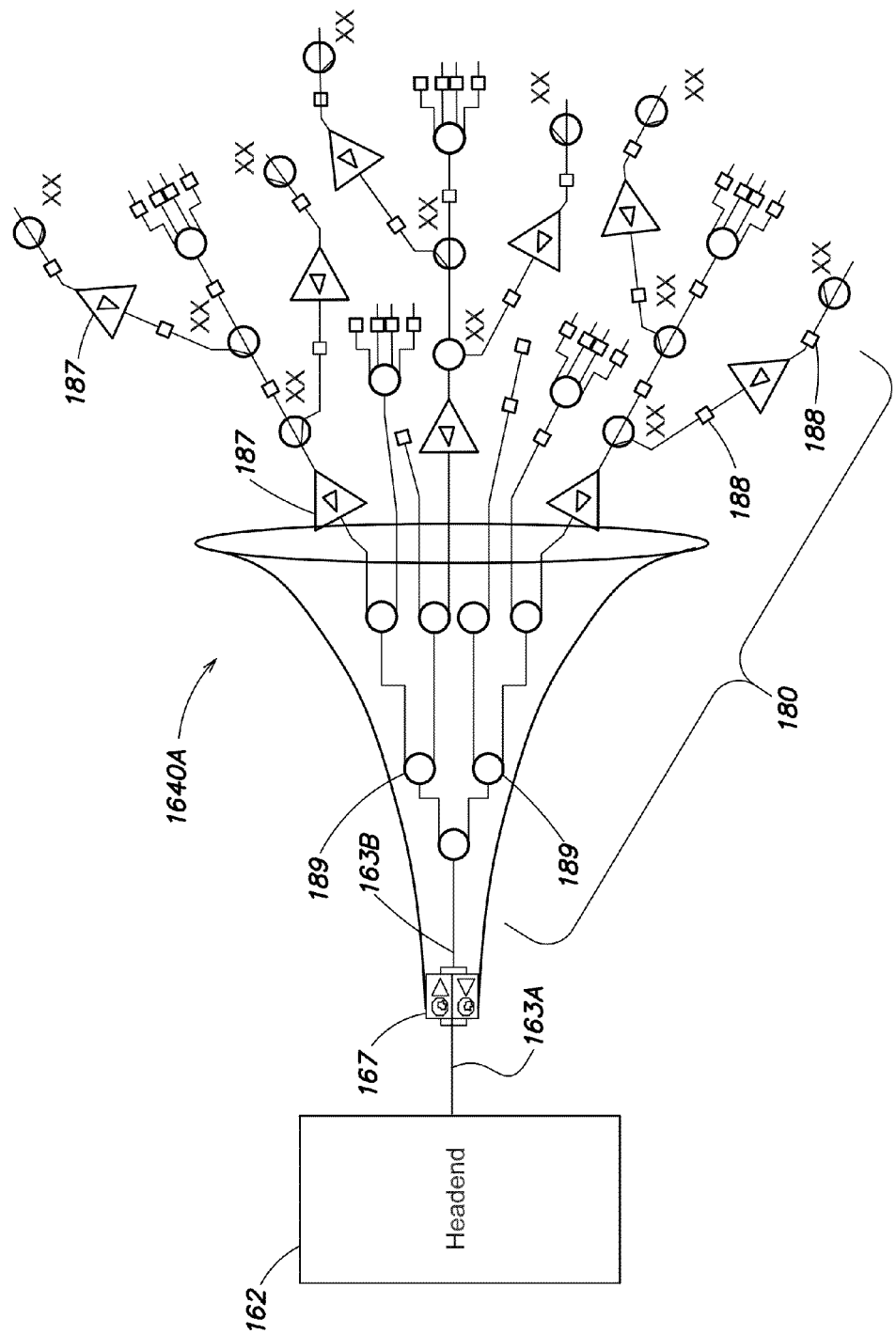
FIG. 22 shows various components of a node of the cable communication system of FIG. 1 so as to illustrate the "noise funneling effect."

Table 11 below is similar to Table 1 discussed above, and provides various parameters relating to the architecture and infrastructure of the ingress mitigated node BT-11 shown in FIGS. 24 and 25. As compared to the parameters listed in Table 1 representative of a generic "typical" neighborhood node (e.g., see Chapman, pages 35-47 and 57-62), as can be seen from Table 11 ingress mitigated node BT-11 includes fewer households passed (HHP) and subscriber premises than the typical node represented in Table 1, but has a significantly higher mileage and cascade, and includes a significantly greater number of amplifiers than does the typical node represented in Table 1. Accordingly, regarding architectural and infrastructure parameters that significantly bear upon the noise profile of a given neighborhood node (particularly in consideration of the "noise funneling effect" discussed above in connection with FIG. 12), BT-11 provides a wholly suitable example of a working neighborhood node of a cable communication system providing ongoing services to a plurality of subscribers and in which the efficacy of ingress mitigation methods and apparatus according to the present invention may be clearly demonstrated.

TABLE 11

INGRESS MITIGATED NODE BT-11

| | |
|---|---|
| Households Passed (HHP) | 285 |
| Subscriber Premises (e.g., high speed data) | 40% (114) |
| HHP Density | 27 HHP/mile |
| Node Mileage | 10.566 miles |
| Cascade | NODE + 8 |
| Amplifiers/Mile | 4.54/mile |
| Taps/Mile | 17.32/mile |
| Amplifiers | 48 |
| Taps | 183 |
| Highest Tap Value | 23 dB |
| Lowest Tap Value | 4 dB |
| Express Feeder Cable Type | 0.875 & 0.725 inch PIII |
| Largest Express Feeder Span | 2314 feet |
| Feeder (distribution) Cable Type | 0.625 & 0.500 inch PIII |
| Feeder Cable Distance to First Tap | ~200 feet |
| Largest Feeder Span | 1388 feet |
| Subscriber Drop Cable Type | Series 6 |
| Largest Drop Cable Span | 200 feet |
| Maximum Subscriber Modem Transmit Power | 55 dBmV |

In the ingress mitigated node BT-11, the subscriber premises constituted a service group sharing a QPSK upstream physical communication channel having a carrier frequency of approximately 25 MHz and a channel bandwidth of 3.2 MHz. The channel utilization index of the upstream channel was at least 50% or greater, and on the order of approximately 70% during peak usage periods.

Figure 27:
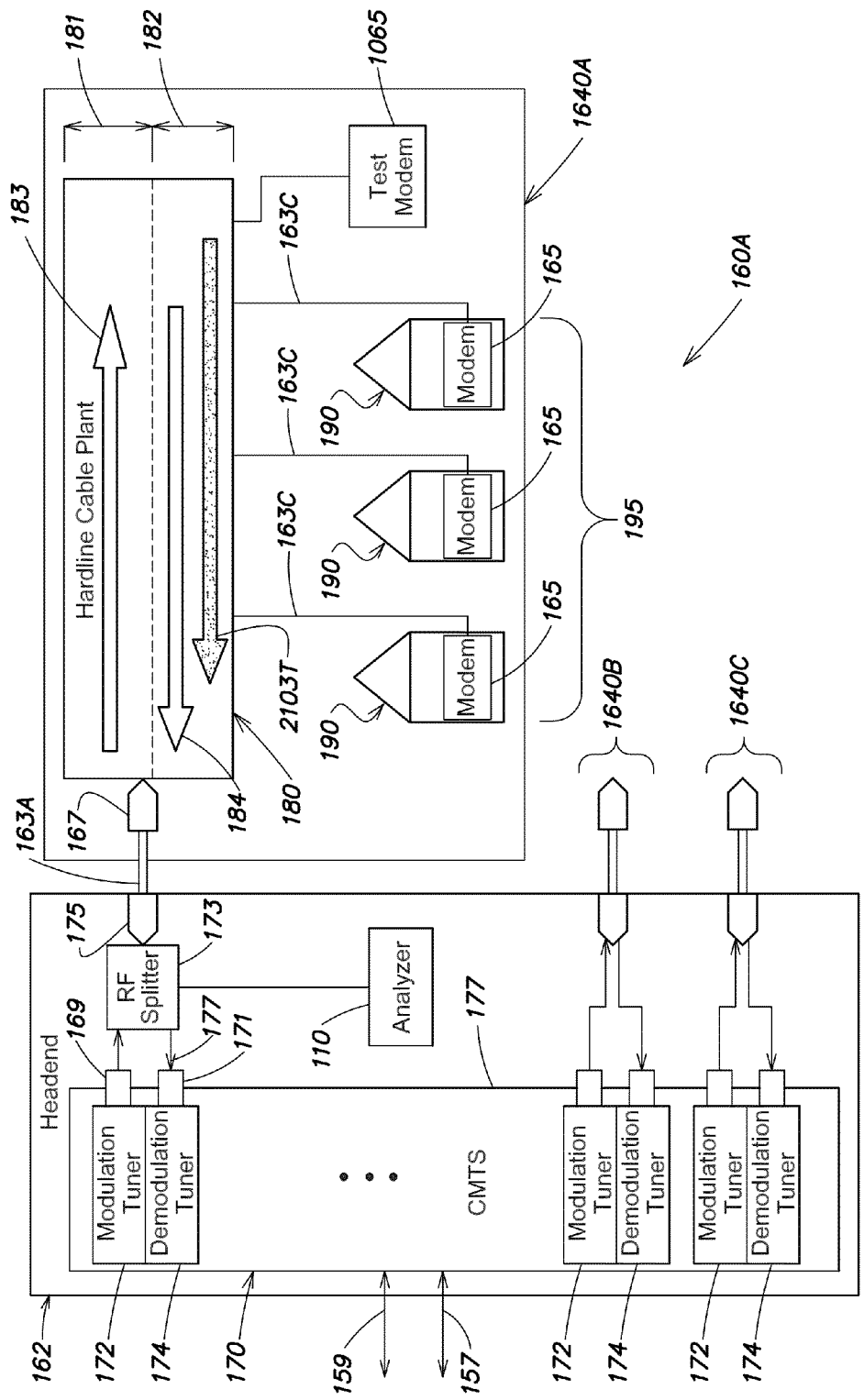
FIG. 27 is an illustration similar to FIG. 1 showing a cable communication system according to one embodiment of the present invention, in which ingress mitigation methods and apparatus according to various embodiments were employed and in which the efficacy of such methods and apparatus was demonstrated.

As part of the test methodology to demonstrate the efficacy of ingress mitigation on the ingress mitigated node BT-11, a test modem was deployed in the neighborhood node to transmit QAM RF signals having a carrier frequency of 16.4 MHz and carrying test information representing additional upstream information ("simulated upstream traffic") from a theoretical additional service group of subscriber premises in the node. FIG. 27 is an illustration similar to FIG. 1 showing a cable communication system 160A according to one embodiment of the present invention, in which the neighborhood node 164A represents the ingress mitigated node BT-11 shown in FIG. 24, and in which an exemplary test modem 1065 is shown coupled to the hardline coaxial cable plant 180 of the ingress mitigated node BT-11, in addition to the subscriber modems 165 forming the service group 195. The test modem 1065 was mounted on a utility pole in a protective housing, together with a wireless router coupled to the test modem (to provide a controllable source of test information for transmission as additional simulated upstream traffic). The test modem 1065 was coupled to a corresponding subscriber service drop, which drop in turn was coupled to an available port of a tap in the hardline cable plant. The wireless router was in communication with a server at the headend 162, which server was running a script to poll the router at its designated IP address to continually request the router's configuration set-up webpage (including various .html and .jpeg content), which served as the additional simulated upstream traffic.

A given QAM RF signal transmitted by a test modem 1065 defined a physical communication test channel 2103T in the upstream path bandwidth 182 of the ingress mitigated node; in various tests, a channel bandwidth of 3.2 MHz, and QAM modulation orders of 4 (QPSK) and 16, respectively were employed for the QAM RF signals transmitted by test modem 1065 and constituting the test channel 2103T. From empirical observations of transmission bursts of the test channel 2103T in free-run spectrums displayed by a spectrum analyzer serving as the analyzer 110 at the headend 162, the additional simulated upstream traffic constituted a channel utilization index for the test channel 2103T on the order of approximately 20% to 30%. Examples of modems employed for test modems represented in FIG. 27 by the test modem 1065, as well as subscriber modems 165 in the ingress mitigated node BT-11 (and modems used in other neighborhood nodes of the cable communication system 160A) include the Motorola Surfboard series (e.g., Motorola SB 4200, 5101, 5120, SBG 900), Ambit models U100018 and U100019, and Arris models 502G, 602G and 652G media terminal adaptors. The CMTS 170 at the headend 162 of the cable communication system 160A was a Cisco 7200 series VXR running DOCSIS version 1.1, and both the test modems and the CMTS 170 implemented Reed Solomon Forward Error Correction (FEC), pre-equalization/adaptive equalization, and Advanced Time Division Multiple Access (ATDMA) for the test channels.

With respect to other elements of infrastructure not specifically indicated in Table 11 above, in the cable communication system 160A shown in FIG. 27 the RF/optical bridge converter 167 in the ingress mitigated node BT-11 and the RF/optical bridge converter 175 at the headend 162 were ADC Homeworx ISX 3040 converters with 1310 nanometer optics. FIG. 27 also illustrates that, in addition to the analyzer 110 coupled to the RF splitter 173 at the headend 162, a QAM analysis device constituting test and/or monitoring equipment 256 (also see FIG. 4) was coupled to the RF splitter 173 to provide one or more of CNR values, unequalized and equalized MER values, and constellation diagrams for received and demodulated QAM RF signals corresponding to test channels exemplified by the test channel 2103T. In the various tests performed, an HP 8591C or an Agilent n9000A spectrum analyzer was employed for the analyzer 110, and the JDSU PathTrack™ HCU-200 Integrated Return Path Monitoring Module (e.g., see http://www.jdsu.com/ProductLiterature/hcu200_ds_cab_tm_ae.pdf) was employed as the test and/or monitoring equipment 256 used for various measurements of channel metrics reported herein.

II. Ingress Mitigation Systems And Apparatus

Figure 28:
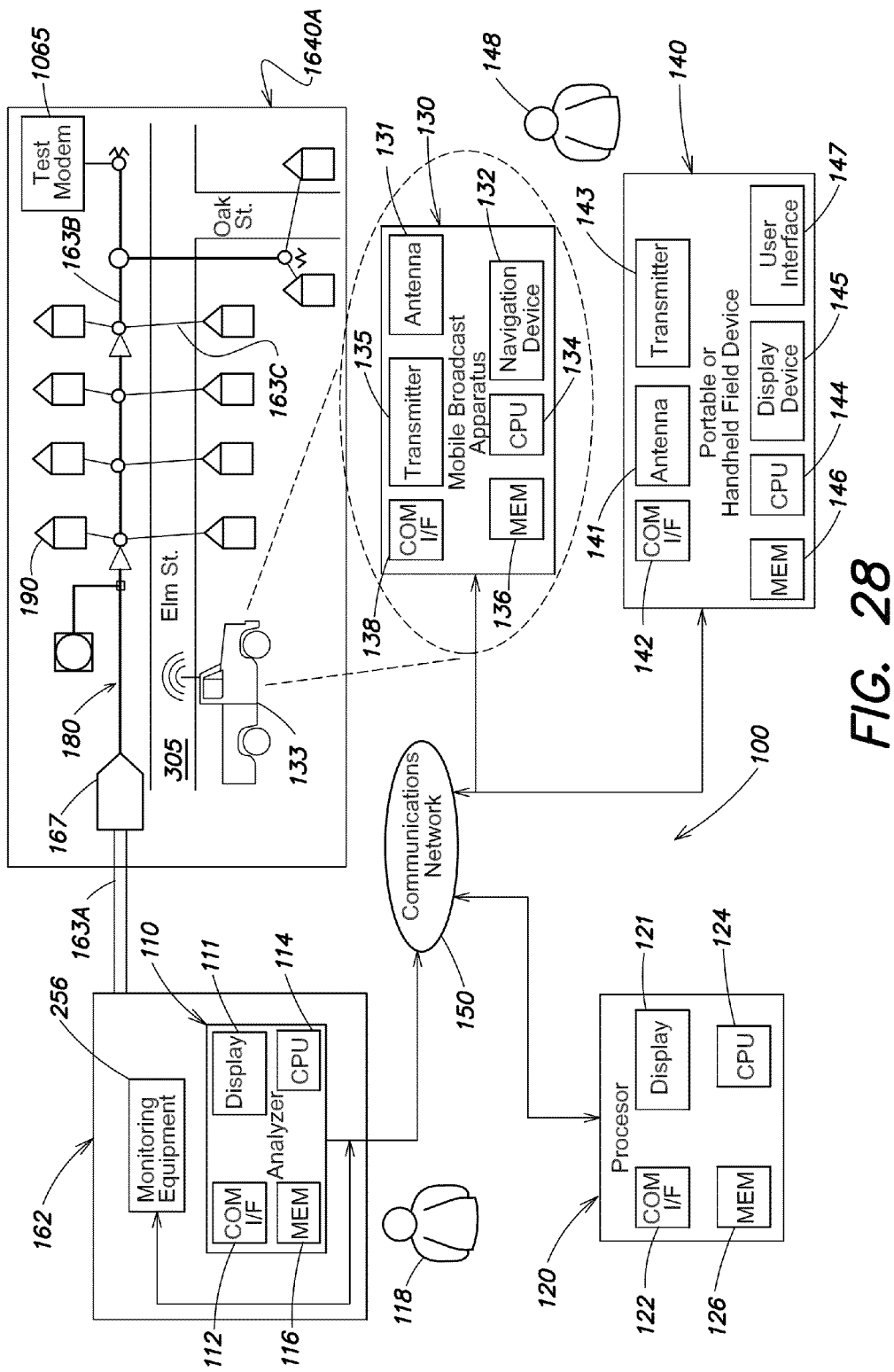
FIG. 28 illustrates a functional block diagram of an ingress detection system, according to one embodiment of the present invention, for accurately and efficiently identifying points of signal ingress in a cable communication system and facilitating remediation of same.

FIG. 28 illustrates a functional block diagram of an ingress detection system 100, according to one embodiment of the present invention, for accurately and efficiently identifying points of signal ingress in a cable communication system and facilitating remediation of same (again, the efficacy of the system 100 was demonstrated in a functioning cable communication system as discussed above).

In various aspects, the ingress detection system 100 includes one or more instrumentation components and/or computing devices (e.g., one or more computers, portable/handheld computing devices, etc.), and utilizes a communications infrastructure (which at least in part may employ network elements and/or dedicated communication links, components, devices, etc.) to provide communication of information amongst respective components/devices of the system and various parties from which relevant information may be acquired and/or to which information may be provided. While FIG. 28 illustrates a number of system components/devices and parties that may exchange information with each other as part of implementing the ingress detection system 100, it should be appreciated that not all of the components/devices/parties shown in FIG. 28 are necessarily required to implement the various embodiments discussed herein of ingress detection systems, and associated methods and apparatus. In particular, in various embodiments, some or all of the components/devices shown in FIG. 28, in a variety of combinations, may be employed to realize a particular implementation of an ingress detection system, and various ingress detection and mitigation methods, according to the present invention.

Figure 2:
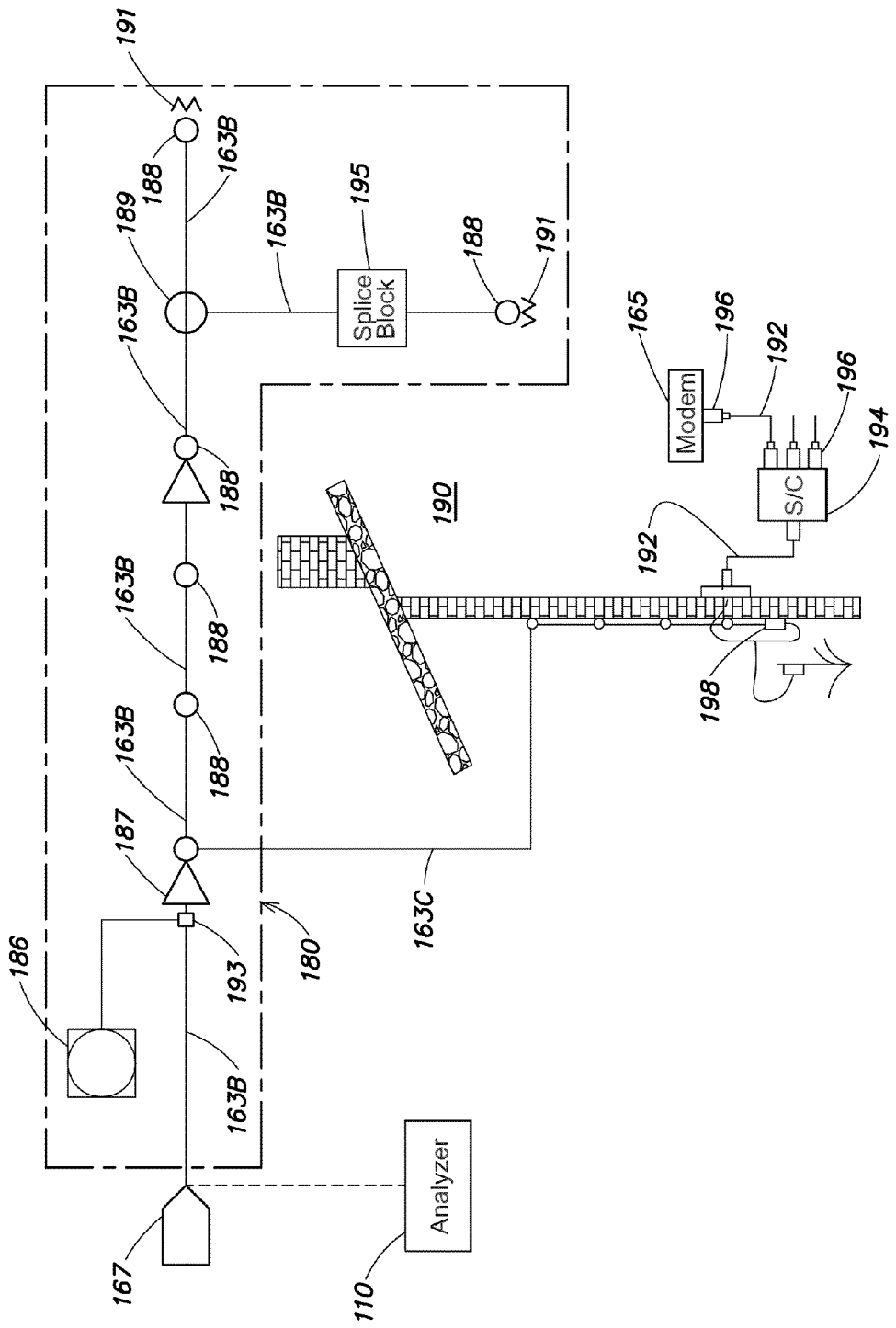
FIG. 2 illustrates various details of a hardline coaxial cable plant and an example subscriber premises of the cable communication system shown in FIG. 1.
Figure 4:
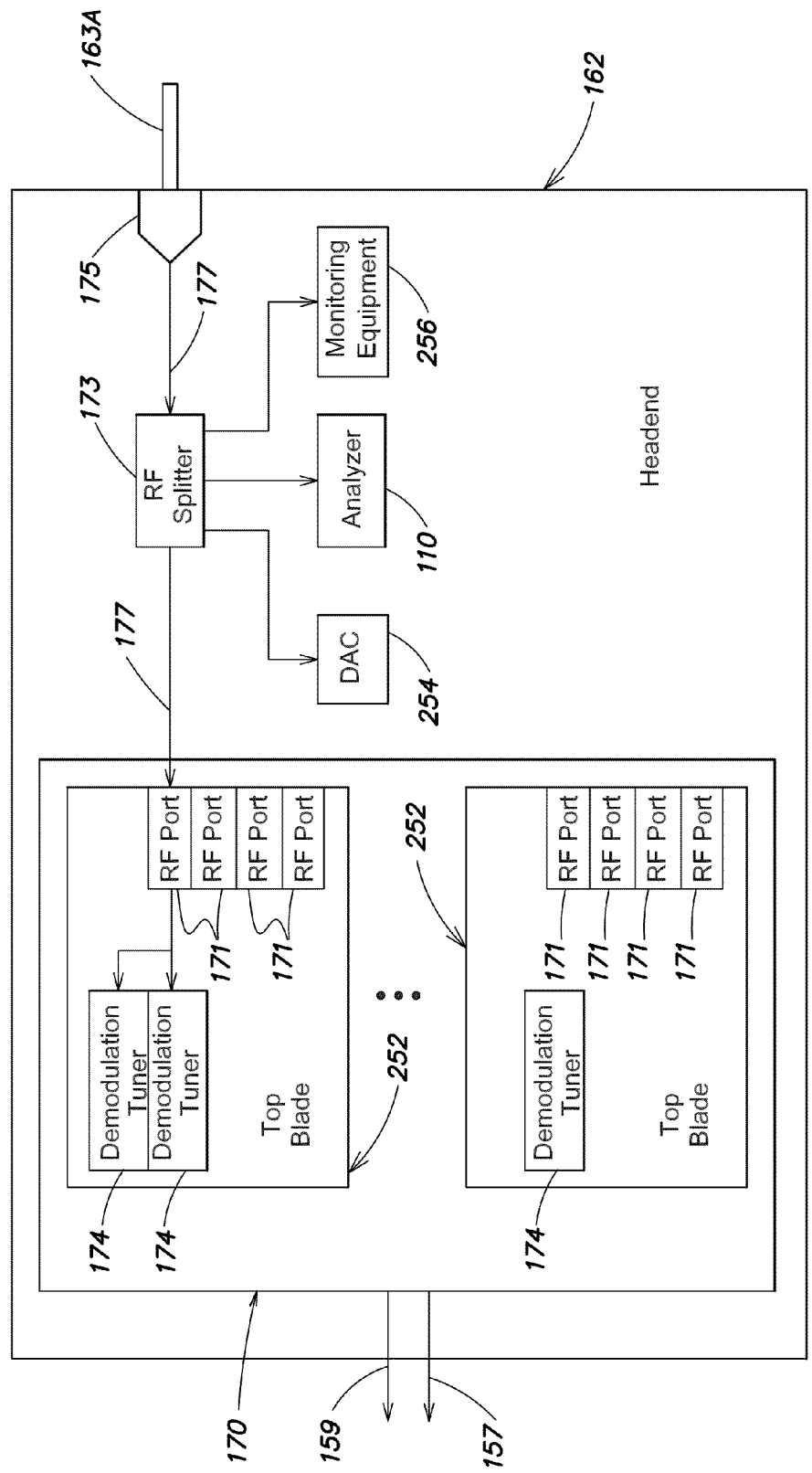
FIG. 4 illustrates various aspects of a headend of the cable communication system shown in FIG. 1.
Figure 5:
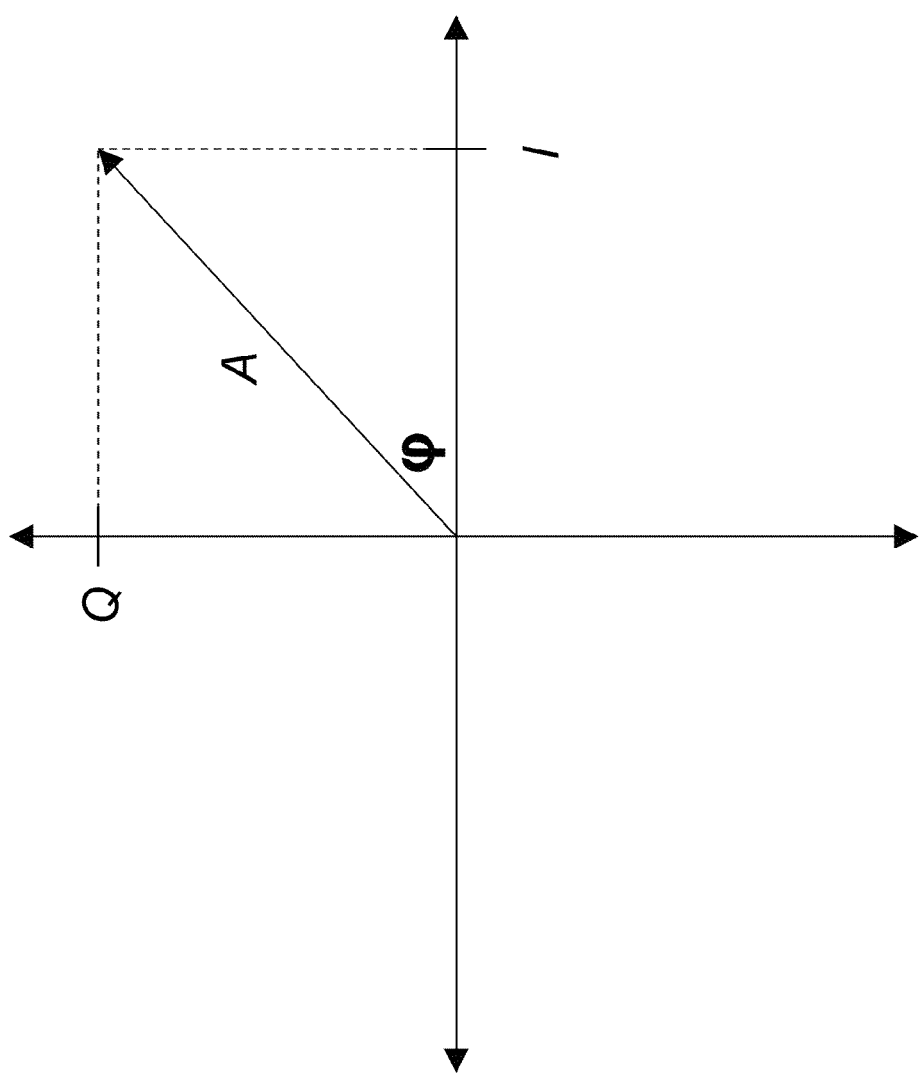
FIG. 5 is a graph illustrating a plot of quadrature amplitude modulation (QAM) signal amplitude and phase in terms of in-phase and quadrature components to facilitate an understanding of information transmission via QAM signals in a cable communication system similar to that shown in FIG. 1.
Figure 6:
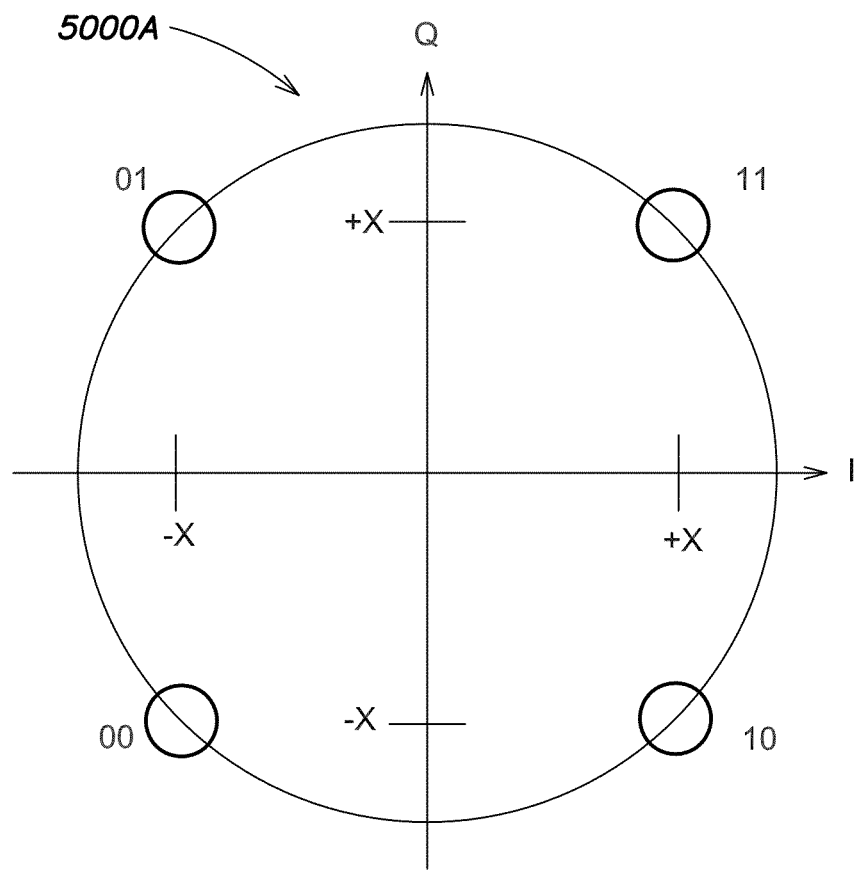
FIG. 6 illustrates a constellation diagram for quadrature phase shift keyed (QPSK) (i.e., 4-QAM) modulation that may be employed for transmission of information in a cable communication system similar to that shown in FIG. 1.
Figure 7:
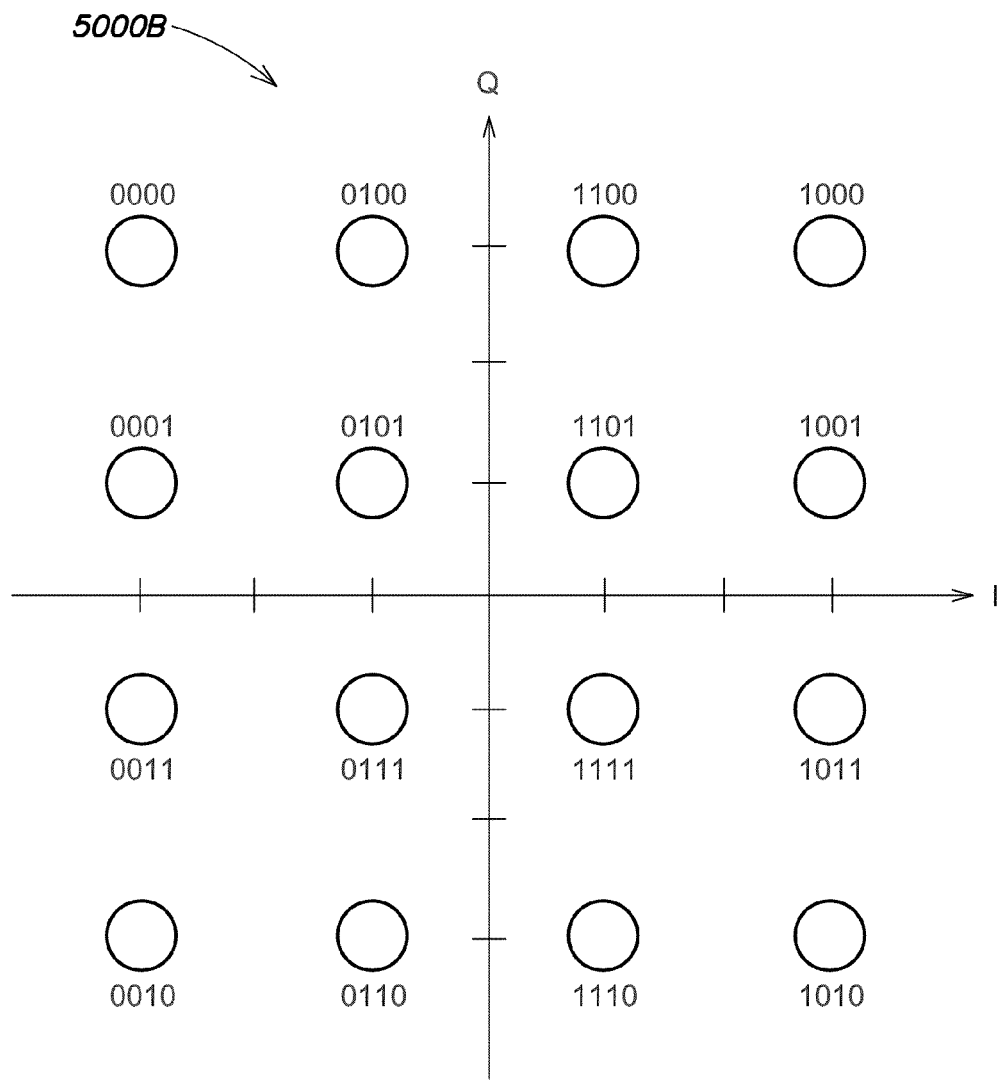
FIG. 7 illustrates a constellation diagram for 16-QAM that may be employed for transmission of information in a cable communication system similar to that shown in FIG. 1.
Figure 8:
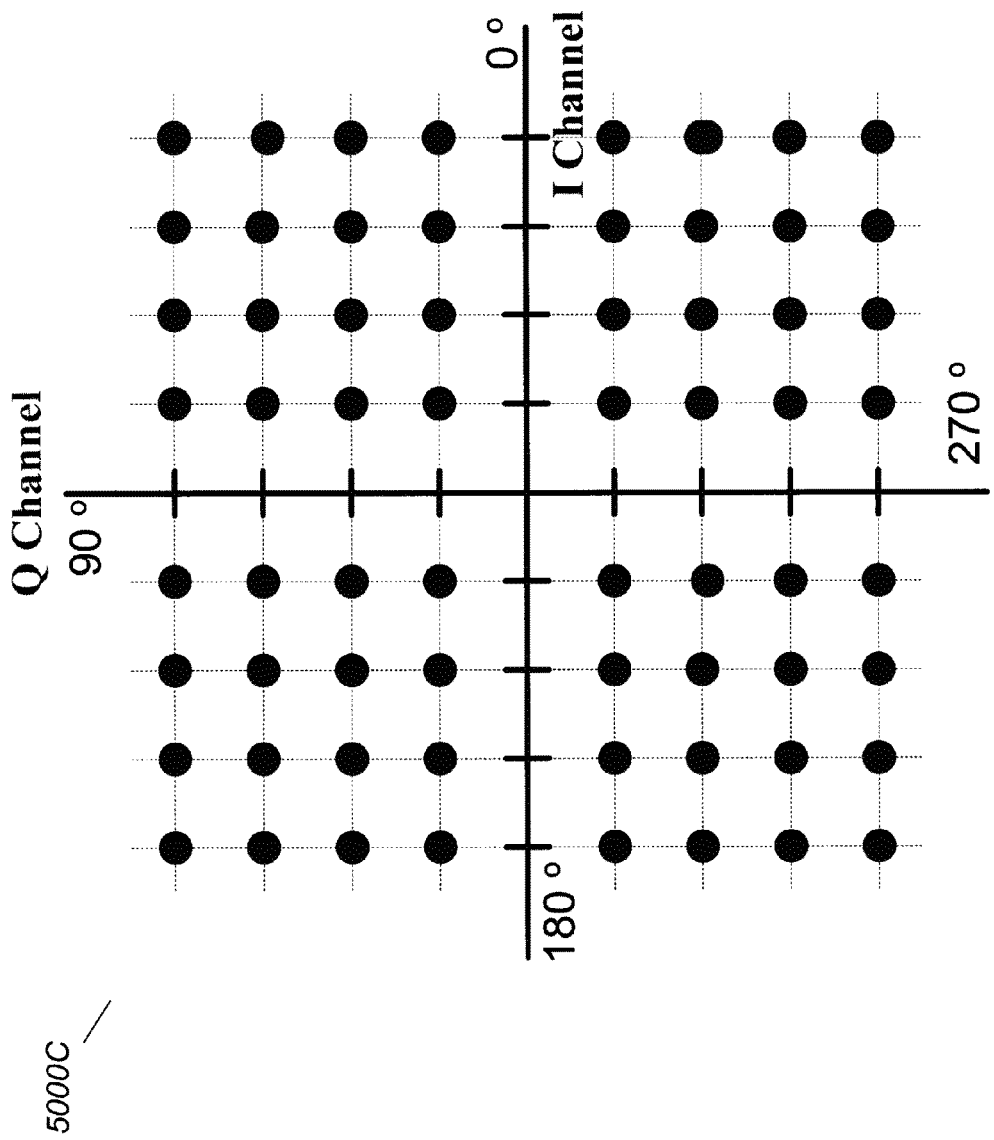
FIG. 8 illustrates a constellation diagram for 64-QAM that may be employed for transmission of information in a cable communication system similar to that shown in FIG. 1.
Figure 9:
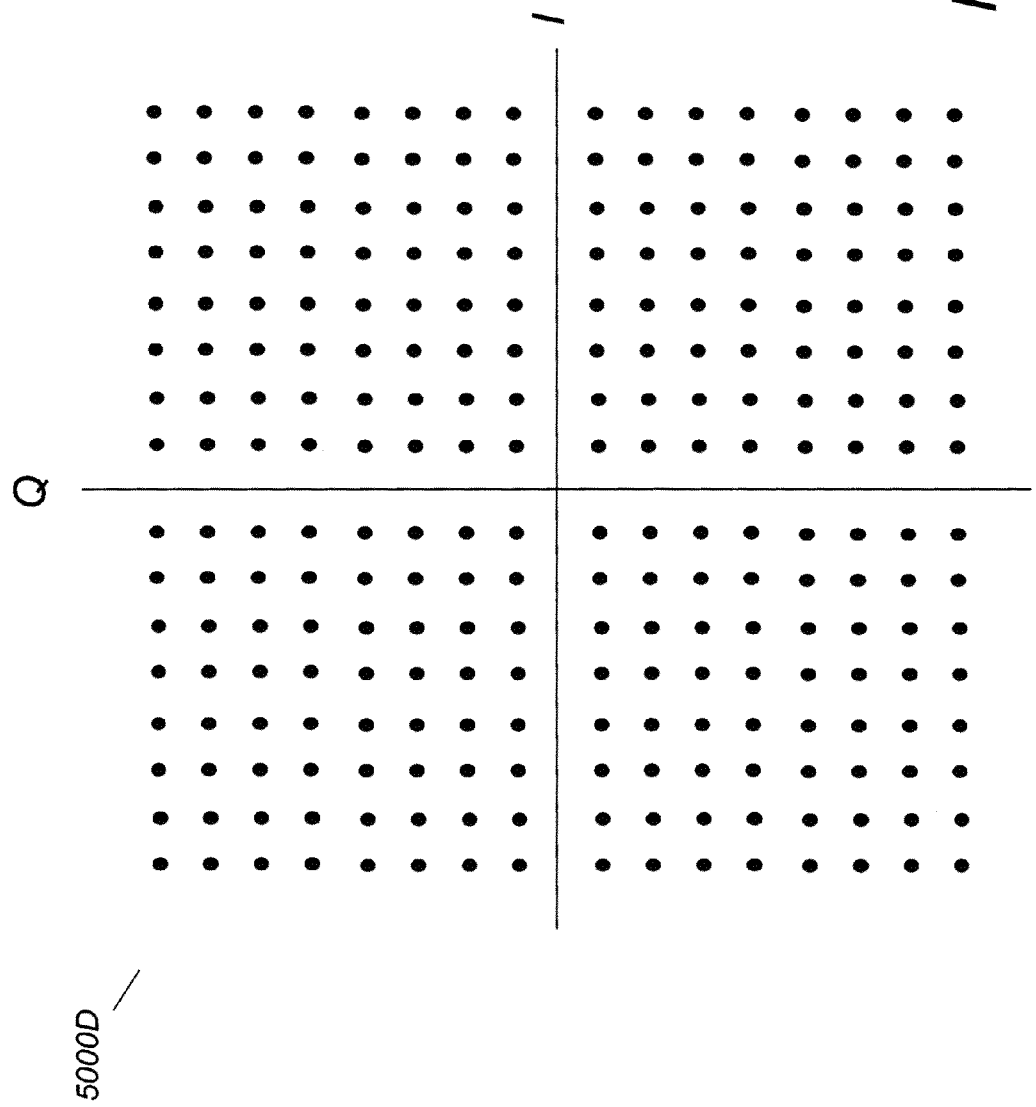
FIG. 9 illustrates a constellation diagram for 256-QAM that may be employed for transmission of information in a cable communication system similar to that shown in FIG. 1.
Figure 10:
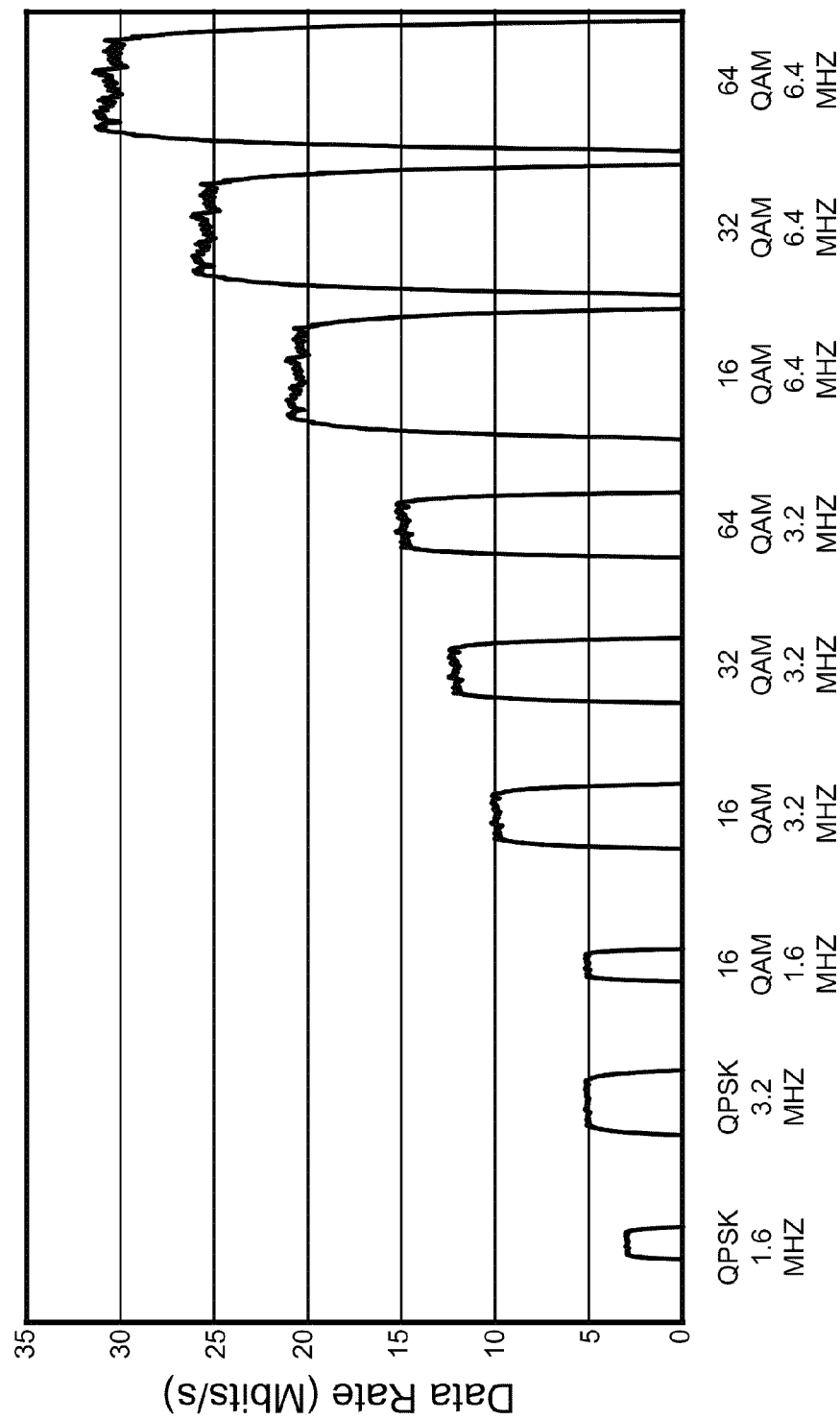
FIG. 10 illustrates a bar graph showing different modulation orders for QAM, different bandwidths for communication channels over which information is transported via QAM RF signals, and corresponding maximum deployed (or "raw") data rates for the channels.
Figure 11:
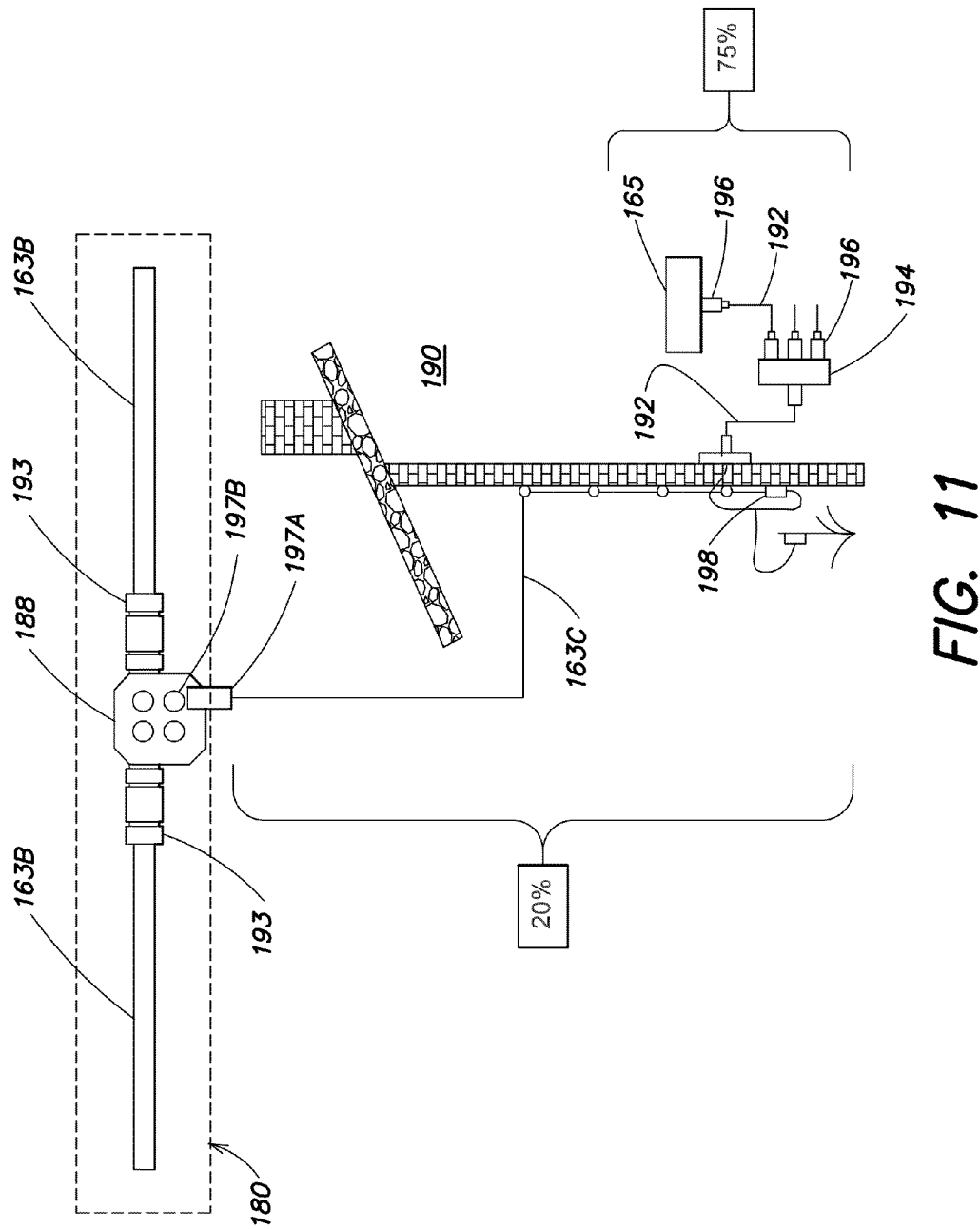
FIG. 11 illustrates a portion of the hardline coaxial cable plant, and details of a subscriber premises coupled to the hardline coaxial cable plant of the cable communication system shown in FIG. 1.

In general, as shown in FIG. 28 the ingress detection system 100 may include, but is not limited to, an analyzer 110 (e.g., a spectrum analyzer or a tuned receiver disposed in the headend 162 of a cable communication system), test and/or monitoring equipment 256 (e.g., a QAM analysis device, also disposed in the headend 162), a processor 120, a mobile broadcast apparatus 130, a portable or handheld field device 140 (used by a field technician) and a communication network 150. The system 100 is implemented in connection with a cable communication system (e.g., similar to the cable communication system 160 shown in FIG. 1 or the cable communication system 160A shown in FIG. 27). For purposes of illustration, FIG. 28 shows a portion of one neighborhood node 164A coupled to the headend 162 of such a cable communication system, including various elements of the neighborhood node as depicted in FIGS. 1, 2 and 25 (e.g., fiber optic cable 163A, optical/RF bridge converter 167, RF hardline coaxial cable plant 180, hardline coaxial cable 163B, subscriber service drops 163C, subscriber premises 190, test modem 1065). FIG. 28 also illustrates a portion of a neighborhood node drive path 305 (e.g., labeled in FIG. 28 as "Elm St." and "Oak St."), proximate to the hardline coaxial cable plant 180, along which the mobile broadcast apparatus 130 is driven so as to effectively traverse and ensure substantially full coverage of the neighborhood node 164A.

In the system 100 shown in FIG. 28, communication network 150 provides for communication between two or more components/devices relating to the ingress detection system 100. For example, network 150 provides the communication infrastructure by which information may be exchanged between any two or more of the mobile broadcast apparatus 130, portable or handheld field device 140, processor 120, the analyzer 110, and the test and/or monitoring equipment 256. Communication network 150 may be, for example, any local area network (LAN) and/or wide area network (WAN) for connecting to the Internet. Communication network 150 also may be implemented at least in part by a wired/wireless telecommunications network, and/or may facilitate radio communication (e.g., two-way radio transmission via personal communication devices).

As shown in FIG. 28, respective components/devices of the ingress detection system 100 may include one or more communication interfaces to facilitate communication of various information. For example, a communication interface 138 of mobile broadcast apparatus 130, a communication interface 142 of portable or handheld field device 140, a communication interface 122 of processor 120, and a communication interface 112 of analyzer 110 may be employed to provide connectivity to other components/devices of the system 100 (e.g., via communication network 150) (the test and/or monitoring equipment 256 similarly may include such a communication interface). Communication interfaces 112, 122, 138 and 142 may be any wired and/or wireless communication interfaces by which information may be exchanged between any components/devices of the ingress detection system 100. Example wired communication interfaces may include, but are not limited to, USB ports, RS232 connectors, RJ45 connectors, and Ethernet connectors. Example wireless communication interfaces may include, but are not limited to, Bluetooth technology, Wi-Fi, Wi-Max, IEEE 802.11 technology, radio frequency (RF), LAN, WAN, Internet, shared wireless access protocol (SWAP), Infrared Data Association (IrDA) compatible protocols and other types of wireless networking protocols, and any combinations thereof.

As also shown in FIG. 28, one or more components/devices of ingress detection system 100 generally include a memory (e.g., one or more computer-readable storage media) to store processor-executable instructions as well as other data (e.g., see memory 116, 126, 136 and 146), and a display device to facilitate display of various information (e.g., see example display devices 111, 121, 145; while not explicitly shown in FIG. 28, any of the components/devices constituting the system 100 may include a display device). One or more components/devices also may include one or more processing units (e.g., a microprocessor, microcontroller, CPU, FPGA, etc.; see example processing units 114, 124, 134 and 144) communicatively coupled to the communication interface and the memory, wherein upon execution of the processor-executable instructions by the processing unit, the processing unit performs a variety of functions as set forth in greater detail below for respective components/devices. Generally speaking, many of the functionalities described herein and attributed to various components/devices of, or in communication with, the ingress detection system 100 shown in FIG. 28 may be encoded as processor-executable instructions stored in/on one or more computer-readable storage media. Similarly, while not shown explicitly for all components/devices of the ingress detection system 100, any one or more such components/devices may include a user interface to facilitate control and/or exchange of information between a user/technician (e.g., the technicians 118 or 148) and the component/device.

Although some aspects of various embodiments may take advantage of one or more wireless communication networks (e.g., at least a portion of the communication network 150) to afford real-time or near real-time relaying, processing, and display of various information relating to ingress detection and remediation, such communication networks are not required for the successful operation of the system 100. For example, due to a lack of wireless coverage in some particular area or a financially driven decision to forgo additional wireless data expenses, there may be situations in which real-time communications are not available. In such cases the various components of the system 100 may be used to transmit, receive, record, store, and/or process various information for further use/processing at a later time, which may be merely when cellular connectivity is again available (e.g., a technician travels back into an area with cellular coverage), or at the end of a shift when a technician might transfer field-collected data to the processor 120 (i.e., via Wi-Fi, Ethernet, memory card, thumb drive, etc.). Specifically, the headend-based equipment (e.g., the analyzer 110 and/or test/monitoring equipment 256) may measure and record various information, while field-based equipment separately may record various information (e.g., transmit location, bearing, pitch, roll, transmit on/off status, ambient noise/ingress, etc.), which may at a later time be combined via automated (e.g., restored wireless communication connection) and/or manual (transfer of information to the processor 120 via a portable memory device) techniques.

Similarly, historical data may be loaded onto a field device (e.g., the mobile broadcast apparatus 130 or the portable/handheld field device 140) so that it is viewable in a field location where no wireless communication service may be available. Visualizations of such data, discussed in greater detail below, may include a time line that may be manipulated for reviewing data non-linearly, or replaying the data in conjunction with a technician's current position to simulate an original walk-through/drive-through of the neighborhood node or a portion thereof based on geographic position and signal amplitude information (first and second information records, as discussed in greater detail below).

A. Mobile Broadcast Apparatus

The mobile broadcast apparatus 130, employed during phase 1 ingress detection activity (discussed in detail further below in connection with FIG. 29), may include one or more processing units (CPU) 134, one or more communication interfaces 138, memory 136, a transmitter 135, an antenna 131, and a navigation device 132. The electronics portion of the mobile broadcast apparatus may be implemented in various form factors, examples of which include, but are not limited to, computing or telecommunications devices such as a portable computer, tablet device, a personal digital assistant (PDA), smart phone, cellular radio telephone, mobile computing device, touch-screen device, touchpad device, or generally any device including, or connected to, a processor and display device.

Navigational device 132 is co-located with the mobile broadcast apparatus 130 and reliably records the geographical position of the mobile broadcast apparatus in the field as a function of time (e.g., the navigational device logs, as a "first record," geographic coordinates such as GPS coordinates, together with a time stamp). Examples of navigational devices include, but are not limited to, conventional dedicated GPS devices or telecommunication devices (e.g., "smart" phones) configured with navigational functionality. The navigational device 132 may include a global positioning system (GPS) receiver or a global navigation satellite system (GNSS) receiver; in one aspect, such a receiver may provide a data stream formatted as a National Marine Electronics Association (NMEA) data stream. In one exemplary implementation, the navigational device may include an ISM300F2-C5-V0005 GPS module available from Inventek Systems, LLC of Westford, Mass. (see www.inventeksys.com/html/ism300f2-c5-v0005.html). The Inventek GPS module includes two UARTs (universal asynchronous receiver/transmitter) for communication with a processor, supports both the SIRF Binary and NMEA-0183 protocols (depending on firmware selection), and has an information update rate of 5 Hz. A variety of geographic location information may be requested from and provided by the navigational device 132 including, but not limited to, time (coordinated universal time—UTC), date, latitude, north/south indicator, longitude, east/west indicator, number and identification of satellites used in the position solution, number and identification of GPS satellites in view and their elevation, azimuth and SNR values, and dilution of precision values. Accordingly, it should be appreciated that in some implementations the navigational device 132 may provide a wide variety of geographic information as well as timing information (e.g., one or more time stamps).

In another exemplary implementation, the navigational device may include an HTC EVO mobile telecommunication device (see http://www.htc.com/us/products/evo-sprint) running the Ride Logger application (see http://www.appbrain.com/app/ride-logger/com.nickholliday.ridelogger), which captures the following fields: time, longitude, latitude, speed (mph), distance (miles), averageSpeed (mph), bearing, accuracy, satellites, altitude (feed), and acceleration (g).

In one embodiment, as shown in FIG. 28, mobile broadcast apparatus 130 may comprise, be coupled to or situated in, a vehicle 133. In various implementations, the vehicle may be a motorized vehicle (e.g., car, truck, motorized cart, all-terrain/off-road vehicle, etc.) or an alternatively-powered vehicle (e.g., a bicycle). The type of vehicle employed in connection with the mobile broadcast apparatus 130 may depend at least in part on various aspects of the terrain generally in a given neighborhood node, and more specifically the nature of the neighborhood node drive path over which the vehicle traverses (e.g., paved, unpaved, readily accessible, partially obstructed, etc.), which in turn may depend at least in part on the topography of the geographic area particularly traversed by the hardline coaxial cable plant (to which the neighborhood node drive path generally remains proximate). In some embodiments, the mobile broadcast apparatus 130 may be carried/transported by a person on foot (e.g., in a backpack), or by a person pushing, pulling or otherwise operating a non-motorized vehicle or motorized vehicle.

In one example, the transmitter 135 may be a CB radio, for broadcasting a test signal at one or more frequencies falling within an upstream path bandwidth of the node(s) (e.g., 5 MHz to at least 42 MHz). In one particular implementation, the transmitter 135 is configured to transmit the test signal having a test signal frequency of approximately 27 MHz; however, as discussed further below, it should be appreciated that a variety of test signal frequencies are contemplated according to various embodiments. Also, the test signal may be broadcast at various power levels, depending in part on one or more of the transmitter design, the frequency or frequencies at which the test signal is transmitted, any applicable regulatory guidelines that may apply regarding transmission of signals, and proximity of the neighborhood node drive path to the hardline coaxial cable plant of the neighborhood node under evaluation; in one example, the test signal may be broadcast with relatively steady power on the order of approximately 2 Watts to 4 Watts (during evaluation of ingress mitigated node BT-11 shown in FIG. 24, a power level of the transmitter 135 for transmitting the test signal from the mobile broadcast apparatus 130 was approximately 2 Watts). A suitable non-limiting example of CB radio serving as the transmitter 135 is provided by the Cobra Roadtrip (see https://www.cobra.com/detail/hh-road-trip-handheld-cb-radio-with-weather-and-soundtracker.cfm).

In various embodiments, the transmitter 135, alone or in combination with the processing unit(s) 134, may be configured to transmit the test signal in a variety of manners. For example, in one implementation, the mobile broadcast apparatus 130 transmits the test signal as an essentially continuous carrier wave having a carrier frequency in the upstream path bandwidth, with no information modulated onto the carrier wave (i.e., simply a "bare tone"). In other embodiments discussed further below, one or both of the transmitter 135 and the processing unit(s) 134 may be configured such that the mobile broadcast apparatus 130 broadcasts the test signal at one or more different power levels (e.g., in some cases having sufficiently low power so as to not require licensure from one or more regulatory authorities), one or more different fixed or varying carrier frequencies (e.g., discrete or simultaneous multiple carriers as a function of time), and/or using any one or more of a variety of modulation techniques (e.g., amplitude modulation, frequency modulation, phase modulation, QAM, pulsed test signals, time division multiplexed test signals, spread-spectrum modulated test signals, etc.).

Since the mobile broadcast apparatus 130 broadcasts a test signal in a given neighborhood node of a cable communication system at a known time and/or for a known time period (e.g., either continuously over a given time period, or periodically at known times), the identification of potential points of ingress in the neighborhood node does not depend on potentially intermittent, random and unpredictable signals generated by an actual ingress source. Thus, the mobile broadcast apparatus significantly reduces the time and effort needed to identify potential points of ingress in a cable communication system.

B. Portable or Handheld Field Device

In phase 2 of an ingress detection and remediation method according to one embodiment of the present invention (discussed further below in connection with FIG. 48), a field technician 148 uses information collected and/or generated during phase 1 activity (e.g., a neighborhood node ingress map, discussed further below in connection with FIGS. 33 through 47) to locally home-in on and verify specific locations of ingress in a neighborhood node under evaluation to particularly identify and isolate one or more faults in the neighborhood node (e.g., faulty system elements) that are directly responsible for ingress. In particular, based on one or more maps generated in phase 1, a field-technician 148 may proceed to one or more particular locations in the neighborhood node where the map(s) indicate potential points of ingress, and employ a portable or handheld field device 140 as a test instrument to home-in on potential ingress points by traversing a target ingress problem area with greater geographical resolution (e.g., on foot, and/or with the aid of a "bucket" truck in the case of hardline coaxial cable plant components disposed aerially on utility poles).

As with other components of the ingress detection system 100, in some implementations the portable or handheld field device 140 may include or be associated with a computing device, such as a portable computer, tablet device, a personal digital assistant (PDA), smart phone, cellular radio telephone, mobile computing device, touch-screen device, touchpad device, or generally any device including, or connected to, a processor and display. More specifically, the field device 140 may include one or more antenna 141 and a transmitter 143 coupled to the antenna to transmit a local test signal in an upstream path bandwidth of the neighborhood node under evaluation. The field device also may include one or more communication interfaces 142 to receive various information including, but not limited to: 1) one or more neighborhood node ingress maps; 2) one or more other maps/other information associated with the neighborhood node ingress map(s) to facilitate fault location; and/or 3) signal information relating to signal amplitudes representing strengths of a received upstream local test signal at the headend of the cable communication system, based on the local test signal transmitted by the transmitter 143 and ingress of the local test signal into one or more faults in the hardline coaxial cable plant, one or more subscriber service drops, and/or one or more subscriber premises.

The field device 140 also may include one or more display devices 145 to display one or more neighborhood node ingress maps and/or other maps/images corresponding to the geographic area covered by the neighborhood node ingress map, so as to facilitate an orientation of the ingress profile in the neighborhood node under evaluation to the environmental surroundings and/or cable communication system infrastructure. The display device 145 also may display one or more indications, based at least in part on the received signal information, corresponding to the signal amplitudes representing strengths of the received upstream local test signal at the headend of the cable communication system. In some implementations, the field device 140 also may include memory 146 and one or more processing units (CPUs) 144 to facilitate one or more of the reception, processing, display and/or indication of various information, as well as transmission of the local test signal.

In one exemplary implementation, the field device 140 has a portable or handheld housing for at least the transmitter, the communication interface(s), and display device(s), and may further include a user interface 147 (e.g., a keypad, touch screen, etc.) to allow the field technician to operate the device and/or enter in information relevant to the ingress detection and remediation process. In various aspects, the antenna 141 may be an integral part of the field device; alternatively, the antenna 141 may not necessarily be mechanically coupled to the field device, but may be instead carried by the technician as a separate unit and electrically coupled to the transmitter of the field device 140. Whether the antenna 141 forms an integral part of the field device 140 or not, in one aspect the antenna 141 may be a directional antenna to provide appropriate strength and directionality of the transmitted local test signal and thereby facilitate identifying particular points of ingress. In another exemplary implementation, the field device 140 may be implemented by a combination of a small transmitter/antenna (e.g., a "walkie-talkie") carried and operated by a first technician on a bucket truck in the air proximate to elements of a hardline coaxial cable plant mounted on utility poles, and a separate portable computing device operated/monitored on the ground by a second technician (and in communication with the first technician, e.g., to provide feedback regarding the signal strength received at the headend).

As noted earlier, in one aspect the transmitter 143 of the field device 140, in a manner similar to that of the mobile broadcast apparatus 130, alone or in combination with the processing unit(s) 144, may be configured to transmit the local test signal in a variety of manners (e.g., a continuous unmodulated carrier wave; modulated signal such as amplitude/frequency/phase/QAM modulated, spread spectrum, TDM, pulse signal; at various power levels; at one or more carrier frequencies; at time-dependent/varying carrier frequencies, etc.). In one implementation, the field device 140 may be configured to transmit the local test signal without significantly interfering with operative signaling in the upstream path bandwidth from one or more subscriber premises in the neighborhood node under evaluation (e.g., via an "unused" frequency in the upstream path bandwidth, and/or via modulation such as spread spectrum, TDM, pulse signal, etc.).

The field technician 148 employs the field device 140 to transmit the local test signal as the technician traverses (e.g., walks around, or drives in close proximity to) the target ingress problem area, or "sweeps" the field device across/along a particular system component in sufficiently close proximity to the component. The field device 140 then receives, in essentially real time (e.g., via the communication network 150), signal amplitudes representing a strength of a received upstream local test signal at the headend of the cable communication system, to provide feedback on the degree of ingress present within the target problem area. As discussed above, any of a variety of communication methodologies may be employed by the communication network 150 to provide this feedback to the field device 140 (e.g., two-way radio, telecommunications, Internet access, etc.). The feedback can in turn be conveyed by the field device 140 to the field technician in any of a variety of manners (e.g., audibly, visually or both); for example, the CPU(s) 144 may control the display device(s) 145 of the field device 140 to display one or more indications representing the feedback as alphanumeric and/or graphic information (e.g., numbers, graphs, simulated meters, reproduced display(s) of the analyzer 110 and/or the test and/or monitoring equipment 256, etc.). Alternatively, or in addition, the display device(s) may include one or more light emitting diodes (LEDs) of different colors to simulate a scale representing received signal strength, and/or the user interface of the field device may include a speaker to provide one or more audible indications (e.g., of a received signal strength exceeding a predetermined threshold value). Accordingly, it should be appreciated that one or more indications corresponding to the signal amplitudes representing strengths of the received upstream local test signal at the headend of the cable communication system may be conveyed to the technician via the field device 140 in any of a variety of manners.

C. Analyzer/Test Equipment

As shown in FIG. 28, the analyzer 110 (e.g., a spectrum analyzer, a particularly tuned signal receiver, etc.) may be located at headend 162 of a cable communication system (or alternatively coupled to a junction between the hardline coaxial cable plant and an optical/RF bridge converter of a given neighborhood node) so as to monitor the upstream path and record signal amplitudes as a function of time at the one or more test signal frequencies of the test signal broadcast by the mobile broadcast apparatus 130. The analyzer 110 may include one or more processing units (CPU) 114, memory 116, one or more communication interfaces 112, and a display device 111. The analyzer 110 may be implemented in various form factors, examples of which include, but are not limited to, a special purpose device (e.g., a particularly tuned signal receiver with appropriate filtering components; a spectrum analyzer) and/or a computing or telecommunications devices such as a portable computer, tablet device, a personal digital assistant (PDA), smart phone, cellular radio telephone, mobile computing device, touch-screen device, touchpad device, or generally any device including, or connected to, a processor and display. One example of a suitable spectrum analyzer is given by a Hewlett Packard spectrum analyzer (e.g., model HP 8591C) communicatively coupled to a computing device including a communication interface; more specifically, the HP spectrum analyzer may be connected via a serial communication bus to a laptop computer executing an HP API to request and log signal amplitudes (e.g., in units of dBmV) with a corresponding time stamp. Another suitable example of a spectrum analyzer is given by an Agilent n9000A spectrum analyzer. In some implementations, as discussed above test and/or monitoring equipment 256 may be used in addition to, or alternatively to, the analyzer 110; one example of suitable test and/or monitoring equipment is given by the JDSU PathTrack™ HCU-200 Integrated Return Path Monitoring Module (e.g., see http://www.jdsu.com/ProductLiterature/hcu200_ds_cab_tm_ae.pdf).

In one embodiment, one or more base technicians 118 may be responsible for analyzing the signals received by the analyzer 110 and/or the test and/or monitoring equipment 256. For example, a, base technician 118 may be responsible for determining whether the signals received at headend 162 indicate that ingress may be occurring at one or more locations in the cable communication system (e.g., proximate to where the mobile broadcast apparatus 130 or handheld transmitter 140 are located and transmitting respective test signals). Consequently, base technician 118 may use analyzer 110 to examine the signals transmitted by mobile broadcast apparatus 130 or handheld transmitter 140 and received at the headend 162, and may also use the test and/or monitoring equipment 256 to monitor the integrity of physical communication channels conveying upstream information from subscriber premises in the neighborhood node under evaluation.

D. Processor

Processor 120 may be any electronic device that can analyze and/or process data and generate various information (e.g., one or more maps or images) relating to the ingress mitigation methodology discussed herein according to various embodiments of the invention. Processor 120 may include or be associated with a computing device, such as a portable computer, personal computer, general purpose computer, server, tablet device, a personal digital assistant (PDA), smart phone, cellular radio telephone, mobile computing device, touch-screen device, touchpad device, and the like. In some implementations, the processor 120 may be co-located with, and communicatively coupled to, the analyzer 110 and/or the test and/or monitoring equipment 256 at the headend of the cable communication system. It other implementations, one or more processors 120 need not necessarily form part of the ingress detection system 100, but merely may be in communication with other elements of the systems (e.g., via the communication network 150).

In one embodiment, the processor 120 includes one or more processing units (CPU) 124, memory 126, one or more communication interfaces 122, and display device 121. Via execution by the processor's processing unit(s) 124 of processor-executable instructions (e.g., stored in the memory 126), the processor may perform a computer-implemented method for facilitating detection of potential points of ingress in a given neighborhood node under evaluation. In particular, in connection with phase 1 activity, the processor 102 may receive (e.g., via the communication interface(s) 122, from one or more of the mobile broadcast apparatus 130, the analyzer 110, and the test and/or monitoring equipment 256) or otherwise access (e.g., from memory 126) a first electronic record (e.g., generated in the field by the mobile broadcast apparatus 130) including geographic information for a plurality of locations in the field at which a test signal is broadcast in an upstream path bandwidth of the neighborhood node (e.g., respective positions of the vehicle 133 along a neighborhood node drive path 305 as it broadcasts a test signal). The processor further may receive or otherwise access a second electronic record including a plurality of signal amplitudes recorded at a headend of the cable communication system, representing a strength of a received upstream test signal at the headend based on the broadcasted test signal.

In one implementation, via execution by the processor's processing unit(s) of processor-executable instructions, the processer then may merge the first electronic record and the second electronic record so as to generate a third electronic record including at least the geographic information for the plurality of locations at which the test signal is broadcast, and the plurality of signal amplitudes representing the strength of the received upstream test signal. The processor may then process the third electronic record so as to generate a neighborhood node ingress map including a first graphical representation of the neighborhood node drive path 305 traversed by the mobile broadcast apparatus 130, and a second graphical representation (e.g., superimposed or overlaid on the first graphical representation) of the plurality of signal amplitudes so as to illustrate test signal ingress of the test signal into various elements of the neighborhood node (particularly the hardline coaxial cable plant). More generally, as discussed in greater detail below, the processor may perform analysis and processing of geographic information relating to vehicle position along a neighborhood node drive path, signal amplitudes representing received upstream test signal strength, and/or other information to in turn provide a wealth of information relating to potential points of ingress in a neighborhood node under evaluation, including different visual renderings relating to potential points of ingress.

Map information for rendering graphical representations of signal ingress in one or more neighborhood nodes of a cable communication system may be communicated by the processor 120 to any one or more of the analyzer 110, mobile broadcast apparatus 130, or portable/handheld field device 140 shown in FIG. 28, and/or maps may be displayed locally on the processor's display device 121. In some exemplary implementations, map data may be saved and communicated as .png files, but it should be appreciated that a variety of graphical formats may be employed (including formats that allow for transparency for overlaying multiple "layers" of map information and/or image information, such as satellite or aerial images).

III. Phase 1—Ingress Detection And Mapping

Figure 29:
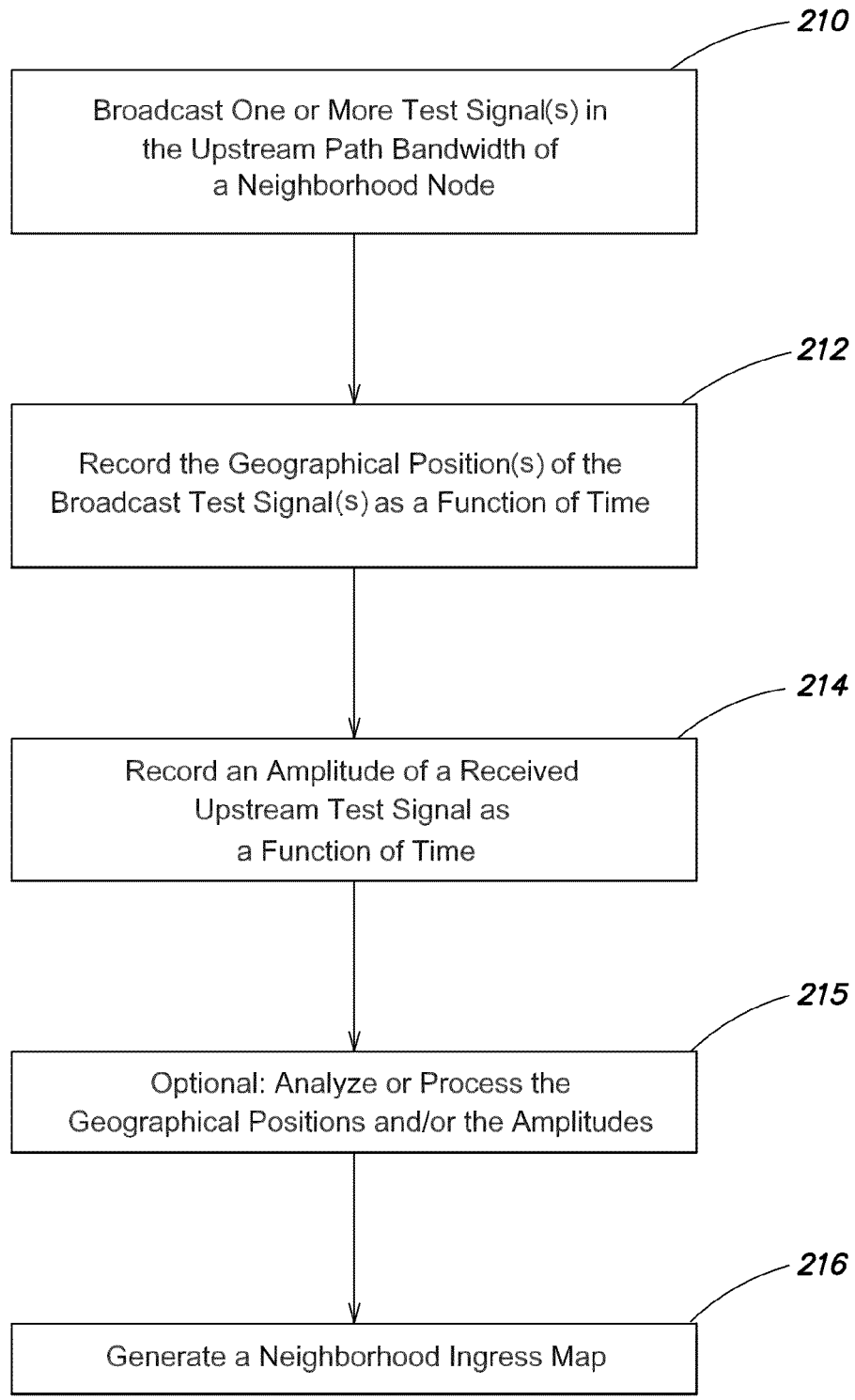
FIG. 29 illustrates a flow chart of a method for facilitating ingress detection and mapping, according to one embodiment of the present invention.

FIG. 29 provides a flow chart to graphically illustrate a method for facilitating ingress detection and mapping (e.g., "phase 1" activity), according to embodiments of the present invention. Various aspects of this method may be implemented by components of the ingress detection system 100 introduced above in FIG. 28, in connection with a cable communication system similar to that shown in FIG. 1 or 27.

In the method outlined in FIG. 29, at block 210 a test signal is broadcast by the mobile broadcast apparatus 130 in the upstream path bandwidth (e.g., 5 MHz to at least 42 MHz) of a given neighborhood node under evaluation. With reference again to the cable facilities map 310 shown in FIG. 24 (of the ingress mitigated node BT-11) as well as FIG. 28, the mobile broadcast apparatus 130 (e.g., the vehicle 133 equipped with the transmitter 135) proceeds along a neighborhood node drive path 305 proximate to the hardline coaxial cable plant 180 so as to effectively traverse and ensure substantially full coverage of the neighborhood node. As noted above and observed in FIG. 24 (and FIG. 25), cable communication system infrastructure within the neighborhood node, and particularly elements of the hardline coaxial cable plant deployed in the neighborhood node, essentially follow existing roadways in the geographic area covered by the neighborhood node (e.g., deployed substantially or at least partially above ground on utility poles flanking and proximate to roadways).

In example implementations, as the hardline coaxial cable plant (as well as the subscriber premises and associated subscriber service drops) may include one or more faults that may contribute in some manner to allowing for ingress (i.e., faults may be located anywhere along the hardline coaxial cable plant, even in areas of the neighborhood node with a relatively low number of households passed and/or relatively low subscriber penetration), the neighborhood node drive path 305 is carefully chosen to afford substantially full/complete coverage of the neighborhood node. In one exemplary implementation, each of the roadways within the neighborhood node (e.g., see the roadways of the ingress mitigated node BT-11 as indicated on the cable facilities map 310 shown in FIG. 24) constitutes a portion of the neighborhood node drive path 305 over which the mobile broadcast apparatus 130 traverses. As the mobile broadcast apparatus 130 proceeds along the neighborhood node drive path 305, a test signal is broadcast from the transmitter 135 at a plurality of locations distributed along at least a substantial portion (and preferably the entirety) of the neighborhood node drive path, wherein the test signal has one or more test signal frequencies falling within the upstream path bandwidth. Additional details regarding the test signal and various options for generating/broadcasting same are discussed in greater detail below in Section III.A.

In block 212, as the mobile broadcast apparatus 130 proceeds along the neighborhood node drive path 305, respective positions at which the test signal is broadcast are recorded (e.g., as a function of time) to generate a first record of geographic information associated with transmission of the test signal in the neighborhood node. For example, with reference again to FIG. 28, a navigation device 132 (e.g., a global positioning system or GPS) associated with the mobile broadcast apparatus 130 may identify the geographical position of the mobile broadcast apparatus 130 as a function of time, as the test signal is broadcast, and record latitude and longitude coordinates for same. In one example, respective positions of the mobile broadcast apparatus are recorded together with a corresponding time stamp.

It should be appreciated that, according to one aspect of this embodiment, the local recording of geographic information (e.g., GPS latitude and longitude coordinates) by the mobile broadcast apparatus at respective positions along a substantial portion, and preferably the entirety, of the neighborhood node drive path significantly facilitates the generation of accurate and complete neighborhood node ingress maps illustrating potential points of ingress in the neighborhood node, as discussed in greater detail below. In contrast, transmitting such geographic information to the headend using the broadcast test signal itself as a carrier for the geographic information (i.e., the geographic information is encoded on the test signal itself via modulation of the test signal) may result in the geographic information not being received at the headend (and hence not being completely or accurately recorded). In particular, in situations involving relatively low (but nonetheless significant) degrees of ingress at a particular location in the neighborhood node, a test signal that is broadcast at this location and carrying any particular information, such as GPS coordinates corresponding to respective positions of the mobile broadcast apparatus, likely will not be received with sufficient strength and detected at the headend. Accordingly, many positions of the mobile broadcast apparatus as it traverses the neighborhood node drive path would be "lost," i.e., not part of the collected information, as any information encoded on the test signal carrier would not be completely or accurately received, if at all.

In view of the foregoing, in some exemplary embodiments of phase 1 activity, the broadcast test signal does not include (e.g., have modulated thereon) the geographic information for respective positions at which the test signal is broadcast by the mobile broadcast apparatus 130. In this manner, the generation in the field of a first record of geographical information corresponding to respective positions of the mobile broadcast apparatus along at least a substantial portion of the first neighborhood node drive path does not rely on the integrity of the broadcast test signal itself, nor does it rely on reliable reception of the test signal at the headend of the cable communication system. In this fashion, a more reliable, complete and accurate record is provided of geographic information associated with respective positions in the neighborhood node at which the test signal is broadcast.

At block 214, also as the mobile broadcast apparatus 130 proceeds along the neighborhood node drive path 305 of the neighborhood node under evaluation, a plurality of signal amplitudes are recorded by the analyzer 110 (coupled to a first junction of the CMTS and the headend optical/RF converter, or a second junction of the hardline cable plant and the optical/RF bridge converter of the neighborhood node; see FIGS. 1 and 2), wherein the signal amplitudes represent a strength of a received upstream test signal as a function of time. The received upstream test signal itself arises from the test signal broadcast by the mobile broadcast apparatus 130, and test signal ingress of the test signal into one or more faults in the neighborhood node (and particularly one or more faults in the hardline coaxial cable plant). More specifically, with reference to FIG. 28, a signal receiver positioned at the headend 162, such as analyzer 110, monitors the upstream path bandwidth of the neighborhood node under evaluation, and particularly monitors a range of frequencies within which (or one or more specific frequencies at which) the test signal is broadcast. In one aspect, analyzer 110 records the plurality of signal amplitudes, together with a second plurality of corresponding time stamps at which the signal amplitudes are recorded, so as to generate a second record, wherein respective signal amplitudes represent a strength of the received upstream test signal as a function of time. Generally speaking, larger received amplitudes implicate a greater degree of possible ingress.

As noted above, in some implementations each of the first record of geographic information corresponding to vehicle positions along the drive path and the second record of signal amplitudes of the received upstream test signal includes corresponding time stamps for the recorded information. However, it should be appreciated that embodiments of the present invention are not limited in this respect, and such records may be generated in a variety of manners to facilitate subsequent processing and coordination of the information. For example, in one implementation, the geographic information corresponding to respective positions of the vehicle along the drive path may be recorded in the first record (e.g., by the mobile broadcast apparatus 130) as a first ordered sequence of points, and the plurality of signal amplitudes of the received upstream test signal may be recorded in the second record (e.g., by the analyzer 110) as a second ordered sequence of points. In one aspect, the first ordered sequence of points is indexed to the second ordered sequence of points; in another aspect, the first ordered sequence of points and the second ordered sequence of points respectively may be sampled at a same time. In various aspects, the processor 120 of the system 100 shown in FIG. 28 may be configured to control (e.g., via the communication network 150) the navigation device 132 of the mobile broadcast apparatus 130 and the analyzer 110 to synchronize acquisition of the first and second records, receive the first and second records, and/or otherwise process the information therein so as to coordinate the geographic information and the plurality of signal amplitudes.

In another exemplary implementation of this embodiment, the vehicle 133 is driven (or otherwise operated) such that the mobile broadcast apparatus 130 traverses at least a substantial portion of the neighborhood drive path during a concerted time period or single "drive-through" of the neighborhood node so as to generate the first record and the second record. In other implementations, multiple "partial drive-throughs" may be conducted such that the mobile broadcast apparatus 130 proceeds along different portions of the drive path during different time periods/at different times (e.g., based on one or more of driver/technician work shifts, weather conditions, constructions conditions, other conditions that may affect navigability of the drive path, temporal cycles in terrestrial signals that may give rise to ingress, etc.) so as to generate corresponding portions of the first and second records. Such partial drive-throughs may in some instances cover overlapping portions of the neighborhood node drive path. In any case, the respective portions of the first and second records thusly generated are then combined (and in some cases analyzed/processed, e.g., to omit redundancy or average multiple readings) to generate "full" first and second records representing coverage for at least a substantial portion, if not the entirety, of the neighborhood node drive path.

At block 215, one or both of the first and second records optionally may be electronically analyzed and/or processed (e.g., by the processor 120 of the system 100), alone or in combination with other information (e.g., stored in memory 126 of the processor 120 or otherwise accessed by the processor 120 via the communication network 150), so as to facilitate identification of one or more possible faults in the system constituting potential points of ingress. Various optional processing and analysis techniques that may be employed by the processor 120 in block 215 are discussed in greater detail below in Section III.B.

At block 216, based on the first record of the respective positions of the mobile broadcast apparatus 130 as a function of time, and the second record of the plurality of signal amplitudes representing a strength of the received upstream test signal as a function of time, the processor 120 of the system 100 electronically generates a neighborhood node ingress map for the neighborhood node under evaluation. Examples of neighborhood node ingress maps according to various embodiments of the present invention are discussed in greater detail below in connection with FIGS. 33 through 47. In one aspect, the neighborhood node ingress map may include a first graphical representation of the neighborhood node drive path 305; in another aspect, the neighborhood node ingress map may include a second graphical representation, overlaid on the first graphical representation, of the plurality of signal amplitudes along the neighborhood node drive path so as to illustrate the test signal ingress of the test signal in the neighborhood node (and particularly into the hardline coaxial cable plant). To this end, the processor 120 may merge the information in the first and second records to form ordered sets. More specifically, in one example the first record and the second record are merged (e.g., based on an index or respective time stamps) so as to generate a third record including both the geographic information and plurality of signal amplitudes. Accordingly, the third record may include an ordered set of multiple entries each having three or four dimensions or parameters (e.g., [LAT, LONG, AMPLITUDE] or [LAT, LONG, AMPLITUDE, TIME]), from which the processor 120 may generate the neighborhood node ingress map to show the route(s) traversed by the mobile broadcast apparatus 130 on the neighborhood node drive path 305, and relative degrees of ingress at different positions along the neighborhood node drive path.

With respect to a third record including an ordered set of data to facilitate generation of a neighborhood node ingress map, a time coordinate may or may not be included in such an ordered set. For example, in one implementation, a time coordinate may be employed to visually render a dynamic "recreation" of the phase 1 process (e.g., create a "replay" of the drive-around route through the neighborhood node taken by the mobile broadcast apparatus). In other implementations, the geographic information may be received and logged at a particular periodicity (e.g., one second intervals), and time coordinates corresponding to respective time stamps may not be necessary to render such a "replay" if consecutive geographic coordinates are presumed to represent predetermined logging intervals (e.g., approximately one second intervals). Additionally, as noted above, the first and second records may not include corresponding time stamps for information therein, but instead may be indexed to each other in some manner (e.g., based on a common or synchronized sampling rate, or particular number of data points acquired in the respective records). In any event, it should be appreciated that such a third record, if created by the processor 120 pursuant to merging the first and second records, may or may not include a time parameter according to various embodiments. Additional details regarding various processing options implemented by the processor 120 in connection with the information provided by the first record and second record are provided below in Sections III.B and III.C.

In different embodiments, various activity relating to phase 1 as discussed above may be performed "actively" or intentionally, or alternatively in a more passive manner. For example, a technician may direct the mobile broadcast apparatus 130 through a specified area (e.g., along a neighborhood node drive path traversing a neighborhood node) for the express purpose of generating the first record and the second record discussed above, and possibly gathering other information (discussed in greater detail below) in connection with ingress detection and/or remediation. In some implementations, such activity may be performed by relatively lower-skilled technicians to cover large geographic areas relatively quickly and inexpensively, perhaps as part of an ongoing preventative maintenance program. This approach also may be employed, if even for a small segment of hardline coaxial cable plant, so as to gather information about a particular area of interest during demand maintenance activity.

In other implementations, various activity relating to phase 1 may be more passively executed. For example, technicians performing regular or routine maintenance or fulfillment activities may be outfitted such that they "passively" gather data relating to geographic position in a particular neighborhood node and corresponding received signal strength due to a broadcast test signal as they move (e.g., in a vehicle or otherwise) through different geographic areas that may overlap with one or more neighborhood nodes of potential interest with respect to ingress mitigation. This passive approach to information gathering may, over time, facilitate the collection of ingress-relevant information over a significant portion of a cable communication system (e.g., spanning one or more neighborhood nodes) without allocating dedicated personnel to such a task. Such an approach may be entirely passive, or may include partial routing direction from a supervisor/system operator (e.g., as may be provided by the processor 120) so as to increase coverage, while still having a relatively low impact on technician resources. Additional concepts relating to active and passive information gathering techniques are discussed further below in connection with "Process Guides."

A. Test Signal(s)

With reference again to block 210 of FIG. 29, a variety of test signal broadcasting techniques may be employed in accordance with various embodiments of the present invention (and these techniques similarly may be applied to transmission of a local test signal during phase 2 activity, discussed in detail below).

In one aspect, the test signal is broadcast so as not to interrupt or otherwise interfere with operative signals (e.g., upstream information being conveyed by one or more upstream physical communication channels) from one or more subscriber premises in the neighborhood node to the headend 162. To this end, in one example the test signal may be broadcast as a carrier wave (e.g., a simple tone) on an unused frequency in the upstream path bandwidth (e.g., a frequency that is not currently in use by, or assigned to, any subscriber modems on the neighborhood node under evaluation). As discussed above, in one embodiment the test signal is not modulated or otherwise encoded with any geographic information representing positions of the mobile broadcast apparatus along the neighborhood drive path, so as to avoid gaps or losses in such geographic information due to significantly attenuated or non-existent signal amplitudes corresponding to the test signal as monitored by the analyzer 110.

In other examples, the test signal alternatively may be modified or modulated to significantly reduce potential interference with other signals on the network, particularly in the upstream path bandwidth. Examples of modulation techniques that may be employed to generate the test signal include, but are not limited to, amplitude modulation, frequency modulation, phase modulation, digital modulation techniques such as phase-shift-keyed (PSK) modulation or quadrature amplitude modulation (QAM), spread spectrum modulation and time division multiplexing (TDM).

In connection with time division multiplexing, in one exemplary implementation the CMTS 170 of the cable communication system may control subscriber modems in the neighborhood node according to a TDMA or ATDMA access protocol, such that a physical communication channel assigned to the modems includes a plurality of time slots (referred to in DOCSIS as "minislots"). In one aspect, the plurality of time slots are segregated so as to include a plurality of subscriber premises time slots and at least one dedicated time slot for the test signal. The subscriber modems are assigned (e.g., by the CMTS at the headend of the cable communication system) respective subscriber premises time slots to transmit upstream information in the upstream path bandwidth. The processor 120 of the ingress detection system 100 may be in communication with the CMTS (e.g., via the communication network 150) so as to control the mobile broadcast apparatus 130 to broadcast the test signal during the dedicated time slot. In this manner, interference of the test signal with the upstream information in the upstream path bandwidth may be avoided.

In some embodiments, the test signal may be broadcast by the mobile broadcast apparatus at a sufficiently low power as transmitted by the transmitter so as not to require licensure by one or more regulatory authorities (e.g., in the U.S., the Federal Communication Commission, see "Understanding the FCC Regulations for Low-Power, Non-Licensed Transmitters," OET Bulletin 63, October 1993, FCC Office of Engineering and Technology, Washington, D.C., which is hereby incorporated by reference herein in its entirety). Also, since particular regions of interest in the upstream path bandwidth with respect to ingress include frequencies below approximately 20 MHz, and more particularly below 18 MHz, and more particularly below 16.4 MHz, and more particularly below 10 MHz, in some embodiments the test signal may be broadcast at one or more test signal frequencies between approximately 5 MHz at the low end of a spectral region of interest, and approximately 10 MHz to 20 MHz at the high end of the spectral region of interest.

As discussed above, faults in one or more of the hardline coaxial cable plant, subscriber service drops and subscriber premises of a given neighborhood node may viewed as resonance structures (e.g., RC or RLC circuits) having particular frequency-dependent and/or frequency-specific characteristics. Accordingly, in some embodiments, employing one or more test signals having different test signal frequencies and/or a time-varying test signal frequency may in some instances facilitate identification of faults having such frequency-dependent and/or frequency-specific characteristics (by exploiting the frequency response of the resonance structures constituting the faults). For example, in one implementation, as the test signal is broadcast by the mobile broadcast apparatus, the test signal frequency may be varied as a function of time, across at least a portion of the upstream path bandwidth. More specifically, the test signal may have a test signal frequency having one value that varies (e.g., continuously or discretely) as a function time; alternatively, multiple test signals having respectively different test signal frequencies may be broadcast simultaneously. In yet another implementation, the test signal may be broadcast as a spread spectrum signal (e.g., frequency-hopping spread spectrum or FHSS, direct-sequence spread spectrum or DSSS, time-hopping spread spectrum or THSS, and chirp spread spectrum or CSS), which employs a pseudonoise code to spread a narrowband signal over a relatively wider band of frequencies. Ingress arising from entry of a spread spectrum test signal via one or more frequency-dependent or frequency-specific faults may in some implementations be derived from data provided by demodulation tuners at the head end that report on "equalizer stress" or similar data in connection with equalizers employed for adaptive equalization as discussed above.

In yet other embodiments, rather than avoiding portions of the upstream path bandwidth in which operative signals are being transmitted (e.g., via one or more physical communication channels having particular carrier frequencies) representing upstream information from one or more subscriber premises, one or more test signals may be broadcast by the mobile broadcast apparatus at one or more test signal frequencies that fall within a frequency range occupied by channels in which such operative signaling is occurring. In this manner, ingress that may be specifically affecting a range of frequencies in which one or more upstream physical communication channels are deployed may be particularly identified so as to facilitate remediation of corresponding faults allowing for such ingress. In one aspect of such embodiments, the test signal frequency may be varied as a function of time across a substantial portion of the frequency range of the operative signaling in the upstream path bandwidth.

In yet other embodiments, frequency division multiplexing techniques may be employed in connection with broadcasting by the mobile broadcast apparatus of one or more test signals at different frequencies. In one aspect of such embodiments, distinct (e.g. unique) test signal frequencies may be assigned to respective field technicians directing the mobile broadcast apparatus along a particular neighborhood node drive path, or alternatively may be assigned to vehicles in which the mobile broadcast apparatus is situated to provide a mode of differentiating the source of the test signal. This frequency multiplexing technique allows simultaneous test signals to be sent by different technicians, even in adjacent neighborhood nodes, while still allowing for the system to provide a "fingerprint" to distinguish the respective signals from different technicians and while preventing interference between the test signals. The different test signal frequencies may include discrete signals transmitted concurrently or sequentially and may be at any arbitrary spectral resolution deemed practical. Additional signifying elements such as modulation distinctions, time division multiplexing and phase division multiplexing may also be applied to provide technician or test vehicle specific signal "fingerprints".

In some embodiments, interferometric techniques may also be employed in connection with transmission of multiple test-signals. More specifically, when multiple different-frequency test signals are transmitted, the interference patterns resulting from the mixing of such signals as they respectively enter one or more hardline cable plant-related or subscriber-related faults may be identified and analyzed to reduce ambiguity in the signals (particularly those that are in close geographic proximity to one another and of similar receptivity), thereby allowing more accurate positioning of the points of ingress relative to the transmitter.

In yet other embodiments, directional antennae may be employed in connection with the mobile broadcast apparatus 130 (as well as the portable/handheld field device 140). By using a directional antenna together with positioning data including, but not limited to, geographic position, bearing, pitch, roll and yaw, reduces amplitude vs. proximity ambiguity by narrowing the field within which elements of the cable communication system are exposed to the test signal, thereby reducing opportunities for multi-point reception. Additionally, some ingress points exhibit directionally-specific receptivity, which may be directly detected and more accurately modeled with the use of directional antennae, leading to more accurate positioning and classification of ingress points. A single antenna that mechanically sweeps though the plane of transmission during a specified period may be used to implement a multi-point test frequency reception method. An antenna array capable of altering its directionality through electronic variations (e.g., variable loading of its transmission elements, or similar approach) may also be used to achieve this function. Alternatively, an array of fixed antennae with some angular relationship to one another within the plane of transmission (e.g., four antennae mounted at 90° angles to one another) may be used to receive directionally specific signal transmissions. A rotating directional antenna may be employed in connection with implementing triangulation techniques. Headings to specific points of ingress may be inferred from the peak amplitude during a sweep through the transmission plane. Headings to a source from multiple transmission locations may be used in conjunction to triangulate the fault position.

In yet other embodiments, the test signal may be broadcast as at least one pulsed test signal so as to mitigate significant interference with operative signaling (e.g., upstream information from subscriber premises) in the upstream path bandwidth. Pulsed or discrete time state test signals may be employed, in lieu of continuously transmitted ones, in various aspects for a variety of reasons (e.g., reduced system interference, inherent feature of a modulation scheme, etc.), and may specifically be used to assist in positioning points of ingress in the cable communication system relative to the test-signal transmitter. To this end, a duration of one or more pulses of the pulsed test signal may be less than a symbol length of the operative signaling (e.g., based on the modulation order of the QAM RF signal carrying upstream information). A sufficiently brief test-signal pulse would be received by the amplitude monitoring equipment in the headend (e.g., the analyzer 110) as a series of pulses (of varying amplitudes), each corresponding to a particular, and varying-length path taken from each fault through which the test signal enters the cable communication system. The time differences of arrival (TDOA), or relative arrival times of these pulses, may be used to infer information about their positions relative to the test signal transmitter and each other, allowing increased accuracy in fault positioning. The TDOA may also be measured using test signal modulation schemes that have discrete time states (such as QAM symbols; see 'Hyperbolic Location' under 'Positioning' discussed further below).

B. Signal Processing

With reference to block 215 of the method shown in FIG. 29, various processing options may be implemented by the processor 120 of the ingress detection system 100 shown in FIG. 28, in connection with the first record of geographic information representing respective positions of the mobile broadcast apparatus 130 (as it broadcasts the test signal) and the second record of the plurality of signal amplitudes representing a strength of the received upstream test signal as a function of time (e.g., as measured by analyzer 110).

It should be appreciated, however, that merely relying on the information contained in one or both of the first and second records themselves, with relatively nominal or no significant processing or analysis, provides valuable insight into possible faults constituting potential points of ingress in a cable communication system. Thus, approaches involving relatively nominal or no significant processing nonetheless may be employed in some embodiments to identify potential points of ingress more quickly, effectively and easily than by conventional techniques.

In some examples, in addition to one or both of the first and second records, other information may be used by the processor 120 to facilitate processing and/or analysis in connection with one or both of the first and second records (which information in some instances may be communicated to the processor 120 via the communication network 150 shown in FIG. 28 and/or stored in memory 126 of the processor 120). Examples of such other information include, but are not limited to: 1) one or more cable facilities maps (e.g., see FIGS. 24 and 25); 2) one or more street maps showing various roads and rights-of-way within the geographic area covered by the neighborhood node; 3) one or more parcel maps showing various roads and rights-of-way within the geographic area covered by a neighborhood node as well as households passed in the neighborhood node; 4) one or more aerial images showing various topographical features in the neighborhood node (e.g., including roads and rights-of-way within the geographic area covered by a neighborhood node as well as households passed in the neighborhood node); 5) ambient ingress information corresponding to a strength of ambient ingress in at least a portion of the geographic area covered by the neighborhood node; 6) environmental information (e.g., weather information, terrain information) relating to the geographic area covered by the neighborhood node; 7) various subscriber information relating to one or more subscriber premises in the neighborhood node, which in some cases may be provided by the cable communication system operator (e.g., MSO); examples of such subscriber information may include, but are not limited to: subscriber identification (e.g., a subscriber list); subscriber service plans for respective subscribers (e.g., types of services or data usage plans); historical changes in subscriber service or maintenance records; "special status" indications to indicate frequent/periodic problem issues in connection with service ("trouble tickets"), and/or a particular type of subscriber or subscriber premises, such as a hospital, a school, a military or government building, or other "VIP" status); and 8) various information provided by DOCSIS equipment such as subscriber modems and demodulation tuners at the headend.

In general, various processing and analytical techniques applied to one or both of the first and second records, and in some instances additional information as discussed above, facilitates identification of possible faults constituting potential points of ingress in the cable communication system, and particularly in the hardline coaxial cable plant of a given neighborhood node under evaluation. As discussed in detail below, the results of such analysis and processing may take several forms, examples of which include, but are not limited to: 1) essentially real-time audio and/or visual feedback to a technician (e.g., directing the mobile broadcast apparatus 130 along the neighborhood node drive path 305, or operating the portable/handheld field device 140 in proximity to a potential point of ingress); 2) a text-based listing of one or more potential points of ingress (e.g., providing geographic location and optionally prioritizing in some manner multiple potential points of ingress); and 3) one or more visual renderings comprising one or more graphs, charts, diagrams and/or maps of various dimensions (e.g., one-, two- or three-axis renderings of information), in which in some examples the neighborhood node drive path itself may be represented (e.g., "neighborhood node ingress maps;" see Section III.C).

Given the various types of information that may be utilized by the processor 120, in some embodiments the processor may process and/or analyze one or both of the first and second records, in some cases in tandem with other information, to automatically determine one or more of: 1) one or more potential points of ingress in a given neighborhood node under evaluation; 2) a relative severity of the potential points of ingress (e.g., so as to prioritize prospective repair or remediation activities in the neighborhood node under evaluation); and 3) differentiation between hardline coaxial cable plant-related faults and subscriber-related faults (e.g., in one or more subscriber service drops and/or subscriber premises). As noted above, any of the foregoing and other results of processing and analysis by the processor 120 may be conveyed via one or more visual renderings comprising one or more graphs, charts, diagrams and/or maps of various dimensions (e.g., one-, two- or three-axis renderings of information), in which different visual codes or symbols may be employed to indicate hardline cable plant-related faults and subscriber-related faults, respectively, and/or to indicate different classes/severity of multiple hardline cable plant-related faults and/or subscriber-related faults.

In some examples relating to processing and/or analysis of information relating to the first and/or second records, the processor 120 may employ geo-fencing techniques in connection with the first record so as to extract only geographic information relating to one or more particular positions of the mobile broadcast apparatus 130 along the neighborhood node drive path 305. In other examples, the processor 103 may employ peak analysis techniques or "thresholding" in connection with one or both of the first record and the second record; in particular, the processor may compare respective signal amplitudes of the second record to a threshold value to facilitate automatic detection and indication of possible faults constituting potential points of signal ingress (e.g., that result in received test signal strengths in excess of the threshold value).

In other examples, the processor 120 may process information relating to the first and/or second records based at least in part on multiple signal amplitude values corresponding to substantially similar geographic positions along the neighborhood node drive path. For example, in some implementations, as the mobile broadcast apparatus 130 is directed along the neighborhood node drive path 305, the mobile broadcast apparatus may traverse a same portion of the neighborhood node drive path more than once (e.g., in opposite directions traveling back and forth along a road ending in a cul-de-sac). More generally, at least a first portion of the neighborhood node drive path may include a first-pass segment and a second-pass segment over which the mobile broadcast apparatus 130 traverses at least a first time and a second time, respectively. Accordingly, the mobile broadcast apparatus may have one or more substantially identical positions along the first-pass segment and the second-pass segment (e.g., at different times), corresponding to respective signal amplitudes in the second record (which may be the same or different). In one implementation based on the foregoing scenario, the processor 120 may process the signal amplitudes in the second record to determine an average value of the respective signal amplitudes corresponding to the substantially identical positions along the first-pass segment and the second-pass segment. In another implementation, the processor 120 may process the signal amplitudes in the second record to determine a difference value of the respective signal amplitudes corresponding to the substantially identical positions along the first-pass segment and the second-pass segment. In yet other implementations discussed further below, the processor may process the signal amplitudes corresponding to substantially identical positions along the first-pass segment and the second-pass segment based at least in part on adjacent signal amplitudes in a succession of signal amplitudes in the first-pass segment and the second-pass segment, respectively, proximate to the substantially identical positions (e.g., based at least in part on the rate of change of the amplitude profile).

In other examples relating to processing and/or analysis of information relating to the first and/or second records, the processor 120 may employ analysis techniques including, but not limited to, trilateral and hyperbolic data analysis. One approach for trilateration of a potential point of ingress in the cable communication system includes using the relationship between a distance of the transmitter from a fault constituting a potential point of ingress and the signal amplitude of the received test signal. As this distance increases, the received amplitude generally decreases (by approximately the inverse square of distance for omni-directional transmission antennae, and by other determinable relationships for directional antennae). Accordingly, a prospective fault position constituting a potential point of ingress may be identified by using multiple known points of transmission.

Figure 30:
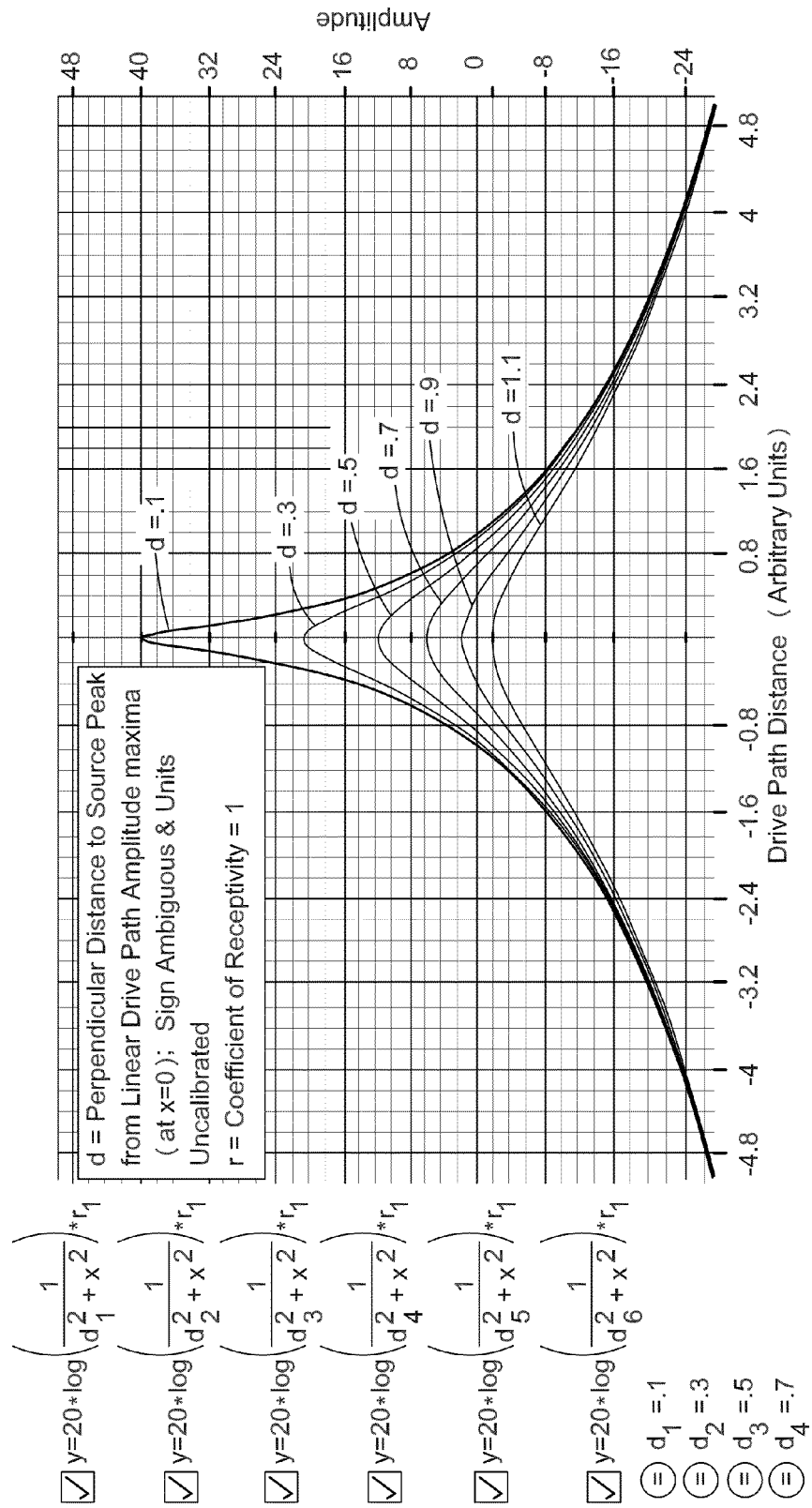
FIG. 30 illustrates variations in received test signal amplitude as monitored by the analyzer shown in FIG. 28, based on a distance between a fault in a cable communication system and a transmitter transmitting the test signal, according to one embodiment of the present invention.

More specifically, FIG. 30 illustrates variations in received test signal amplitude as monitored by the analyzer shown in FIG. 28, based on a distance between a fault in a cable communication system and a transmitter transmitting the test signal, according to one embodiment of the present invention. In addition to using trilateration techniques based on the relationships shown in FIG. 30 to identify locations of potential points of ingress, the relationships shown in FIG. 30 may be employed more generally to facilitate an analysis of the rate of amplitude change to estimate a distance between the transmitter of the test signal and a fault constituting a potential point of interest. Such a determination may facilitate differentiation of a hardline cable plant-related fault (presumed to be relatively close to the neighborhood node drive path proximate to the hardline coaxial cable plant) and a subscriber-related fault (which in some cases, particularly relating to subscriber premises faults, may be somewhat farther away in distance from the neighborhood node drive path). In general, analyzing the rate of amplitude change across a series of positions at which the test signal is broadcast/transmitted allows the distance to a prospective point of ingress from the point of closest approach and its relative receptivity to be determined.

As illustrated in FIG. 30, the amplitude profile of a roughly linear transmission path traversing arbitrarily near a fault constituting a point of ingress increases to peak amplitude at a point of closest approach more quickly (higher rate of change) the closer that linear transmission path is to the fault. Amplitude varies logarithmically to the inverse of the sum of the squares of distance to the fault at closest approach and distance along the transmission path from the fault. The point of half power relative to the peak bears special significance. In some implementations, this analytical technique reduces the ambiguity of distance vs. receptivity in interpreting peak amplitude. Specifically, analyzing the rate of amplitude change accordingly helps distinguish a close but moderate fault from a more distant but more receptive (i.e. more receptive) fault, which faults might be indistinguishable if peak amplitude was analyzed in isolation. While a single "drive-through" or pass traversing the neighborhood node drive path 305 may yield a mirror-image ambiguity (i.e., known distance, but two possible bearings, 180° apart), multiple, angularly distinct passes effectively eliminate this ambiguity. This analytical technique is also applicable to more complex transmission paths and reception scenarios.

Interferometry is another analysis technique that may be implemented as an alternative or additional method for identifying prospective points of ingress or fault locations. Interference patterns may occur where the test signal impinges upon multiple faults and enters into the cable communication system as ingress, in which the constituent test signal components entering the multiple faults may have respective different phase relationships. The test signal components entering the respective faults are ultimately combined together in the cable communication system. As the mobile broadcast apparatus traverses the neighborhood node drive path, the phase relationships corresponding to the multiple faults change in conjunction with the (differently) changing path distances between the faults and the test signal transmitter, giving rise to test signal interference patterns which may be observed, for example, by the analyzer 110. In particular, these interference patterns may be seen in the varying amplitude readings as the mobile broadcast apparatus traverses the neighborhood node drive path, and are most pronounced when faults are in close proximity to one another and of similar receptivity.

Figure 31:
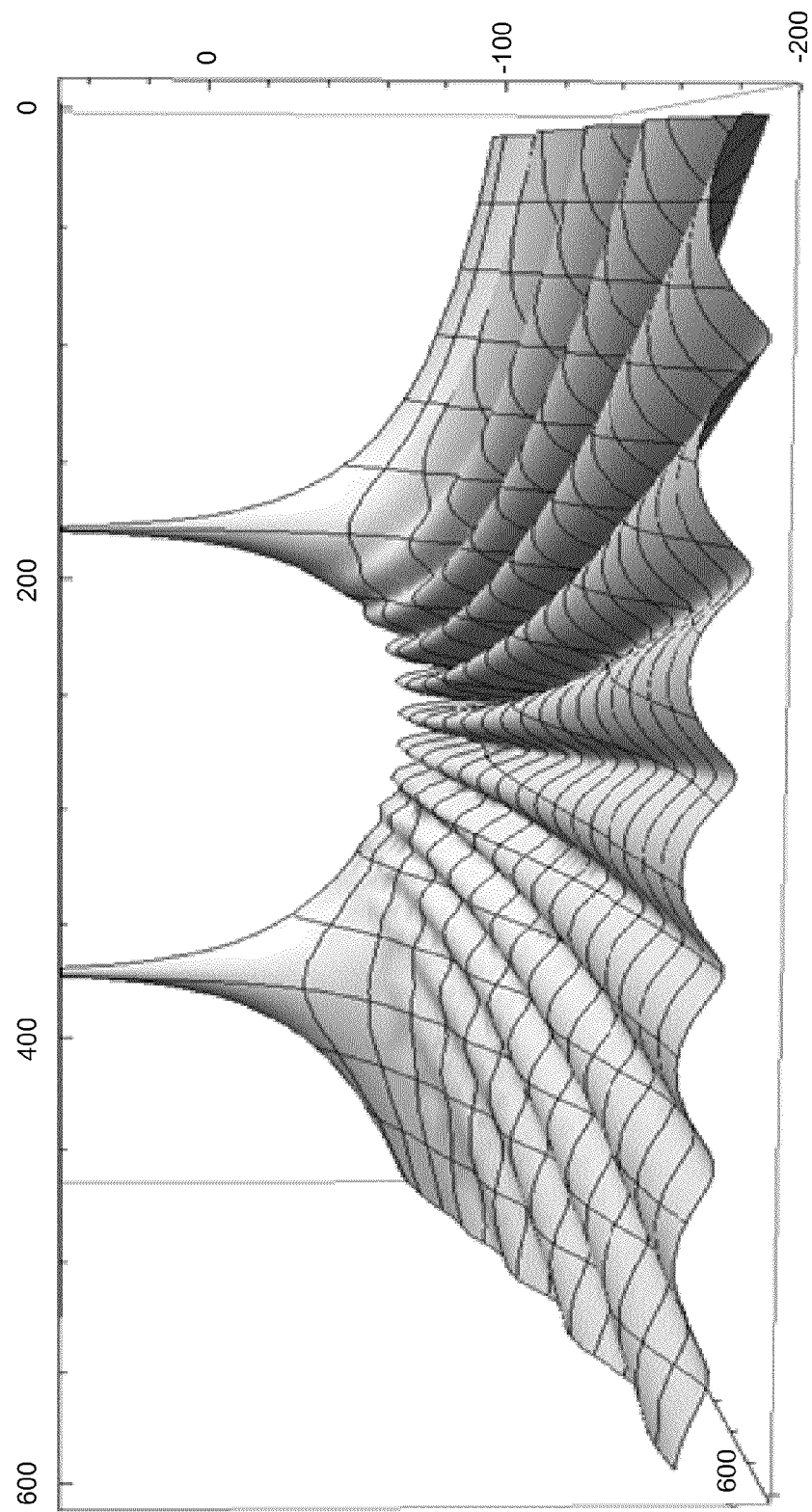
FIG. 31 illustrates an interference pattern model, according to one embodiment of the present invention, of test signal ingress via two relatively widely-separated faults in a cable communication system.
Figure 32:
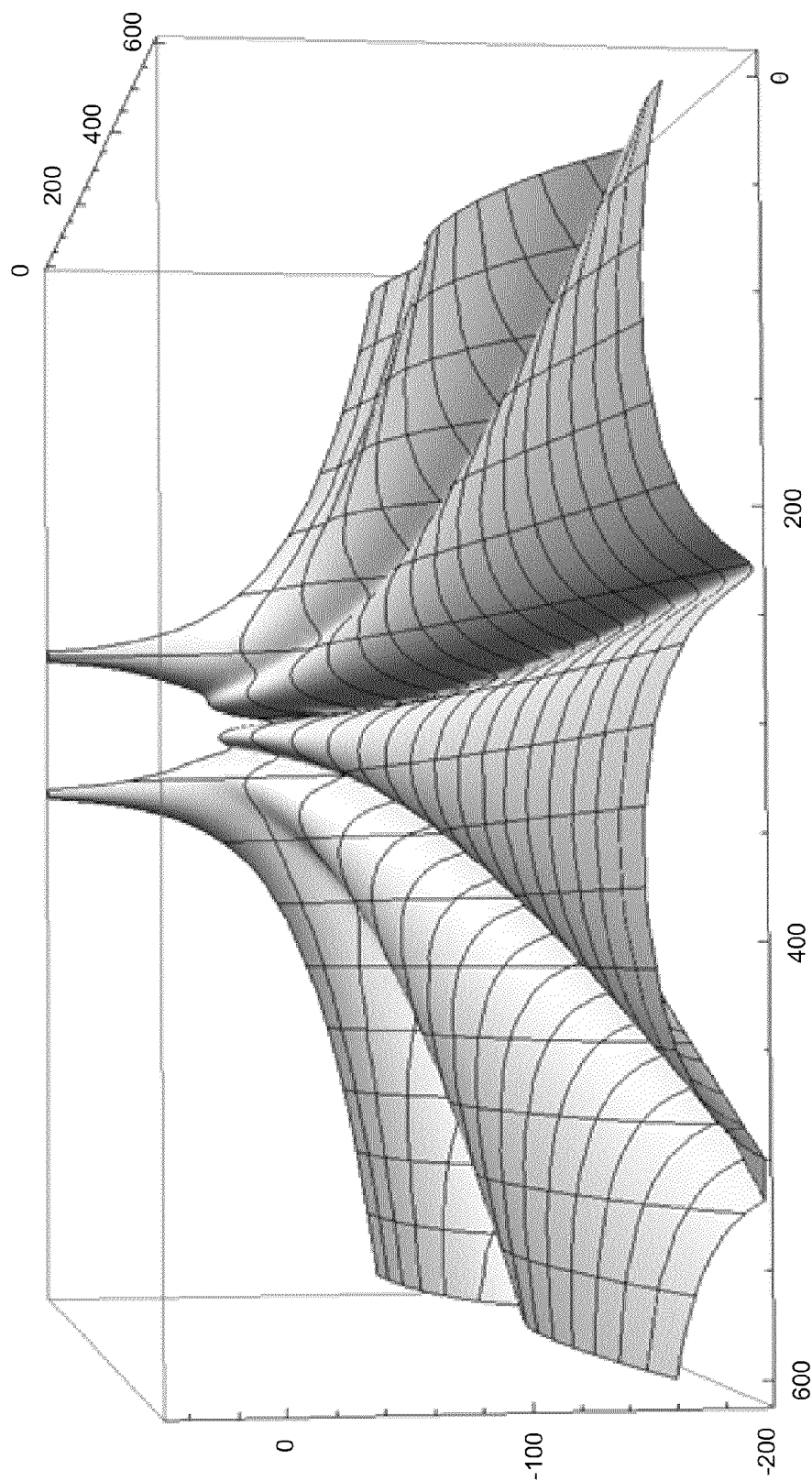
FIG. 32 illustrates an interference pattern model, according to one embodiment of the present invention, of test signal ingress via two relatively narrowly-separated faults in a cable communication system.

FIG. 31 illustrates an interference pattern model, according to one embodiment of the present invention, of test signal ingress via two relatively widely-separated faults in a cable communication system, and FIG. 32 illustrates an interference pattern model, according to one embodiment of the present invention, of test signal ingress via two relatively narrowly-separated faults in a cable communication system. From FIGS. 31 and 32, it may be readily appreciated that analysis of such interference patterns as represented in the plurality of signal amplitudes in the second record (i.e., the changing phase relationships and therefore level of constructive and destructive interference over transmission position) provides useful information about the relative positions of the possible faults and corresponding potential points of ingress in question. In exemplar implementations, determination of prospective fault location via analysis based on interference patterns in signal amplitude data may be performed using a single frequency test signal (i.e., "homodyne detection"), or multiple (typically two) frequencies (i.e., "heterodyne detection").

In other embodiments, a processing and/or analytical technique involving a hyperbolic approach uses the TDOA of a signal at various points of ingress, and/or from multiple transmission points, to pinpoint prospective fault locations. Some advantages of this approach generally include reduced vulnerability to interference patterns typically generated by multiple points of ingress, as discussed above. Additionally, the hyperbolic approach does not rely on an absolute amplitude reading, making location of low level (i.e., distant) ingress points potentially more accurate or sensitive.

In yet other embodiments, complex event processing (CEP) may be utilized by the processor 120 in conjunction with processing and/or analyzing multiple external data streams to assist in fault location, diagnosis or root cause analysis. Examples of external data streams/sets that may be processed via CEP techniques according to some embodiments include, include information derived from but not limited to the following sources: the first and second records, street maps, cable facilities maps, parcel maps, aerial images, subscriber information (e.g., VIP customer locations or other subscriber data relating to delivered services), ambient noise/ingress in the frequency range of the upstream path bandwidth, environmental data (temperature, weather, etc.), cable communication system design data, terrain, service ticketing system records (relating to maintenance, repair, service changes/upgrades, etc.), technician locations/activity, and DOCSIS equipment status data (e.g., relating to one or more subscriber modems or demodulation tuners at the headend). For example, an indication that ingress is entering the system at a particular subscriber premise, combined with the knowledge that service work (via the ticketing system) was recently performed there, may inform the remediation (e.g., diagnosis and/or repair) process. Alternately, a presence of ingress detected in the system coupled with the knowledge that temperatures had recently changed dramatically, may point a technician toward a bad cable-to-connector interface (due to the physical contraction and expansion of the cable as temperatures change). Also, terrain data may inform a propagation model for locating faults based on the data collected.

In yet other embodiments, and particularly in connection with block 216 of the method outlined in FIG. 29, an "expanded" third record further may be generated to include entries for additional geographic locations not included in the first record, but corresponding to geographic locations within the general area covered by the neighborhood node under evaluation. Such additional geographic locations included in the expanded third record, upon which a neighborhood node ingress map may be generated as discussed further below, provide for a higher resolution and/or increased geographical coverage for the illustrative representation of ingress provided by such a map. To provide relative degrees of ingress corresponding to these additional geographic locations, the plurality of signal amplitudes obtained from the second record may be interpolated to include estimated signal amplitudes corresponding to the additional locations in the expanded third record. In one exemplary implementation, the processor 120 may use the Gnuplot graphing utility (e.g., see www.gnuplot.info), Wolfram's Mathematica program (e.g., see www.wolfram.com/mathematical), or other similar utility (i.e., a portable command-line driven graphing utility) to interpolate signal amplitudes corresponding to additional geographic locations included in the expanded third record, upon which a neighborhood node ingress map may be generated according to various embodiments. Below is an illustrative example of a routine implemented using the Gnuplot graphing utility for accomplishing such interpolation (it should be appreciated that other methods/routines may be employed to implement interpolation of data as discussed herein:

Syntax:
set dgrid3d {, {<row_size>} {,{<col_size>} {,<norm>}}}
set nodgrid3d

EXAMPLES set dgrid3d 10,10,2
set dgrid3d, 4

The first example selects a grid of size 10 by 10 to be constructed and the use of L2 norm in the distance computation. The second example only modifies the norm to be used to L4. By default this option is disabled. When enabled, 3d data read from a file is always treaded as a scattered data set. A grid with dimensions derived from a bounding box of the scattered data and size as specified by the row/col$_{13}$ size above is created for plotting and contouring. The grid is equally spaced in x and y while the z value is computed as a weighted average of the scattered points distance to the grid points. The closer the scatter points to a grid point are the more effect they have on that grid point. The third, norm, parameter controls the "meaning" of the distance, by specifying the distance norm. This distance computation is optimized for powers of 2 norms, specifically 1, 2, 4, 8, and 16, but any nonnegative integer can be used. This dgrid3d option is a low pass filter that converts scattered data to a grid data set. More sophisticated approaches may be employed as a preprocess to and outside Gnuplot. For example, the Shepherds inverse distance weighting algorithm (see http://en.wikipedia.org/wiki/Inverse$_{13}$ distance$_{13}$ weighting), available in Mathematica, may be employed for this purpose.

C. Graphical Representations

As noted above, in connection with block 216 of the method outlined in FIG. 29 relating to phase 1 activity, various results of processing and analysis by the processor 120 relating to a first record of geographic information and a second record of signal amplitudes may be conveyed via one or more visual renderings comprising one or more graphs, charts, diagrams and/or maps of various dimensions (e.g., one-, two- or three-axis renderings of information), in which different visual codes or symbols may be employed to indicate various types of information. The presentation of such information, irrespective of particular format and content, generally is referred to herein as "a neighborhood node ingress map."

In various embodiments, the processor 120 may provide information relating to a neighborhood node ingress map so as to render one or more maps with visual codes for illustrating respective signal amplitudes (e.g., color; gray tone; different shading, hatching or symbols), as well as various types of map presentations (e.g., one-dimensional, two-dimensional, three-dimensional, heat maps, modified topographical maps, etc.). Information provided by the processor 120 for rendering graphical representations of ingress may be communicated by the processor to any one or more of the analyzer 110, mobile broadcast apparatus 130, or portable/handheld field device 140 shown in FIG. 28, and/or ingress maps may be displayed locally on the processor's display device 121. In some exemplary implementations, map data may be saved and communicated as .png files, but it should be appreciated that a variety of graphical formats may be employed (including formats that allow for various degrees of transparency in connection with overlaying multiple "layers" of map information and/or image information, such as satellite or aerial images, street maps, cable facilities maps, parcel maps, ambient ingress maps, subscriber information, DOCSIS information, etc., which information the processor may acquire from any of a variety of conventional sources, via communication interface 122 and/or communication network 150, and/or stored in memory 126).

In some embodiments, the neighborhood node drive path 305 traversed by the mobile broadcast apparatus 130 may itself be rendered on the neighborhood node ingress map. With respect to rendering the neighborhood node drive path if desired, the processor may acquire from any of a variety of conventional sources (e.g., via communication interface 122 and/or communication network 150, and/or stored in memory 126) one or more street maps for the appropriate geographic area corresponding to the neighborhood node, and employ these as received, or filtered/simplified to render simple line drawings of the neighborhood node drive path, on which are superimposed or overlaid the visual codes representing relative degrees of signal ingress as a function of position along the drive path.

More specifically, in some embodiments of neighborhood node ingress maps according to the present invention, the graphical representation for the ingress map may comprise a two-dimensional representation including any of a variety of types of street maps (or simplified versions of street maps to provide simple line drawings of thoroughfares) showing the neighborhood node drive path 305 traversed by the mobile broadcast apparatus 130, and a visual code for the plurality of signal amplitudes representing the strength of the received upstream test signal and relative degree of ingress at a given location superimposed or overlaid on the neighborhood node drive path. For example, an x-axis (or horizontal coordinate scale) and a y-axis (or vertical coordinate scale) for the map respectively may represent latitude and longitude, and a given signal amplitude corresponding to a latitude/longitude coordinate pair may be indicated with the visual code in the x-y plane of the map. In one implementation involving a "heat map," the visual code includes a color code, and a color of the color code represents a corresponding signal amplitude. In another implementation, the visual code includes a gray-tone scale, and a shade of gray represents a corresponding signal amplitude. In yet other implementations, examples of visual codes include, but are not limited to: a plurality of different hatching styles, wherein respective hatching styles of the plurality of different hatching styles represent different signal amplitudes; a plurality of different shading styles, wherein respective shading styles of the plurality of different shading styles represent different signal amplitudes; and a plurality of different symbols, wherein respective symbols of the plurality of different symbols represent different signal amplitudes.

FIGS. 33 through 36 illustrate examples of neighborhood node ingress maps in the form of two-dimensional "heat maps" in which the visual code for the plurality of signal amplitudes is implemented as a color code (although these maps will appear to be rendered in a gray-tone scale in black and white in some publications, copies of this patent publication with color drawing(s) will be provided by the U.S. Patent Office upon request and payment of the necessary fee).

Figure 23:
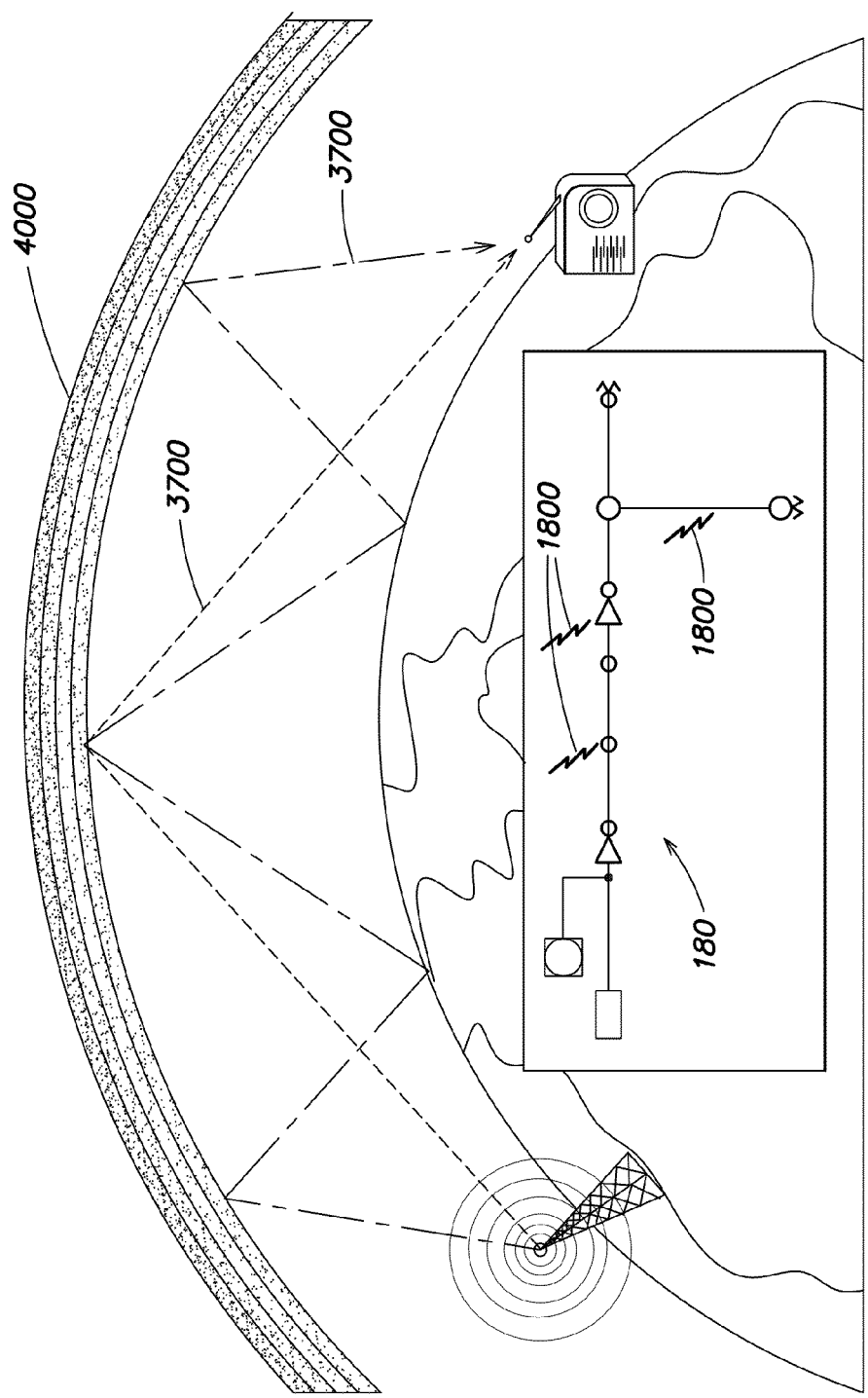
FIG. 23 is an illustration showing the concept of terrestrial signals constituting a source of ingress and entering into one or more faults in the hardline coaxial cable plant of a cable communication system.

More specifically, the heat maps 300A, 300B, 300C and 300D respectively shown in FIGS. 33 through 36 constitute a time-series of four neighborhood node ingress maps corresponding to ingress mitigated node BT-11 shown in FIGS. 23 and 24, wherein each heat map of the series is generated pursuant to the method outlined and discussed above in connection with FIG. 29. In tandem with generation of the time-series of maps 300A, 300B, 300C and 300D shown in FIGS. 33 through 36, some type of remediation effort (i.e., repair, replacement and/or adjustment of one or more system components) pursuant to phase 2 activity (discussed in greater detail below in Section IV) was conducted after generation of the heat map 300A and before generation of the heat maps 300B, and then again before generation of each of the heat maps 300C and 300D. Thus, the time series of four heat maps shown in FIGS. 33 through 36 represents multiple iterations of phase 1 and phase 2 activity, and illustrates corresponding incremental improvements in the noise profile (i.e., incremental and significant reductions in ingress) in the ingress mitigated node BT-11 pursuant to each iteration of phase 1 and phase 2 activity.

In the illustrated embodiments, each of the heat maps 300A, 300B, 300C and 300D includes a first graphical representation of the neighborhood node drive path 305 traversed by the mobile broadcast apparatus 130, together with a second graphical representation of the plurality of signal amplitudes representing locations of potential points of ingress in the neighborhood node, based on a color-coded scale for a relative degree of ingress as a function of geographic location. In particular, the x-axis or horizontal axis of each of the heat maps 300A, 300B, 300C and 300D represents latitude coordinates in degrees, the y-axis or vertical axis represents longitude coordinates in degrees, and a color legend 303 indicates a correspondence between colors represented in the heat map and a relative level of ingress, as represented by signal amplitudes representing strengths of an upstream test signal received at the headend of the cable communication system (e.g., black≈−90 dBmV; blue≈−80 to −70 dBmV; violet≈−60 dBmV; red≈−50 dBmV; red-orange≈−40 dBmV; orange≈−30 dBmV; orange-yellow≈−20 to −10 dBmV; yellow≈0 dBmV). While the heat maps 300A, 300B, 300C and 300D illustrated in FIGS. 33 through 36 use an essentially continuous color scale for the color legend 303, it should be appreciated that a discrete color scale similarly may be employed, of various resolutions.

Figure 33:
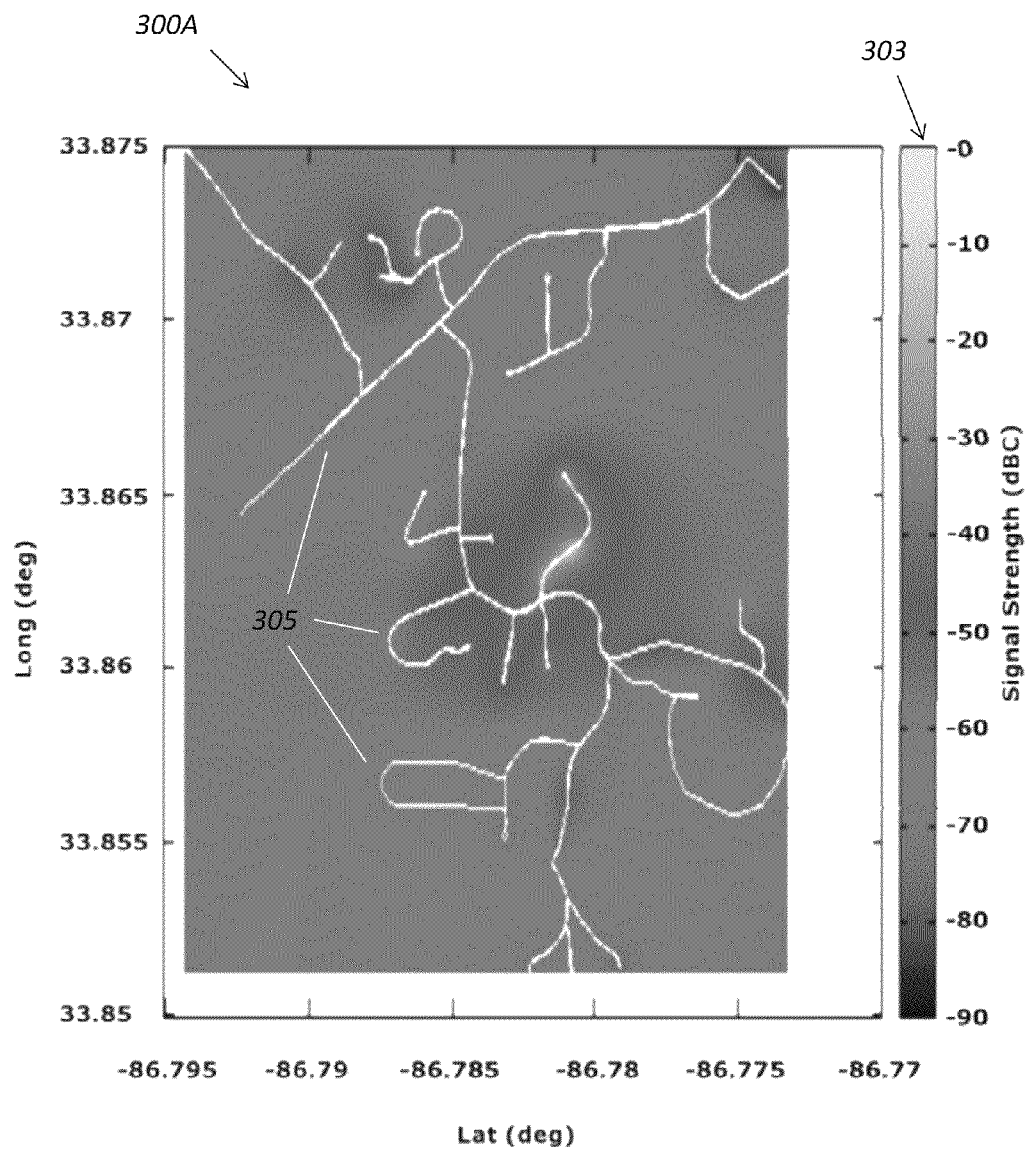
FIGS. 33 through 36 illustrate examples of neighborhood node ingress maps in the form of two-dimensional "heat maps," in which a visual code representing ingress is implemented as a color code, according to one embodiment of the present invention.
Figure 37:
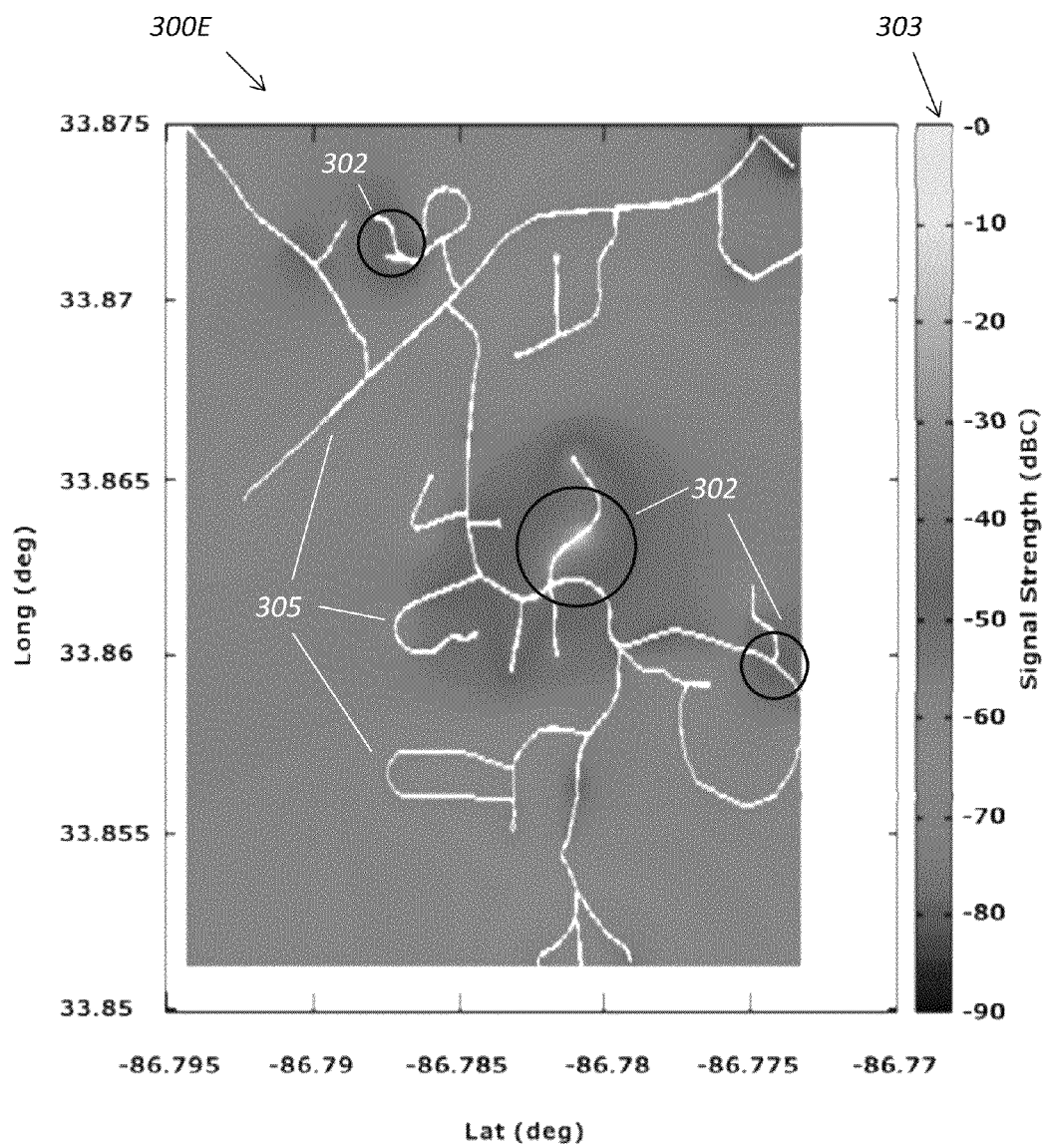
FIG. 37 illustrates a heat map similar to the map shown in FIG. 33, on which are indicated potential points of signal ingress, according to one embodiment of the present invention.

FIG. 37 illustrates a heat map 300E similar to the map shown in FIG. 33, on which are indicated potential points of signal ingress, according to one embodiment of the present invention. In some embodiments, as illustrated in FIG. 37, potential points of ingress may be indicated by circles 302 denoting specific areas at which relatively strong signal amplitudes of a broadcast test signal were received (e.g., by the analyzer 110), based on the color-coded legend. Although circles 302 are employed in FIG. 37 to indicate potential points of ingress on the head map 300E, it should be appreciated that any of a variety of symbols, marks, shapes colors or other indicators may be employed in various embodiments so as denote potential points of ingress. The circles 302 or other indicators may in some implementations be added manually to the heat maps following a visual inspection (e.g., via a user interface of a computing device such as the processor 102, or mobile broadcast apparatus and/or the portable/handheld field device); in other implementations, peak analysis with respect to some threshold value may be performed (e.g., as discussed above in Section III.B) in connection with the plurality of signal amplitudes in the second record so as to automatically generate and provide on the heat map circles 302 (or other indicators) to denote significant signal strengths indicating potential ingress.

Figure 38:
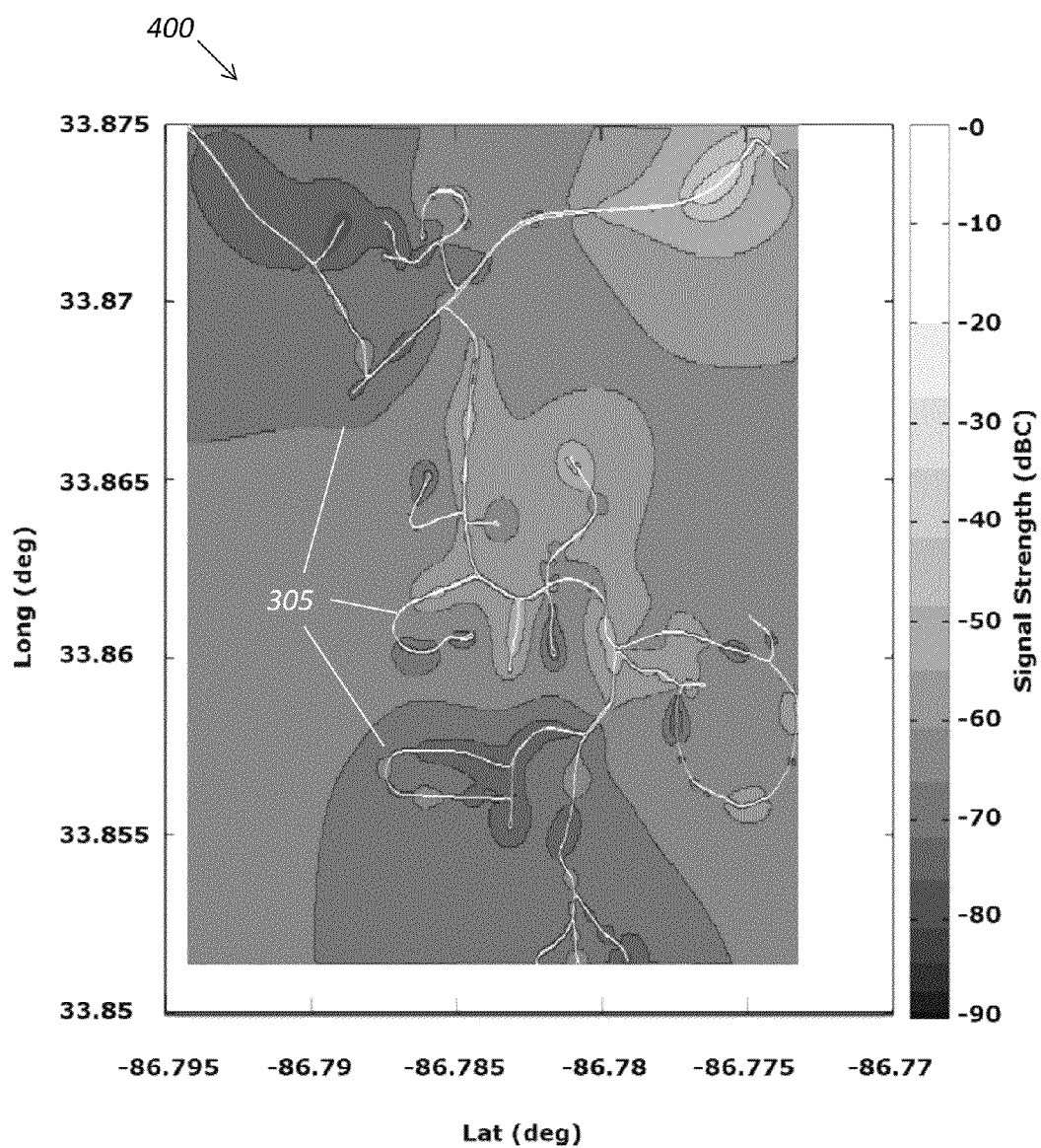
FIG. 38 illustrates another example of a neighborhood node ingress map in the form of a modified topographical map (e.g., contour map), according to one embodiment of the present invention.
Figure 39:
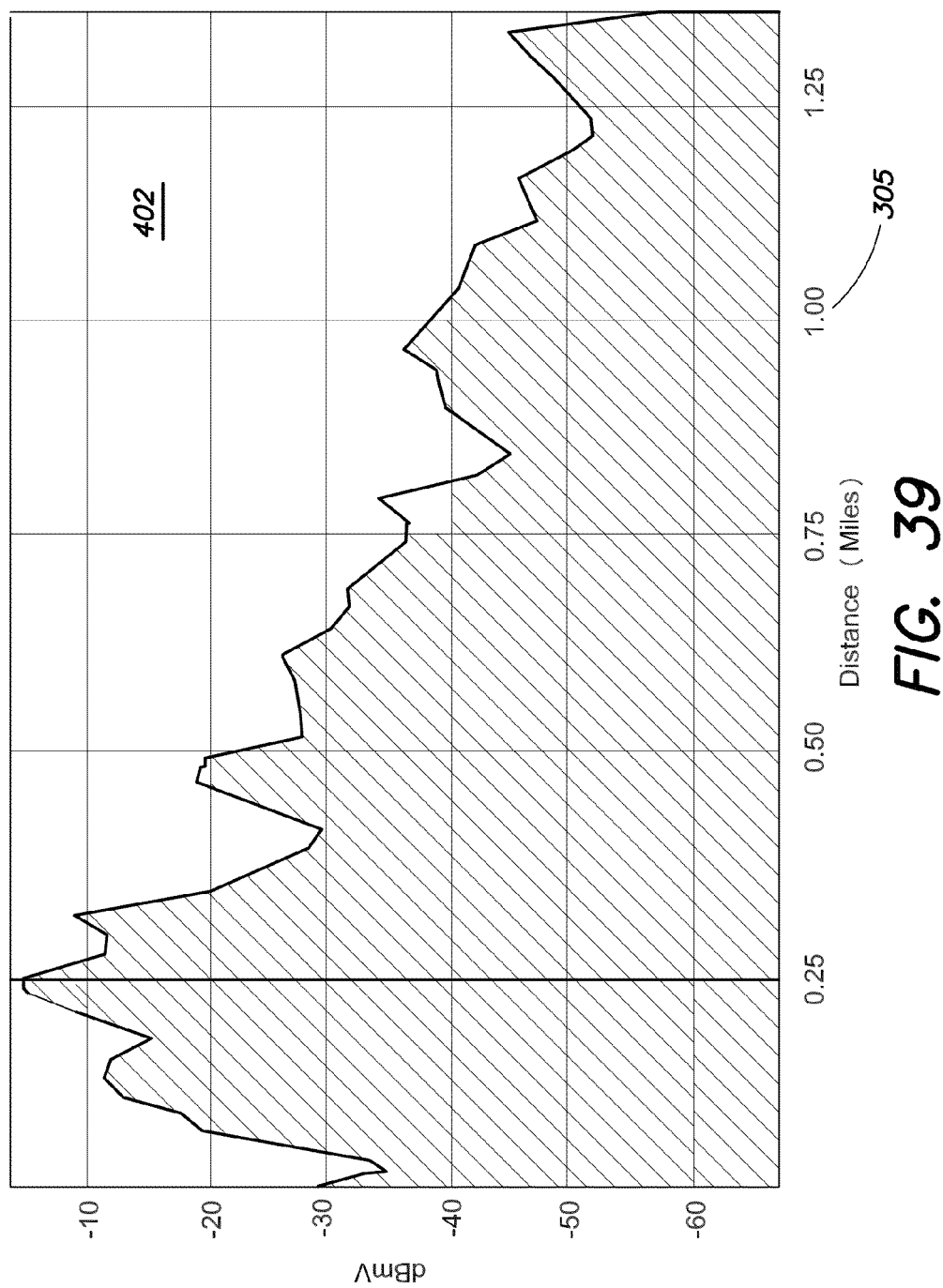
FIG. 39 illustrates another example of a neighborhood node ingress map in the form of a one-dimensional map (e.g., plot on a graph of signal amplitudes as a function of distance), according to one embodiment of the present invention.
Figure 40:
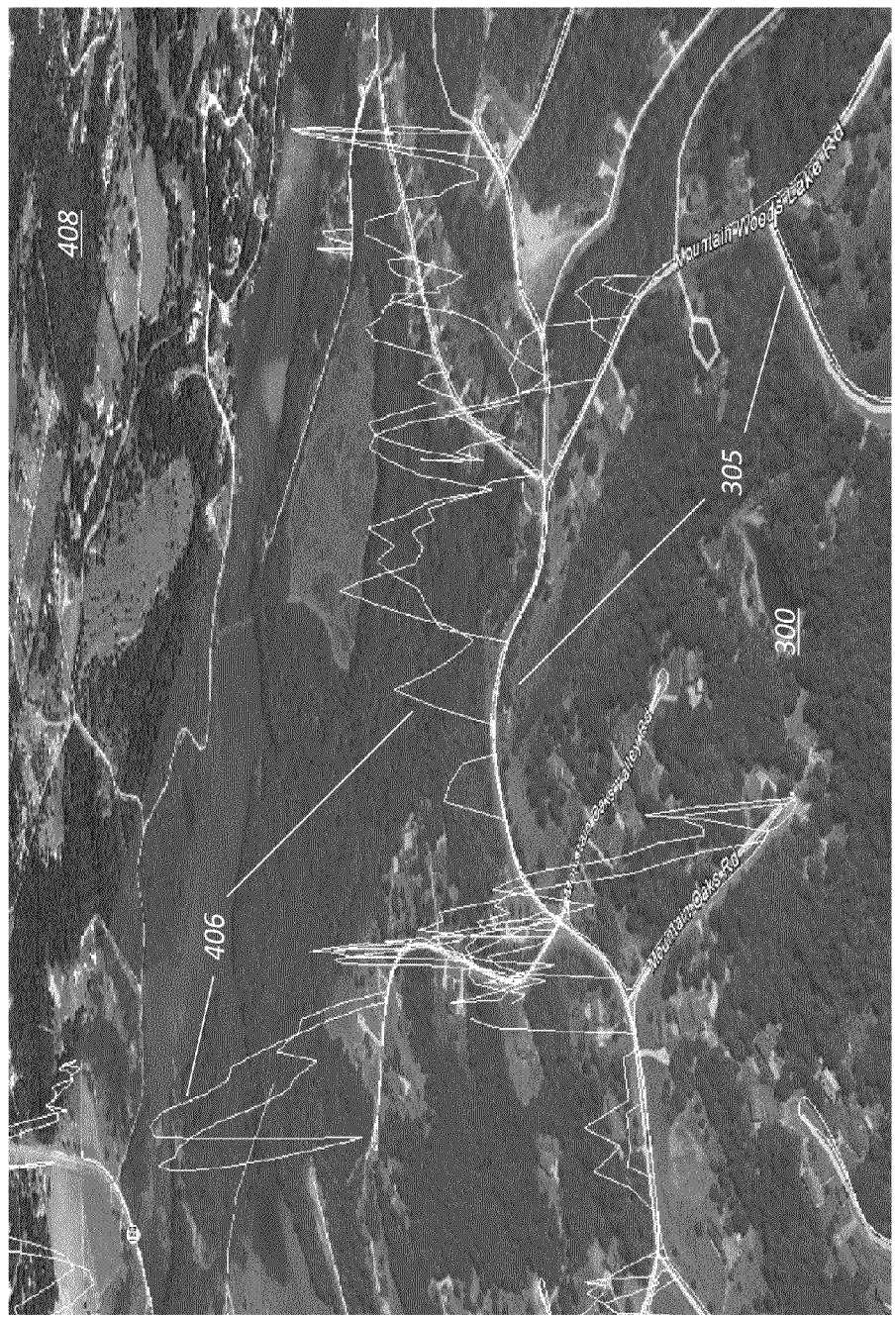
FIG. 40 illustrates another example of a neighborhood node ingress map in the form of a three-dimensional map, according to one embodiment of the present invention.

In other embodiments, the graphical representation for a neighborhood node ingress map may be in the form of a modified topographical map, in which contour lines are employed to reflect signal amplitude rather than elevation. To this end, FIG. 38 illustrates another example of a neighborhood node ingress map in the form of a modified topographical map, or contour map 400, in which contour lines (and optionally different shadings within an area bounded by a contour line) are employed to signify signal strength. In another example, the neighborhood node ingress map may be in the form of a one-dimensional map 402, as shown in FIG. 39, illustrating signal amplitude (e.g., along a vertical or y-axis) as a function of time or position (e.g., along a horizontal or x-axis) along at least a portion of the neighborhood node drive path 305. In yet another example, the neighborhood node ingress map may be in the form of a three-dimensional map 404, as shown in FIG. 40, in which the signal amplitudes 406 may be plotted along a z-axis, and a heat map 300 for at least a portion of the ingress mitigated node BT-11 also is illustrated in the x-y plane to provide another type of visualization for ingress in the cable communication system. In FIG. 40, the three-dimensional map 404 also includes an aerial image layer 408 which, as discussed in greater detail below, may be included as one of multiple layers in an ingress "overlay" map (discussed further below). In various aspects, in a manner similar to two-dimensional representations, color, gray-scale, or other types of visual codes also may be employed in connection with a one-dimensional or three-dimensional graphical representation. Thus, it should be appreciated that various examples of neighborhood node ingress maps are provided in the accompanying figures primarily for purposes of illustration, and that a variety of graphical representations may be employed to render neighborhood node ingress maps according to various embodiments of the present invention.

From both FIGS. 39 and 40, a profile of the plurality of signal amplitudes may be more clearly observed as a function of distance traversed along at least a portion of the neighborhood node drive path 305 (and similarly as a function of time). As discussed above in Section III.B, the signal amplitudes may in some embodiments be processed and/or analyzed (e.g., by the processor 120), so as to adduce various information relevant to identification of possible faults constituting potential points of ingress. For example, the magnitude of respective peaks in the profile of signal amplitudes may suggest particular types of faults, as well as respective positions of different peaks relative to one another (e.g., resulting from constructive/destructive interference of the test signal entering into multiple faults), and/or different rates of change in the signal amplitude associated with one or more peaks (e.g., which manifest as different peak heights and/or different widths of peak waveforms). As discussed above and illustrated in connection with FIGS. 30, 31 and 32, interference patterns resulting from a test signal entering into multiple faults, and/or different amplitude profiles resulting from respective distances between the transmitter of the test signal and a given fault, provide significant and useful information that may facilitate fault identification. In some implementations, mere observation of such amplitude profiles by a trained/experienced technician, with or without the aid of signal processing enabled by the processor 102, may reveal valuable empirical insights into the nature and/or location of various possible faults.

In yet other embodiments, the processor 120 may provide information relating to a neighborhood node ingress map so as to render one or more maps as ingress "overlay" maps, in which one or more representations of information are overlaid on one or more other representations of information. In one aspect, respective layers of an ingress overlay lap may be independently selectable and/or independently viewable layers so as to facilitate comparative viewing of the information represented in the respective layers, and in some instances manipulation of information (e.g., pan, zoom, color/graytone options, crop, etc.) to facilitate enhanced viewing. As noted above, the processor 120 may utilize a variety of information, examples of which include but are not limited to, the first and second records, satellite or aerial images, street maps, cable facilities maps, parcel maps, ambient ingress maps, environmental information (e.g., weather, terrain), various subscriber information, and various DOCSIS information (which information the processor may acquire from any of a variety of sources via communication interface 122 and/or communication network 150, and/or stored in memory 126). As noted above, information provided by the processor 120 for rendering graphical representations of ingress overlay maps may be communicated by the processor to any one or more of the analyzer 110, mobile broadcast apparatus 130, or portable/handheld field device 140 shown in FIG. 28, and/or ingress overlay maps may be displayed locally on the processor's display device 121.

More generally, any one or more layers of information that may constitute one or more layers of a neighborhood node ingress map in the form of an ingress overlay map may be in the form of an "input image" that may be represented by source data that is electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, an input image may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information"). In view of the foregoing, various examples of input images that may constitute at least a portion of a neighborhood node ingress map, and source data representing such input images, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.);

Various maps indicating surface features and/or extents of geographical areas, such as street/road maps, topographical maps, military maps, parcel maps, tax maps, town and county planning maps, call-center and/or facility polygon maps, virtual maps, etc. (such maps may or may not include geo-encoded information);

Facility maps illustrating installed underground facilities, such as gas, power, telephone, cable, fiber optics, water, sewer, drainage, etc. Facility maps may also indicate street-level features (streets, buildings, public facilities, etc.) in relation to the depicted underground facilities. Examples of facility maps include CAD drawings that may be created and viewed with a GIS to include geo-encoded information (e.g., metadata) that provides location information (e.g., infrastructure vectors) for represented items on the facility map;

Architectural, construction and/or engineering drawings and virtual renditions of a space/geographic area (including "as built" or post-construction drawings);

Land surveys, i.e., plots produced at ground level using references to known points such as the center line of a street to plot the metes and bounds and related location data regarding a building, parcel, utility, roadway, or other object or installation;

A grid (a pattern of horizontal and vertical lines used as a reference) to provide representational geographic information (which may be used "as is" for an input image or as an overlay for an acquired "real world" scene, drawing, map, etc.);

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML); and Photographic renderings/images, including street level, topographical, satellite, and aerial photographic renderings/images, any of which may be updated periodically to capture changes in a given geographic area over time (e.g., seasonal changes such as foliage density, which may variably impact the ability to see some aspects of the image).

It should also be appreciated that source data representing an input image may be compiled from multiple data/information sources; for example, any two or more of the examples provided above for input images and source data representing input images, or any two or more other data sources, can provide information that can be combined or integrated to form source data that is electronically processed to display an image on a display device.

In various embodiments, respective layers of a neighborhood node ingress map may be displayed side by side with one or more input images, or alternatively may be overlaid on one another (e.g., via appropriate correlation/registration of a geographic coordinate reference frame used for geographic coding of the ingress map and input image(s)). In one aspect, the respective layers may be selectively enabled or disabled for display (via a user interface associated with a display device) to facilitate comparative overlaid viewing with one another. In particular, in one implementation, with reference again to the ingress detection system 100 shown in FIG. 28, any one or more of the display device(s) 111, 121, 131, and 145 may be controlled to display an ingress overlay map including multiple information layers. In one aspect, the technician may employ a user interface in any one of the analyzer 110, processor 120, mobile broadcast apparatus 130, or portable/handheld field device 140 to select display layers for viewing, and adjust the scale, resolution and/or position of the displayed ingress overlay map.

Figure 41:
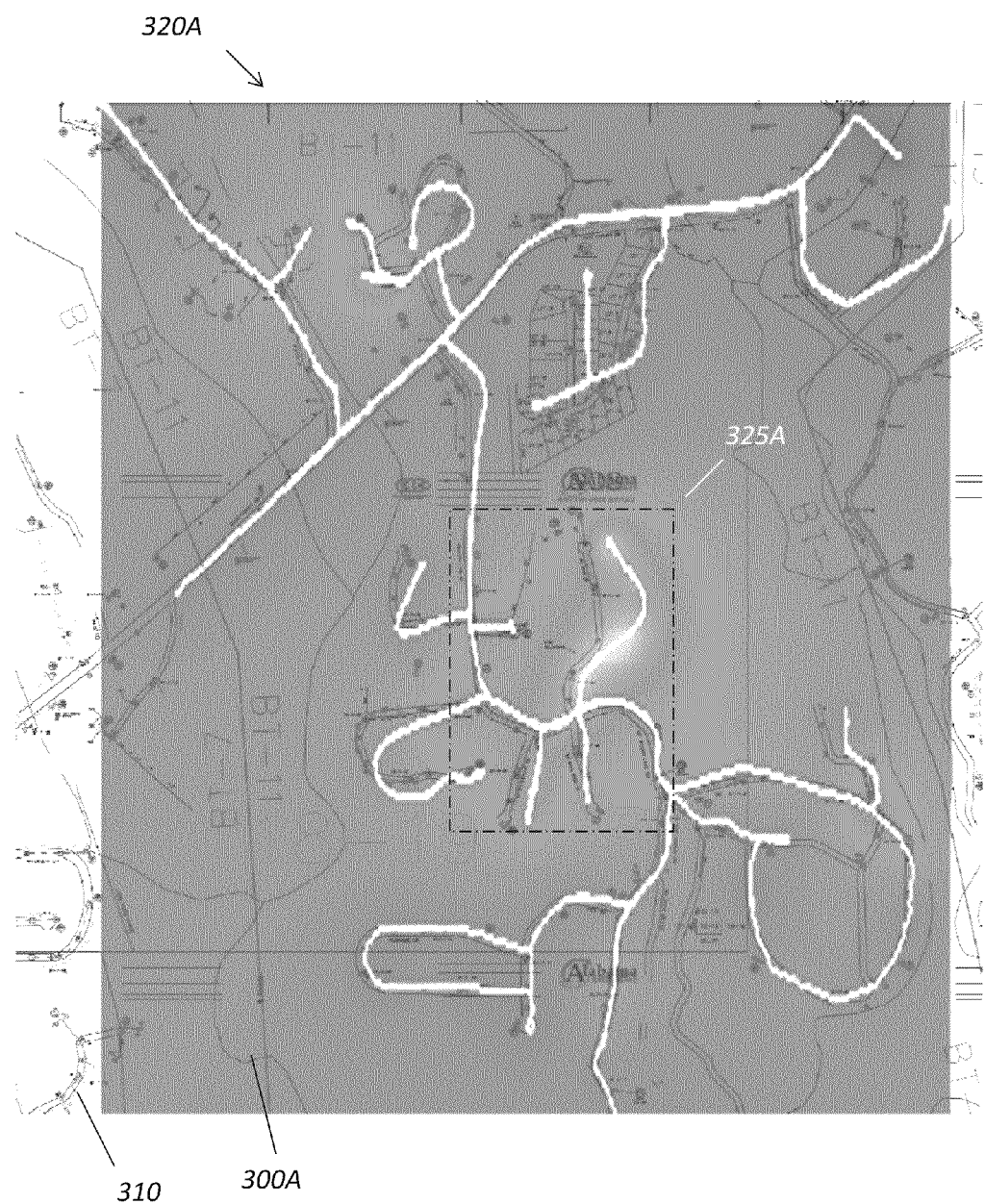
FIG. 41 illustrates another example of a neighborhood node ingress map in the form of an ingress overlay map, in which the heat map of FIG. 33 is overlaid on the cable facilities map of FIG. 24, according to one embodiment of the present invention.

FIG. 41 illustrates a first ingress overlay map 320A serving as a neighborhood node ingress map, in which the heat map 300A of FIG. 33 is overlaid on the cable facilities map 310 of FIG. 24. In FIG. 41, a center portion 325A of the map 320A is indicated, which is in turn shown expanded and with greater resolution in FIG. 42. In general, via the visual aid of such an ingress overlay map in which a cable facilities map 310 is used as a constituent layer, a field technician may readily identify ingress trouble spots in the hardline coaxial cable plant, target specific areas/elements of the hardline cable plant for further investigation, and target specific components of the hardline cable plant for repair, replacement or adjustment. In some implementations, as discussed above in Section III.B, processing/analysis of the first record of geographic information and the second record of signal amplitudes (e.g., thresholding of amplitude peaks, analysis of rate of change of amplitudes), in some instances together with additional information (e.g., metadata from the cable facility map 310), provides for automated indications on the ingress overlay map 320A of possible faults constituting potential points of ingress. Accordingly, one or both of the visual aid provided by heat map overlaid on a cable facilities map, and automated indications of possible faults, provide a valuable tool to facilitate remediation of faults.

Figure 42:
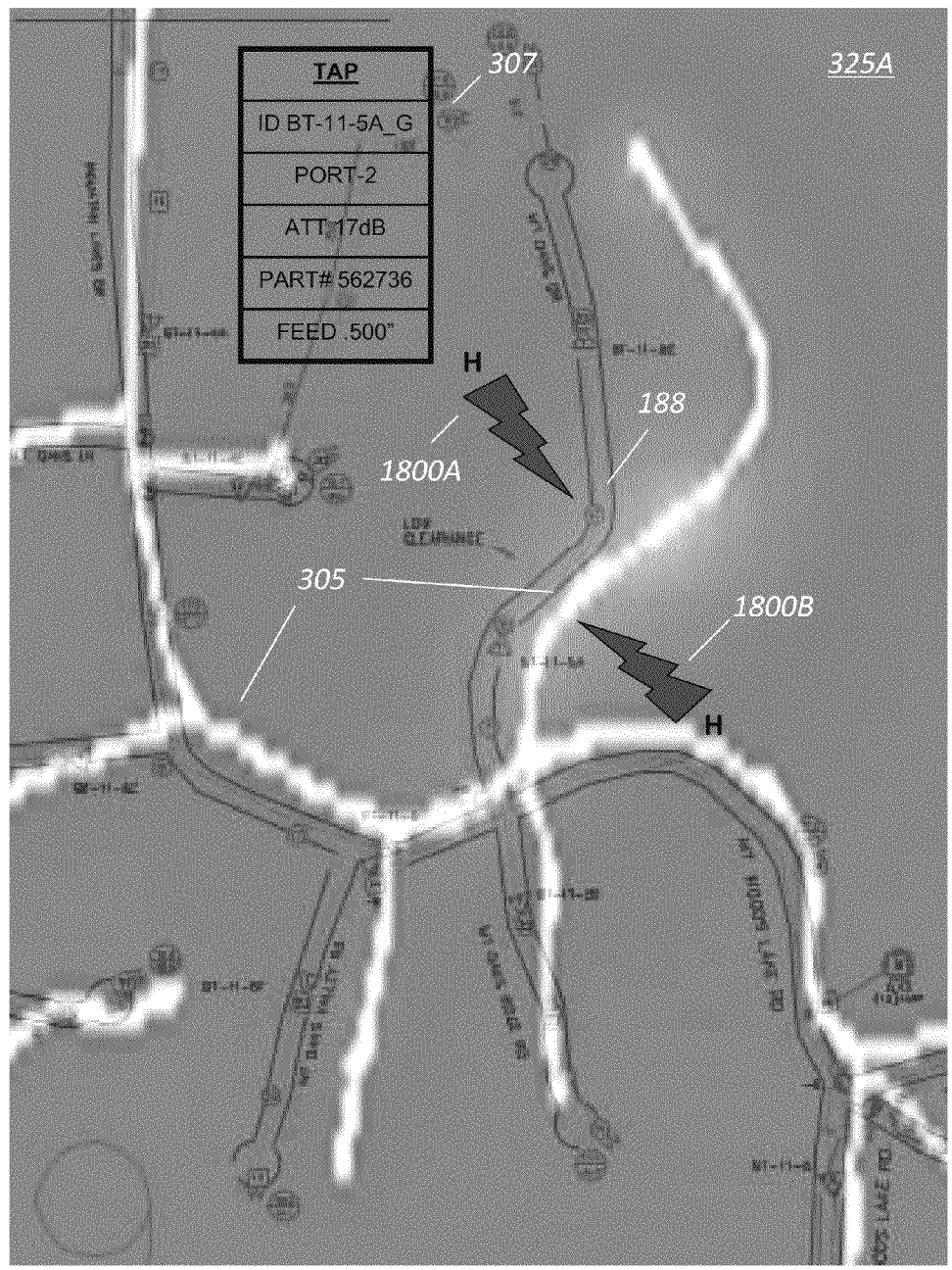
FIG. 42 illustrates a portion of the ingress overlay map of FIG. 41 to show additional details of cable communication system infrastructure and a possible hardline coaxial cable plant-related fault in a portion of the neighborhood node.

From FIG. 42, it may be readily observed from the expanded portion 325A of the ingress overlay map 320A that a region of high signal amplitude (appearing in a yellow-orange color in the heat map 300A) indicated along an uppermost vertical portion of the neighborhood node drive path 305 ("Mountain Oaks Dr.") suggests one or more faults. More specifically, FIG. 42 includes a first indicator 1800A (e.g., a "lightning bolt" with the letter "H") to indicate a first possible fault in the hardline coaxial cable plant (in which a nearby tap 188 is indicated in the underlying cable facilities map 310), and a second indicator 1800B to indicate a second possible fault in the hardline coaxial cable plant. FIG. 42 also indicates an information table 307 in connection with the first possible fault (the nearby tap 188), showing various information regarding the component suspected of being faulty (an identification for the tap, number of ports, attenuation value, hardline cable diameter to which the tap is coupled, etc.). Such an information table 307 may be provided for one or more faults indicated on the ingress overlay map 320A; for example, while not shown explicitly in FIG. 42, the second indicator 1800A may be associated with a length of hardline coaxial cable suspected as being faulty, and an information table in connection with same may indicate a plant location ID for the cable, a cable diameter, and part numbers/ID for the nearest active or passive components. In some implementations, a "scroll-over" of the area proximate to a fault indicator may cause such an information table 307 to be displayed).

Figure 43:
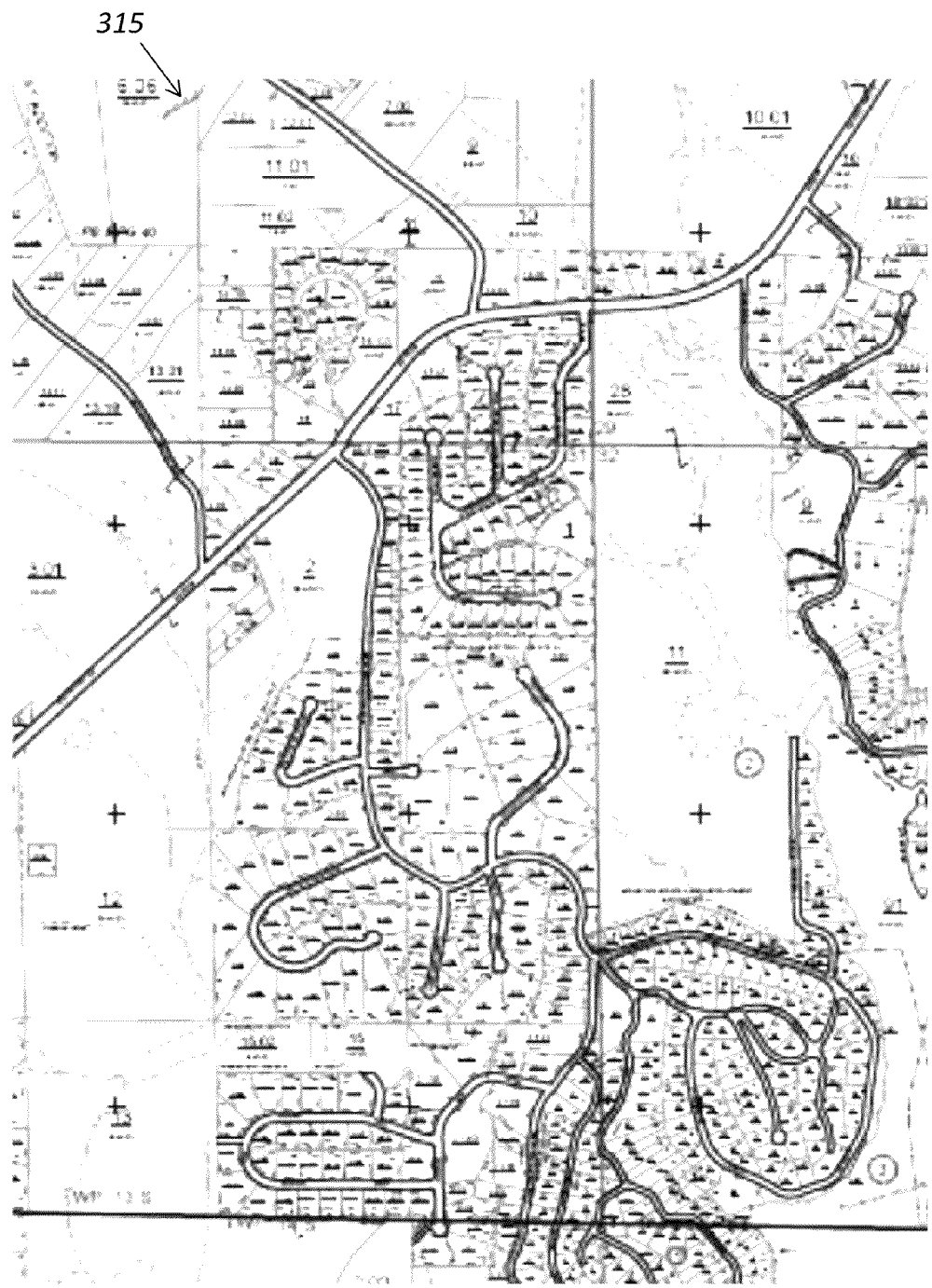
FIG. 43 illustrates a parcel map corresponding to the neighborhood node shown in FIGS. 41 and 42.
Figure 44:
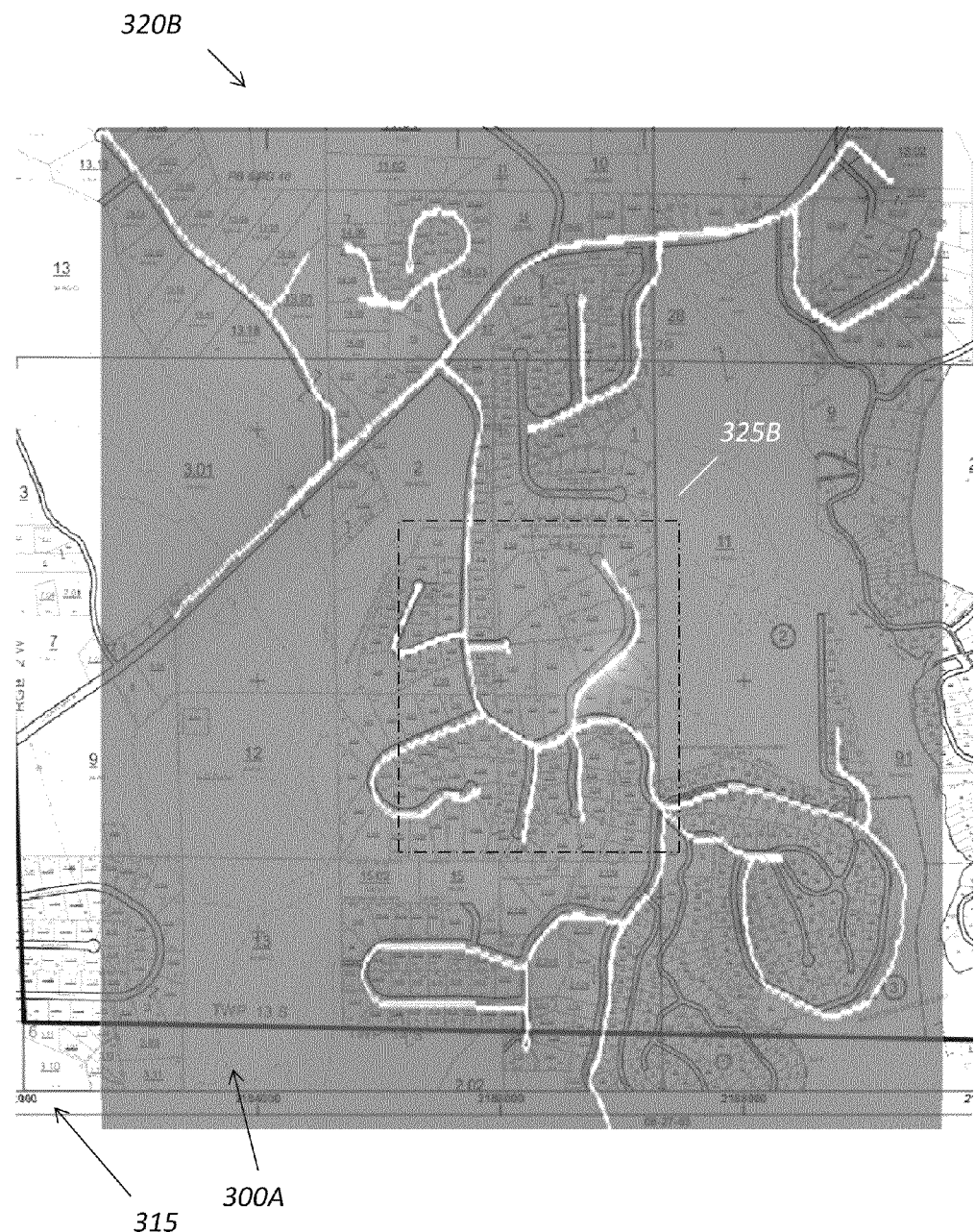
FIG. 44 illustrates another example of a neighborhood node ingress map in the form of an ingress overlay map, in which the heat map of FIG. 33 is overlaid on the parcel map of FIG. 43, according to one embodiment of the present invention.
Figure 45:
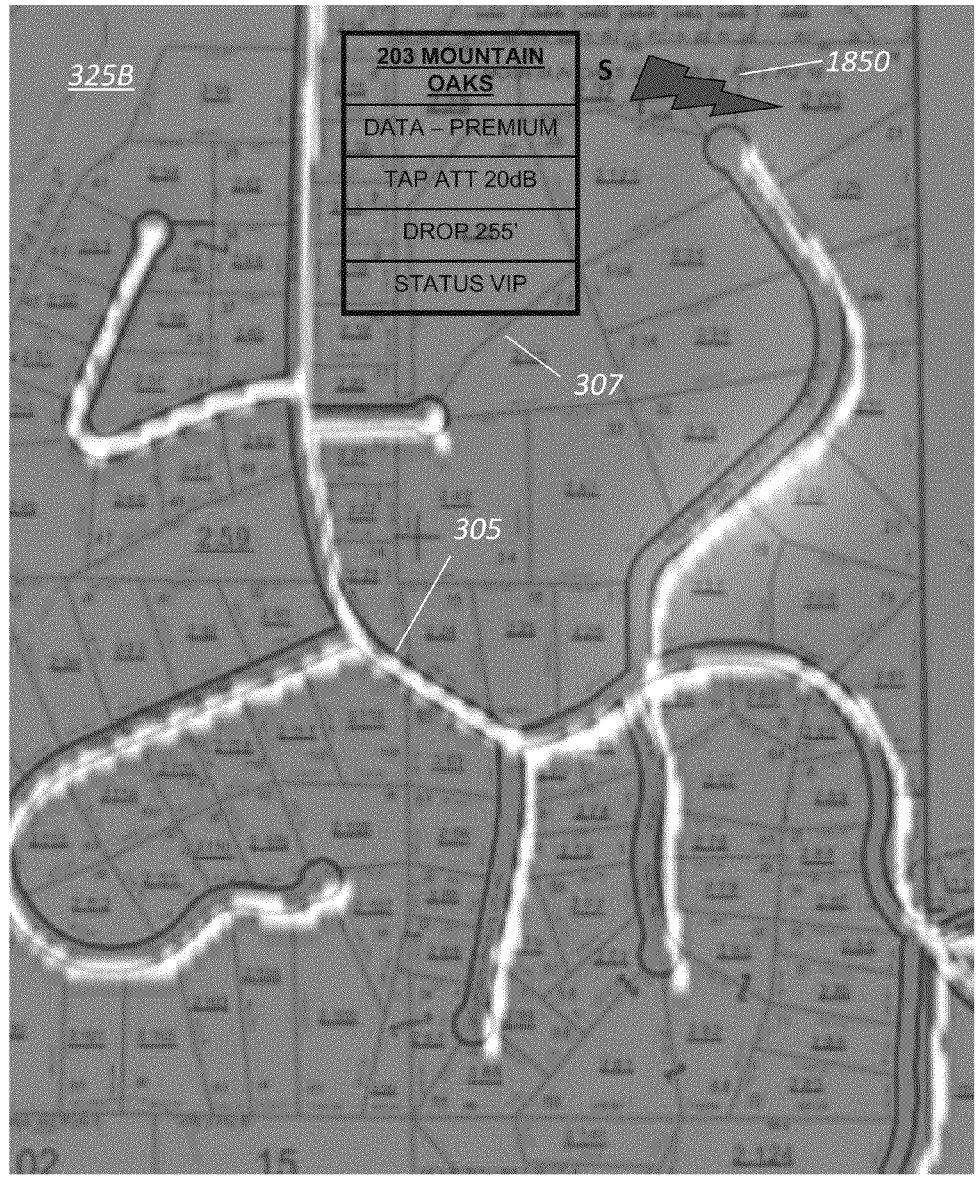
FIG. 45 illustrates a portion of the ingress overlay map of FIG. 44.

FIG. 43 illustrates a parcel map 315 corresponding to the ingress mitigated node BT-11 shown in FIGS. 41 and 42, which parcel map also may be utilized as a layer in an ingress overlay map serving as a neighborhood node ingress map according to one embodiment of the invention. To this end, FIG. 44 illustrates another example of a neighborhood node ingress map in the form of an ingress overlay map 320B, in which the heat map 300A of FIG. 33 is overlaid on the parcel map 315 of FIG. 43. In FIG. 44, a center portion 325B of the map 320B is indicated, which is in turn shown expanded and with greater resolution in FIG. 45. In various embodiments, information contained in the parcel map 315 relating to the households passed by hardline cable plant (and the neighborhood node drive path), and the metes/bounds of same, may facilitate identification of possible subscriber-related faults, and differentiation between hardline cable plant-related faults and subscriber-related faults. In particular, by combining information from a heat map, a parcel map, and various subscriber information (e.g., provided by the cable communication system operator), subscriber-related faults vis a vis hardline cable plant-related faults may be more readily identified. In FIG. 45, a subscriber-related fault indicator 1850 (e.g., a "lightning bolt" with the letter "S") is provided to indicate a potentially problematic subscriber premises and/or subscriber drop. FIG. 45 also indicates an information table 307 in connection with the suspected subscriber-related fault, similar to that shown in FIG. 43, providing various information regarding the associated subscriber (address, data services package, tap attenuation value, length of drop cable, any special status such as VIP subscriber, hospital, school, military, government, etc.).

Thus, ingress overlay maps involving one or both of a cable facilities map 310 and a parcel map 315 may include various information relating to respective elements of the hardline coaxial cable plant and/or subscriber premises in the neighborhood node displayed on the ingress overlay map. With respect to elements of the hardline coaxial cable plant, such information may include system design information relevant to respective components (e.g., location ID number, model number, standard operating levels, date and purpose of last visit by a technician, subscriber counts/addresses for taps, etc.). With respect to subscriber premises, an ingress overlay map including a parcel map may further display for one or more subscriber premises the associated account information (e.g., phone number, address, service plan type, number/type of outlets, date purpose and resolution codes of last service call, VIP or other special status etc.).

Figure 46:
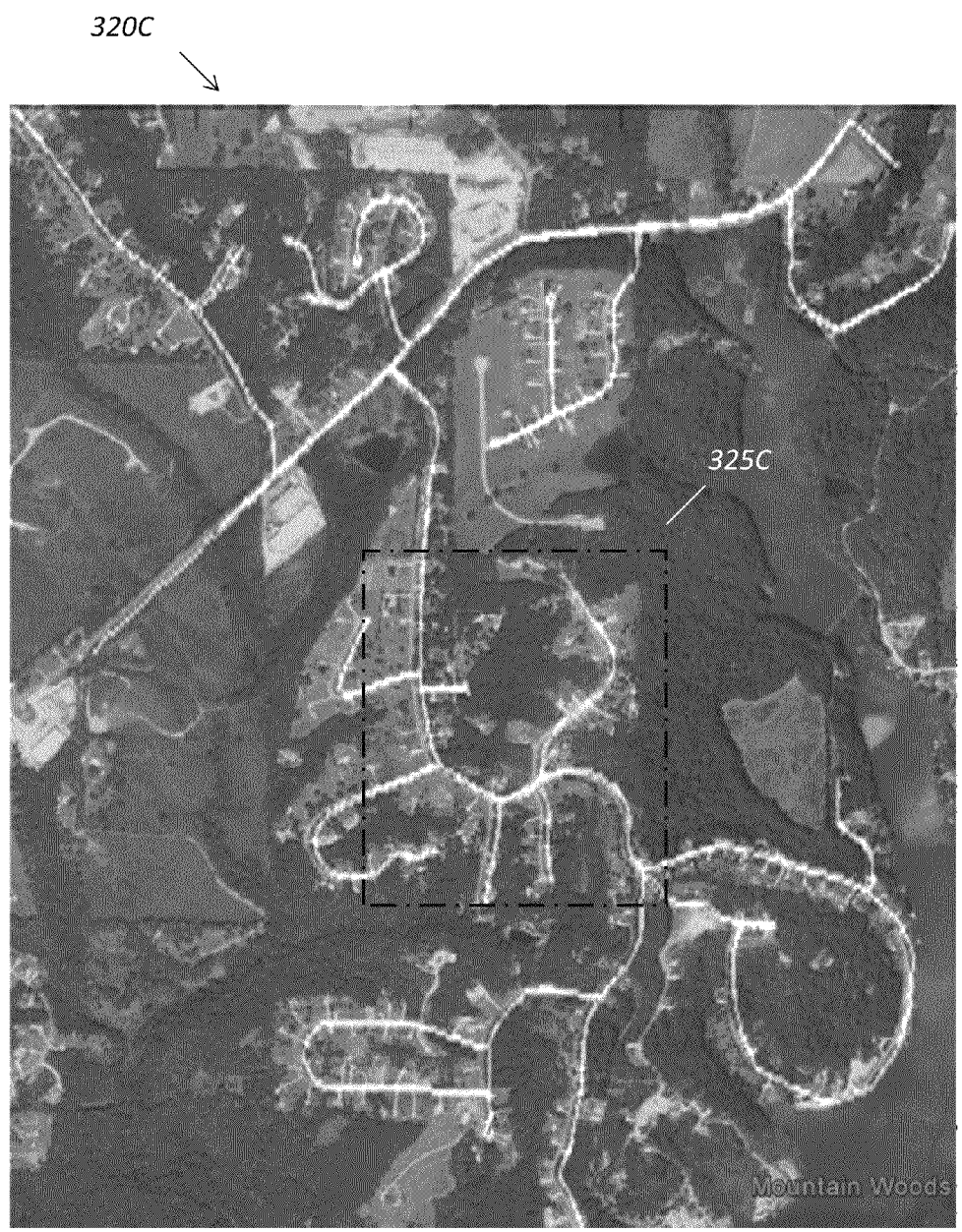
FIG. 46 illustrates another example of a neighborhood node ingress map in the form of an ingress overlay map, in which the heat map of FIG. 33 is overlaid on an aerial image, according to one embodiment of the present invention.
Figure 47:
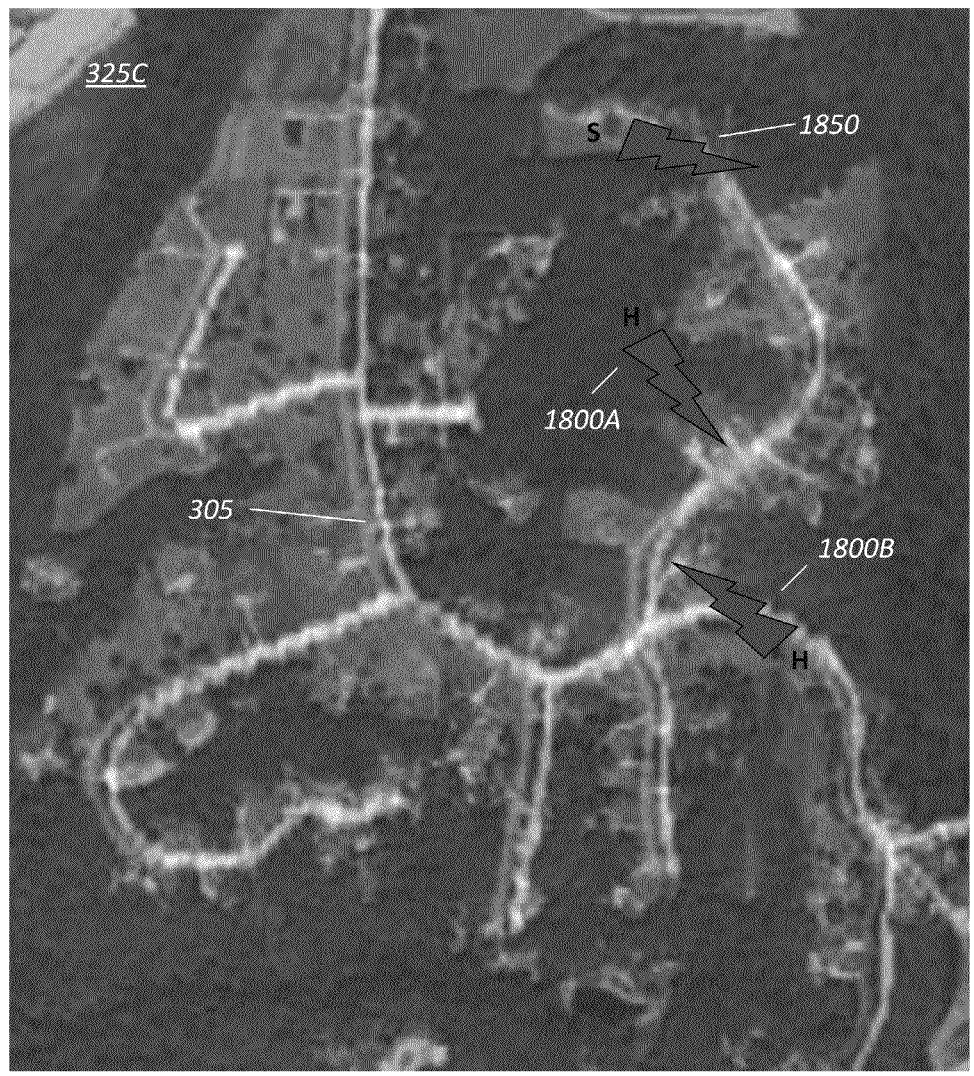
FIG. 47 illustrates a portion of the ingress overlay map of FIG. 46.

FIG. 46 illustrates another example of a neighborhood node ingress map in the form of an ingress overlay map 320C, in which the heat map 300A of FIG. 33 is overlaid on an aerial image (e.g., obtained from Google Earth), according to one embodiment of the present invention. In one implementation, registration of the heat map 300A on the aerial image may be accomplished by calculating the maximum north, south, east, and west values of the bounding drive path from the ingress map to determine the appropriate metes and bounds of the satellite/aerial image. In FIG. 46, a center portion 325C of the map 320C is indicated, which is in turn shown expanded and with greater resolution in FIG. 47. In a manner similar to the cable facilities map 310 and the parcel map 315, ingress overlay map 320C including an aerial image that shows various terrain features as well as the footprint of the neighborhood node drive path 305 and premises within the neighborhood may facilitate identification of one or more hardline cable plant-related faults and/or one or more subscriber-related faults. For example, in the portion 325C of the ingress overlay map 320C, FIG. 47 illustrates first and second hardline cable plant fault indicators 1800A and 1800B, as well as subscriber-related fault indicator 1850, so as to facilitate differentiation between possible hardline cable plant-related faults and subscriber-related faults. It should be appreciated that such fault indicators for hardline cable plant-related faults and subscriber-related faults, respectively (which may include any of a variety of codes or symbols) may be employed with "single layer" neighborhood node ingress maps (e.g., heat maps, contour maps, maps of various dimensions, etc.) as well as different types of ingress overlay maps serving as a neighborhood node ingress map according to various embodiments.

For example, in accordance with various embodiments, information such as customer VIP lists, environmental data, terrain maps, technician activity/location, or DOCSIS status reporting, could be incorporated into a visual rendering or graphical representation constituting part of a neighborhood node ingress map, as one or more separate layers and/or selectable elements of one or more layers. In some implementations, display of such information may include, but is not limited to: "push-pins" or other markers to indicate the location of business or VIP customers, since service interruption protocols for plant corrective action may differ for these customers (e.g., there may be notification requirements, restricted time-of-day service windows, etc.); current or historical weather data tied to the ingress mapping may elucidate intermittent problems related to environmental conditions such as rain or cold temperatures, or other significant weather conditions that may bear upon different cable communication system elements and particularly the hardline coaxial cable plant; knowledge of recent or concurrent activity by other technicians may further inform the troubleshooting or repair process.

IV. Phase 2—Local Ingress Verification And Remediation

In phase 2 of a two-phase implementation of an ingress detection and remediation method according to one embodiment of the present invention, specific locations of ingress in a neighborhood node under evaluation are verified, and system components in the neighborhood node that are directly responsible for ingress (particularly in the hardline coaxial cable plant) are specifically identified, isolated, and repaired, replaced or adjusted if/as necessary. In particular, based on one or more neighborhood node ingress maps generated in phase 1, a field technician may proceed to one or more particular locations in the neighborhood node where the map(s) indicate potential points of signal ingress, and employ a portable (e.g., handheld) field device 140 as a test instrument, as discussed above (see FIG. 28), to specifically identify potential ingress points by traversing a target ingress problem area with greater geographical resolution (e.g., on foot, by bicycle, via a small motorized or non-motorized vehicle, etc.).

In some embodiments of phase 2 activity, a field technician may first proceed to a target ingress problem area in a vehicle traversing some portion of the neighborhood node under evaluation. During such an initial "drive out" en route to a target ingress problem area, geographic information from the first record and signal amplitudes from the second record generated during phase 1 activity may be used to provide to the field technician one or more indications in the vehicle (e.g., audible and/or visual indications) of signal strength as measured and recorded during phase 1 at various positions along the neighborhood node drive path; in essence, the original phase 1 drive-through may be "replayed" in some fashion to the field technician so as to provide indicators (e.g., audible and/or visual warnings) to the technician as the vehicle approaches areas where significant signal amplitudes were measured during phase 1 activity. In one implementation, a first neighborhood node ingress map generated during phase 1 activity may be displayed on a display screen in the vehicle, in which a geo-marker for the vehicle location during phase 2 "drive-outs" is superimposed on the ingress map (to provide the technician with a "you are here" indicator).

Figure 48:
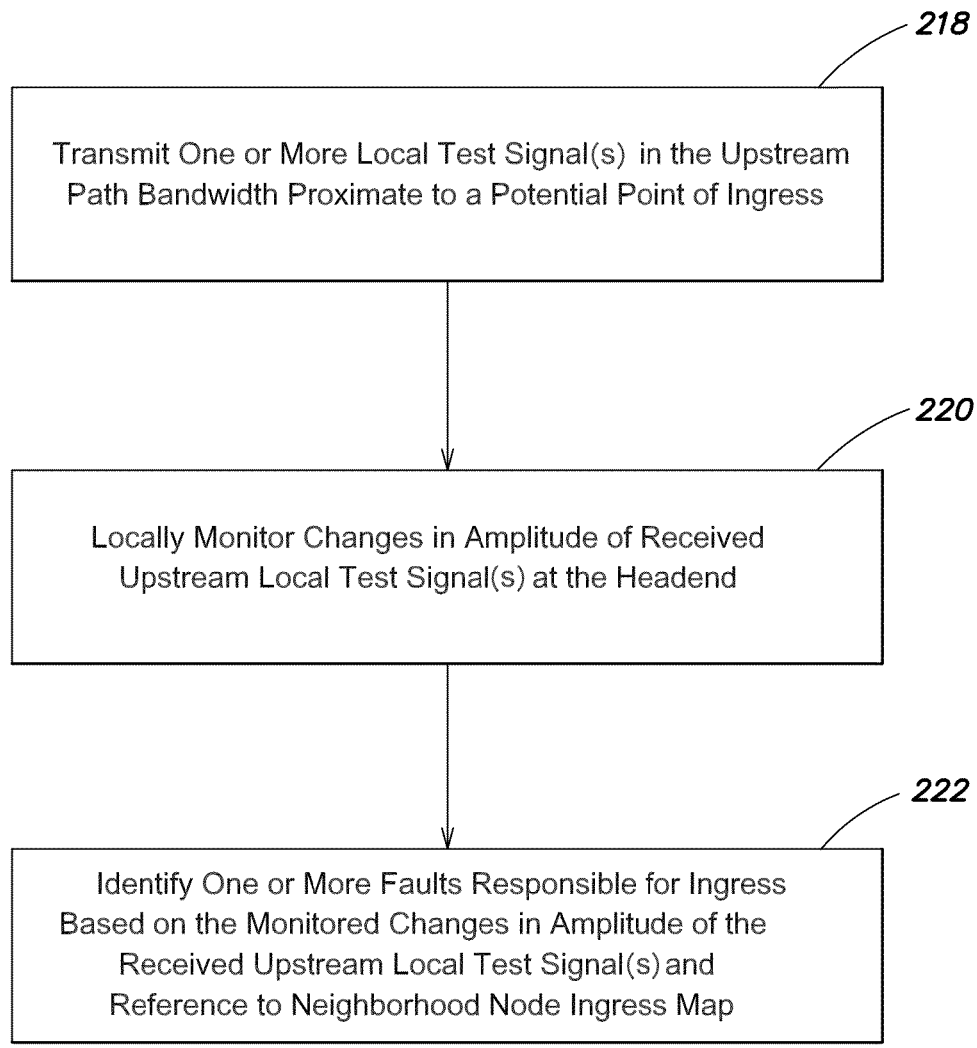
FIG. 48 illustrates a flow chart of a method for ingress detection and remediation according to one embodiment of the present invention.

FIG. 48 outlines phase 2 of an exemplary ingress detection and remediation method according to one embodiment of the present invention. At block 218, one or more local test signals is/are transmitted, at or proximate to at least one potential point of the signal ingress, in an upstream path bandwidth of the neighborhood node under evaluation. For example, with reference again to FIG. 28, portable or handheld device 140 including a transmitter 143 may be used by a field technician sent to investigate potential points of ingress that were identified on the map generated by processor 120 in phase 1, discussed above (i.e., the technician may determine the potential point of the signal ingress via a neighborhood node ingress map generated in phase 1, and may also consult a cable communication system facilities map illustrating at least a portion of an infrastructure of the at least one neighborhood node of the cable communication system, if not included as part of the neighborhood node ingress map). The transmitter of the portable or handheld device (or an independent transmitter employed by the technician) may be directed by the technician so as to "sweep" across and/or along and sufficiently proximate to an identified possible fault constituting the potential point of ingress while generating one or more local test signals, which signal(s) is/are transmitted in the upstream path bandwidth via the fault.

As in phase 1, in one aspect the local test signal(s) is/are transmitted without significantly interfering with operative signaling in the upstream path bandwidth from one or more subscriber premises of the neighborhood node under evaluation (e.g., via an "unused" frequency in the upstream path bandwidth, modulation such as spread spectrum, TDM, pulse signal, etc.). More specifically, any of the techniques discussed above in Section III.A relating to the transmission of test signals during phase 2 activity may apply similarly to the transmission of one or more local test signals during phase 2 activity.

At block 220, signal amplitudes representing a strength of a received upstream local test signal at a headend of the cable communication system, based on the transmitted local test signal in block 218, are received at or proximate to the at least one potential point of the signal ingress (e.g., by the portable or handheld field device employed by the technician) as the technician traverses (e.g., walks around) the target ingress problem area. More specifically, a signal receiver or analyzer (e.g., see the analyzer 110 in FIG. 28) at the headend monitors the upstream path bandwidth of the neighborhood node under evaluation and records signal amplitudes corresponding to received upstream local test signals (if any). These amplitudes are then conveyed in essentially real time to the field technician to provide feedback on the degree of ingress present within the target problem area.

In one example, a base technician at the headend 162 communicates (e.g., via two-way radio, cell phone, text message, email, etc.) the received signal amplitudes to the field technician to provide feedback on the received signal strength as the field technician traverses the target problem area. In another example, a signal receiver (the analyzer 110 at the headend) includes a communication interface communicatively coupled to the portable or handheld field device 140 (e.g., via the communication network 150) so that the device 140 may receive signal amplitude readings via any known communication method in essentially real time. This information can in turn be conveyed by the device 140 (e.g., audibly, visually or both) to the field technician to provide essentially real time feedback.

More specifically, in one embodiment, the signal receiver includes a communication interface communicatively coupled to the Internet, and the field device 140 remotely accesses the signal receiver, via the Internet, so as to receive the signal amplitudes representing the strength of the received upstream test signal at the headend of the cable communication system. As discussed above in connection with FIG. 28, the field device 140 may include a display device to display one or more indications corresponding to the received signal amplitudes (e.g., a numeric display, a bar graph, a simulated meter, etc.). Alternatively, the field device 140 may include a telecommunications device that communicates with the analyzer/headend via a telecommunications link (e.g., serving as the communication network 150).

In another aspect of block 220 of the method outlined in FIG. 48, the neighborhood node ingress map generated in phase 1 (which may include an ingress overlay map constituted in part by a cable facilities map illustrating cable communication system infrastructure—e.g., see FIGS. 41 and 42), may be displayed locally to the field technician (e.g., via the display device of the portable or handheld field device 140). In this manner, with reference to the cable facilities map layer showing hardline coaxial cable plant infrastructure and component details in the neighborhood node under evaluation, the field technician may specifically identify the faulty/defective component(s) of the hardline coaxial cable plant that is/are responsible for ingress in the neighborhood node.

In yet another aspect, the CPU(s) 144 further may control the display device(s) 145 of the field device 140 to also display for the technician one or more of the ingress map generated in phase 1, and one or more other maps or images corresponding to the geographic area covered by the ingress map, so as to facilitate an orientation of the ingress profile to the environmental surroundings and/or the hardline coaxial cable plant infrastructure. In some implementations, visualizations employing augmented reality may be used, such that as the technician points the field device 140 in various directions, the CPU(s) 144 and display 145 may operate to overlay real-time or historical information onto a video feed taken by an onboard camera of the field device 140 (the CPU(s) 144 and display 145 may be an integral part of the field device 140 or a smart phone or similar device docked to the field device 140). The information overlaid onto the scene could include RF amplitude (i.e., field strength) data, relating to ingress, egress, ambient RF, etc. Additionally, system elements brought into view may include system design information relevant to them, such as location ID number, model number, operating levels, date and purpose of last visit by a technician, subscriber counts/addresses (i.e., for taps), etc. Subscriber premises viewed in this way may have the associated subscriber information displayed, such as phone number, number/type of outlets, date purpose and resolution codes of last service call, etc.

At block 222 of FIG. 48, one or more specific elements in the hardline coaxial cable plant responsible for the signal ingress (e.g., faulty cable or components) are identified based on the monitored changes in amplitude of the received upstream signal; that is, based at least in part on the locally received signal amplitudes, one or more faulty or defective infrastructure elements of the hardline coaxial cable plant may be identified. Thereafter, the field technician may appropriately specifically inspect and remediate (e.g., repair, replace or adjust) if/as necessary each of the identified faults so as to significantly reduce or essentially eliminate ingress. To conclude phase 2, the field technician may employ the portable or handheld field device 140 to provide verification that a remediation effort (e.g., repair, replacement, or adjustment) to mitigate ingress was effective by re-transmitting the local test signal(s) following the remediation effort and noting a significantly attenuated signal amplitude corresponding to the local test signal(s) received at the headend 162 (e.g., a reduction on the order of 3 dB to 6 dB).

As discussed above, any of a variety of components of the hardline coaxial cable plant may be faulty and give rise to ingress, and during phase 2 any one or more components of the hardline cable plant may be successfully identified and remediated to significantly reduce ingress. Examples of faults in the hardline cable plant that may be remediated during phase 2 activity include, but are not limited to, loose or defective fittings/connectors (e.g., splice connectors, pin-type connectors such as housing terminators, extension fittings, 90 degree fittings, splice blocks, any of which may be loose, water-logged, corroded or otherwise damaged for example), hardline coaxial cable flaws (compromised shielding and/or broken conductors arising from environmental damage, defective cable, poor craftsmanship during installation, aging, squirrel chews, bullet holes, etc.), and a compromised RF ground in one or more active or passive components of the hardline cable plant (e.g., amplifiers, filters, distribution taps, line terminators, directional couplers, etc.). Of course, beyond detection and remediation of faults in the hardline coaxial cable plant of a given neighborhood node, one or more subscriber-related faults (e.g., loose connectors between the subscriber service drop and tap, pinched or otherwise compromised subscriber drop, ground block and/or internal subscriber premises wiring and/or equipment problems, etc.) additionally or alternatively may be detected and remediated as part of phase 1 and phase 2 activity.

FIGS. 49A through 49L illustrate expanded close-up views of facilities maps showing cable communication system infrastructure, corresponding heat maps before ingress remediation, and corresponding heat maps after ingress remediation, respectively, according to various embodiments of the present invention. In particular, FIGS. 49A, 49D, 49G, and 49J illustrate respective close-up portions of a cable facilities map 310 showing faulty cable communication system components, FIGS. 49B, 49E, 49H, and 49K illustrate corresponding respective portions of heat maps 300 before remediation, and FIGS. 49C, 49F, 49I, and 49L illustrate corresponding respective portions of heat maps 300 following repair of the component. The series of FIGS. 49A, 49B and 49C depict a loose connector and repair of same; likewise, the series of FIGS. 49D, 49E, and 49F also depict a loose connector and repair of same. The series of FIGS. 49G, 49H and 49I depict a water logged connector and repair of same, and the series of FIGS. 49J, 49K and 49L similarly depict a water logged connector and repair of same.

In yet other embodiments, multiple iterations of phase 1 and phase 2 activity may be performed to ensure the efficacy of ingress mitigation methods involving detection and remediation (e.g., refer again to the "time-series" of heat maps shown in FIGS. 33-36). In particular, in some embodiments an iterative approach is adopted in which identification of potential points of ingress in a given neighborhood node and corresponding remediation of hardline plant-related and/or subscriber-related faults are conducted successively and multiple times to document a progression of ingress mitigation efforts in a given neighborhood node. More specifically, the Inventors have recognized and appreciated that: 1) as faults allowing for more significant ingress are remediated, "lesser" faults that allow for relatively lower (but nonetheless potentially problematic) levels of ingress may become more evident during iterative phase 1 and phase 2 activity; and 2) some faults may be intermittent (e.g., time-dependent and/or weather-dependent), and may be identifiable only via iterative phase 1 and phase 2 activity (e.g., over different time periods and/or weather conditions, and/or using different test signal frequencies) to identify potential points of ingress.

In view of the foregoing, in one embodiment, after collection of information during a first iteration of phase 1 activity in a given neighborhood node, and after a first iteration of phase 2 activity in the neighborhood node, an ingress mitigation method comprises conducting at least a second iteration of phase 1 activity in the neighborhood node. In one example implementation of this embodiment, a neighborhood node ingress map is generated as part of the first iteration of phase 1 activity, and a second iteration of the neighborhood node ingress map is generated as part of the second iteration of the phase 1 activity, so as to ascertain an effectiveness of the first remediation. In another aspect, the neighborhood node ingress map and the second iteration of the neighborhood node ingress map may be generated as an electronic visual rendering having a plurality of independently selectable and independently viewable layers comprising a first layer corresponding to the neighborhood node ingress map and a second layer corresponding to the second iteration of the neighborhood node ingress map, so as to facilitate comparative viewing of the respective layers. In yet another aspect, a second iteration of phase 2 activity is conducted in the neighborhood node (a second remediation of one or more additional hardline plant-related and/or subscriber-related faults based on the second iteration of phase 1 activity) and, after the second remediation, the ingress mitigation method comprises conducting at least a third iteration of phase 1 activity in the neighborhood node. In yet another aspect, a third iteration of the neighborhood node ingress map is generated pursuant to the third iteration of phase 1 activity so as to provide a time series of at least three neighborhood node ingress maps.

The cumulative effect of the iterative approach as outlined above, in which various components of the hardline coaxial cable plant and/or subscriber service drops or subscriber premises equipment are successively repaired or replaced, leads to a dramatic reduction of ingress in a given neighborhood node across the upstream path bandwidth, with a particularly noteworthy reduction in narrowband interference in the portion of the upstream path bandwidth between approximately 5 MHz and approximately 20 MHz (and particularly between 5 MHz to approximately 18 MHz, and more particularly between 5 MHz and approximately 16.4 MHz, and more particularly between 5 MHz and approximately 10 MHz). In some implementations, even a single iteration of phase 1 activity and phase 2 activity (in various possible modes of execution) results in a significant reduction of ingress in a given neighborhood node. Thus, ingress mitigation methods according to various embodiments of the present invention effectively recover valuable bandwidth, widely recognized as being otherwise effectively unusable, to instead be more productively and reliably employed to facilitate increased upstream capacity for supporting voice and/or data services.

For example, with respect to various figures of merit, in various implementations one or more faults in the hardline coaxial cable plant of a given neighborhood node may be repaired or replaced such that a highest value for an average noise power in at least a portion of the upstream path bandwidth below approximately 20 MHz (e.g., as measured over at least a 24 hour period at the headend) is less than approximately 20 decibels (dB) (and more particularly less than 15 dB, and more particularly less than 10 dB, and more particularly less than 8 dB) above a noise floor associated with the upstream path bandwidth below 20 MHz (e.g., as measured at the headend over the same time period). In other implementations, one or more faults in the hardline coaxial cable plant may be repaired or replaced such that a highest value for the average noise power in at least a portion of the upstream path bandwidth below approximately 20 MHz (e.g., as measured over at least a 24 hour period at the headend) is at least 22 decibels (dB) (and more particularly at least 24 dB, and more particularly at least 27 dB, and more particularly at least 30 dB, and more particularly at least 33 dB, and more particularly at least 36 dB, and more particularly at least 38 dB) below an average channel power of one or more physical communication channels having a carrier frequency in the portion of the upstream path bandwidth below approximately 20 MHz and carrying upstream information from one or more subscriber premises in the neighborhood node.

In yet other implementations, one or more faults in the hardline coaxial cable plant may be repaired or replaced so as to achieve a carrier-to-noise-plus-interference ratio (CNIR) of at least 25 decibels (dB) (and more particularly at least 28 dB, and more particularly at least 31 dB, and more particularly at least 34 dB, and more particularly at least 37 dB) associated with one or more physical communication channels deployed in the upstream path bandwidth of the neighborhood node (and, more specifically, channels deployed in a portion of the upstream path bandwidth below approximately 19.6 MHz, and more particularly below approximately 18 MHz, and more particularly below approximately 16.4 MHz, and more particularly below approximately 10 MHz). In yet other implementations, one or more faults in the hardline coaxial cable plant may be repaired or replaced so as to achieve an unequalized modulation error ratio (MER) of at least 17 decibels (dB) (and more particularly at least 20 dB, and more particularly at least 22 dB, and more particularly at least 24 dB, and more particularly at least 28 dB, and more particularly at least 30 dB) associated with one or more physical communication channels deployed in the upstream path bandwidth of the neighborhood node (and, more specifically, channels deployed in a portion of the upstream path bandwidth below approximately 19.6 MHz, and more particularly below approximately 18 MHz, and more particularly below approximately 16.4 MHz, and more particularly below approximately 10 MHz). In yet other implementations, one or more faults in the hardline coaxial cable plant may be repaired or replaced so as to significantly reduce a noise power (e.g., as measured at the headend) associated with one or more narrowband substantially persistent ingress signals (e.g., short wave radio signals) constituting at least part of the neighborhood node ingress. Again, these results are significant, unexpected, and surprising, particularly given the cable communication industry's previously undisputed presumption that the portion of the upstream path bandwidth below approximately 20 MHz purportedly suffers from an irreparable presence of ingress.

V. Other Considerations For Ingress Mitigation

It should be appreciated that while the methods outlined in FIGS. 29 and 48 provide exemplary processes for managing an ingress detection and remediation operation according to embodiments of the present invention, the underlying functionalities encompassed by these methods may be performed by any of the various entities shown in FIG. 28 and associated with the ingress mitigation (e.g., detection and remediation) operation.

More specifically, it should be appreciated that, in various embodiments, the parties performing phase 1 activity and phase 2 activity, respectively, need not necessarily be the same parties, and may or may not be under the jurisdiction/direction of a common entity. For example, in one implementation, a first party who conducts phase 1 detection activity may provide one or more work orders (which may or may not include one or more neighborhood node ingress maps) to a second party who is commissioned to conduct phase 2 remediation activity, after which the second party reports back to the first party regarding work performed in the field. In other embodiments, different technicians/crews may attend to various elements of phase 1 and phase 2 activity under the direction of a common supervising entity. In yet other embodiments, two distinct phases of activity are not necessarily required to accomplish ingress mitigation; for example, one or more elements of phase 1 activity as described herein, and one or more elements of phase 2 activity as described herein, may be combined in a series of tasks performed by a single crew/technician, during one or more dispatches to the field, to effective accomplish ingress mitigation in one or more neighborhood nodes of a cable communication system.

In some embodiments, a "command center" may be employed for system monitoring, crew management, work planning and review of current or historical data. In one implementation, the processor 120 shown in the system 100 of FIG. 28 may be configured to serve as such a command center. A command center visualization may incorporate one or more of the layers detailed above, but from the point of view of the entire system, as opposed to the activities of a one or more technicians or crews. For example, the locations and status of all technicians might be displayable on any one or more of the various maps and images discussed herein. The emphasis in the command center generally is focused on displaying current/historical data sets, rather than guiding or informing the collection or repair process.

In yet other embodiments of the present invention, ingress assessments may be made during the course of a technician's normal fulfillment task (e.g., install, service change, disconnect, etc.). For example, at the end of such work as part of the closeout procedure for the job, a test signal may be transmitted to test for points of ingress in the immediate vicinity (i.e., the subscriber premises). The results of this test may inform the activities during the execution of the task at hand. As a post-test, a positive result may be used as a pre-requisite for closing the ticket, as well as a tangible, verifiable record of the workmanship/craftsmanship, and therefore as a potential defense against back charges (a common liability in contract fulfillment work).

In yet other embodiments, process guides may be provided for different field-based usage modes (i.e., active and passive data collection, ingress mitigation/repair and fulfillment) to lead technicians through the various steps of the task (e.g., pursuant to phase 1 and phase 2 activity) that must be completed to permit data collection or processing in connection with the relevant ingress detection modality being used. For example, a technician might be prompted to satisfy notification requirements before taking down the system to affect a repair. One aspect of this guide may include the presentation of turn-by-turn routing instructions to a technician. This may assist during active data collection, for example, by keeping the neighborhood node drive path within test area boundaries (e.g., the neighborhood node), ensuring full coverage of the test area (e.g., the neighborhood node), or providing an optimized drive path. Alternately the routing guidance may be directed to a technician engaged in some non-ingress related activity, but from whose vehicle ingress data may be passively collected, such that the technician might make relatively minor course deviations, relative to their primary assignment, in order to map some nearby area of interest (e.g., a neighborhood node). This directed passive mapping may be in response to a gap in or undue age of the data covering a particular plant segment, or in response to some suspected problem/fault in the area of interest that might benefit from more current data or a higher spatial resolution.

In yet other embodiments, low-frequency downstream egress may be used to gather data that may assists in ingress detection. This data may be obtained, for example, by monitoring a signal in the network's forward path that is closer to the return path frequency range than is now customary. The carrier present at E.I.A. channel 2 (i.e., the lowest frequency in the forward lineup, and therefore closest to the return bandwidth) may be utilized, or a narrow carrier injected at the head end into the forward path below channel 2, but above the diplex filter cutoff (generally 50 MHz to 52 MHz), expressly for this purpose. This approach avoids the requirement of two-way communication to get both amplitude and position data, and may operate entirely passively.

A variation on the passive approaches detailed above that may be provided in various implementations includes "listening" for return path traffic (i.e., DOCSIS subscriber modems) as egress from the cable communication system. This implementation may yield useful data passively, and at precisely the frequencies of highest concern in the return path (i.e., where the DOCSIS carriers reside). The data gathered in this way may also be tagged with a MAC address of the transmitting modem, further information that may be used diagnostically.

In accordance with various aspects of some embodiments of the present invention, customer premise equipment (CPE) (i.e., subscriber premises equipment) may be repurposed and implemented as an integral component for ingress detection. More specifically, a piece of CPE may temporarily be controlled (for example, by command from the CMTS, during, for example, idle cycles) to check for the presence (and relative amplitude) of the ingress test transmission and report the results back via the DOCSIS data stream. This data may assist in directly identifying a prospective ingress point entering the cable communication system between the tap and the reporting piece of CPE. Since the physical address of each CPE is known, the fault occurs along the connection path to the subscriber premise. Such an implementation may be completed as a rapid system ride-out, without having to disconnect any subscriber service drops or other connections during testing. It would only, however, be sensitive to ingress faults inline with the particular branch of in-home wiring that feeds the CPE device in question.

VI. Inventive Cable Communication Systems

With reference again to Section I above, to demonstrate the efficacy of ingress mitigation methods, apparatus and systems according to various embodiments of the present invention, the phase 1 and phase 2 activities described herein were performed in connection with a neighborhood node of an operational cable communication system (e.g., ingress mitigated node BT-11). More specifically, three iterations of phase 1 and phase 2 activity were performed over the period of about one week, with an additional final iteration of phase 1 to ascertain the effectiveness of the final phase 2 activity (i.e., four iterations of phase 1, three iterations of phase 2). Before ingress mitigation efforts, a noise spectrum for the upstream path bandwidth of the ingress mitigated node BT-11 was taken (e.g., 24 hour average noise power across the upstream path bandwidth), and various metrics (e.g., C/N, MER) were observed for a test channel having a carrier frequency of 16.4 MHz (e.g., see FIG. 27 and the test channel 2103T provided by the test modem 1065) (so as to obtain pre-mitigation data). For each iteration of phase 1, an ingress neighborhood node map in the form of a heat map was generated (e.g., see the time series of heat maps 300A, 300B, 300C and 300D shown in FIGS. 33-36). Following each iteration of phase 2, various measurements were taken in connection with the upstream path bandwidth of the ingress mitigated node BT-11 and the test channel 2103T. Accordingly, a time series of heat maps, upstream path bandwidth spectra (illustrating the test channel and any noise within the upstream path bandwidth), test channel MER measurements (unequalized and equalized) and associated constellation diagrams were obtained, from which incremental reductions in ingress and improvements in test channel metrics were unambiguously observed. Additionally, pre-mitigation and post-mitigation comparisons of all measurements revealed a dramatic reduction in ingress and overall improvement in test channel metrics.

Figure 50:
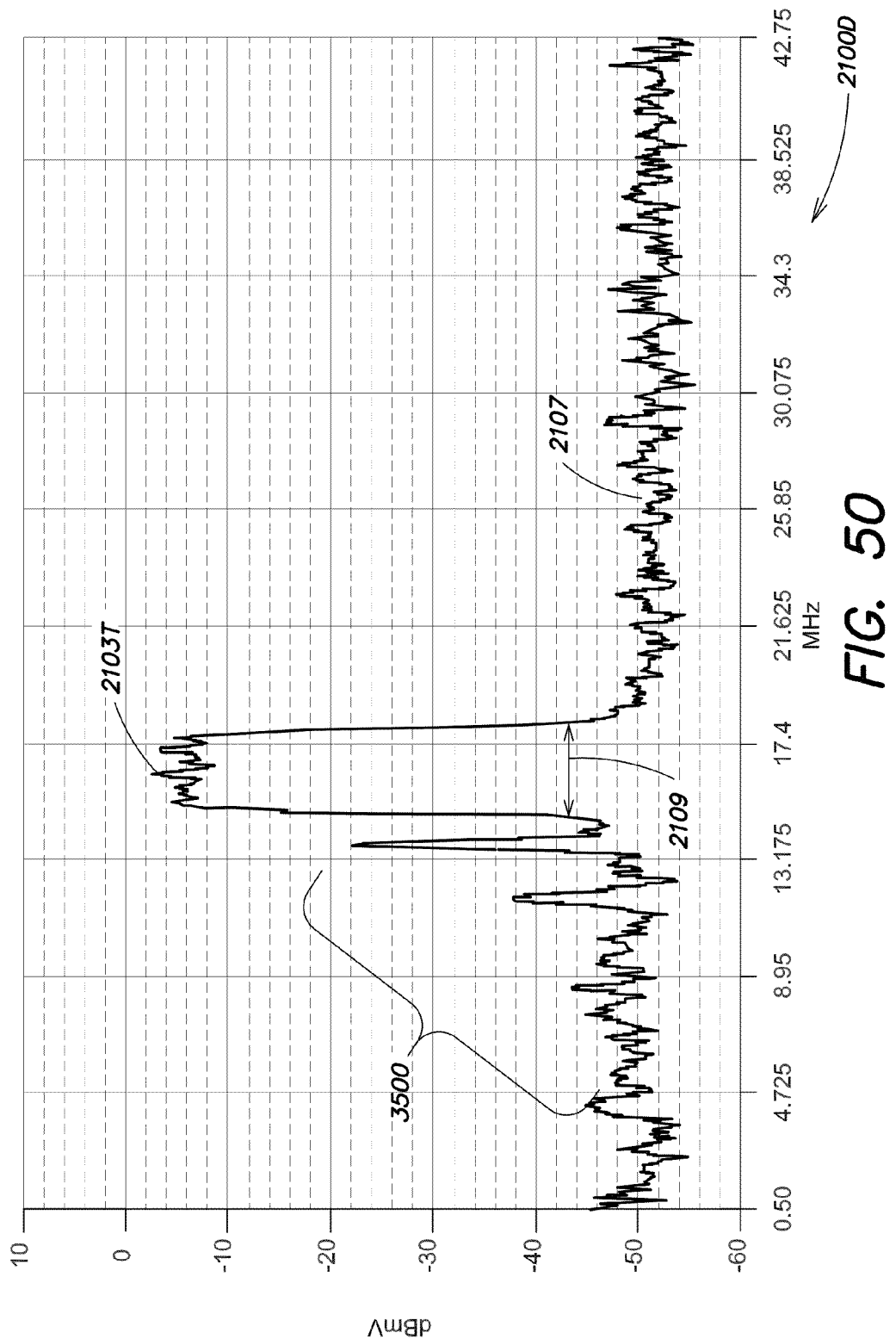
FIG. 50 illustrates a spectrum of the upstream path bandwidth of a neighborhood node selected for ingress mitigation according to the present invention, in which a test channel is transmitting, prior to ingress mitigation and corresponding to the heat map of FIG. 33.
Figure 57:
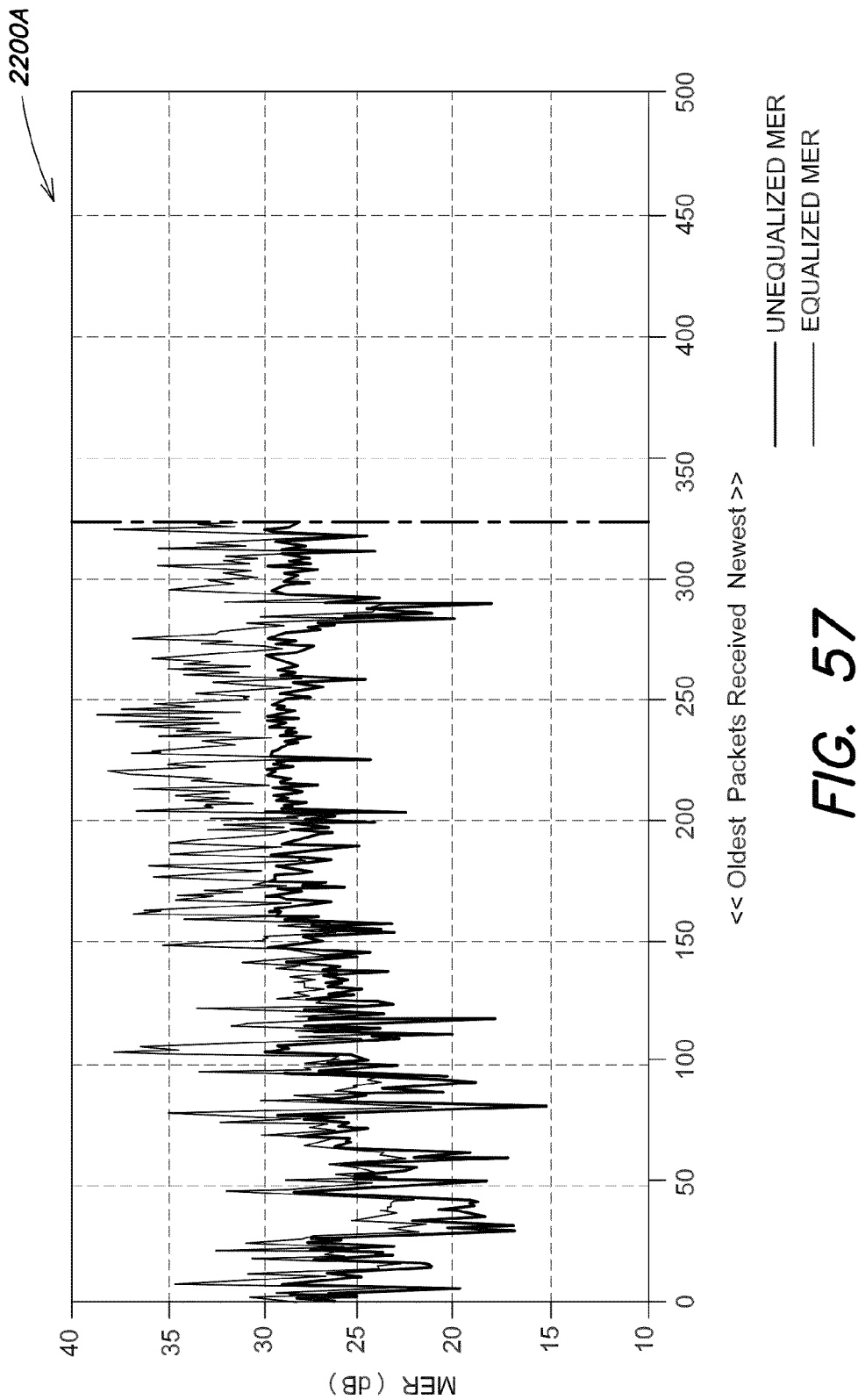
FIGS. 57 through 60 are graphs illustrating unequalized and equalized modulation error ratio (MER) of the test channel shown in the spectra of FIGS. 50 through 53, respectively, as a function of packets received, after each iteration of ingress remediation.
Figure 58:
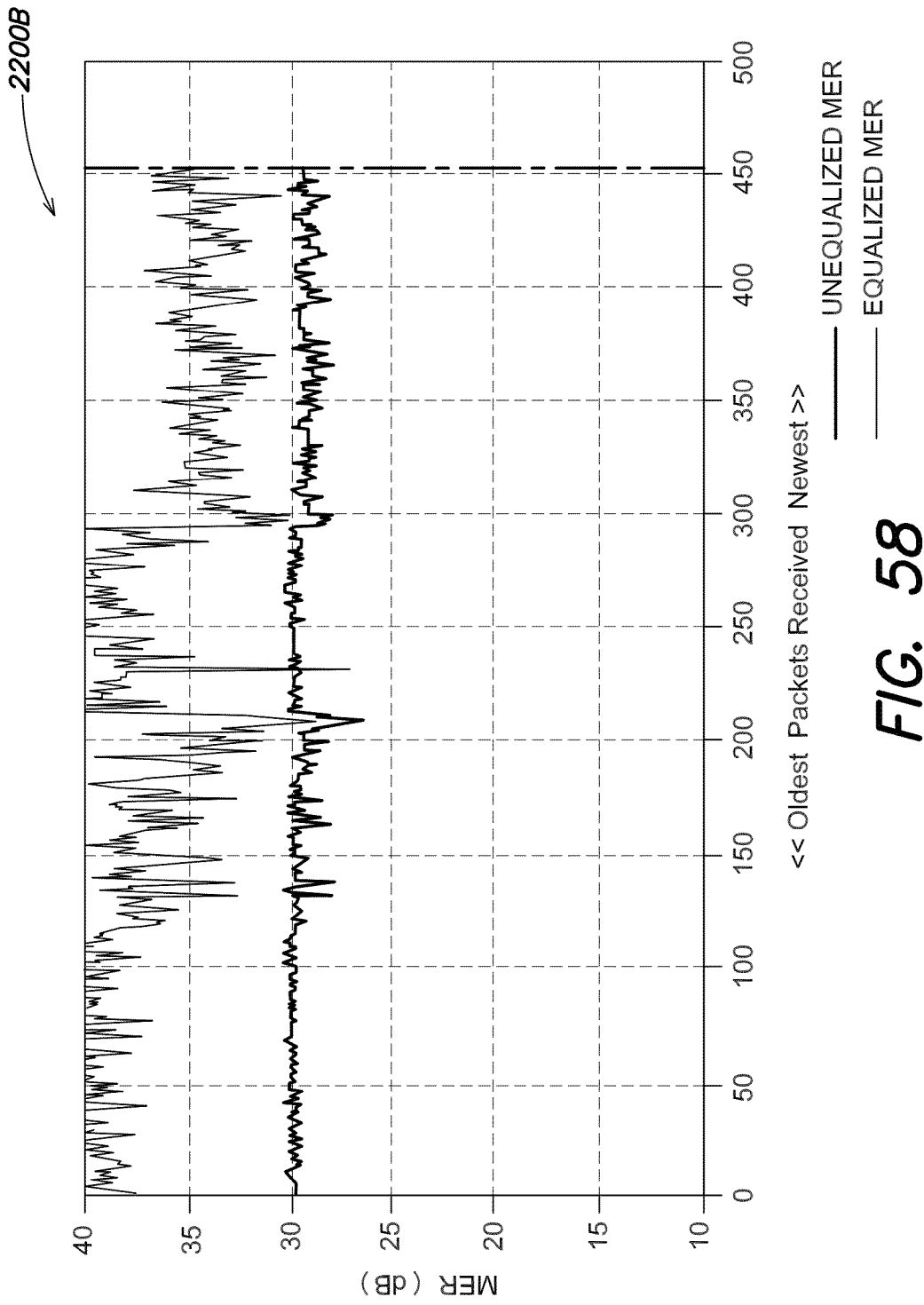
Figure 59:
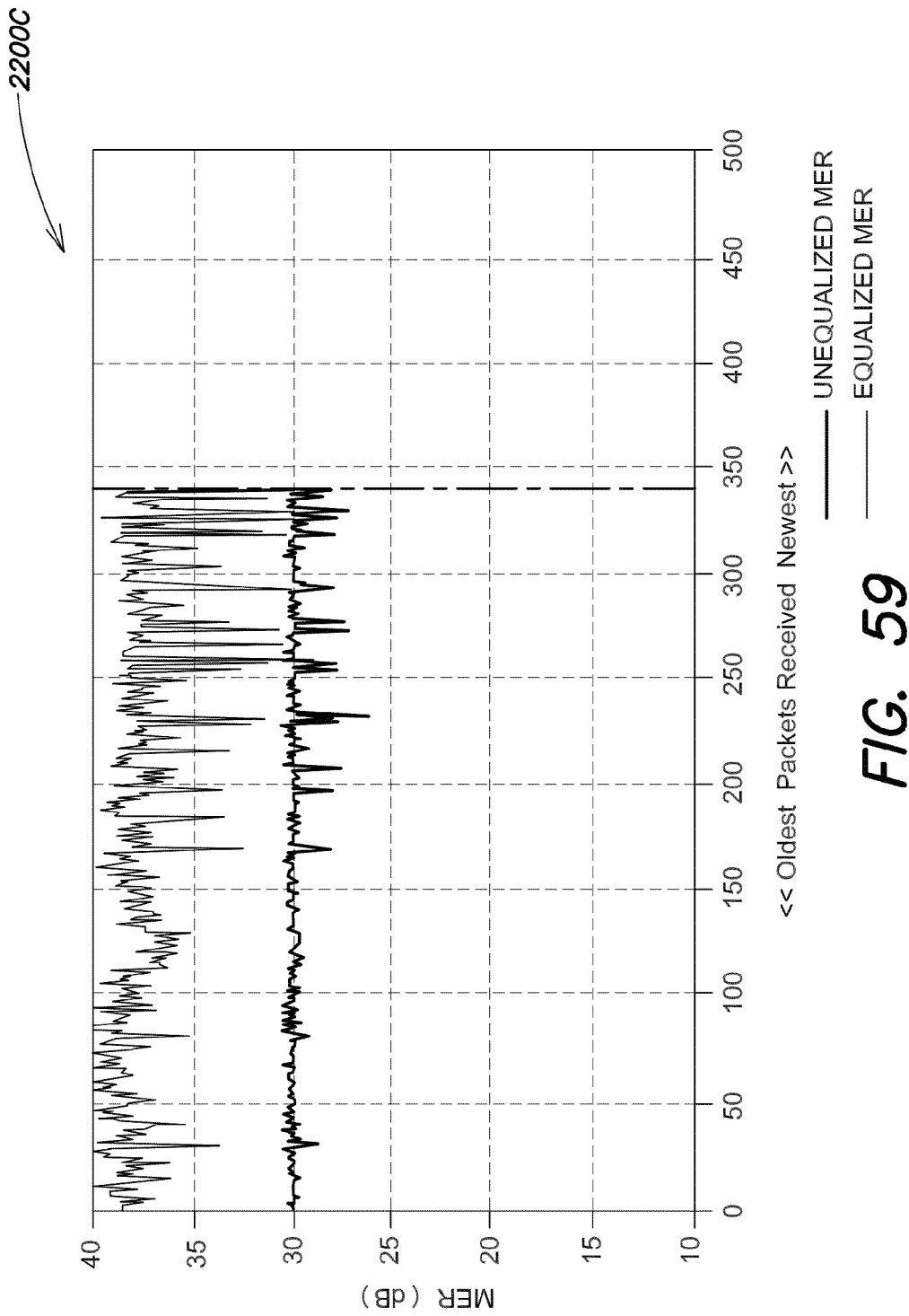

FIG. 50 illustrates a spectrum 2100D of the upstream path bandwidth of the ingress mitigated node BT-11 in which the test channel 2103T having a carrier frequency of 16.4 MHz and a bandwidth 2109 of 3.2 MHz is transmitting, prior to ingress mitigation and corresponding to the heat map of FIG. 33. The spectrum 2100D of FIG. 50 shows multiple significant ingress disturbances 3500 present at frequencies from approximately 5 MHz to approximately 15 MHz, and more particularly from approximately 10 MHz to approximately 15 MHz. A noise floor 2107 of the spectrum 2100D at frequencies of about 20 MHz and higher is about −52 dBmV, and the average channel power of the test channel 2103T is approximately −6 dBmV. From FIG. 50, it may be observed that the peak of the highest power ingress carrier (at about 13.5 MHz) is only approximately 16 dB lower than the average channel power. It is also noteworthy that it is impossible to determine from the spectrum 2100D of FIG. 50 if there are one or more additional ingress carriers that fall within the bandwidth 2109 of the test channel 2103T; in fact, from MER measurements of the test channel corresponding to the spectrum 2100D (discussed further below in connection with FIG. 57), it may be reasonably presumed that indeed there is a significant presence of ingress disturbances within the bandwidth 2109 of the test channel 2103T (leading to a notably low CNIR for the test channel).

Figure 34:
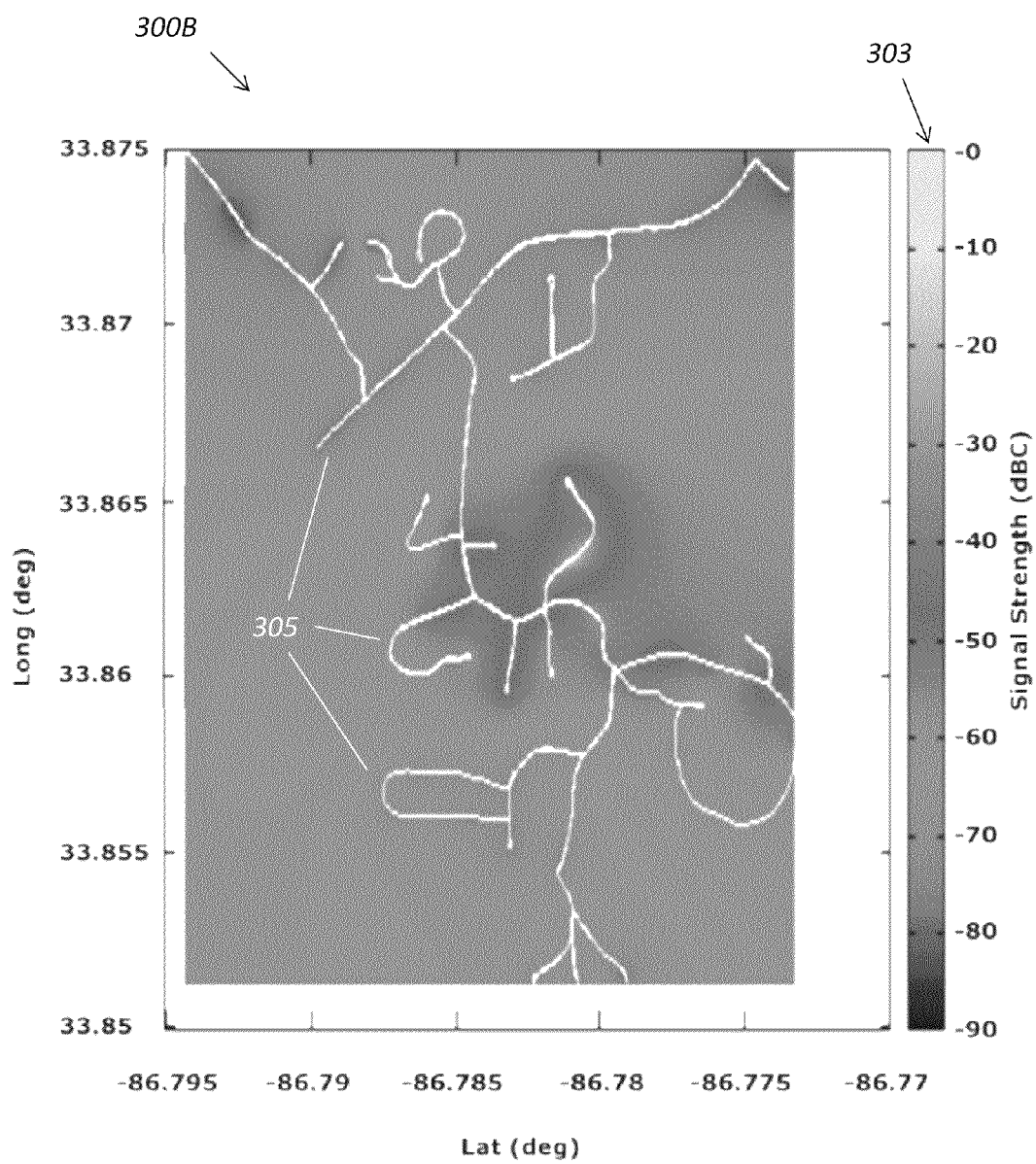
Figure 51:
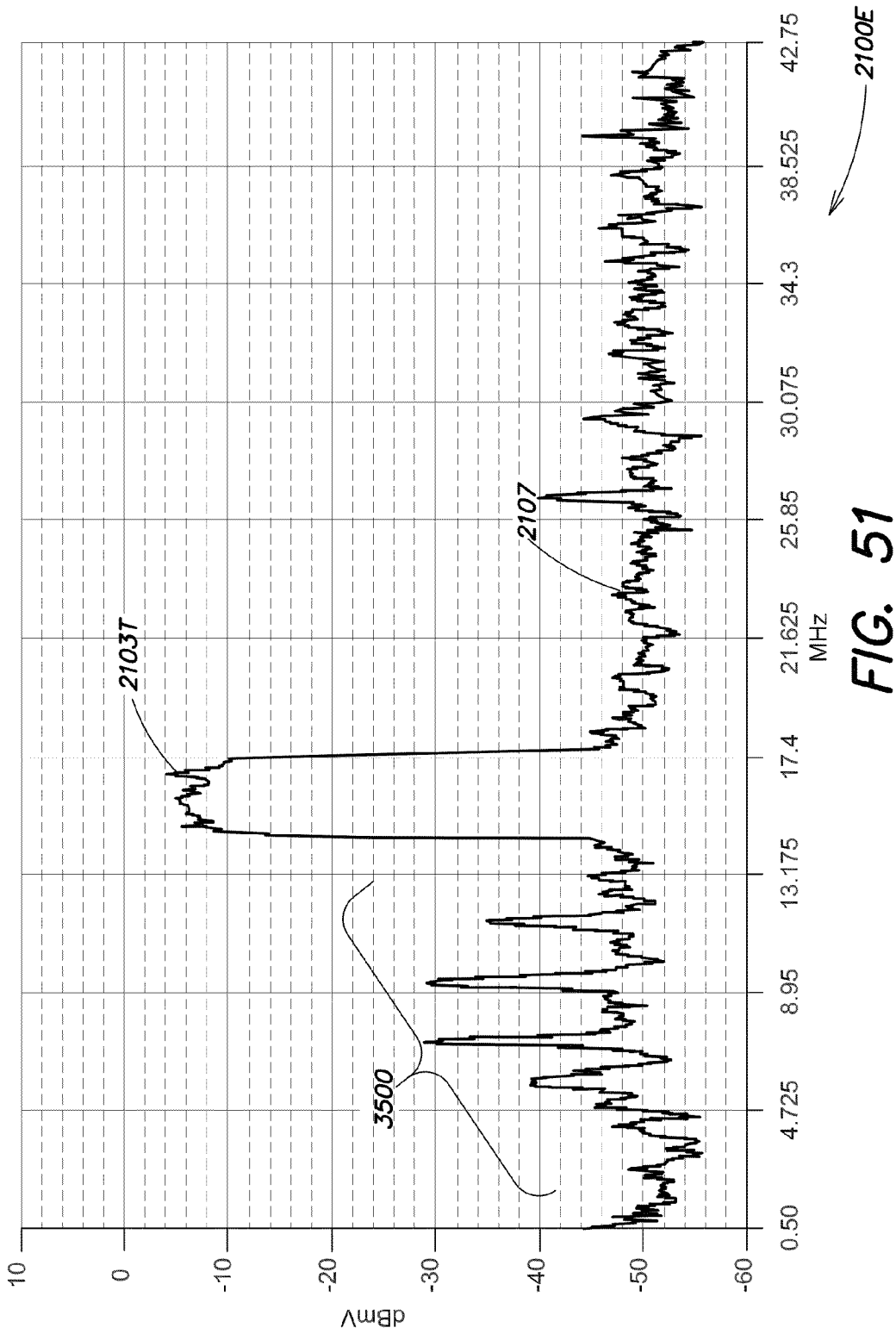
FIG. 51 illustrates a spectrum of the same upstream path bandwidth monitored in FIG. 50, after a first iteration of ingress remediation and corresponding to the heat map of FIG. 34.

FIG. 51 illustrates a spectrum 2100E of the same upstream path bandwidth monitored in FIG. 50, after a first iteration of ingress remediation and corresponding to the heat map of FIG. 34. Although the spectrum 2100E still reveals a significant presence of ingress disturbances 3500 below approximately 15 MHz, it may be observed that the a peak of the highest power ingress carrier (at about 7 MHz) is lower as compared to the highest power ingress carrier in the spectrum 2100D, and approximately 22 dB lower than the average channel power of the test channel 2103T. It is also noteworthy in FIG. 51 that additional ingress disturbances have appeared in the spectrum 2100E above 20 MHz (e.g., see ingress carrier at approximately 27 MHz), providing evidence of the time-varying nature of some ingress disturbances.

Figure 35:
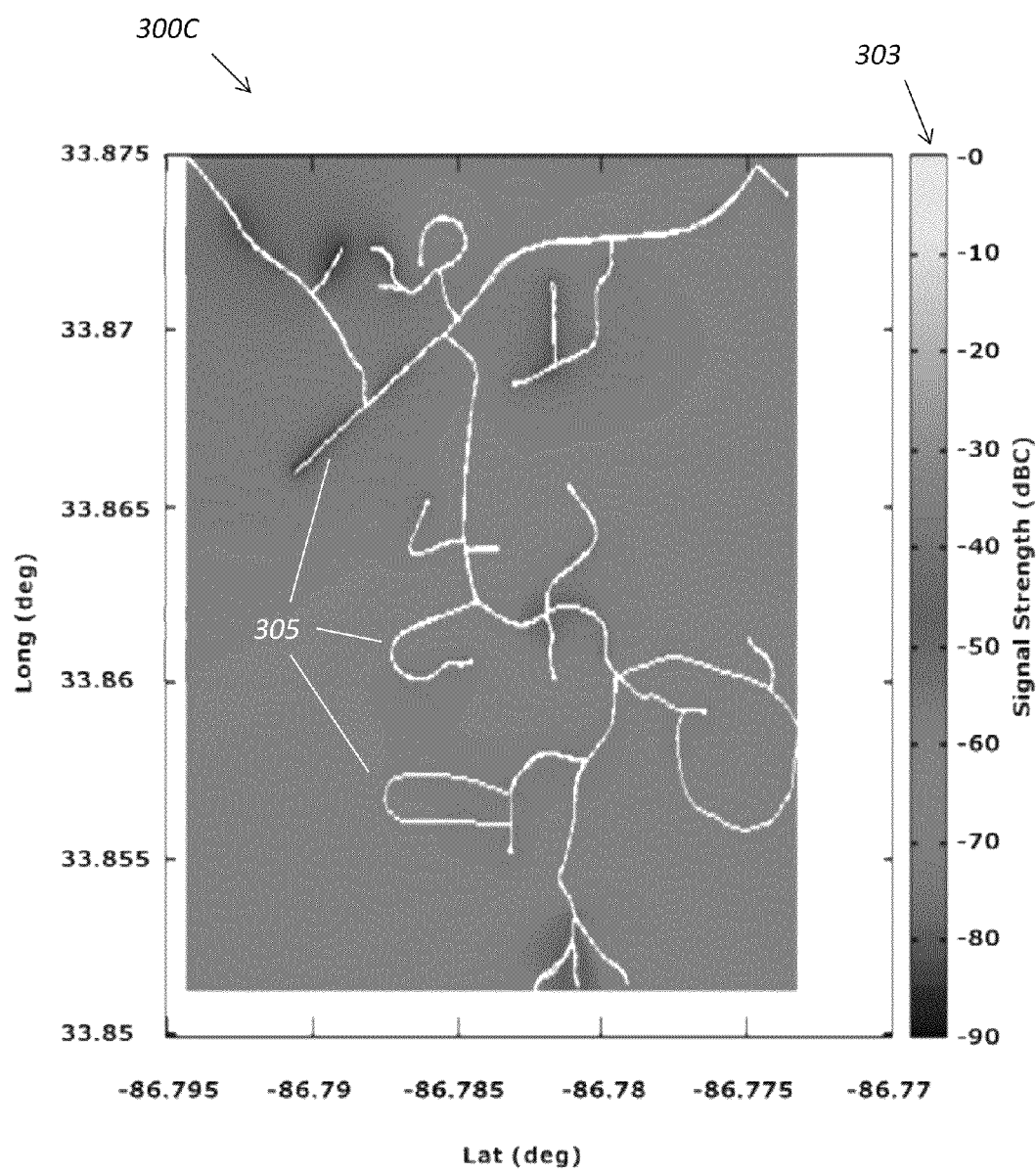
Figure 52:
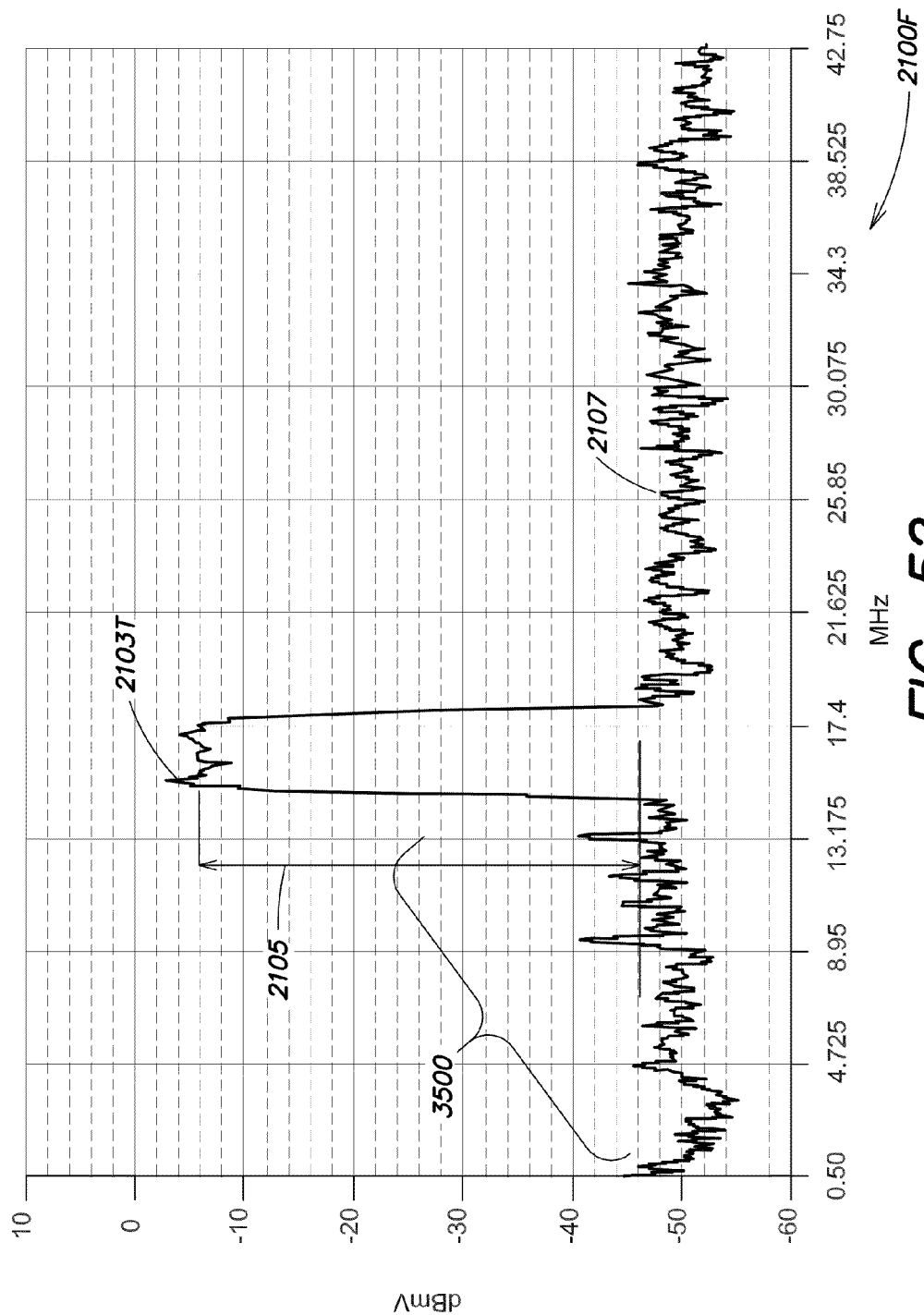
FIG. 52 illustrates a spectrum of the same upstream path bandwidth monitored in FIGS. 50 and 51, after a second iteration of ingress remediation and corresponding to the heat map of FIG. 35.

FIG. 52 illustrates a spectrum 2100F of the same upstream path bandwidth monitored in FIGS. 50 and 51, after a second iteration of ingress remediation and corresponding to the heat map of FIG. 35. Although ingress disturbances 3500 are still present to some extent in the spectrum 2100F, there is a marked reduction in the power level of such disturbances. The noise floor 2107 in the vicinity of the test channel 2103T is approximately −48 dBmV (and somewhat lower above 20 MHz) and the average channel power of the test channel is approximately −6 dBmV, evidencing an apparent carrier-to-noise ratio (CNR) 2105 of approximately 42 dB. With reference again to Table 6, such a CNR is suitable for supporting a QAM channel having a modulation order of up to 1024 (1024-QAM), without error correction, to achieve a bit error ratio (BER) on the order of $10^{-8}$. If FEC is employed, this CNR is sufficient to support QAM channels having a modulation order of up to 4096 (4096-QAM).

Figure 36:
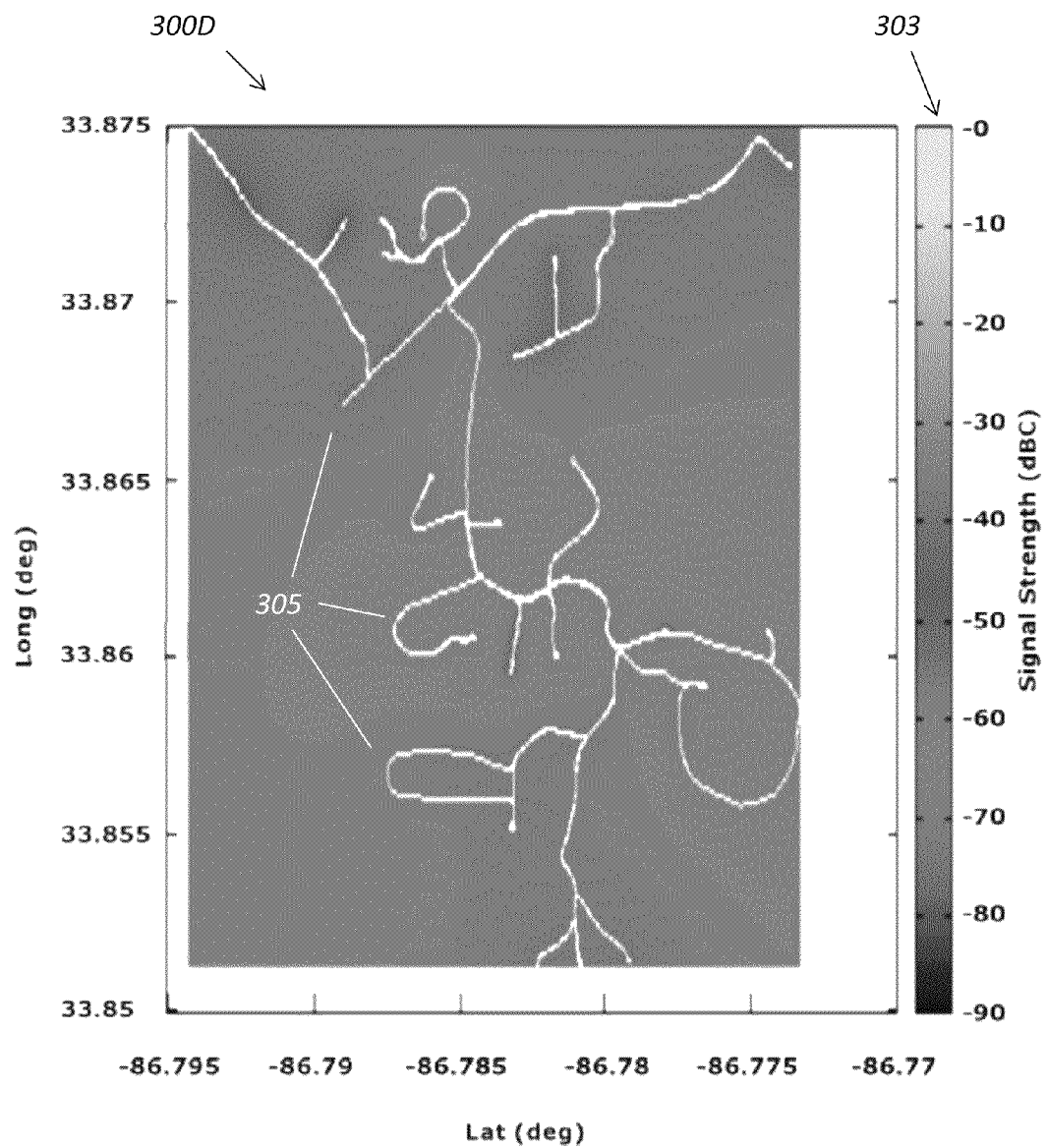
Figure 53:
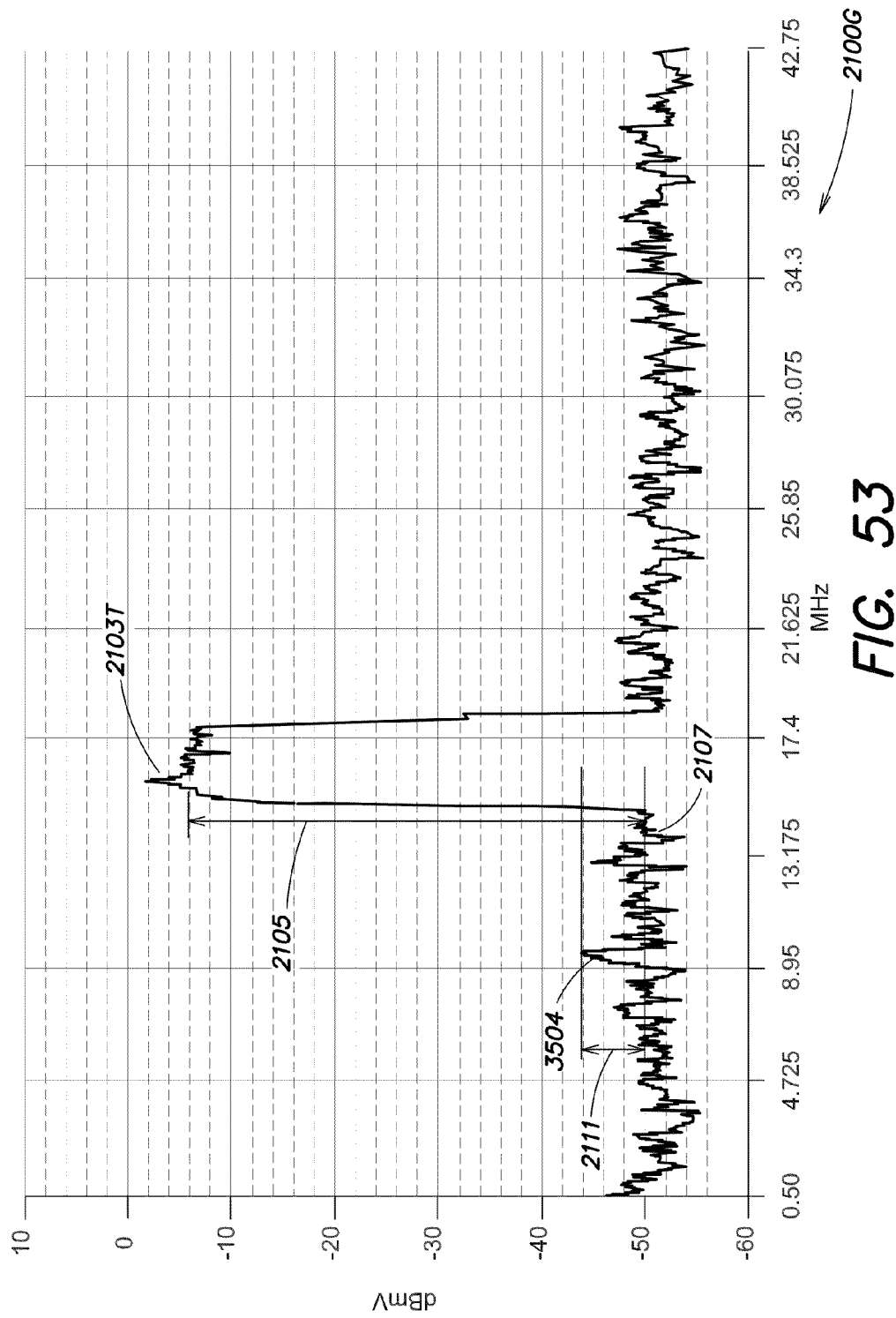
FIG. 53 illustrates a spectrum of the same upstream path bandwidth monitored in FIGS. 50, 51, and 52, after a third iteration of ingress remediation and corresponding to the heat map of FIG. 36.

FIG. 53 illustrates a spectrum 2100G of the same upstream path bandwidth monitored in FIGS. 50, 51, and 52, after a third iteration of ingress remediation and corresponding to the heat map of FIG. 36. In FIG. 53, a dramatic reduction and virtual eradication of the ingress disturbances below approximately 15 MHz may be observed, with only a relatively minor ingress carrier 3504 observable at approximately 9 MHz. In the spectrum 2100G of FIG. 53, the noise floor 2107 in the vicinity of the test channel 2103T, and throughout the spectrum from approximately 5 MHz to approximately 20 MHz, is approximately −50 dBmV, and a difference 2111 between the peak power level of the largest remaining ingress carrier 3504 and the noise floor 2107 is approximately 6 dB; i.e., the noise floor 2107 is remarkably flat from approximately 5 MHz to approximately 20 MHz. Most significantly, in addition to an appreciably flat noise floor 2107, the spectrum 2100G of FIG. 53 reveals a CNR 2105 for the test channel 2103T of approximately 44 dB; with reference again to Table 6, such a CNR is suitable for supporting a QAM channel having a modulation order of up to 2048 (2048-QAM), without error correction, to achieve a bit error ratio (BER) on the order of $10^{-8}$.

Figure 54:
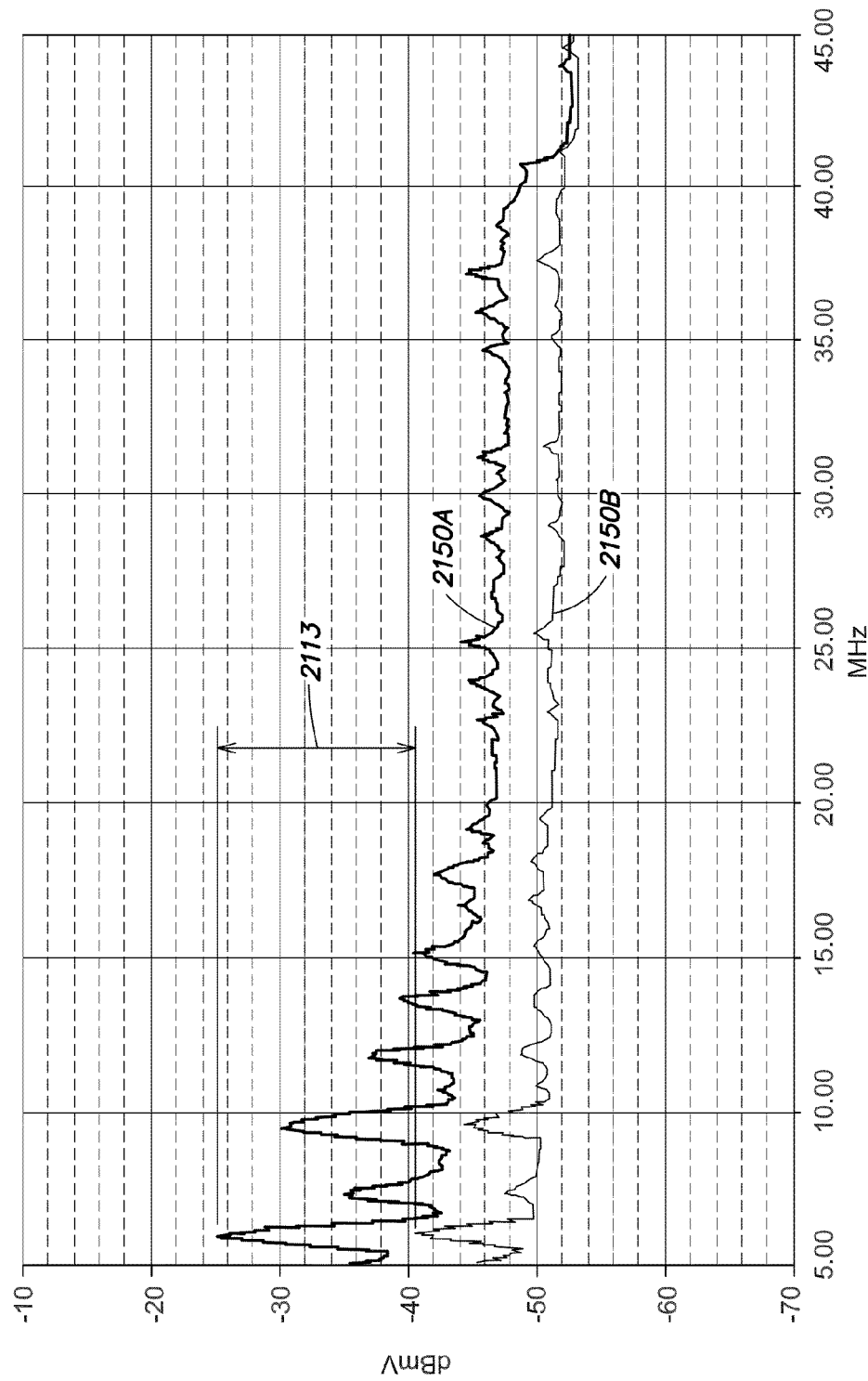
FIG. 54 illustrates a comparison of a first spectrum representing a 24 hour average noise power in the neighborhood node for which spectra are shown in FIGS. 50-53, prior to ingress mitigation according to the present invention, and a second spectrum representing a 24 hour average noise power in the same neighborhood node following ingress mitigation.

FIG. 54 illustrates a comparison of a first spectrum 2150A representing a 24 hour average noise power in the ingress mitigated node BT-11, prior to ingress mitigation according to the present invention, and a second spectrum 2150B representing a 24 hour average noise power in the ingress mitigated node BT-11 following the iterative ingress mitigation process described above. As with the spectrum 2100G shown in FIG. 53, the spectra shown in FIG. 54 reveal a dramatic and sustained reduction in ingress across the entire upstream path bandwidth from approximately 5 MHz to approximately 42 MHz. In particular, above approximately 20 MHz, sustained reduction in the noise floor of approximately 4 dB to 6 dB may be observed; below approximately 20 MHz, significant reductions in ingress may be observed, in which a difference 2113 between the highest ingress peak prior to ingress mitigation (at approximately 6.5 MHz) and after ingress mitigation is approximately 14 dB.

Figure 55:
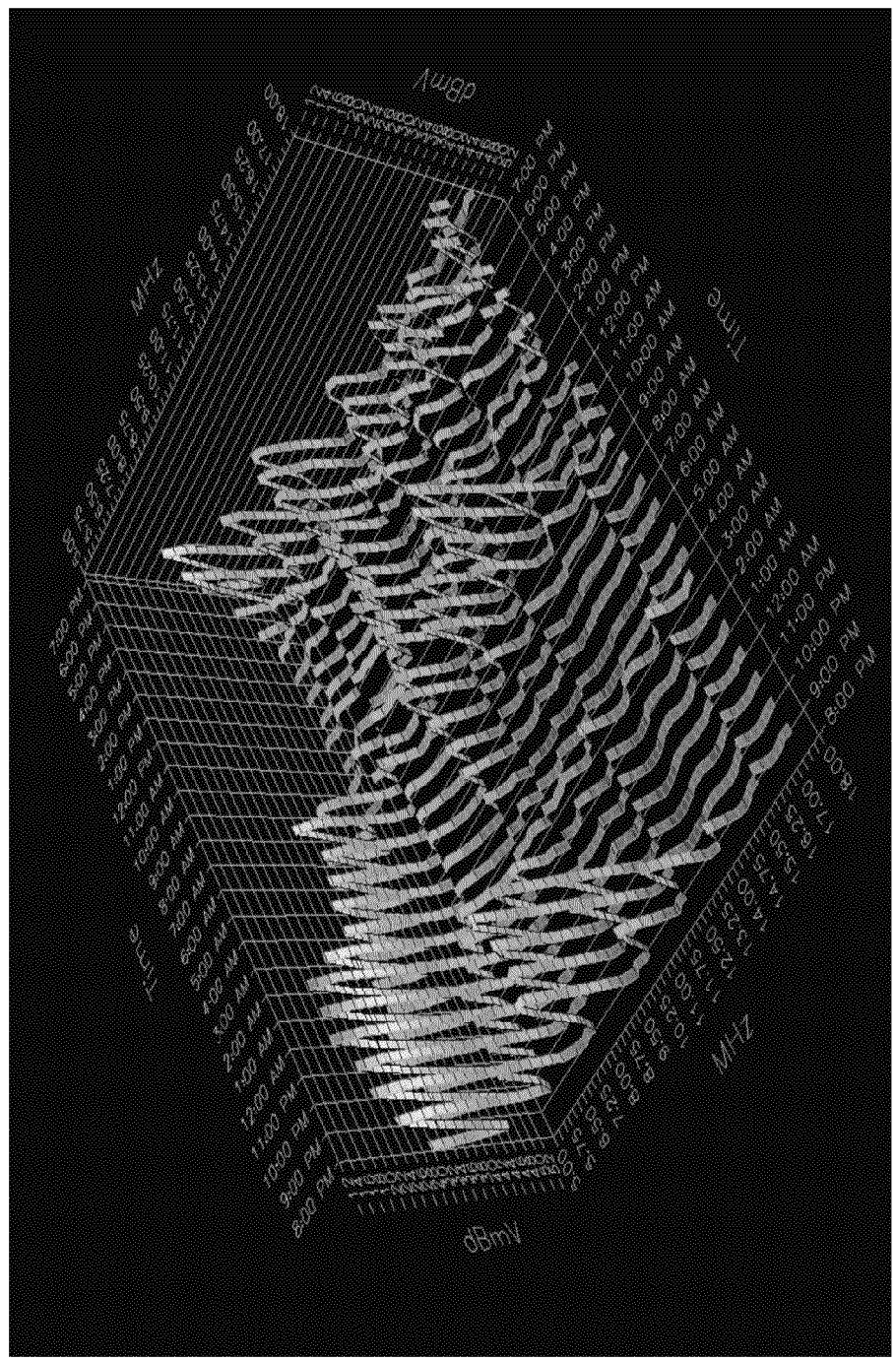
FIG. 55 illustrates a three-dimensional graph showing a first time series of hourly spectra of the upstream path bandwidth of the same neighborhood node over a 24 hour period, prior to ingress mitigation according to the present invention.
Figure 56:
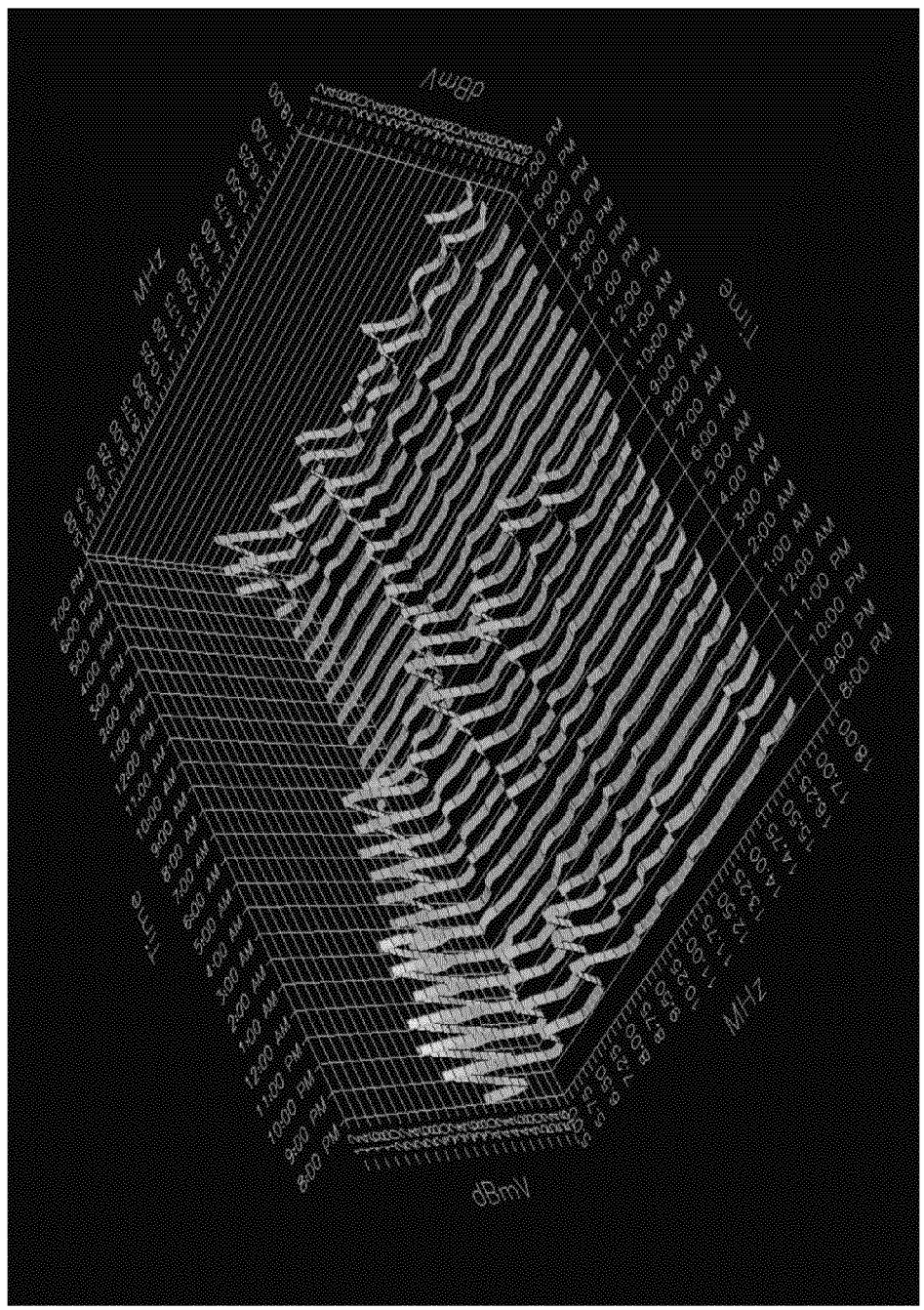
FIG. 56 illustrates a three-dimensional graph showing a second time series of hourly spectra of the upstream path bandwidth of the same neighborhood node over a 24 hour period, following ingress mitigation according to the present invention.

FIG. 55 illustrates a three-dimensional graph showing a first time series of hourly spectra of the upstream path bandwidth of the ingress mitigated node BT-11, prior to ingress mitigation according to the present invention, which served as the basis for the 24 hour average noise power measurements shown in the spectrum 2150A of FIG. 54. From FIG. 55, the time-varying nature of ingress may be clearly observed. FIG. 56 illustrates a three-dimensional graph showing a second time series of hourly spectra of the upstream path bandwidth of the ingress mitigated node BT-11 over another 24 hour period, following ingress mitigation according to the present invention, which served as the basis for the 24 hour average noise power measurements shown in the spectrum 2150B of FIG. 54. Although noteworthy time variations in ingress still can be seen in FIG. 56 over the 24 hour period observed post-mitigation, there is nonetheless a dramatic reduction of ingress across the entire upstream path bandwidth and throughout the entire 24 hour period observed.

FIGS. 57 through 60 are graphs 2200A, 2200B, 2200C, and 2200D respectively illustrating unequalized and equalized modulation error ratio (MER) of the test channel 2103T (shown in the corresponding spectra of FIGS. 50 through 53) as a function of packets received, after each iteration of ingress remediation discussed above. In the graph 2200A of FIG. 57, both unequalized and equalized MER measurements are significantly erratic; with reference again to FIG. 50 and the spectrum 2100D (during which the MER measurements shown in FIG. 57 were taken), such erratic MER strongly suggests the presence of one or more ingress carriers within the bandwidth 2109 of the test channel 2103T. In the graphs 2200B and 2200C shown in FIGS. 58 and 59, notable improvement in MER is seen with each iteration of ingress remediation, in which unequalized MER is consistently greater than 25 dB (although somewhat less stable above approximately 26 to 27 dB). With reference again to Table 5, the MER measurements demonstrated in FIGS. 58 and 59 nonetheless are sufficient to support a QAM channel having a modulation order of at least 32 (32-QAM) and as high as 64 (64-QAM).

Figure 60:
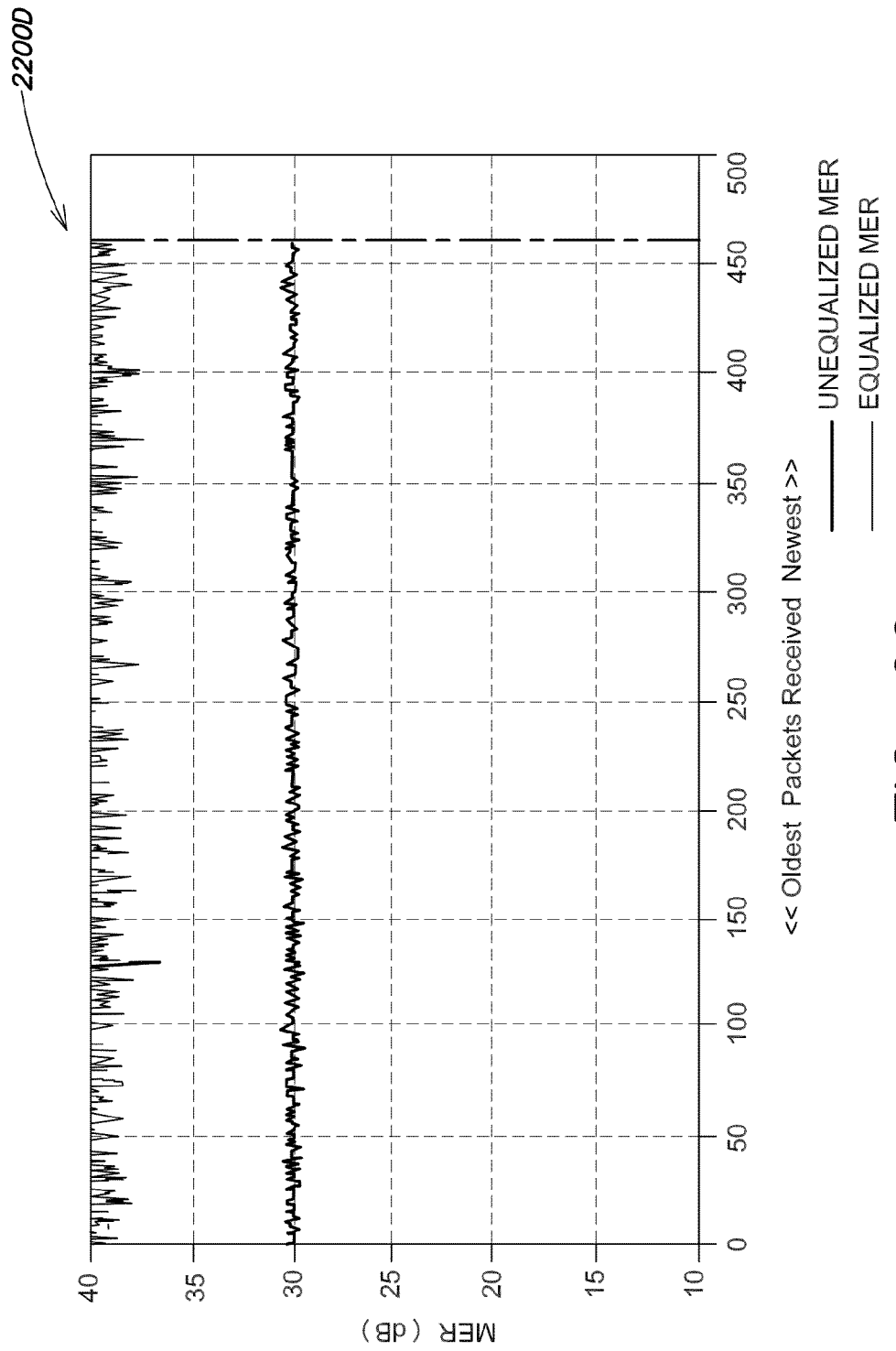
Figure 61A:
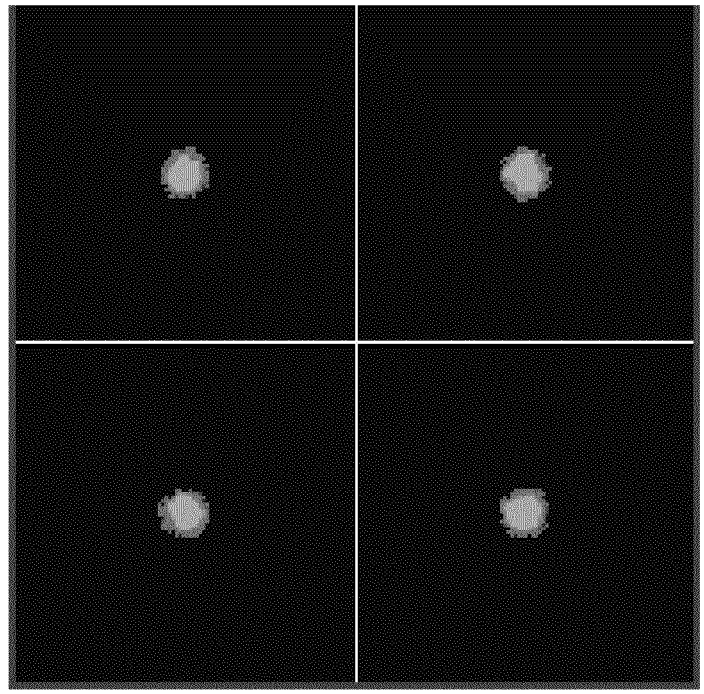
FIGS. 61A and 61B represent pre-ingress mitigation and post-ingress mitigation constellation diagrams, respectively for the test channel shown in FIGS. 50 through 53.
Figure 61B:
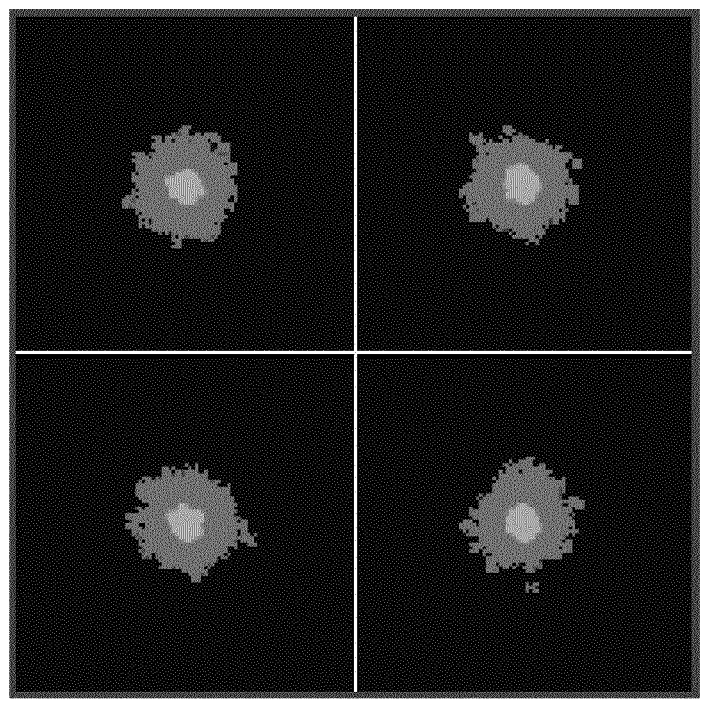

In the graph 2200D of FIG. 60, which corresponds to the spectrum 2100G of FIG. 53, a significant improvement in the value and stability of both unequalized and equalized MER for the test channel 2103T may be observed; in particular a very stable unequalized MER of approximately 30 dB is achieved, and a stable equalized MER of approximately 40 dB is achieved. With reference again to Table 5, these MER measurements are sufficient to support a QAM channel having a modulation order of at least 64 (64-QAM) and as high as 256 (256-QAM) or even higher (e.g., if LDPC error correction is employed). With reference again to the spectrum 2100G of FIG. 53, and in view of the substantially flat noise floor 2107 across the upstream path bandwidth (particularly below approximately 20 MHz), the MER measurements provided in the graph 2200D of FIG. 60 support placement of QAM channels having a modulation order of 64, and as high as at least 256, virtually anywhere within the upstream path bandwidth To provide another visually intuitive illustration of the efficacy of ingress mitigation methods, apparatus, and systems according to various embodiments of the present invention in terms of channel performance, FIGS. 61A and 61B represent pre-ingress mitigation and post-ingress mitigation constellation diagrams, respectively, for the test channel 2103T shown in FIGS. 50 through 53 (the constellation diagram of FIG. 61A corresponds to the spectrum 2100D shown in FIG. 50, and the constellation diagram of FIG. 61B corresponds to the spectrum 2100G shown in FIG. 53). In terms of the spread or "fuzziness" of the respective symbol clouds in the constellation diagrams, significantly less fuzzy and "tighter" symbol clusters may be readily observed in the constellation diagram of FIG. 61B as a result of ingress mitigation.

Figure 62:
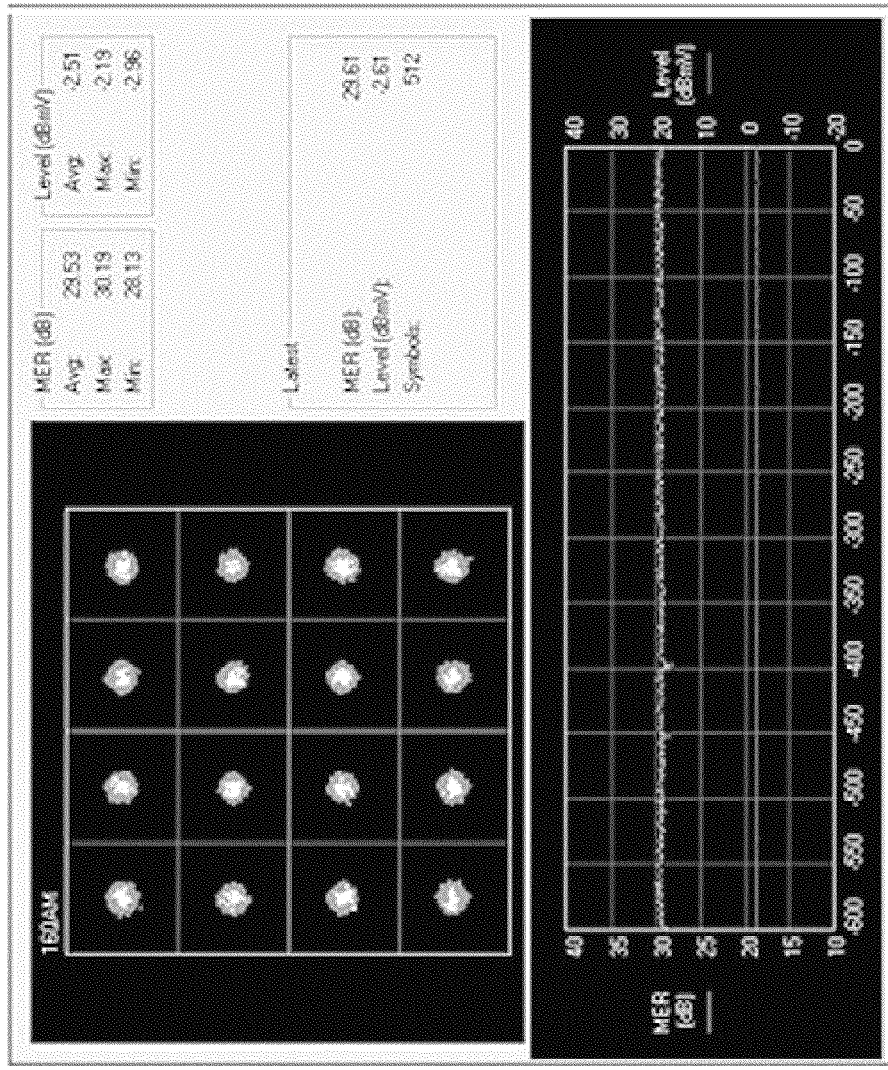
FIG. 62 shows a screen-shot of a QAM analyzer, illustrating a post-ingress mitigation constellation diagram and graph of unequalized MER as a function of packets received, for a 16-QAM ATDMA test channel having a carrier frequency of 16.4 MHz and employed in the neighborhood node for which spectra are shown in FIGS. 50-53, to verify the efficacy of ingress mitigation methods, apparatus and systems according to various embodiments of the present invention.

In addition to using a QPSK test channel to observe reduced ingress and improved performance on the ingress mitigated node BT-11, the ingress mitigated node BT-11 also was equipped, post-mitigation, with a test modem and demodulation tuner supporting a 16-QAM ATDMA test channel having a carrier frequency of 16.4 MHz and a bandwidth of 3.2 MHz. FIG. 62 shows a screen-shot of a QAM analyzer coupled to the headend of the communication system, illustrating a post-ingress mitigation constellation diagram and graph of unequalized MER as a function of packets received, for the 16-QAM ATDMA test channel. From FIG. 62, it may be readily observed that an unequalized MER of approximately 30 dB similarly is achieved for the 16-QAM ATDMA test channel, with tight symbol clusters in the constellation diagram.

Figure 63C:
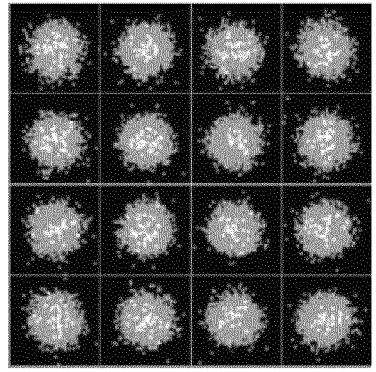
FIG. 63A shows the constellation diagram from the screen-shot of FIG. 62, and FIGS. 63B, 63C, 63D and 63E show similar constellation diagrams for 16-QAM ATMDA test channels used respectively in four other control nodes of the cable communication system, in which control nodes ingress mitigation was not performed according to the present invention, so as to provide a comparative illustration of the efficacy of ingress mitigation methods, apparatus and systems according to various embodiments of the present invention.
Figure 63E:
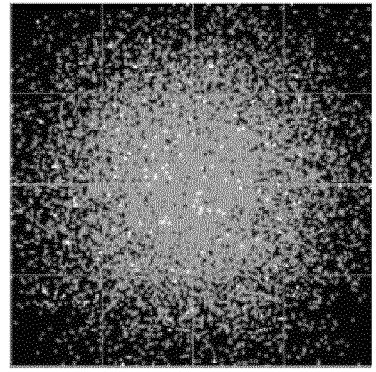
Figure 63B:
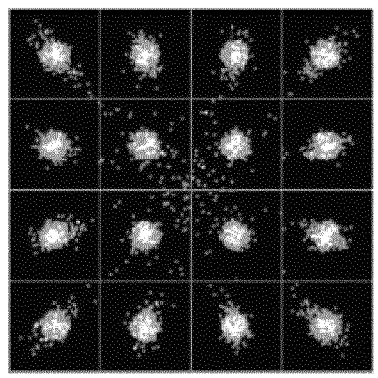
Figure 63D:
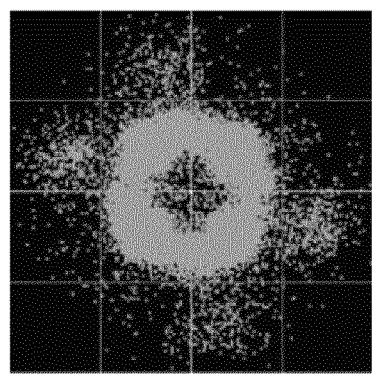
Figure 63A:
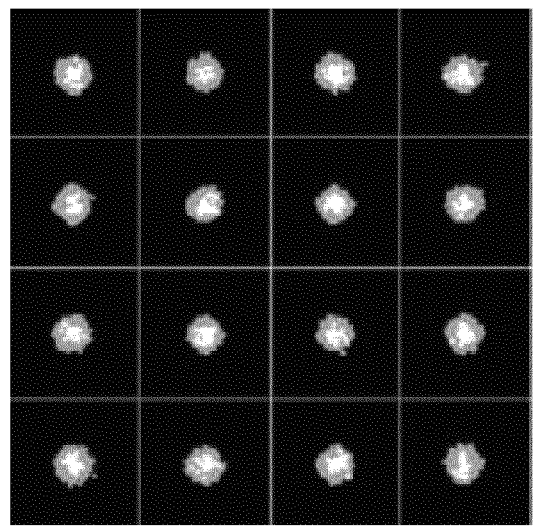

Similarly, four other "control nodes" of the cable communication system in which ingress mitigation was not performed respectively were equipped with test modems and demodulation tuners supporting a 16-QAM ATDMA test channel having a carrier frequency of 16.4 MHz and a bandwidth of 3.2 MHz. FIG. 63A shows the constellation diagram from the screen-shot of FIG. 62, and FIGS. 63B, 63C, 63D and 63E show similar constellation diagrams for 16-QAM ATMDA test channels used respectively in the four other control nodes of the cable communication system. The constellation diagrams of FIGS. 63B and 63C reveal significantly fuzzier clouds for the constellation symbols than those shown in FIG. 64A corresponding to the ingress mitigated node BT-11. In the control nodes represented by the constellation diagrams shown in FIGS. 63D and 63DE, the test modems would not even lock due at least in part to a significant presence of ingress.

Thus, pursuant to various inventive ingress mitigation methods and apparatus disclosed herein, improved cable communication systems and methods according to other embodiments of the present invention may be realized that previously were not possible. In particular, existing cable communication systems may be modified (e.g., repaired and/or updated with new components) pursuant to the ingress mitigation methods and apparatus disclosed herein to yield significantly improved cable communication systems according to various embodiments of the present invention. Similarly, new cable communication systems according to various embodiments of the present invention may be deployed in which, as part of a quality assessment of the newly installed system for example, the ingress mitigation methods and apparatus disclosed herein may be applied to ascertain that various noise metrics are met to accommodate significant increases in aggregate deployed upstream capacity as compared to conventional cable communication systems, and to generally ensure reliable operation of the newly installed system. For both pre-existing and newly installed cable communication systems, ingress mitigation methods and apparatus according to various embodiments of the present invention may be employed as part of a periodic (e.g., routine or occasional) cable communication system maintenance program to ensure ongoing reliability of such increased upstream capacity systems.

Furthermore, the Inventors have recognized and appreciated that a dramatic reduction of ingress in a given neighborhood node, particularly below approximately 20 MHz, also may provide for greater effectiveness of ingress cancellation circuitry employed in some cable modem termination system (CMTS) demodulation tuners, and/or obviate the need in some instances for advanced access protocols such as Synchronous Code Division Multiple Access (S-CDMA), thereby permitting expanded use of TDMA/ATDMA channels in a previously unusable portion of the upstream path bandwidth. In particular, cable communication systems according to various embodiments of the present invention having significantly reduced noise in the upstream path bandwidth of respective neighborhood nodes enable an expanded use of commonly implemented TDMA/ATDMA channels below 20 MHz to increase upstream capacity for supporting voice and/or data services.

Figure 26:
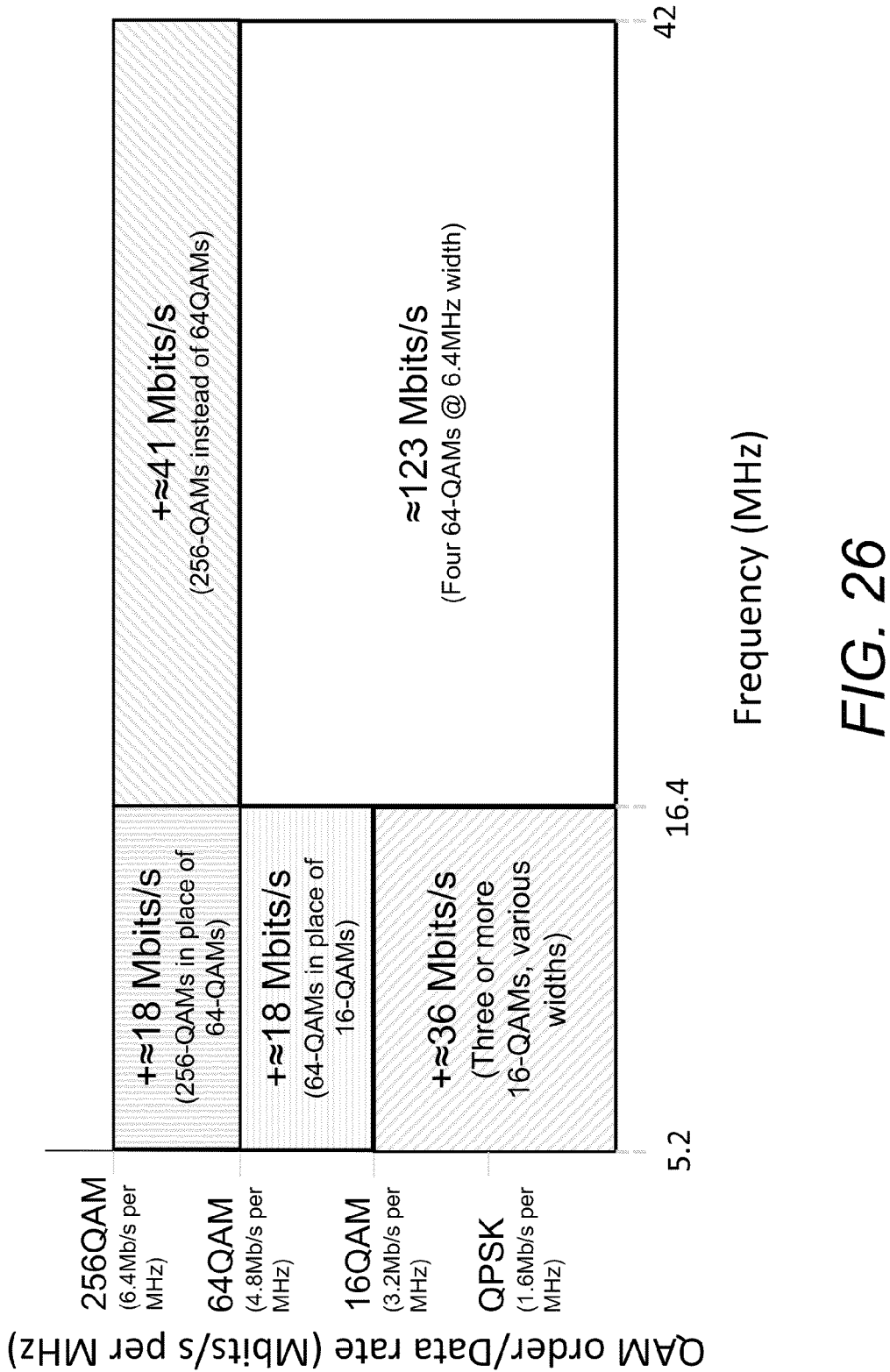
FIG. 26 illustrates a chart similar to that shown in FIGS. 17 through 21, in which incremental upstream capacity gains may be observed via the deployment of higher modulation order QAM channels in different portions of the upstream path bandwidth in one or more neighborhood nodes of cable communication systems according to various embodiments of the present invention.

Moreover, such reduced noise cable communication systems enable the implementation of upstream QAM channels with higher modulation orders (and hence increased deployed channel data rates) throughout the upstream path bandwidth from approximately 5 MHz to at least approximately 42 MHz as compared to conventional cable communication systems (even in the absence of forward error correction, adaptive equalization and/or ingress cancellation), thus providing significantly increased aggregate deployed upstream capacity in a given neighborhood node. For example, with reference again to FIG. 26, by using QAM channels having a modulation order as high as 256 throughout the upstream path bandwidth from approximately 5.2 MHz to approximately 42 MHz in a given neighborhood node of a cable communication system according to one embodiment of the present invention, a total aggregate deployed upstream capacity of approximately 240 Mbits/s may be realized—almost doubling the aggregate deployed upstream capacity of "state-of-the-art" conventional cable communication systems.

When reduced noise cable communication systems according to various embodiments of the present invention are coupled with one or more of adaptive equalization and ingress cancellation for physical communication channels, forward error correction (e.g., Reed-Solomon FEC or LDPC—see Table 6 above), and optionally advanced protocols such as S-CDMA or Orthogonal Frequency Division Multiplexing (OFDM), even further enhancements in aggregate deployed upstream capacity may be realized in the upstream path bandwidth of respective neighborhood nodes of the system (e.g., using QAM channels having modulation orders in excess of 256). In particular, in other embodiments, cable communication systems may be realized in which the noise profile of a given neighborhood node (e.g., the noise floor arising from AWGN, and other disturbances/interference combined therewith) over a substantial portion of the upstream path bandwidth from approximately 5 MHz to at least approximately 42 MHz allows for C/N values that, when combined with advanced error correction techniques such as LDPC, support functioning QAM channels having modulation orders in excess of 256 (e.g., see Table 6, in which a C/N value of 34 dB supports 4096-QAM using LDPC ⅚ error correction). In this manner, aggregate deployed upstream capacities of up to approximately 350 Mbits/s may be achieved in cable communication systems according to various embodiments of the present invention (e.g., using 4096-QAM channels having a deployed data rate of 9.6 Mbits/s/MHz across the upstream path bandwidth from approximately 5 MHz to at least approximately 42 MHz; see Table 3).

VII. Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, an intelligent network (IN) or the Internet. Such networks may be based on any suitable technology and may operate according to any suitable protocol and may include wireless networks, wired networks or fiber optic networks.

Any computer discussed herein may comprise a memory, one or more processing units (also referred to herein simply as "processors"), one or more communication interfaces, one or more display units, and one or more user input devices (user interfaces). The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Various embodiments described herein are to be understood in both open and closed terms. In particular, additional features that are not expressly recited for an embodiment may fall within the scope of a corresponding claim, or can be expressly disclaimed (e.g., excluded by negative claim language), depending on the specific language recited in a given claim.

Unless otherwise stated, any first range explicitly specified also may include or refer to one or more smaller inclusive second ranges, each second range having a variety of possible endpoints that fall within the first range. For example, if a first range of 3 dB<x<10 dB is specified, this also specifies, at least by inference, 4 dB<x<9 dB, 4.2 dB<x<8.7 dB, and the like.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for facilitating detection of ingress in at least one neighborhood node of a cable communication system, the cable communication system comprising:
    a headend or hub comprising:
    a headend optical/radio frequency (RF) converter; and
    a cable modem system coupled to the headend optical/RF converter; and
    a first neighborhood node of the at least one neighborhood node, the first neighborhood node having an infrastructure comprising:
    a first fiber optic cable coupled to the headend optical/RF converter;
    a first node optical/RF converter coupled to the first fiber optic cable;
    a first RF hardline coaxial cable plant, coupled to the first node optical/RF converter and traversing the first neighborhood node, to convey to the headend or hub at least first upstream information from a plurality of first subscriber premises over an upstream path bandwidth including a range of frequencies from approximately 5 MHz to at least approximately 42 MHz; and
    a plurality of first subscriber service drops, coupled to the first RF hardline coaxial cable plant and to the plurality of first subscriber premises, to provide the first upstream information from the plurality of first subscriber premises to the first RF hardline coaxial cable plant,
    the method comprising:
    A) directing a mobile broadcast apparatus including a transmitter along a first neighborhood node drive path proximate to the first RF hardline coaxial cable plant so as to effectively traverse and ensure substantially full coverage of the first subscriber neighborhood;
    B) during A), broadcasting from the transmitter a test signal at a plurality of locations distributed along at least a substantial portion of the first neighborhood node drive path, the test signal having at least one test signal frequency falling within the upstream path bandwidth;
    C) during A), electronically recording first geographic information corresponding to respective positions of the mobile broadcast apparatus along at least the substantial portion of the first neighborhood node drive path so as to generate a first record of the first geographic information;
    D) during A) and throughout traversing at least the substantial portion of the first neighborhood node drive path, recording, via an analyzer coupled to a first junction of the cable modem system and the headend optical/RF converter or a second junction of the hardline cable plant and the first node optical/RF converter, a plurality of signal amplitudes at the test signal frequency so as to generate a second record, the plurality of signal amplitudes representing a strength of a received upstream test signal as a function of time, based on B) and test signal ingress of the test signal into at least one fault in the first RF hardline coaxial cable plant; and
    E) based on the first record generated in C) and the second record generated in D), electronically generating a first neighborhood node ingress map comprising:
    a first graphical representation of the first neighborhood node drive path; and
    a second graphical representation, overlaid on the first graphical representation, of the plurality of signal amplitudes, at least along the substantial portion of the first neighborhood node drive path, so as to illustrate the test signal ingress of the test signal into at least the first RF hardline coaxial cable plant of the first neighborhood node.

2. The method of claim 1, wherein:
    B) comprises broadcasting from the transmitter the test signal at the plurality of locations distributed along an entirety of the first neighborhood node drive path;
    C) comprises electronically recording the first geographic information corresponding to the respective positions of the mobile broadcast apparatus along the entirety of the first neighborhood node drive path so as to generate the first record of the first geographic information;
    D) comprises recording the plurality of signal amplitudes at the test signal frequency throughout traversing the entirety of the first neighborhood node drive path so as to generate the second record; and
    in E), the second graphical representation is based on the plurality of signal amplitudes recorded along the entirety of the first neighborhood node drive path, so as to illustrate the test signal ingress of the test signal into at least the first RF hardline coaxial cable plant of the first neighborhood node.

3. The method of claim 1, wherein in B), the test signal does not include the geographic information for the plurality of locations recorded in C).

4. The method of claim 1, wherein B) comprises:
    B1) modulating the test signal so as to mitigate significant interference in the upstream path bandwidth with the first upstream information from the plurality of first subscriber premises.

5. The method of claim 4, wherein B1) comprises spread spectrum modulating the test signal.

6. The method of claim 4, wherein B1) comprises time division multiplexing the test signal.

7. The method of claim 6, wherein:
    the upstream path bandwidth includes a plurality of time slots;
    the plurality of time slots include a plurality of subscriber premises time slots and at least one dedicated time slot for the test signal;
    the plurality of subscriber premises are assigned respective subscriber premises time slots of the plurality of subscriber premises time slots to transmit at least some of the first upstream information in the upstream path bandwidth; and
    B1) comprises broadcasting the test signal during the dedicated time slot.

8. The method of claim 1, wherein B1) comprises:
    broadcasting the test signal as at least one pulsed test signal.

9. The method of claim 8, wherein a duration of one or more pulses of the at least one pulsed test signal is less than a symbol length of the first upstream information from the plurality of first subscriber premises.

10. The method of claim 1, wherein B) comprises:
    during A), broadcasting from the transmitter the test signal at a sufficiently low power as transmitted by the transmitter so as not to require licensure from one or more regulatory authorities.

11. The method of claim 1, wherein B) comprises:
    during A), broadcasting from the transmitter the test signal at at least one test signal frequency between 5 MHz and 16 MHz.

12. The method of claim 1, wherein B) comprises:
during A), varying the at least one test signal frequency, as a function of time, across at least a portion of the upstream path bandwidth.

13. The method of claim 1, wherein:
the at least one test signal frequency includes a plurality of test signal frequencies; and
B) further comprises:
B1) broadcasting, during A), the test signal at the plurality of test signal frequencies.

14. The method of claim 13, wherein B1) comprises broadcasting the test signal at at least two of the plurality of test signal frequencies simultaneously.

15. The method of claim 13, wherein the test signal includes a spread spectrum test signal.

16. The method of claim 1, wherein B) comprises:
B1) broadcasting the test signal during operative signaling in the upstream path bandwidth from at least some of the plurality of first subscriber premises, wherein the at least one test signal frequency falls within a frequency range of the operative signaling in the upstream path bandwidth.

17. The method of claim 16, wherein B1) further comprises:
varying the at least one test signal frequency, as a function of time, across a substantial portion of the frequency range of the operative signaling in the upstream path bandwidth.

18. The method of claim 1, wherein:
C) comprises:
during A), electronically recording the first geographic information corresponding to the respective positions of the mobile broadcast apparatus along at least the substantial portion of the first neighborhood node drive path as a first ordered sequence of points so as to generate the first record of the first geographic information as a function of time; and
D) comprises:
during A) and throughout traversing at least the substantial portion of the first neighborhood node drive path, recording, via the analyzer coupled to the first junction of the cable modem system and the headend optical/RF converter or the second junction of the hardline cable plant and the first node optical/RF converter, the plurality of signal amplitudes at the test signal frequency as a second ordered sequence of points so as to generate the second record, the plurality of signal amplitudes representing the strength of the received upstream test signal as a function of time, based on B) and the test signal ingress of the test signal into the at least one fault in the first RF hardline coaxial cable plant.

19. The method of claim 18, wherein in D), the second ordered sequence of points is indexed to the first ordered sequence of points from C).

20. The method of claim 18, wherein in C) and D), the first ordered sequence of points and the second ordered sequence of points respectively are sampled at a same time.

21. The method of claim 1, wherein:
C) comprises:
during A), electronically recording the first geographic information corresponding to the respective positions of the mobile broadcast apparatus along at least the substantial portion of the first neighborhood node drive path, together with a plurality of first corresponding time stamps, so as to generate the first record of the first geographic information as a function of time; and D) comprises:
during A) and throughout traversing at least the substantial portion of the first neighborhood node drive path, recording, via the analyzer coupled to the first junction of the cable modem system and the headend optical/RF converter or the second junction of the hardline cable plant and the first node optical/RF converter, the plurality of signal amplitudes at the test signal frequency together with a plurality of second corresponding time stamps so as to generate the second record, the plurality of signal amplitudes representing the strength of the received upstream test signal as a function of time, based on B) and the test signal ingress of the test signal into the at least one fault in the first RF hardline coaxial cable plant.

22. The method of claim 21, wherein:
at least a first portion of the first neighborhood node drive path includes a first-pass segment and a second-pass segment;
based on the first geographic information and plurality of first corresponding time stamps recorded during C), the mobile broadcast apparatus has at least one substantially identical position along the first-pass segment and the second-pass segment, respectively, at different ones of the first corresponding time stamps;
the second record includes respective signal amplitudes representing the strength of the received upstream test signal at different ones of the second corresponding time stamps substantially corresponding to the different ones of the first corresponding time stamps representing the at least one substantially identical position of the mobile broadcast apparatus along the first-pass segment and the second-pass segment;
the method further comprises:
F) electronically processing the respective signal amplitudes in the second record to provide an electronically-processed signal amplitude at the at least one substantially identical position along the first-pass segment and the second-pass segment; and
in E), the second representation is based at least in part on the electronically-processed signal amplitude from F).

23. The method of claim 22, wherein:
F) comprises determining an average value of the respective signal amplitudes in the second record to provide an averaged signal amplitude at the at least one substantially identical position along the first-pass segment and the second-pass segment; and
in E), the second representation is based at least in part on the averaged signal amplitude from F).

24. The method of claim 22, wherein:
F) comprises determining a difference value between the respective signal amplitudes in the second record to provide a differential signal amplitude at the at least one substantially identical position along the first-pass segment and the second-pass segment; and
in E), the second representation is based at least in part on the differential signal amplitude from F).

25. The method of claim 21, wherein E) comprises:
E1) merging the first record and the second record, based at least in part on the plurality of first corresponding time stamps and the plurality of second corresponding time stamps, so as to generate a third record including at least the first geographic information corresponding to respective positions of the mobile broadcast apparatus and the plurality of signal amplitudes representing the strength of the received upstream test signal as a function of time; and E2) generating the first neighborhood node ingress map based at least in part on the third record.

26. The method of claim 25, wherein:
E1) comprises:
adding to the third record second geographic information relating to additional locations in the first neighborhood node beyond the first neighborhood node drive path so as to generate an expanded third record; and
interpolating the plurality of signal amplitudes representing the strength of the received upstream test signal as a function of time so as to include in the expanded third record estimated signal amplitudes corresponding to the additional locations; and
E2) comprises generating the first neighborhood node ingress map based at least in part on the expanded third record.

27. The method of claim 1, wherein in E), the second graphical representation of the plurality of signal amplitudes includes a visual code for at least the plurality of signal amplitudes.

28. The method of claim 27, wherein the second graphical representation comprises a heat map representing the plurality of signal amplitudes.

29. The method of claim 27, wherein the second graphical representation comprises a contour map representing the plurality of signal amplitudes.

30. The method of claim 27, wherein:
the visual code comprises a color code including a plurality of colors; and
respective colors of the plurality of colors represent different signal amplitudes of the plurality of signal amplitudes.

31. The method of claim 27, wherein:
the visual code comprises a gray-tone scale including a plurality of shades of gray; and
respective shades of gray of the plurality of shades of gray represent different signal amplitudes of the plurality of signal amplitudes.

32. The method of claim 27, wherein the visual code includes at least one of:
a plurality of different hatching styles, wherein respective hatching styles of the plurality of different hatching styles represent different signal amplitudes of the plurality of signal amplitudes;
a plurality of different shading styles, wherein respective shading styles of the plurality of different shading styles represent different signal amplitudes of the plurality of signal amplitudes; and
a plurality of different symbols, wherein respective symbols of the plurality of different symbols represent different signal amplitudes of the plurality of signal amplitudes.

33. The method of claim 1, wherein in E):
the first neighborhood node ingress map comprises a graph having a first axis and a second axis;
the first graphical representation of the first neighborhood node drive path corresponds to the first axis, wherein a first scale of the first axis represents a distance or a time along the first neighborhood node drive path;
a second scale of the second axis represents respective signal amplitude values of the plurality of signal amplitudes; and
the second graphical representation of the plurality of signal amplitudes comprises a plot on the graph of the plurality of signal amplitudes as a function of the distance or the time along the first neighborhood node drive path.

34. The method of claim 1, wherein E) comprises generating the first neighborhood node ingress map as a three-dimensional map having three coordinate axes, and wherein:
the first graphical representation of the first neighborhood node drive path is rendered in a first plane of the three-dimensional map, wherein latitude and longitude coordinates for the first geographic information corresponding to the respective positions of the mobile broadcast apparatus are plotted along a first axis and a second axis, respectively, of the three coordinate axes; and
the second graphical representation includes a graph of respective values of the plurality of signal amplitudes, wherein the respective values of the plurality of signal amplitudes are plotted along a third axis of the three coordinate axes.

35. The method of claim 34, wherein the second graphical representation further includes a two-dimensional representation in the first plane of the three-dimensional map, the two-dimensional representation including a visual code for at least the plurality of signal amplitudes rendered.

36. The method of claim 1, wherein:
in A), the mobile broadcast apparatus is further equipped with an antenna and a receiver configured to measure ambient ingress;
C) further comprises:
during A), electronically recording, in tandem with the first geographic information, ambient ingress information corresponding to a strength of the ambient ingress as measured by the receiver along at least the substantial portion of the first neighborhood node drive path; and
E) comprises generating the first neighborhood node ingress map to further include a third graphical representation, overlaid on the first and second graphical representations, of the ambient ingress information.

37. The method of claim 1, wherein E) further comprises generating the first neighborhood node ingress map to further include:
a third graphical representation, overlaid on the first and second graphical representations, of a cable facilities map showing at least a portion of the infrastructure of the first neighborhood node.

38. The method of claim 1, wherein E) further comprises generating the first neighborhood node ingress map to further include:
a third graphical representation, overlaid on the first and second graphical representations, of subscriber information showing respective locations of the plurality of first subscriber premises.

39. The method of claim 38, wherein the third graphical representation includes at least one of a tax map and a parcel map.

40. The method of claim 38, wherein the third graphical representation includes at least one of:
at least one first indicator to indicate respective ones of the plurality of first subscriber premises;
at least one second indicator to indicate one or more types of cable communication system services provided to the respective ones of the plurality of first subscriber premises;
at least one third indicator to indicate a special status of at least one first subscriber premises of the plurality of first subscriber premises; and
at least one fourth indicator to indicate respective ones of non-subscriber premises in the first neighborhood node.

41. The method of claim 1, wherein E) further comprises generating the first neighborhood node ingress map to further include:

a third graphical representation, overlaid on the first and second graphical representations, of at least one of an aerial image and a street map.

42. The method of claim 1, wherein E) comprises generating the first neighborhood node ingress map as an electronic visual rendering having a plurality of independently selectable and independently viewable layers comprising at least two of:
   a first layer corresponding to the first graphical representation of the first neighborhood node drive path;
   a second layer corresponding to the second graphical representation of the plurality of signal amplitudes;
   a third layer corresponding to a third graphical representation of a cable facilities map showing at least a portion of the infrastructure of the first neighborhood node;
   a fourth layer corresponding to a fourth representation of subscriber information showing respective locations of the plurality of first subscriber premises;
   a fifth layer corresponding to a fifth graphical representation of at least one of an aerial image and a street map; and
   a sixth layer corresponding to a sixth representation of ambient ingress information in the first neighborhood node.

43. The method of claim 1, further comprising:
   F) during A), electronically communicating to the mobile broadcast apparatus the plurality of signal amplitudes recorded in D) in substantially real time; and
   G) providing to a technician directing the mobile broadcast apparatus at least one audible indicator and/or at least one visual indicator based on the plurality of signal amplitudes, wherein at least one aspect of the at least one audible indicator and/or the at least one visual indicator is based at least in part on the strength of the received upstream test signal as a function of time.

44. The method of claim 1, further comprising:
   F) electronically processing the plurality of signal amplitudes so as to automatically determine at least one potential point of first neighborhood node ingress due to the at least one fault in the first RF hardline coaxial cable plant of the first neighborhood node.

45. The method of claim 44, wherein E) comprises:
   based on the first record in C), the second record generated in D), and the at least one potential point of first neighborhood node ingress determined in F), generating the first neighborhood node ingress map comprising:
   the first graphical representation of the first neighborhood node drive path;
   the second graphical representation, overlaid on the first graphical representation, of the plurality of signal amplitudes; and
   a third graphical representation, overlaid on the first graphical representation and the second graphical representation, of the at least one potential point of first neighborhood node ingress.

46. The method of claim 44, wherein F) further comprises processing the plurality of signal amplitudes so as to automatically determine:
   a plurality of potential points of first neighborhood node ingress; and
   a relative severity of the plurality of potential points of first neighborhood node ingress so as to prioritize prospective repair or remediation activities in the first neighborhood node.

47. The method of claim 46, wherein E) further comprises:
   based on the first record in C), the second record generated in D), and the plurality of potential points of first neighborhood node ingress and the relative severity determined in F), generating the first neighborhood node ingress map comprising:
   the first graphical representation of the first neighborhood node drive path;
   the second graphical representation, overlaid on the first graphical representation, of the plurality of signal amplitudes; and
   a third graphical representation, overlaid on the first graphical representation and the second graphical representation, of the relative severity of the plurality of potential points of first neighborhood node ingress.

48. The method of claim 46, wherein:
   in A), the mobile broadcast apparatus is further equipped with an antenna and a receiver configured to measure ambient ingress;
   C) further comprises:
   during A), electronically recording, in tandem with the first geographic information, ambient ingress information corresponding to a strength of the ambient ingress as measured by the receiver along at least the substantial portion of the first neighborhood node drive path; and
   F) further comprises processing the plurality of signal amplitudes and the ambient ingress information so as to automatically determine the plurality of potential points of first neighborhood node ingress and the relative severity of the plurality of potential points of first neighborhood node ingress so as to prioritize the prospective repair or remediation activities in the first neighborhood node.

49. The method of claim 46, wherein the plurality of potential points of first neighborhood node ingress comprises:
   at least one hardline plant-related point corresponding to the at least one hardline plant-related fault in the first RF hardline coaxial cable plant; and
   at least one subscriber-related point corresponding to at least one subscriber-related fault in at least one of the plurality of first subscriber service drops or at least one of the plurality of first subscriber premises.

50. The method of claim 49, wherein F) further comprises processing the plurality of signal amplitudes and subscriber information so as to automatically determine the relative severity of the plurality of potential points of first neighborhood node ingress so as to prioritize the prospective repair or remediation activities in the first neighborhood node.

51. The method of claim 50, wherein the subscriber information includes at least one of:
   one or more types of cable communication system services provided to the at least one of the plurality of first subscriber premises; and
   a special status of the at least one of the plurality of first subscriber premises.

52. The method of claim 49, wherein E) further comprises:
   based on the first record in C), the second record generated in D), and the plurality of potential points of first neighborhood node ingress and the relative severity determined in F), generating the first neighborhood node ingress map comprising:
   the first graphical representation of the first neighborhood node drive path;
   the second graphical representation, overlaid on the first graphical representation, of the plurality of signal amplitudes; and
   a third graphical representation, overlaid on the first graphical representation and the second graphical representation, of the plurality of potential points of first neighborhood node ingress, wherein the third graphical representation includes different visual codes for the at least one subscriber-related point and the at least one hardline plant-related point, respectively.

53. An apparatus for facilitating detection of ingress in at least a first neighborhood node of a cable communication system, the apparatus comprising:
a communication interface;
a display device;
a memory to store processor-executable instructions;
an analyzer; and
a processor coupled to the communication interface, the display device, the analyzer, and the memory, wherein upon execution of the processor-executable instructions by the processor, the processor:
A) controls the communication interface so as to receive a first record of first geographic information as a function of time, the first geographic information corresponding to respective positions of a mobile broadcast apparatus as directed along at least a substantial portion of a first neighborhood node drive path proximate to a first RF hardline coaxial cable plant in the first neighborhood node of the cable communication system; and
B) controls the analyzer to measure a plurality of signal amplitudes representing a strength, at a headend or the first RF hardline coaxial cable plant of the cable communication system, of a received upstream test signal as a function of time, the strength of the received upstream test signal being based on: 1) a test signal broadcast from a transmitter in the mobile broadcast apparatus as the mobile broadcast apparatus is directed along the first neighborhood node drive path proximate to the first RF hardline coaxial cable plant; and 2) test signal ingress of the test signal into at least one fault in the RF hardline coaxial cable plant;
C) generates a second record including the plurality of signal amplitudes measured in A2);
D) controls the memory so as to store in the memory the first record and the second record;
E) based on the first record and the second record, electronically generates a first neighborhood node ingress map comprising:
E1) a first graphical representation of the first neighborhood node drive path; and
E2) a second graphical representation, overlaid on the first graphical representation, of the plurality of signal amplitudes, at least along the substantial portion of the first neighborhood node drive path, so as to illustrate the test signal ingress of the test signal into at least the first RF hardline coaxial cable plant of the first neighborhood node; and
F) controls the display device so as to display the first neighborhood node ingress map.

54. A computer readable non-transitory storage medium storing processor-executable instructions that, when executed by at least one processor, perform a method for facilitating detection of ingress in at least a first neighborhood node of a cable communication system, the method comprising:
A) electronically receiving:
A1) first geographic information as a function of time, the first geographic information corresponding to respective positions of a mobile broadcast apparatus as directed along at least a substantial portion of a first neighborhood node drive path proximate to a first RF hardline coaxial cable plant in the first neighborhood node of the cable communication system; and
A2) a plurality of signal amplitudes representing a strength, as measured at a headend or the first RF hardline coaxial cable plant of the cable communication system, of a received upstream test signal as a function of time, the strength of the received upstream test signal being based on: 1) a test signal broadcast from a transmitter in the mobile broadcast apparatus as the mobile broadcast apparatus is directed along the first neighborhood node drive path proximate to the first RF hardline coaxial cable plant; and 2) test signal ingress of the test signal into at least one fault in the RF hardline coaxial cable plant;
B) electronically processing the first geographic information to generate a first record based at least in part on the processed first geographic information;
C) electronically processing the plurality of signal amplitudes to generate a second record based at least in part on the processed plurality of signal amplitudes; and
D) based on the first record and the second record, electronically generating a first neighborhood node ingress map comprising:
D1) a first graphical representation of the first neighborhood node drive path; and
D2) a second graphical representation, overlaid on the first graphical representation, of the plurality of signal amplitudes, at least along the substantial portion of the first neighborhood node drive path, so as to illustrate the test signal ingress of the test signal into at least the first RF hardline coaxial cable plant of the first neighborhood node.

* * * * *